US012756567B2

(12) United States Patent
Grube

(10) Patent No.: US 12,756,567 B2
(45) Date of Patent: Oct. 6, 2026

(54) SELECTING A CONTINGENT ACTION TOKEN

(71) Applicant: 2BC Innovations, LLC, Barrington, IL (US)

(72) Inventor: Gary W. Grube, Barrington Hills, IL (US)

(73) Assignee: 2BC Innovations, LLC, Barrington, IL (US)

( * ) Notice: Subject to any disclaimer, the term of this patent is extended or adjusted under 35 U.S.C. 154(b) by 13 days.

(21) Appl. No.: 18/954,253

(22) Filed: Nov. 20, 2024

(65) Prior Publication Data

US 2025/0080356 A1 Mar. 6, 2025

Related U.S. Application Data

(63) Continuation of application No. 17/953,433, filed on Sep. 27, 2022, now Pat. No. 12,155,766.

(60) Provisional application No. 63/339,843, filed on May 9, 2022.

(51) Int. Cl.

| | |
|---|---|
| ***G06Q 20/38*** | (2012.01) |
| ***G06Q 20/36*** | (2012.01) |
| ***G06Q 40/04*** | (2012.01) |
| ***G06Q 40/06*** | (2012.01) |
| ***G06Q 40/08*** | (2012.01) |
| ***H04L 9/00*** | (2022.01) |
| ***H04L 9/08*** | (2006.01) |
| ***H04L 9/32*** | (2006.01) |

(52) U.S. Cl.

CPC ....... *H04L 9/3213* (2013.01); *G06Q 20/3678* (2013.01); *G06Q 20/38215* (2013.01); *G06Q 20/389* (2013.01); *G06Q 40/04* (2013.01); *G06Q 40/06* (2013.01); *G06Q 40/08* (2013.01); *H04L 9/0825* (2013.01); *H04L 9/3236* (2013.01); *H04L 9/3247* (2013.01); *H04L 9/50* (2022.05); *G06Q 2220/10* (2013.01); *H04L 2209/603* (2013.01)

(58) Field of Classification Search

CPC .................... G06Q 20/00–425; H04L 9/00–50

See application file for complete search history.

(56) References Cited

U.S. PATENT DOCUMENTS

| | | | |
|---|---|---|---|
| 6,963,852 | B2 | 11/2005 | Koresko, V |
| 7,519,552 | B2 | 4/2009 | Phelps |
| 7,752,062 | B1 | 7/2010 | Martin |
| 7,769,607 | B2 | 8/2010 | Phelps |
| 7,885,837 | B1 | 2/2011 | Martin |

(Continued)

*Primary Examiner* — Ari Shahabi

(74) *Attorney, Agent, or Firm* — Gary W. Grube

(57) ABSTRACT

A method executed by a computing device includes identifying a contingency-action token (CAT) of an object distributed ledger that meets minimum CAT requirements. The method further includes determining whether to select the CAT based on an evaluation of the CAT with regards to an evaluation profile. When selecting the CAT the method further includes to producing a selected CAT and determining reassignment information for the selected CAT. The method further includes updating the selected CAT utilizing the reassignment information for the CAT to produce an updated CAT. The method further includes causing generation of a new block affiliated with the updated CAT via a blockchain of the object distributed ledger, where the new block includes the updated CAT.

12 Claims, 61 Drawing Sheets

(56) References Cited

U.S. PATENT DOCUMENTS

| | | | | |
|---|---|---|---|---|
| 8,005,739 | B1 | 8/2011 | Reddy | |
| 8,005,741 | B2 | 8/2011 | Jenkins | |
| 8,533,087 | B2 | 9/2013 | Lyons | |
| 8,566,206 | B2 | 10/2013 | Stolerman | |
| 8,725,618 | B1 | 5/2014 | Menzer | |
| 10,505,726 | B1 | 12/2019 | Andon | |
| 11,075,891 | B1 * | 7/2021 | Long | H04L 9/3213 |
| 2020/0273048 | A1 * | 8/2020 | Andon | G06Q 10/02 |
| 2021/0295324 | A1 * | 9/2021 | Kerseboom | H04L 9/3239 |
| 2021/0390531 | A1 * | 12/2021 | Voorhees | G06Q 20/367 |
| 2022/0343328 | A1 * | 10/2022 | Fowler | G06Q 30/0631 |
| 2022/0383295 | A1 * | 12/2022 | Cox | G06Q 20/367 |
| 2022/0391887 | A1 * | 12/2022 | Jakobsson | H04L 9/3239 |
| 2022/0391888 | A1 * | 12/2022 | Kim | G06Q 20/3678 |

* cited by examiner

SELECTING A CONTINGENT ACTION TOKEN

CROSS REFERENCE TO RELATED PATENTS

The present U.S. Utility Patent Application claims priority pursuant to 35 U.S.C. § 120 as a continuation of U.S. Utility application Ser. No. 17/953,433 entitled "SELECTING A CONTINGENT ACTION TOKEN", filed Sep. 27, 2022, issuing as U.S. Pat. No. 12,155,766 on Nov. 26, 2024, which claims priority pursuant to 35 U.S.C. § 119(e) to U.S. Provisional Application No. 63/339,843, entitled "UTILIZING A CONTINGENT ACTION TOKEN," filed May 9, 2022, each of which is hereby incorporated herein by reference in its entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to communication systems and more particularly to asset reconfiguration and reassignment within the communication system.

Description of Related Art

Communication systems are known to communicate data between communication devices of the communication system. The data may be communicated in one or more of an unaltered form (e.g., raw data from a first communication device), in an altered form to provide enhanced transmission reliability (e.g., error encoded), in an altered form to provide enhanced security of access (e.g., credentialed access, encryption), and in an altered form to enhance communication resource utilization (e.g., compression). The data may represent a wide variety of data types including one or more of video, audio, text, graphics, and images. Text data is widely known to represent text character documentation, financial documents of numerical nature, and/or a combination thereof.

Global enterprise operations are increasingly utilizing communication systems to communicate representations of financial affairs. Financial documents associated with the financial affairs may include advertisements, solicitations, asset pricing information, purchase orders, invoices, payment transactions, asset distribution information, complex settlement information, financing information, financial market information, asset titling information, transaction guarantee information, global finance trend analysis information, and other information associated with the increasingly complex world of electronic commerce.

The global velocity of data communication and massive volume of data representing financial documents is ever-increasing and as a result it is a growing challenge to communicate, manipulate, and enhance the data related to financial affairs. Such challenges include refreshing an asset base of the financial system (e.g., including detecting growing issues with regards to desired funding levels of the financial system), unlocking untapped asset value (e.g., conversion of one asset type to another), and rapidly retitling new or re-spun assets (e.g., assigning new assets, reassigning converted assets).

BRIEF DESCRIPTION OF THE SEVERAL VIEWS OF THE DRAWING(S)

Figure 20A:
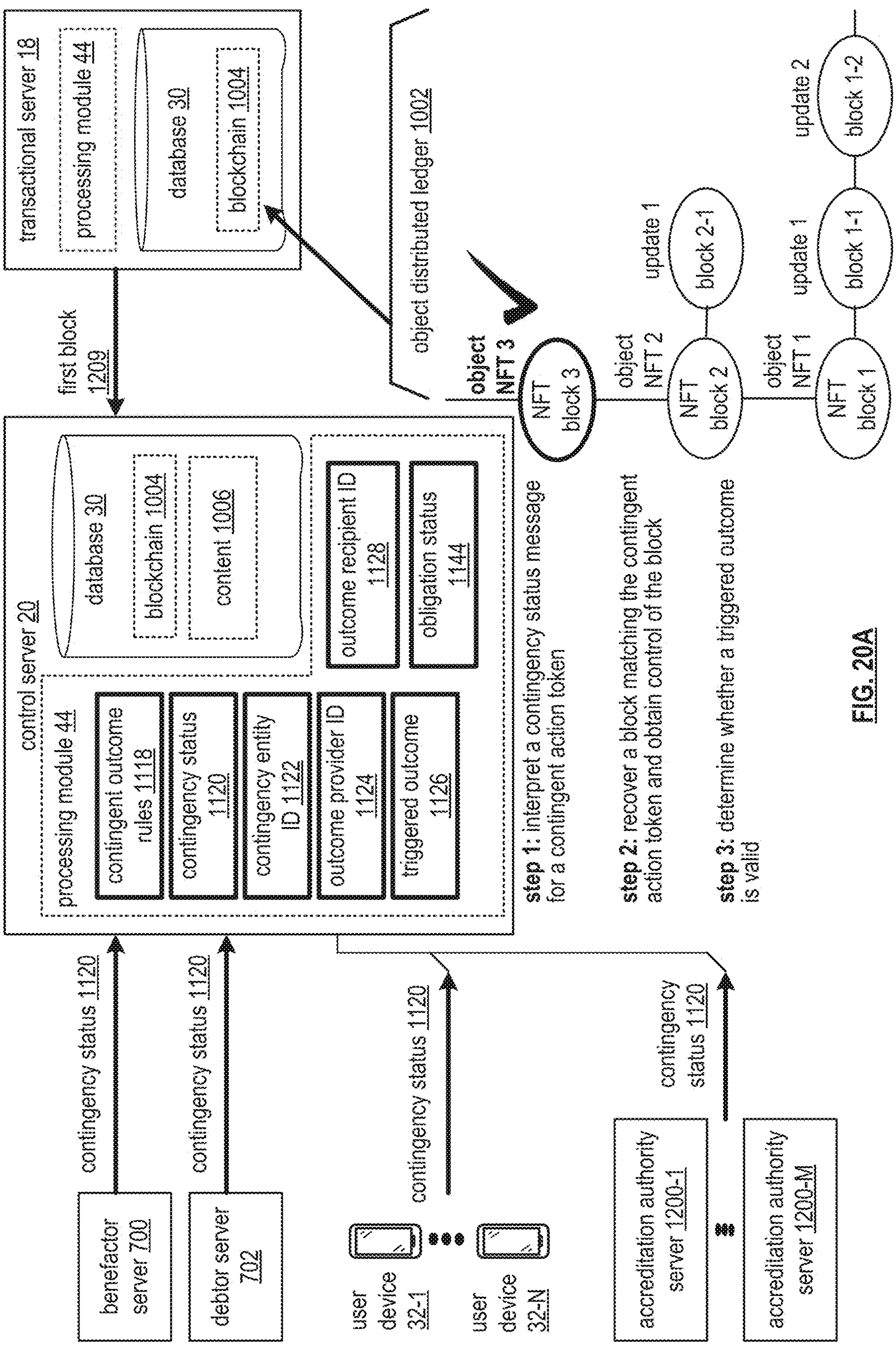
Figure 20B:
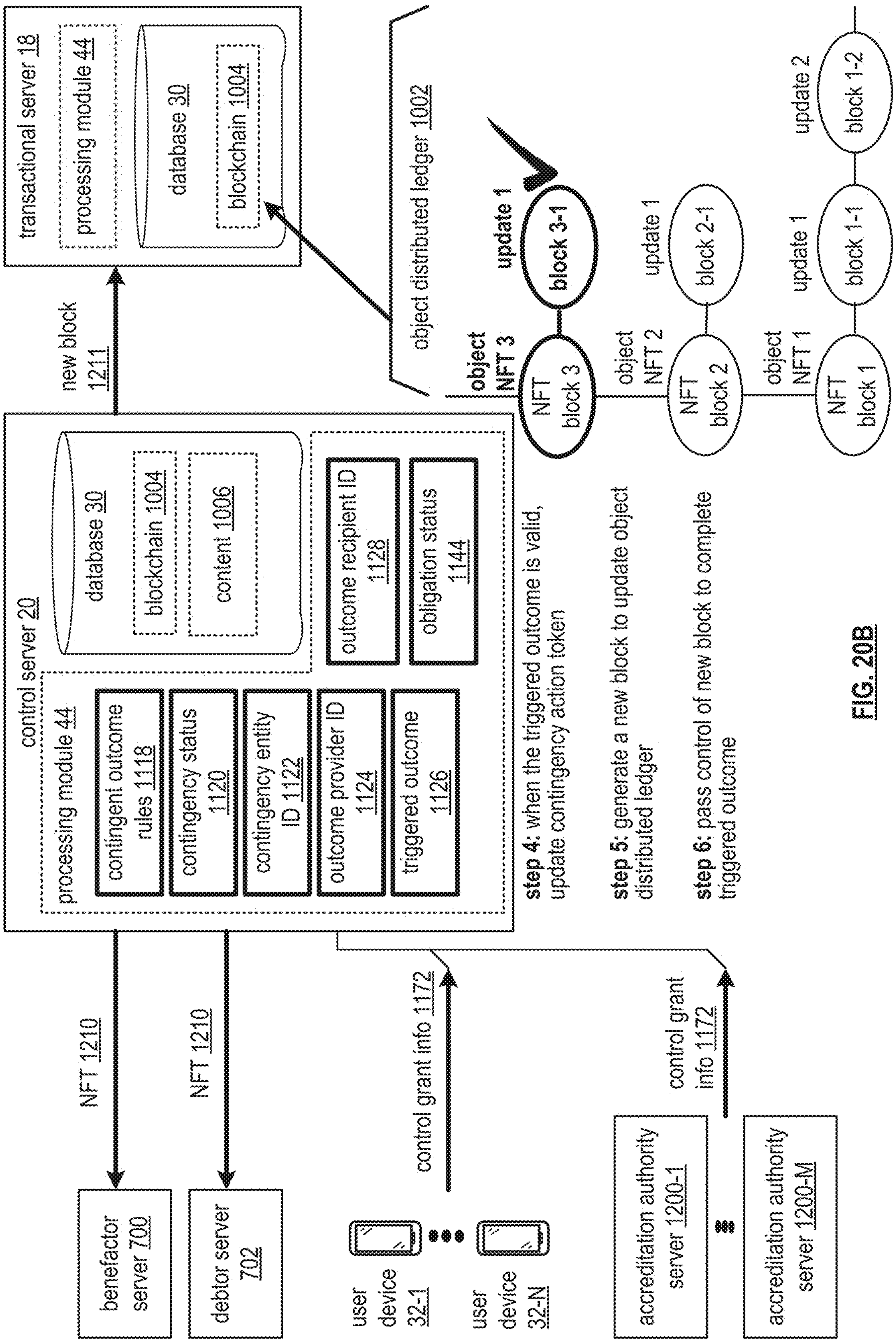

FIGS. 20A-20B are schematic block diagrams of another embodiment of a computing system illustrating another embodiment of a method for utilizing a contingent action token within the computing system in accordance with the present invention; and FIGS. 21A-21D are schematic block diagrams of an embodiment of a computing system illustrating an embodiment of a method for selecting a contingent action token within the computing system in accordance with the present invention.

DETAILED DESCRIPTION OF THE INVENTION

Figure 1:
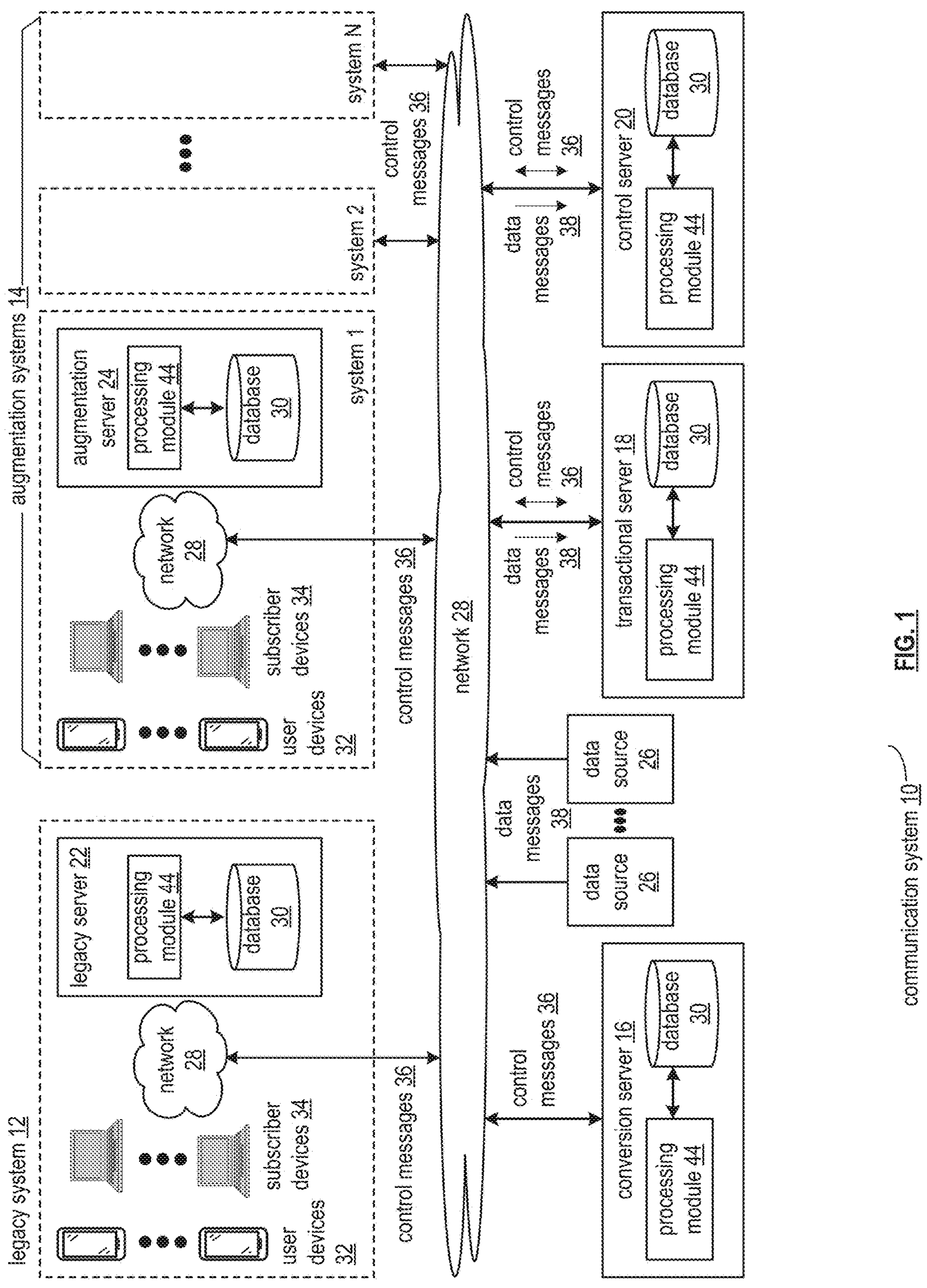
FIG. 1 is a schematic block diagram of an embodiment of a communication system in accordance with the present invention.

FIG. 1 is a schematic block diagram of an embodiment of a communication system 10 that includes a legacy system 12, a plurality of N augmentation systems 14, a conversion server 16, a transactional server 18, a control server 20, one or more data sources 26, and a network 28. Alternatively, the communication system 10 may include any number of legacy systems 12 and any number of servers 16-20.

The legacy system 12 includes a plurality of user devices 32, a plurality of subscriber devices 34, a portion of the network 28, and a legacy server 22. Each user device 32 may be implemented utilizing one or more portable communication devices. Examples of portable communication devices include a smart phone, a basic cell phone, a Wi-Fi communication device, a satellite phone, and/or any other device that includes a computing core (e.g., providing processing module functionality), one or more wireless modems, sensors, and one or more user interfaces, and is capable of operating in a portable mode untethered from a fixed and/or wired network. For example, a particular user device 32 is implemented utilizing the smart phone, where the smart phone is utilized by a user associated with the legacy system 12. At least some of the user devices 32 are capable to communicate data encoded as wireless communication signals and/or wireless location signals with the portion of the network 28 associated with the legacy system 12 and/or directly or indirectly to other user devices 32 and/or to at least some of the user devices 34.

Each subscriber device 34 may be implemented utilizing one or more computing devices. Examples of portable computing devices includes a laptop computer, a tablet computer, a handheld computer, a desktop computer, a cable television set-top box, an application processor, an internet television user interface, and/or any other device that includes a computing core a (e.g., providing the processing module functionality), one or more modems, sensors, and one or more user interfaces. For example, a particular user subscriber device 34 is implemented utilizing the laptop computer, where the laptop computer is utilized by a subscriber associated with the legacy system 12. The subscriber devices 34 are capable to communicate data that is encoded into wireless and/or wired communication signals via the portion of the network 28 associated with the legacy system 12 and/or directly or indirectly to other subscriber devices 34 and/or to at least some of the user devices 32.

The components of the communication system 10 are coupled via the network 28, which may include one or more of wireless and/or wireline communications networks, one or more wireless location networks, one or more private communications systems, a public Internet system, one or more local area networks (LAN), and one or more wide area networks (WAN). For example, the network 28 is implemented utilizing the Internet to provide connectivity between the legacy system 12, the plurality of augmentation systems 14, the one or more data source 26, and the servers 16-20. The wireless location networks communicate wireless location signals with the user devices 32. Each wireless location network may be implemented utilizing one or more of a portion of a global positioning satellite (GPS) satellite constellation, a portion of a private location service, a wireless local area network (WLAN) access point, a Bluetooth (BT) beacon and/or communication unit, and a radiofrequency identifier (RFID) tag and/or transceiver. Each wireless location network generates and transmits the wireless location signals in accordance with one or more wireless location industry standards (e.g., including synchronize timing information (i.e., GPS), and a geographic reference identifier (ID) (i.e., a beacon ID, a MAC address, an access point ID such as a wireless local area network SSID)).

The wireless communication networks of the network 28 include one or more of a public wireless communication network and a private wireless communication network and may operate in accordance with one or more wireless industry standards including 5G, 4G, universal mobile telecommunications system (UMTS), global system for mobile communications (GSM), long term evolution (LTE), wideband code division multiplexing (WCDMA), and IEEE 802.11. For example, a first user device 32 communicates data encoded as wireless communication signals with a 4G public wireless communication network of the network 28 and a second user device 32 communicates data encoded as wireless communication signals with a Wi-Fi wireless communication network of the network 28.

The legacy server 22 includes at least one processing module 44 and at least one database 30. The processing module 44 processes control messages 36 and data messages 38 via the network 28 with one or more of the user devices 32, the subscriber devices 34, the augmentation systems 14, the data sources 26, the conversion server 16, a transactional server 18, and the control server 20. The processing module 44 further stores and retrieves data in the database 30. The processing module 44 is discussed in greater detail with respect to FIGS. 2-3 and the database 30 is discussed in greater detail with reference to FIG. 3.

Each augmentation system 14 includes another plurality of user devices 32, another plurality of subscriber devices 34, another portion of the network 28, and an augmentation server 24. The augmentation server 24 includes another processing module 44 and another database 30. Each of the conversion server 16, the transactional server 18, and the control server 20 includes another processing module 44 and another database 30.

Each data source 26 may be implemented utilizing one or more of a server, a subscription service, a website data feed, or any other portal to data messages 38 that provide utility for operation of the communication system 10. Further examples of the data source 26 includes one or more of a financial market server, a census server, a government record server, another transactional server, another control server, another conversion server, another legacy server, a weather service, a screen scraping algorithm, a website, another database, a schedule server, a live traffic information feed, an information server, a service provider, and a data aggregator. The data messages 38 includes one or more of live financial market information, historical financial market information, weather information, a user daily activity schedule (e.g., a school schedule, a work schedule, a delivery schedule, a public transportation schedule), real-time traffic conditions, a road construction schedule, a community event schedule, address of residence information, user lifestyle information (e.g., smoker, non-smoker, physical activities, etc.), user death records, mortality tables, and other information associated with a user.

In general, and with respect to the asset reconfiguration and reassignment within the communication system 10, the communication system 10 supports three primary functions. The three primary functions include: 1) determining desired financial attributes of a financial system (e.g., supported by an underperforming legacy asset base), 2) facilitating acquisition of an augmenting asset bundle to enhance the financial system (e.g., enhancing and/or replacing the legacy asset base, and 3) facilitating the enhancement of the financial system utilizing the augmenting asset bundle such that the financial system substantially achieves the desired financial attributes. The communication system 10 may perform one or more of the three primary functions to provide the asset reconfiguration and reassignment.

The financial system is associated with the legacy system 12 where a plurality of users of the user devices 32 and the subscriber devices 34 are investors/beneficiaries of the legacy asset base supporting the financial system. The plurality of users may include thousands, hundreds of thousands, or even millions of users. The financial system includes any system to derive value for the plurality of users (e.g., balance sheet value and/or cash flow value) from the legacy asset base. Examples of the financial system includes a money market, a bond fund, a hedge fund, a pension system, and a stock fund. The desired financial attributes include one or more of present and future values of the legacy asset base, cash flows enabled by the legacy asset base, ongoing costs associated with the financial system, and return on investment levels for the legacy asset base. The legacy asset base may include thousands, hundreds of thousands, or even millions of individual assets, where assets may include tangible hard assets (e.g., property title, precious metals, commodities, etc.) and monetary assets (e.g., bonds, stocks, life insurance policies, The augmenting asset bundle includes a bundle of selected assets acquired from one or more of the augmentation systems 14, where candidate assets associated with the augmentation systems 14 includes thousands, hundreds of thousands, and even millions of assets. The assets are selected such that when combined or replacing assets of the legacy assets, the desired financial attributes of the financial system can substantially be reached. The facilitating of the enhancement of the financial system utilizing the augmenting asset bundle manipulates (e.g., splits, un-bundles, transforms, re-bundles, retitles, etc.) the selected assets for combination with or the replacement of assets of the legacy asset base.

The first primary function includes the communication system 10 determining desired financial attributes of a financial system. In an example of operation where the financial system of the legacy system 12 is a pension system for over 100,000 pensioners, the legacy asset base includes assets that are a combination of cash and bonds, and the augmentation systems 14 lists millions of available life insurance policies, the processing module 44 of the control server 20 determines to evaluate the financial system. For example, the control server 20 receives, via the network 28, a control message 36 from the conversion server 16, where the control message 36 includes a request to address underperformance of the legacy asset base associated with the legacy system 12. Having determined to evaluate the financial system, the control server 20 characterizes the financial system to produce a desired cash flow and desired valuation improvement or left for the legacy asset base. For example, the control server 20 receives, via the network 28, another control message 36 from the legacy server 22 that includes information associated with the financial system, and evaluates the information associated with the financial system to determine the desired cash flow and desired valuation lift. The first primary function is discussed in greater detail with reference to FIGS. 5A-5B.

The second primary function includes the communication system 10 facilitating acquisition of an augmenting asset bundle to enhance the financial system. In an example of operation, the processing module 44 of the control server 20 accesses augmenting asset information to extract candidate asset characteristics and down selects candidate assets that compare favorably to augmenting asset preferences. The candidate asset characteristics includes one or more of asset identifier (ID), asset type (e.g., stock, bond, life insurance policy, tangible asset), estimated fair market value (FMV) of the asset, purchase price of the asset, a risk level associated with the asset, a risk level associated with the particular augmentation system tied to the asset, associated liabilities (e.g., premium payments), associated payouts (e.g., a death benefit of an insurance policy), estimated payout timing (e.g., estimated year of a life insurance death benefit payout), an estimated return on investment (ROI) level, and demographics of entities associated with the asset (e.g., age and other characteristics of an insured person associated with an insurance policy). The augmenting asset preferences includes one or more of a maximum desired risk level associated with the asset, a maximum desired risk level associated with the augmentation system tied to the asset, a maximum liability level, a minimum payout level, a minimum ROI level, and one or more preferred demographics of the entities associated with the asset. For example, the control server 20 receives control messages 36 from one or more of the augmentation servers 24, where the control messages 36 includes the candidate asset characteristics, and receives further control messages 36 from the conversion server 16, where the further control messages 36 includes the augmenting asset preferences.

Having obtained the candidate asset characteristics and the augmenting asset preferences, the control server 20 searches through available assets of the one or more augmentation systems 14 to down select the candidate assets that compare favorably to the augmenting asset preferences. For example, the control server 20 exchanges control messages 36 with the augmentation server of each of the one or more augmentation systems 14 to identify each available asset, compares the asset characteristics of the available asset to the augmenting asset preferences, and identify assets where the comparison is favorable (e.g., estimated ROI greater than minimum desired ROI, estimated risk level lower than maximum desired risk level, etc.) to produce the down selected candidate assets.

Having identified the down selected candidate assets, the control server 20 determines a financial contribution of each of the down selected candidate assets. For example, the control server 20 estimates a balance sheet contribution (e.g., a portion of the desired lift) and a cash flow contribution (e.g., a portion of the desired cash flow) for each down selected candidate asset based on the candidate asset characteristics. The control server 20 may produce the estimates based on the down selected candidate assets in an un-altered form and may produce further estimates based on altered forms of the down selected candidate assets, where each of the altered down selected candidate assets are reconfigured. The reconfiguring of a plurality of assets (e.g., selected candidate assets) includes the deconstruction of each of the assets into deconstructed asset elements of two or more element types in accordance with a deconstruction approach and re-bundling pluralities of deconstructed asset elements into two or more new asset bundles in accordance with a re-bundling approach to substantially satisfied the desired cash flow and desired valuation lift of the financial system, where each new asset bundle is generally titled to a different entity. For instance, the control server 20 utilizes a default deconstruction approach and default re-bundling approach to produce financial contributions of the down selected candidate assets when reconfigured (e.g., deconstructed and re-bundled in accordance with the default deconstruction approach and default re-bundling approach).

Having determined the financial contributions of each of the down selected candidate assets, the control server 20 selects assets from the down selected candidate assets to produce the augmenting asset bundle. The selecting includes choosing an asset selection approach to make the selections and completing the selecting utilizing the identified selection approach. The selection approaches include one or more of selecting assets that individually produce a highest level of ROI, selecting assets that produce a highest level of cash flow, selecting assets that produce a highest level of lift, selecting assets associated with highest levels of favorable financial contributions weighted by risk (e.g., asset risk, augmenting system risk, and transactional server entity risk), a random selection approach, and any other approach to optimize selection of the assets when considering utilization of deconstructed elements of the assets. The choosing of the asset selection approach may be based on one or more of a predetermination, a request, a correlation of historically utilized selection approaches and financial results, and a weighting factor that considers multiple desired outcomes.

Having chosen the asset selection approach, the control server 20 utilizes the asset selection approach to select assets from the down selected candidate assets based on the financial contributions to produce the augmenting asset bundle revealing characteristics of the selected assets (e.g., asset ID, asset type, etc.). For example, the control server 20 exchanges further control messages 36 with the one or more augmentation servers 24 to complete acquisition of the selected assets of the augmenting asset bundle based on the financial contributions of the selected assets.

The third primary function includes the communication system 10 facilitating the enhancement of the financial system utilizing the augmenting asset bundle such that the financial system substantially achieves the desired financial attributes. In an example of operation, the control server 20 selects a server to perform the reconfiguring of the acquired assets. The selection may be based on one or more of a predetermination, a request, and historical reconfiguring results. For example, the control server 20 selects the conversion server 16 to perform the reconfiguring of the acquired assets.

Having selected the conversion server 16 to perform the reconfiguring of the acquired assets, the control server 20 facilitates the reconfiguring of the assets of the augmenting asset bundle. The facilitating includes selecting the deconstruction approach, selecting the re-bundling approach, and initiating the reconfiguring utilizing the selected approaches. The selecting may be based on one or more of a predetermination, a request, information extracted from data messages 38 of one or more of the data sources 26 (e.g., current market conditions), and historical financial results based on various approaches. The initiating of the reconfiguring includes performing the reconfiguring by the control server 20 and/or issuing a control message 36 to the conversion server 16, where the control message 36 includes a request to perform the reconfiguring of the assets of the augmenting asset bundle in accordance with the selected deconstruction approach and the selected re-bundling approach. The control message 36 may further include the characteristics of the selected assets of the augmenting asset bundle. For example, the conversion server 16 deconstructs each asset of the augmenting asset bundle in accordance with the deconstruction approach to produce two or more deconstructed asset elements (e.g., of two or more element types) and re-bundles pluralities of the deconstructed asset elements in accordance with the re-bundling approach to produce the two or more asset bundles.

Having facilitated the reconfiguring of the assets, the control server 20 facilitates the reassignment of the reconfigured assets where the two or more asset bundles are to be titled to two or more entities of the communication system 10 to substantially satisfy the desired cash flow and desired valuation lift of the financial system. The facilitating includes issuing titling information to the conversion server 16 such that the conversion server 16 titles the two or more asset bundles in accordance with the titling information. Having received the titling information, the conversion server 16 produces two asset bundles and issues the titling information via a control message 36 to the legacy server 22 to associate a first asset bundle with the legacy system 12 and issues the titling information via another control message 36 to the transactional server 18 to associate a second asset bundle with the transactional server 18.

Having facilitated the titling of the two or more asset bundles, the control server 20 identifies the transactional server 18 to facilitate subsequent financial transactions utilizing the new asset bundles produced from the re-bundling of the deconstructed elements of the acquired assets. For example, the control server 20 issues a control message 36, via the network 28, to the transactional server 18, where the control message 36 includes subsequent financial transaction information (e.g., how to utilize the new asset bundles). For instance, the transactional server 18 exchanges control messages 36 with an augmentation server 24 associated with a particular asset to settle a periodic liability (e.g., the transactional server 18 facilitates a liability payment to the augmentation server 24 such as a life insurance premium payment) and to collect a cash flow (e.g., a life insurance policy death benefit payment). As another instance, the transactional server 18 partitions the cash flow from the augmentation server 24 into a first portion and a second portion, where the first portion is associated with the legacy server 22 (e.g., a portion of the life insurance policy death benefit payment flows to the pension system associated with the financial system of the legacy server 22) and the second portion is associated with the transactional server 18 (e.g., a holdback if any). Such financial transactions may include one or more of electronic money wire transfers and blockchain encoded secure funds transfer.

In various embodiments, a non-transitory computer readable storage medium includes at least one memory section that stores operational instructions that, when executed by one or more processing modules of one or more computing devices that each include a processor and a memory, causes each processing module to perform operations including the above-described asset reconfiguration and reassignment within the communication system.

Figure 2:
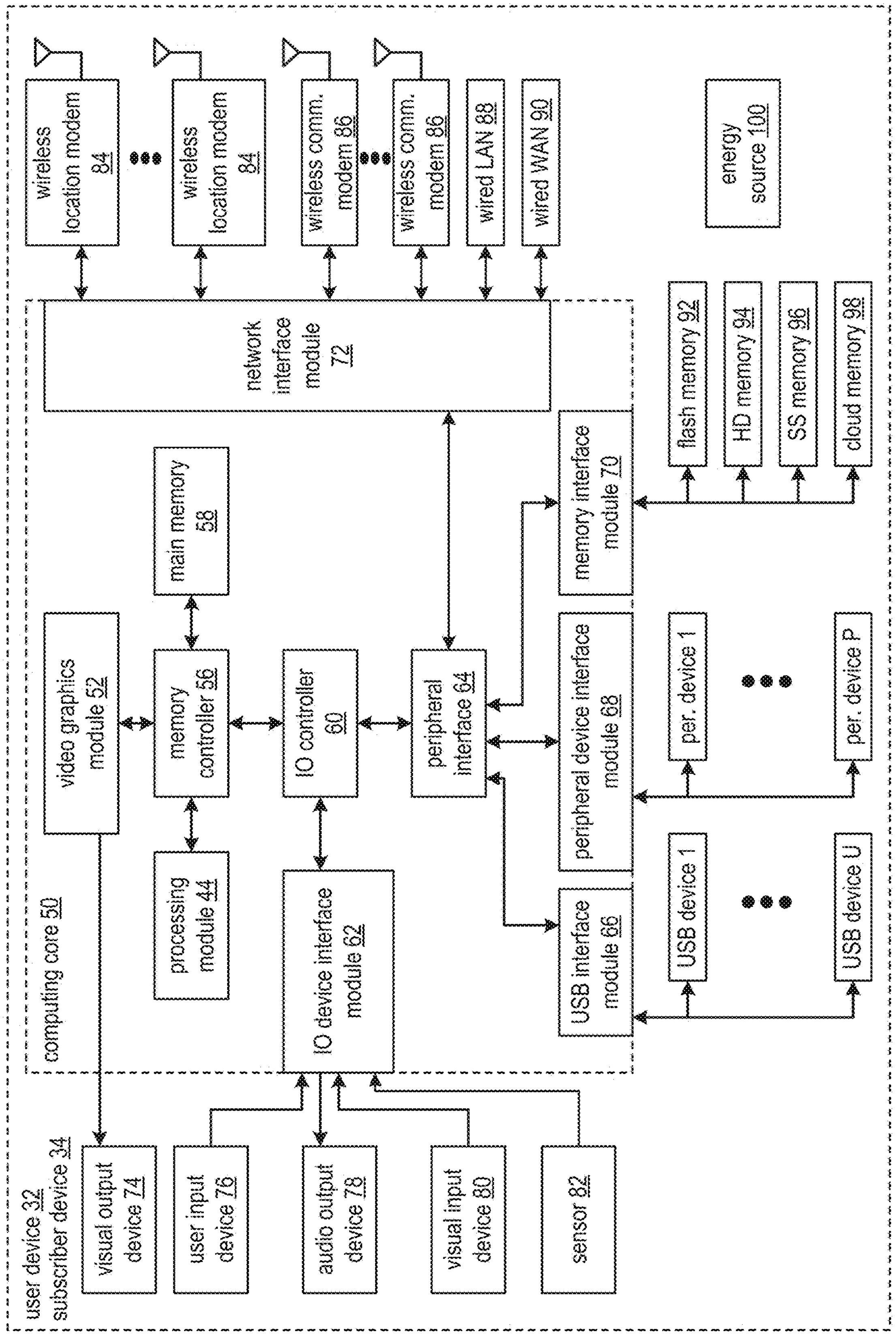
FIG. 2 is a schematic block diagram of an embodiment of a device of a communication system in accordance with the present invention.

FIG. 2 is a schematic block diagram of an embodiment of the user device 32 and the subscriber device 34 of the communication system 10 that includes a computing core 50, a visual output device 74 (e.g., a display screen, a light-emitting diode), a user input device 76 (e.g., keypad, keyboard, touchscreen, voice to text, etc.), an audio output device 78 (e.g., a speaker, a transducer, a motor), a visual input device 80 (e.g., a photocell, a camera), a sensor 82 (e.g., an accelerometer, a velocity detector, electronic compass, a motion detector, electronic gyroscope, a temperature device, a pressure device, an altitude device, a humidity detector, a moisture detector, an image recognition detector, a biometric reader, an infrared detector, a radar detector, an ultrasonic detector, a proximity detector, a magnetic field detector, a biological material detector, a radiation detector, a mass and/or weight detector, a density detector, a chemical detector, a gas detector, a smoke detector, a fluid flow volume detector, a DNA detector, a wind speed detector, a wind direction detector, a medical condition detector, a human activity detector, a motion recognition detector, and a battery level detector), one or more universal serial bus (USB) devices 1-U, one or more peripheral devices, one or more memory devices (e.g., a local memory, a flash memory device 92, one or more hard drives 94, one or more solid state (SS) memory devices 96, and/or cloud memory 98), an energy source 100 (e.g., a battery, a generator, a solar cell, and a fuel cell), one or more wireless location modems 84 (e.g., a GPS receiver, a Wi-Fi transceiver, a Bluetooth transceiver, etc.), one or more wireless communication modems 86 (e.g., 4G, 5G cellular), a wired local area network (LAN) 88, and a wired wide area network (WAN) 90.

The computing core 50 includes a video graphics processing module 52, one or more processing modules 44, a memory controller 56, one or more main memories 58 (e.g., RAM), one or more input/output (I/O) device interface modules 62 (e.g., interfaces), an input/output (I/O) controller 60, a peripheral interface 64, one or more USB interface modules 66, one or more network interface modules 72, one or more memory interface modules 70, and/or one or more peripheral device interface modules 68. Each of the interface modules 62, 66, 68, 70, and 72 includes a combination of hardware (e.g., connectors, wiring, etc.) and operational instructions stored on memory (e.g., driver software) that is executed by the processing module 44 and/or a processing circuit within the interface module. Each of the interface modules couples to one or more components of the user device 32. For example, one of the IO device interface modules 62 couples to an audio output device 78. As another example, one of the memory interface modules 70 couples to flash memory 92 and another one of the memory interface modules 70 couples to cloud memory 98 (e.g., an on-line storage system and/or on-line backup system).

The main memory 58 and the one or more memory devices include a computer readable storage medium that stores operational instructions that are executed by one or more processing modules 44 of one or more computing devices (e.g., the user device 32) causing the one or more computing devices to perform functions of the communication system 10. For example, the processing module 44 retrieves the stored operational instructions from the HD memory 94 for execution.

Figure 3:
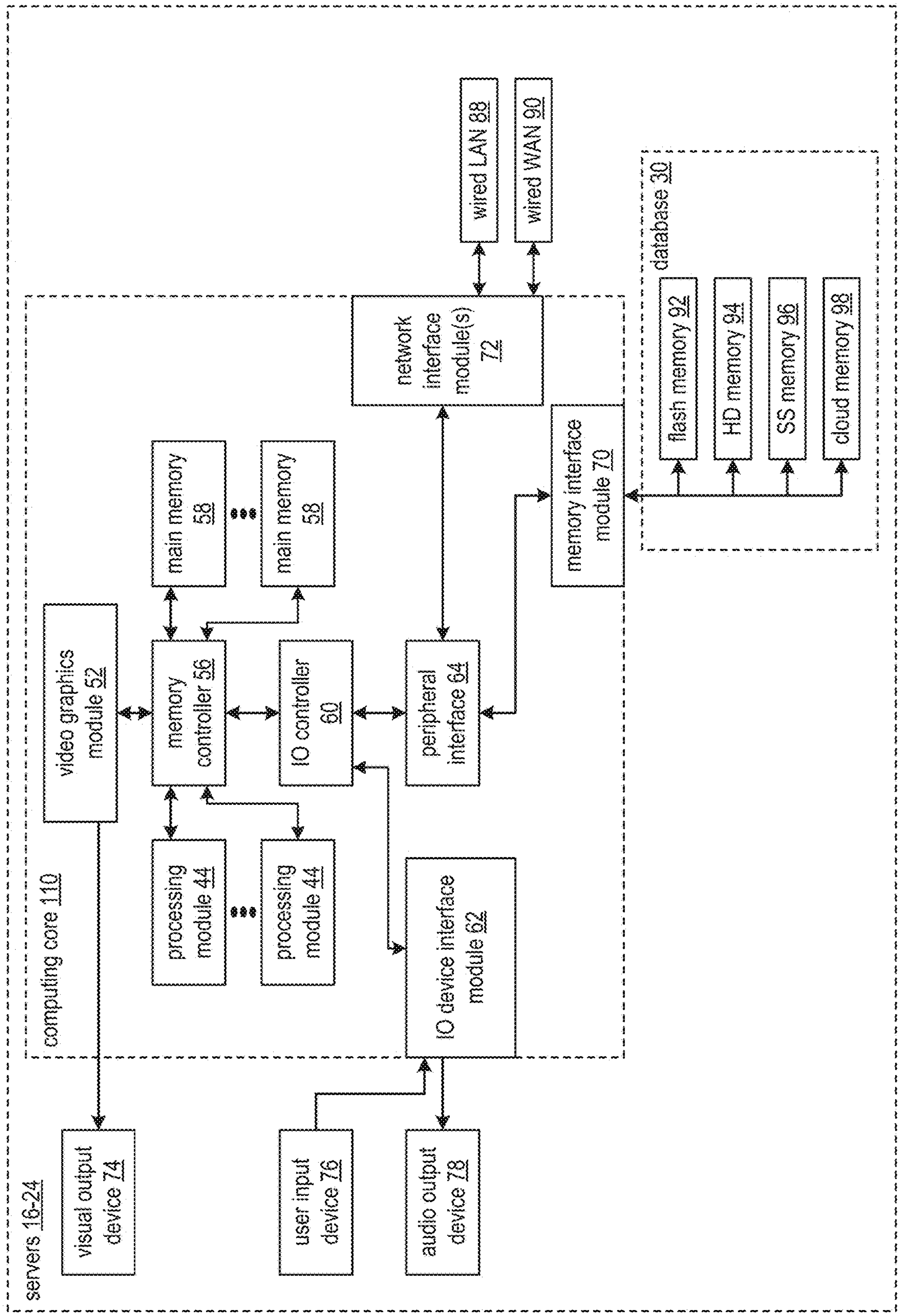
FIG. 3 is a schematic block diagram of an embodiment of a server of a communication system in accordance with the present invention.

FIG. 3 is a schematic block diagram of an embodiment of the servers 16-24 of the communication system 10 that includes a computing core 110 and elements of the user device 32 (e.g., FIG. 2), including one or more of the visual output device 74, the user input device 76, the audio output device 78, the memories 92-98 to provide the database 30 of FIG. 1, the wired LAN 88, and the wired WAN 90. The computing core 110 includes elements of the computing core 50 of FIG. 2, including the video graphics module 52, the plurality of processing modules 44, the memory controller 56, the plurality of main memories 58, the input-output controller 60, the input-output device interface module 62, the peripheral interface 64, the memory interface module 70, and the network interface modules 72.

Figure 4A:
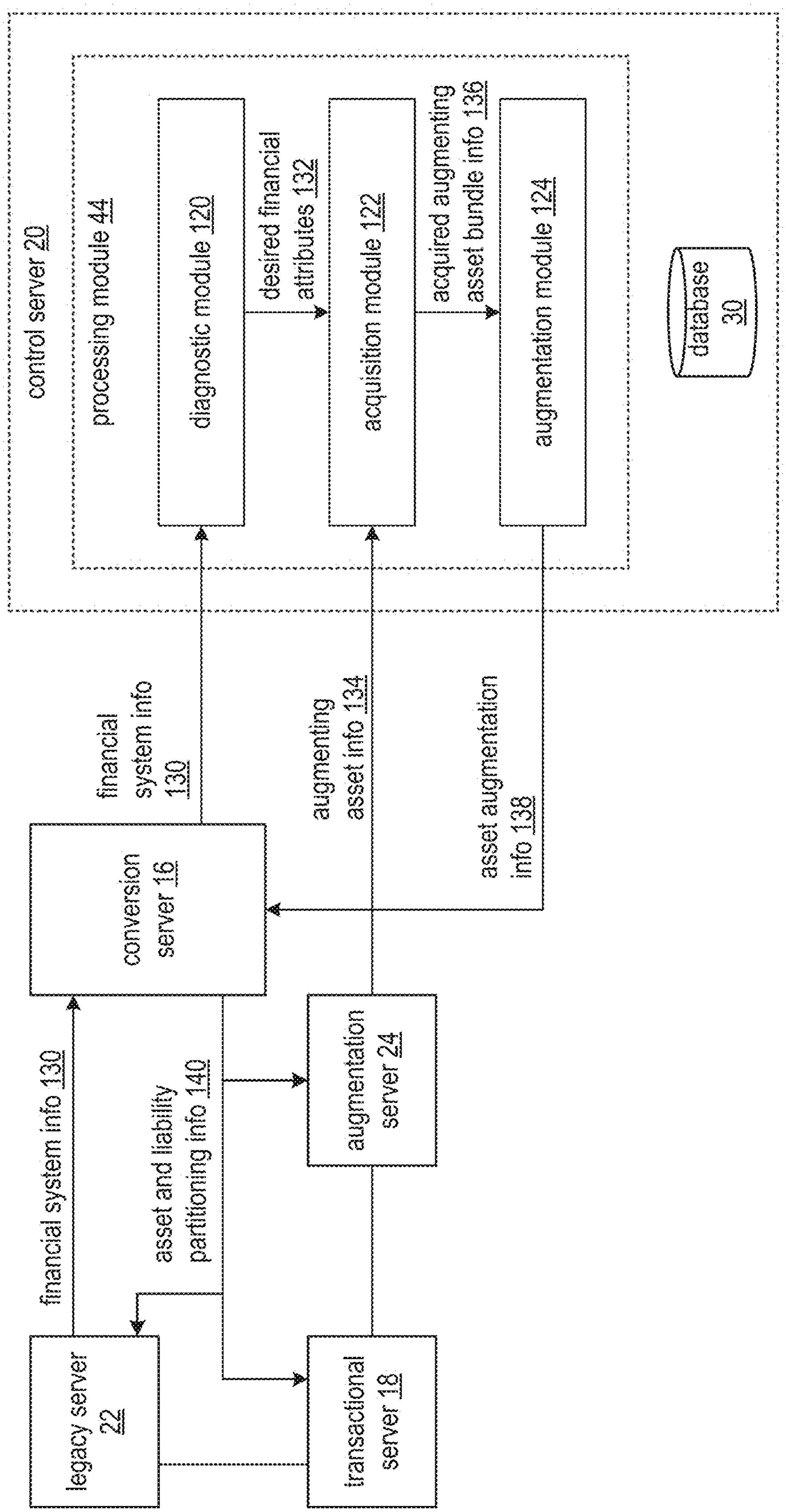
FIGS. 4A-4B are schematic block diagrams of another embodiment of a communication system in accordance with the present invention.
Figure 4B:
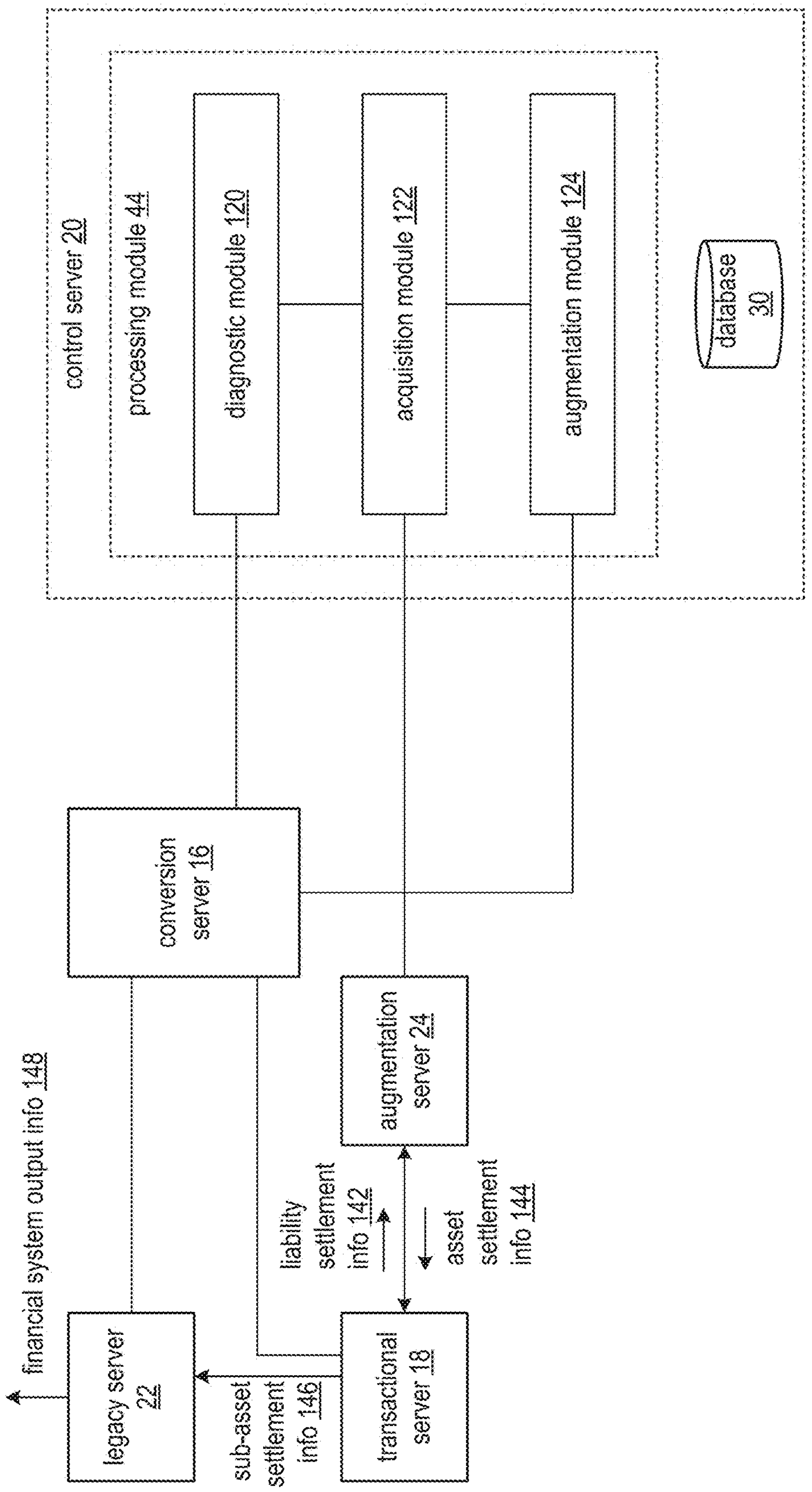

FIGS. 4A-4B are schematic block diagrams of another embodiment of a communication system that includes the legacy server 22 of FIG. 1, the conversion servers 16 of FIG. 1, the transactional server 18 of FIG. 1, the augmentation server 24 of FIG. 1, and the control server 20 of FIG. 1. The control server 20 includes the processing module 44 of FIG. 1 and the database 30 of FIG. 1. The processing module 44 includes a diagnostic module 120, an acquisition module 122, and an augmentation module 124. Each of the diagnostic module 120, the acquisition module 122, and the augmentation module 124, may be implemented utilizing a processing module. The communication system functions to facilitate asset reconfiguration and reassignment.

FIG. 4A illustrates an example of the facilitating of the asset reconfiguration and reassignment where the legacy server 22 communicates financial system information 130 to the conversion servers 16. The financial system information 130 includes one or more of yield characteristics (e.g., ROI, timing of yields) of the legacy asset base of the financial system associated with the legacy server 22, a current valuation of the legacy asset base, a risk level associated with the legacy asset base, a liability schedule (e.g., a pension liability schedule when the financial system is a pension system), and demographics associated with users of the financial system (e.g., ages, lifestyles associated with pension participants).

Having received the financial system information 130, the conversion servers 16 forwards the financial system information 130 to the diagnostic module 120. The diagnostic module 120 determines desired financial attributes 132 for the financial system supported by the legacy asset base by analyzing the financial system information 130 in accordance with historical financial system information and/or current market conditions. The desired financial attributes 132 includes one or more of a desired cash flow level and timing, and a desired valuation lift such that the valuation of the legacy asset base is corrected to a desired legacy asset value when the legacy asset base is augmented in the following step. The operation of the diagnostic module 120 is discussed in greater detail with reference to FIGS. 5A-5B.

The acquisition module 122 facilitates acquisition of an augmenting asset bundle to enhance the legacy asset base such that the desired legacy asset value can be obtained while meeting the desired cash flow levels and timing. For example, the acquisition module 122 analyzes candidate asset characteristics of augmenting asset information 134 received from the augmentation server 24 to screen for candidate assets for acquisition, evaluates a financial contribution for each of the potentially acquired assets, selects a combination assets that when aggregated have a total financial contribution that compares favorably to the desired cash flow and desired valuation lift, and facilitates acquisition of the selected assets to produce acquired augmenting asset bundle information 136 (e.g., includes characteristics of the selected assets as well as identification). The operation of the acquisition module 122 is discussed in greater detail with reference to FIGS. 6A-6C.

The augmentation module 124 facilitates enhancement of the legacy asset base with the augmenting asset bundle to enable the financial system in accordance with the desired financial attributes (e.g., cash flow and valuation lift). The facilitation includes the augmentation module 124 performing enhancement or the augmentation module 124 instructing another server (e.g., the conversion servers 16) to perform the enhancement. The enhancement includes selecting an asset deconstruction approach and utilizing the selected asset deconstruction approach, where each asset of the acquired augmenting asset bundle is deconstructed to produce at least two deconstructed elements and where individual elements are re-bundled into two or more groupings for titling to two or more entities of the communication system. For example, deconstructed elements are re-bundled into a first grouping that is to be titled to the legacy server 22 to replace the legacy asset base such that the new valuation and expected cash flow associated with the first grouping meets or exceeds the desired cash flow and desired valuation lift and other deconstructed elements are re-bundled into a second grouping that is to be titled to the transactional server 18. For instance, the augmentation module 124 outputs asset augmentation information 138 to the merchant server 16, where the asset augmentation information includes the selected asset deconstruction approach, and new asset titling information. Having received the asset augmentation information 138, the conversion servers 16 issues asset and liability partitioning information 140 to the legacy server 22 and to the transactional server 18, where the asset liability partitioning information 140 includes asset deconstruction results (e.g., characteristics of the deconstructed elements) and deconstructed asset element title information (e.g., which deconstructed elements are now affiliated with which entity). The operation of the augmentation module 124 is discussed in greater detail with reference to FIGS. 7A-7C.

FIG. 4B further illustrates the example of the facilitating of the asset reconfiguration and reassignment where the transactional server 18, when receiving the asset and liability partitioning information 140, issues liability settlement information 142 to the augmentation server 24 when detecting that a liability is to be resolved (e.g., making a life insurance policy premium payment in accordance with a schedule), issues further liability settlement information 142 to the augmentation server 24 when detecting that an asset settlement is to be resolved (e.g., submitting a death benefit claim for a particular life insurance policy based on detecting death of the insured), and receiving asset settlement information 144 from the augmentation server 24 to complete settlement of a particular asset (e.g., receiving a payment transaction for a death benefit related to a life insurance policy).

Having received asset settlement information 144, the transactional server 18 partitions a payment associated with the received asset settlement information 144 into two or more payment partitions, where the partitioning is in accordance with the asset and liability partitioning information 140. For example, the transactional server 18 partitions the payment into X and Y portions, where the X portion is associated with the legacy server 22 in accordance with titling information of the asset and liability partitioning information 140, where the Y portion is associated with the transactional server 18 in accordance with the titling information of the asset and liability partitioning information 140, and where X+Y=100%.

Having partitioned the payment, the transactional server 18 issues sub-asset settlement information 146 to the legacy server, where the sub-asset settlement information 146 facilitates a payment transaction (e.g., bank wire, electronic transaction, E-cash, blockchain currency) for a portion of the payment (e.g., a portion of the payment transaction for the death benefit related to the life insurance policy to be assigned to the legacy server 22). Having received the sub-asset settlement information 146, the legacy server 22 issues financial system output information 148 to include a desired cash flow in accordance with the financial system funded by a plurality of such payment transactions as communicated by the sub-asset settlement information 146. For example, the legacy server 22 facilitates payment transactions to satisfy periodic payments to pension plan participants funded by the portion of the death benefit payments, when the financial system is a pension system and the acquired assets of the augmentation server 24 include life insurance policies that have been deconstructed and re-bundled.

Figure 4C:
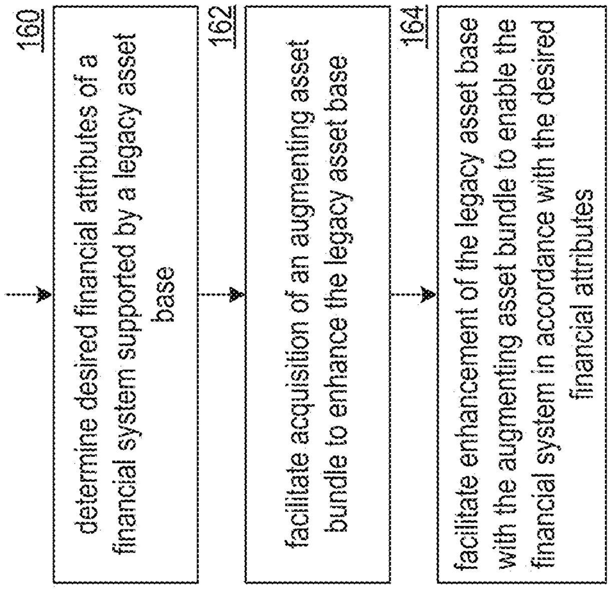
FIG. 4C is a logic diagram of an example of a method of enhancing a legacy asset base in accordance with the present invention.

FIG. 4C is a logic diagram of an example of a method of enhancing a legacy asset base that includes step 160 where a processing module (e.g., of a communication system) determines desired financial attributes of a financial system supported by a legacy asset base. For example, the processing module determines to evaluate the financial system (e.g., by request, in accordance with a schedule, when a metric of the financial system is detected to be unfavorable compared to a desired value), analyzes the financial system to produce a desired cash flow level (e.g., identifies a stream of liability payments), and analyzes the financial system to produce a desired valuation lift (e.g., identifies a gap between a current valuation of the legacy asset base and a desired valuation of the legacy asset base).

The method continues at step 162 where the processing module facilitates acquisition of an augmenting asset bundle to enhance the legacy asset base. For example, the processing module identifies augmenting asset preferences (e.g., receives, performs a lookup, interprets a query response), accesses augmenting asset information from an augmenting asset entity (e.g., an augmentation server) to extract candidate asset characteristics (e.g., searches through thousands of life insurance policy records), down selects candidate assets the compare favorably to the augmenting asset preferences (e.g., a favorable quality level), determines financial contributions of each of the down selected candidate assets (e.g., when split utilizing a deconstruction approach), selects an asset selection approach (e.g., to maximize one or more of cash flow contribution and balance sheet contribution), complete selection and acquisition from the down selected candidate assets to produce the augmenting asset bundle utilizing the selected asset selection approach where an estimated financial contribution of the augmenting asset bundle compares favorably to the desired cash flow and valuation left, and summarize the augmenting asset bundle to reveal selected asset characteristics.

The method continues at step 164 where the processing module facilitates enhancement of the legacy asset base with the augmenting asset bundle to enable the financial system in accordance with the desired financial attributes. For example, the processing module identifies a custodial entity and associated custodial server (e.g., a transactional server identified in a predetermination or contest), selects a deconstruction approach for the acquired augmenting asset bundle where an estimated value of deconstructed asset elements compares favorably to one or more of the desired cash flow, the desired valuation lift, and other funding requirements (e.g., value to be generated associated with the custodial server, generates title transfer information for the deconstructed asset elements, and facilitates the construction of the acquired augmenting asset bundle utilizing the deconstruction approach to produce the deconstructed asset elements (e.g., deconstruct or request that another entity such as the custodial server perform the deconstruction by issuing a request that includes selected asset title transfer information and the selected asset deconstruction approach).

The processing module may determine the estimated value of the deconstructed asset elements by calculating the fair market or present value of a first deconstructed element (e.g., a death benefit of a life insurance policy) of the deconstructed asset as a function of: the value of a corresponding second deconstructed element (e.g., a series of premium payments associated with the life insurance policy) of the deconstructed asset, a credit rating associated with the custodial entity (e.g., likelihood of the custodial entity continuing to make life insurance premium payments to a corresponding leverage is comedy), a credit rating associated with the augmenting asset entity (e.g., likelihood that life insurance company associated with the life insurance policy will make the death benefit payment), and a life expectancy of an insured entity (e.g., a person) associated with insurance policy. The calculation of the value may further be based on market conditions where a plurality of augmenting assets are deconstructed and re-bundled by others thus influencing a general market condition for valuations and spreads due to arbitrage as such deconstructed elements pass through multiple levels of ownership and retitling.

Figure 4D:
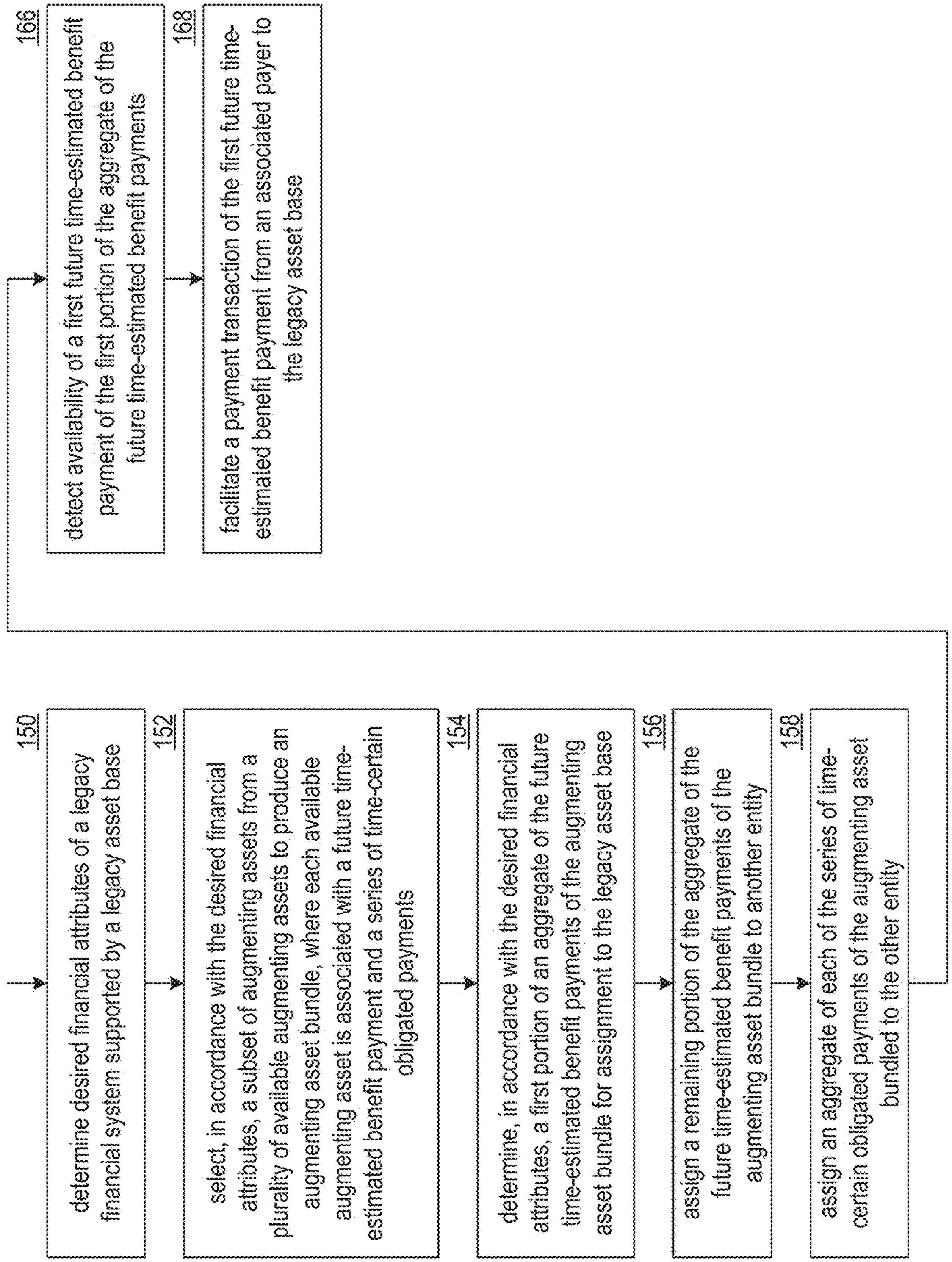
FIG. 4D is a logic diagram of another method of enhancing a legacy asset base in accordance with the present invention.

FIG. 4D is a logic diagram of another method of enhancing a legacy asset base within a computing system and/or communication system. In particular, a method is presented for use in conjunction with one or more functions and features described in conjunction with FIGS. 1-3, 4A, 4B, 4C, and also FIG. 4D. The method includes step 150 where a processing module of one or more processing modules of one or more computing devices of the computing system determines desired financial attributes of a legacy financial system, where the legacy financial system is supported by a legacy asset base, where the legacy asset base includes a plurality of legacy assets associated with a plurality of legacy asset types, and where the plurality of legacy assets is to provide favorable support for a plurality of ongoing financial obligations in accordance with the desired financial attributes.

The determining the desired financial attributes includes one or more of establishing a desired valuation lift of the legacy asset base in accordance with a difference between a desired valuation of the legacy asset base and a current valuation of the legacy asset base when the desired valuation of the legacy asset base is greater than the current valuation of the legacy asset base, identifying, for at least one unfavorably-performing legacy asset of the plurality of legacy assets, an associated level of desired support for the plurality of ongoing financial obligations, analyzing a level of favorable support for the plurality of ongoing financial obligations to produce the desired financial attributes and interpreting an input to produce the desired financial attributes.

The method continues at step 152 where the processing module selects, in accordance with the desired financial attributes, a subset of augmenting assets from a plurality of available augmenting assets to produce an augmenting asset bundle, where each available augmenting asset is associated with a future time-estimated benefit payment and a series of time-certain obligated payments. The selecting of the subset of augmenting assets may be accomplished by a variety of approaches.

A first approach of selecting of the subset of augmenting assets includes determining, for each augmenting asset of the plurality of available augmenting assets, a valuation difference, wherein the valuation difference is a difference between a fair market value and a net present value, ranking the plurality of available augmenting assets based on the valuation difference associated with each augmenting asset to produce a rank ordered list of available augmenting assets, and selecting the subset of augmenting assets based on the rank ordered list of available augmenting assets, where financial aspects of the subset of augmenting assets compares favorably to the desired financial attributes.

The selecting of the subset of augmenting assets based on the rank ordered list further includes one or more of analyzing the rank ordered list to identify available augmenting assets associated with a greatest level of valuation difference, analyzing the rank ordered list to identify available augmenting assets associated with a maximum desired level of fair market value, analyzing the rank ordered list to identify available augmenting assets associated with a minimum desired level of net present value, selecting a number of available augmenting assets such that a sum of the fair market values of the selected available augmenting assets compares favorably to a desired valuation lift of the legacy asset base, and selecting another number of available augmenting assets such that a sum of the net present values of the selected available augmenting assets compares favorably to a desired maximum aggregate net present value.

A second approach of selecting of the subset of augmenting assets includes one or more of identifying the subset of augmenting assets associated with favorable support of a desired cash flow level for the ongoing financial obligations, identifying the subset of augmenting assets associated with a desired timing of the desired cash flow level for the ongoing financial obligations, identifying the subset of augmenting assets associated with a desired valuation of the legacy asset base, identifying the subset of augmenting assets associated with a desired minimum rate of return for the augmenting asset bundle, and identifying the subset of augmenting assets associated with a desired maximum risk level for the augmenting asset bundle.

The method continues at step 154 where the processing module determines, in accordance with the desired financial attributes, a first portion of an aggregate of the future time-estimated benefit payments of the augmenting asset bundle for assignment to the legacy asset base. The determining the first portion of the aggregate of the future time-estimated benefit payments of the augmenting asset bundle includes one or more of selecting a number of augmenting assets of the augmenting asset bundle such that a sum of fair market values of the selected augmenting assets compares favorably to a desired valuation lift of the legacy asset base, and selecting the number of augmenting assets of the augmenting asset bundle such that such that a sum of fair market values of each remaining augmenting asset of remaining augmenting assets compares favorably to a sum of an aggregate of each of the series of time-certain obligated payments associated with the augmenting asset bundle.

The method continues at step 156 where the processing module assigns a remaining portion of the aggregate of the future time-estimated benefit payments of the augmenting asset bundle to another entity. For example, the processing module facilitates titling of the remaining portion to a pension plan sponsor associated with a pension plan that is affiliated with the legacy asset base. As another example, the processing module facilitates titling of the remaining portion to a financial custodian.

The method continues at step 158 where the processing module assigns an aggregate of each of the series of time-certain obligated payments of the augmenting asset bundle to the other entity. For example, the processing module establishes a commitment from the financial custodian to fund the aggregate of each of the series of time-certain obligated payments when the financial custodian receives the remaining portion of the aggregate of the future time-estimated benefit payments, where the benefit payments and the obligated payments are similar in values.

The method continues at step 166 for the processing module detects availability of a first future time-estimated benefit payment of the first portion of the aggregate of the future time-estimated benefit payments (e.g., a life settlement payment is available). The method continues at step 168 where the processing module facilitates a payment transaction of the first future time-estimated benefit payment from an associated payer to the legacy asset base. For example, the processing module issues a payment request to a financial server of the associated payer (e.g., a life insurance company) such that payment is made from the associated payer to the legacy asset base (e.g., to a pension plan).

The method described above in conjunction with the processing module can alternatively be performed by other modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the communication system 10, cause the one or more computing devices to perform any or all of the method steps described above.

Figure 5A:
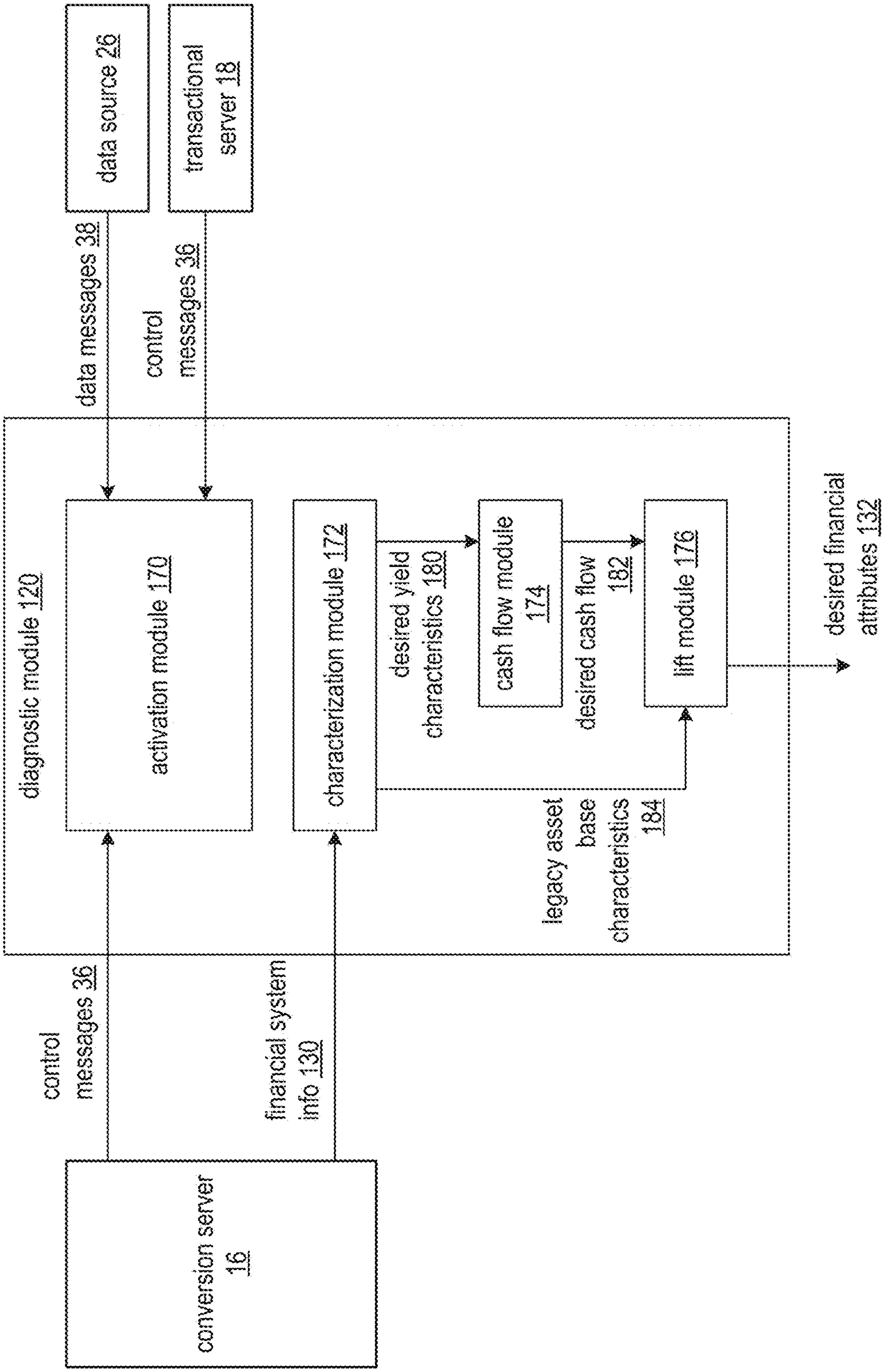
FIG. 5A is a schematic block diagram of an embodiment of a diagnostic module in accordance with the present invention.

FIG. 5A is a schematic block diagram of an embodiment of a diagnostic module that includes an activation module 170, a characterization module 172, a cash flow module 174, and a lift module 176, where the diagnostic module 120 communicates with one or more of the conversion server 16 of FIG. 1, the data source 26 of FIG. 1, and the transactional server 18 of FIG. 1. Each of the activation module 170, the characterization module 172, the cash flow module 174, and the lift module 176, may be implemented utilizing a processing module.

In an example of operation of the diagnostic module, the activation module 170 selects a financial system valuation trigger approach from a plurality of evaluation trigger approaches. The plurality of evaluation trigger approaches includes one or more of a legacy asset base value below a low threshold level, a desired cash flow level above a high threshold level, a desired valuation lift above a high threshold level, and evaluation time frame has expired, receiving a request, and detecting that an external factor level is beyond a normal threshold level. The selecting includes one or more of utilizing a predetermination, interpreting a request, and interpreting a received alert from the server or data source (e.g., receive a control message 36 and/or data message 38 from one or more of the conversion server 16, the data source 26, and the transactional server 18).

Having selected the evaluation trigger approach, the activation module 170 indicates to evaluate a financial system associated with the conversion server 16 when detecting a trigger threshold event in accordance with the evaluation trigger approach (e.g., where the conversion server 16 is affiliated with a sponsor that is associated with the financial system of a legacy server).

When evaluating the financial system, the characterization module 172 identifies financial system desired yield characteristics 180. The financial system desired yield characteristics includes one or more of an ROI level, a dividend level or similar payout level, and payout timing, (e.g., for payouts for a pension liability schedule, pension participant demographics, pension participant mortality information, pension participant lifestyle information). The identifying includes one or more of receiving, performing a lookup, interpreting a query response, interpreting financial system information 130 received from the conversion server, and generating an estimate based on a last stored financial system information.

The characterization module 172 determines legacy asset base characteristics 184 based on the financial system information 130. The legacy asset base characteristics include one or more of, for each asset type, a face amount, a fair market value, a net present value, associated timing, and a risk level. The determining includes one or more of interpreting a query response, performing a lookup, interpreting a data message 38 from the data source 26, and interpreting the financial system information 130 from the conversion server 16.

Having generated the desired yield characteristics 180 and the legacy asset base characteristics 184, the characterization module 172 sends the desired yield characteristics 180 to the cash flow module 174 and sends the legacy asset base characteristics 184 to the lift module 176. The cash flow module 174 determines a desired cash flow 182 based on the financial system desired yield characteristics 180 (e.g., cash flow to substantially match desired pension payouts when the financial system is a pension system). The lift module 176 determines a value of the legacy asset base based on the legacy asset base characteristics 184. The determining includes one or more of calculating utilizing at least one of fair market value approach, a net present value approach, and interpreting a query response (e.g., issue a value request to the transactional server 18, where the transactional server 18 utilizes market values to generate an estimate). The lift module determines a value of the desired cash flow based on the desired cash flow 182. The determining includes one or more of calculating utilizing at least one of a fire market value approach, a net present value approach, and interpreting a query response (e.g., issue a value request to the conversion server 16 and receive the query response). The lift module calculates a difference between the value of the desired cash flow and the value of the legacy asset base to produce a desired valuation lift. The lift module outputs desired financial attributes 132 to include the value of the desired cash flow and the desired valuation lift.

Figure 5B:
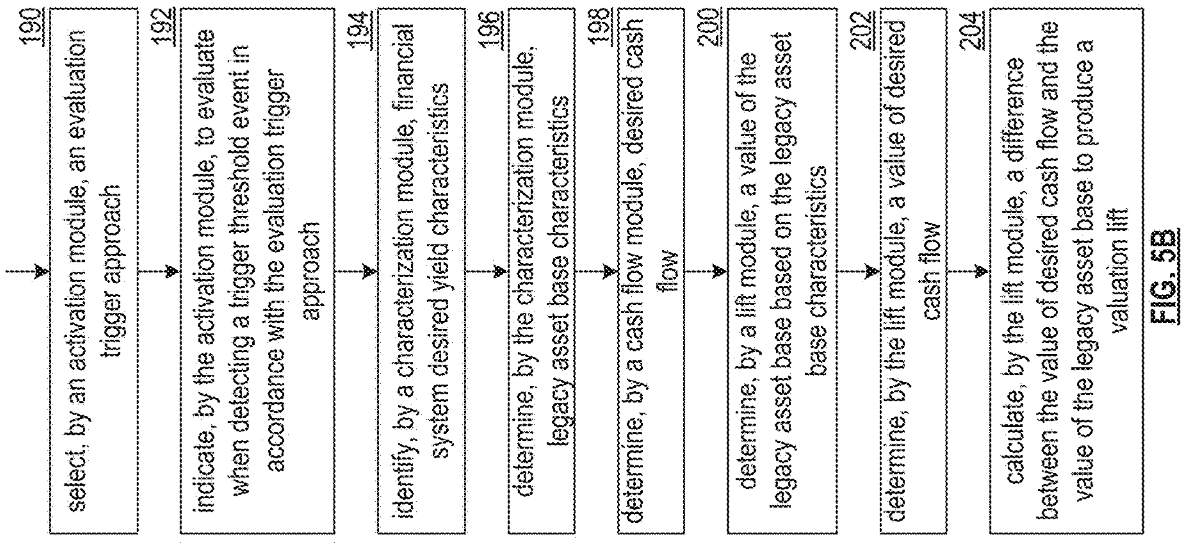
FIG. 5B is a logic diagram of an example of a method of diagnosing a legacy asset base in accordance with the present invention.

FIG. 5B is a logic diagram of an example of a method of diagnosing a legacy asset base which includes step 190 where an activation module selects an evaluation trigger approach. The selecting may be based on one or more of utilizing a predetermination, interpreting a request, and receiving an alert. The method continues at step 192 where the activation module indicates to evaluate when detecting a trigger threshold event in accordance with the evaluation trigger approach. For example, the activation module detects a favorable comparison of an input to a corresponding condition of the evaluation trigger approach and indicates to evaluate.

The method continues at step 194 where a characterization module identifies financial system desired yield characteristics. The identifying includes one or more of interpreting a query response, performing a lookup, and receiving financial system information that includes the financial system desired yield characteristics. The method continues at step 196 where the characterization module determines legacy asset base characteristics. The determining includes one or more of interpreting a message in response to a query, performing a lookup, and interpreting a data message from a data source.

Figure 6A:
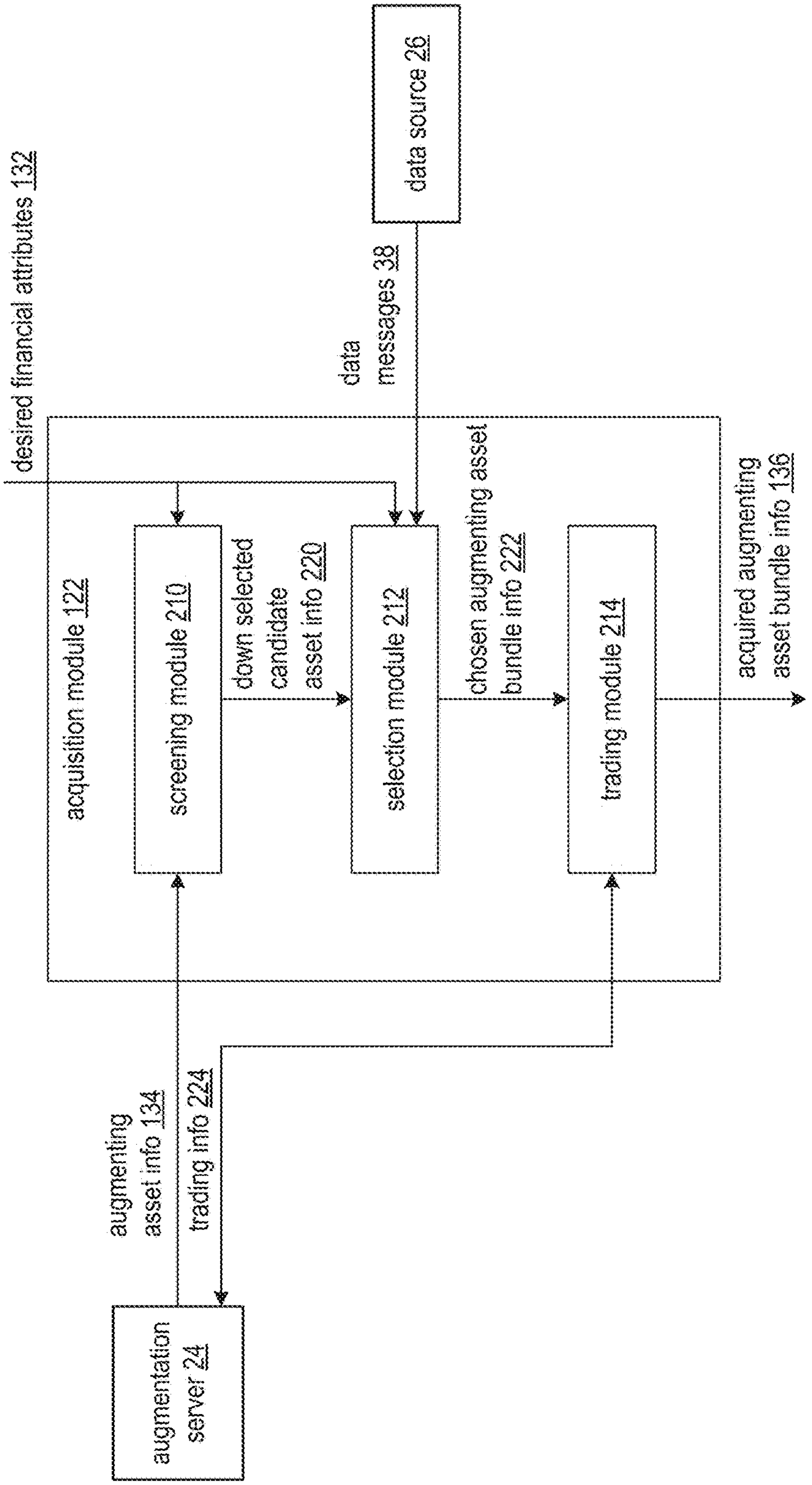
FIG. 6A is a schematic block diagram of an embodiment of an acquisition module in accordance with the present invention.

The method continues at step 198 where a cash flow module determines desired cash flow. The determining may be based on calculating the desired cash flow based on the desired yield characteristics. The method continues at step 200 where a lift module determines a value of the legacy asset base based on the legacy asset base characteristics. The determining includes utilizing at least one of fair market value approach, a net present value approach, and interpreting market and/or historical conditions. The method continues at step 202 where the lift module determines a value of desired cash flow. The determining includes utilizing at least one of the fair market value approach, the net present value approach, and interpreting market and/or historical conditions. The method continues at step 204 where the lift module calculates a difference (e.g., subtract) between the value of desired cash flow and the value of the legacy asset base to produce a valuation lift. FIG. 6A is a schematic block diagram of an embodiment of an acquisition module that includes a screening module 210, a selection module 212, and a trading module 214, where the acquisition module 122 communicates with one or more of the augmentation server 24 of FIG. 1, and the data source 26 of FIG. 1. Each of the screening module 210, the selection module 212, and the trading module 214, may be implemented utilizing a processing module.

In an example of operation of the acquisition module 122, a screening module 210 identifies augmenting asset preferences by interpreting augmenting asset information 134 from the augmentation server 24 and the desired financial attributes 132. The augmenting asset preferences includes one or more of a risk level of an entity associated with the augmentation server, a credit rating of the entity, the validity of available assets (e.g., insurable interest, title chain), and an estimated asset ROI.

Having identified the augmenting asset preferences, the screen module 210 identifies candidate assets that are associated with attributes that compare favorably to the augmenting asset preferences to produce down selected candidate asset information 220. For example, the selection module 212 interprets the augmenting asset information 134 to identify characteristics of the candidate assets, compares the characteristics to the asset preferences, and indicates the down selection (e.g., identifiers of selected assets) when the attributes of the candidate asset compares favorably to the asset preferences.

The selection module 212 estimates a financial contribution of each of the down selected candidate assets, where the estimation is based on valuation after the asset has been deconstructed. The estimating may be based on one or more of purchase price from the augmentation server 24, fair market valuation (e.g., based on a data message 38 from the data source 26 with regards to market pricing), asset and liability components of the asset, and matching to the desired financial attributes over a time frame of cash flow (e.g., of death benefit payments when the asset is a life insurance policy).

Having produced the estimated financial contributions, the selection module 212 chooses an asset selection approach. The asset selection approaches include 1) a passive approach where an estimated value after deconstructing each asset into a positive asset and a liability, where the positive asset is associated with the financial system of the legacy asset based, 2) an active approach where the desired financial attributes are matched to the estimated value after deconstructing each asset to produce positive assets associated with the financial system, and 3) an iterative approach where each asset is selected one by one to optimize resulting assets of the financial system in accordance with the desired financial attributes. The choosing may include one or more of utilizing a predetermination, interpreting a request, and interpreting historical selection data with regards to selection approach and financial results.

Having chosen the asset selection approach, the selection module 212 completes the selection from the down selected candidate assets to produce chosen augmenting asset bundle information 222 (e.g., identified assets), where the selection is made in accordance with the chosen asset selection approach, and where estimated financial contributions of the augmenting asset bundle compares favorably to the desired cash flow and desired valuation lift of the desired financial attributes 132. The trading module facilitates acquisition (e.g., purchase) of the assets of the augmenting asset bundle to produce acquired augmenting asset bundle information 136 that includes selected asset characteristics. The selected asset characteristics include one or more of identification of each asset, title information, expected financial contribution, risk levels, identity of the entity associated with the augmentation server of the ad set, and the suggested deconstruction approach. The facilitating includes exchanging trading information 224 with the augmentation server 24 to confirm purchase pricing, pass-through of funding in accordance with the purchase pricing, and confirming receipt and title of the purchased assets. Such a financial transaction may be carried out by utilizing one or more electronic financial transaction approaches including electronic cash, wire transfer, electronic funds transfer, and a blockchain approach.

Figure 6B:
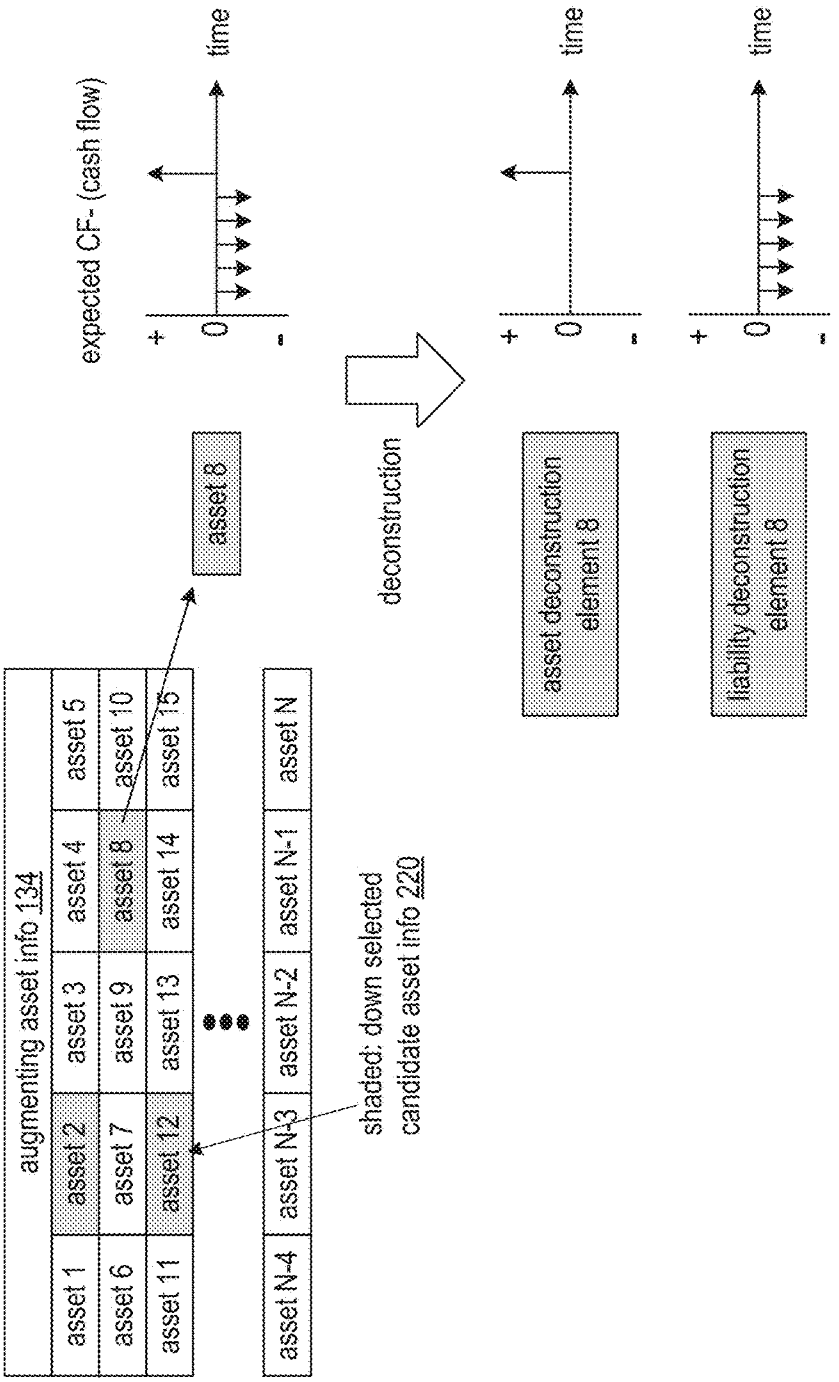
FIG. 6B is a diagram of an example of acquiring augmenting assets in accordance with the present invention.

FIG. 6B is a diagram of an example of acquiring augmenting assets where values of a plurality of assets are considered based on their characteristics and an asset deconstruction approach. The plurality of assets are associated with augmenting asset information 134. For example, a plurality of N augmenting assets, that are available for purchase (e.g., from an insurance company, from a hedge fund entity, from any other entity) are represented by a plurality of digital records indicating augmenting asset information. For example, a digital record of an asset 8 represents a life insurance policy that is associated with an obligation of a series of premium payments in accordance with obligation requirements to maintain the life insurance policy and a one-time death benefit payment upon death of a person associated with a life insurance policy. An obligation provider provides the obligation (e.g., a series of premium payments on a timely basis) to an obligation recipient in accordance with the obligation requirements. A risk level associated with fulfilling continued payment of the premium payments may be higher when responsibility for the obligation to make the premium payments is associated with an original contingency entity (e.g., a originally insured person associated with a life insurance policy) as compared to when the responsibility for the obligation to make the premium payments is shifted during a splitting or riving process such that the obligation is now associated with another obligation provider (e.g., a financial market entity known for making commitments and in an embodiment committing to make the premium payments with a lower risk level than the originally insured). A risk level associated with receiving the one-time death benefit payment may be higher when the associated life insurance company has an unfavorable death benefit payment history as compared to other life insurance companies or when the risk level of making the premium payments is higher than average.

The valuation of the asset based on the deconstruction approach involves deconstructing each asset into two or more deconstructed elements which may henceforth be alternatively referred to as deconstructives. For example, the asset 8 is deconstructed into an asset deconstruction element 8 and a liability deconstruction element 8, where the asset deconstruction element 8 is associated with the death benefit payment in the life insurance policy example and the liability deconstruction element 8 is associated with the plurality of premium payments. The selection of candidate assets to produce down selected candidate asset information 220 includes identifying assets associated with asset deconstruction elements with favorable payouts and payout timing within a desired risk level (e.g., relative to other assets, relative to minimum levels as compared to historical asset element information), and liability deconstruction elements associated with favorable premium payments and premium payment timing when under custodial care of an entity with a favorable risk level (e.g., relative to other liabilities, relative to historical liability element information).

In an example of operation to identify digital records of assets for selection and splitting to generate unexpected value due to reassignment of the obligation to make an obligation (e.g., premium payments), a computing device analyzes a multitude of available longevity-contingent assets (e.g., augmenting assets information 134 for life insurance policies or similar) for purchase to identify a set of candidate assets such that each candidate asset of the set of candidate assets has a purchase price that is less than a sum of a net present value of a future time-estimated benefit payment of the candidate asset and a net present value of a series of time-certain obligated payments of the candidate asset when the candidate asset is split after purchase to reassign the future time-estimated benefit payment to a benefit entity and to reassign the series of time-certain obligated payments to a common entity. Each available longevity-contingent asset of the multitude of available longevity-contingent assets assigns the future time-estimated benefit payment of the available longevity-contingent asset and the series of time-certain obligated payments of the available longevity-contingent asset to a common entity associated with the available longevity-contingent asset. The analyzing of the multitude of available longevity-contingent assets includes at least one of a variety of sub-approaches.

A first sub-approach includes determining that the net present value of the future time-estimated benefit payment of the candidate asset is greater upon the split after purchase to reassign the future time-estimated benefit payment from the common entity to the benefit entity. A second sub-approach includes determining that the net present value of the series of time-certain obligated payments of the candidate asset is greater upon the split after purchase to reassign the series of time-certain obligated payments from the common entity to the sponsor entity.

The example method further includes the computing device selecting, in accordance with a longevity-contingent asset de-construction approach, a subset of available longevity-contingent assets from the set of candidate assets to produce selected longevity-contingent assets. The selected longevity-contingent assets is associated with a fair market value for purchase (e.g., purchase price established by a seller).

The example method further includes the computing device splitting each of the selected longevity-contingent assets to produce the plurality of longevity-contingent assets by a series of sub-steps. A first sub-step includes reassigning the future time-estimated benefit payment of each selected longevity-contingent asset from the common entity of the selected longevity-contingent asset to the benefit entity. An aggregate of the future time-estimated benefit payment of each selected longevity-contingent asset is associated with an incremental benefit net present value.

A second sub-step includes assigning the series of time-certain obligated payments of each selected longevity-contingent asset from the common entity of the selected longevity-contingent asset to the sponsor entity to produce a plurality of periodic premium payments for the selected longevity-contingent assets, such that an unexpected beneficial valuation elevation is created where a sum of the incremental benefit net present value and an incremental liability net present value is greater than the fair market value of the selected longevity-contingent assets, so that improved support is provided for an obligation of the sponsor entity for the series of time-certain obligated payments of each selected longevity-contingent asset of the plurality of longevity-contingent assets due to the beneficial valuation elevation over direct utilization of the selected longevity-contingent assets. An aggregate of each series of time-certain obligated payments of each selected longevity-contingent asset is associated with the incremental liability net present value.

The example method further includes the computing entity causing a record set for the plurality of longevity-contingent assets to be stored in a database of a transactional computing device. The transactional computing device is distinct from the computing device. Each record corresponds to one of the plurality of longevity-contingent assets and is indexed in the database by an asset identifier of the corresponding one of the plurality of longevity-contingent assets. Each record includes the longevity-contingent asset de-construction approach and the asset identifier of the corresponding one of the plurality of longevity-contingent assets.

The example method of operation further includes the transactional computing device identifying, using the record set for the plurality of longevity-contingent assets stored in the database of the transactional computing device, a payout of one or more longevity-contingent assets of the plurality of longevity-contingent assets. A benefit cash account is utilized to accrue a portion of the payout on behalf of one or more benefactors. A premium cash escrow is utilized to fund an aggregated payment of the plurality of periodic premium payments on behalf of one or more debtors.

The example method of operation further includes the transactional computing device determining a first portion of the payout to associate with the premium cash escrow in accordance with the longevity-contingent asset de-construction approach. The example method of operation further includes the transactional computing device determining a second portion of the payout to associate with the benefit cash account based on the first portion of the payout and in accordance with the longevity-contingent asset de-construction approach.

Figure 6C:
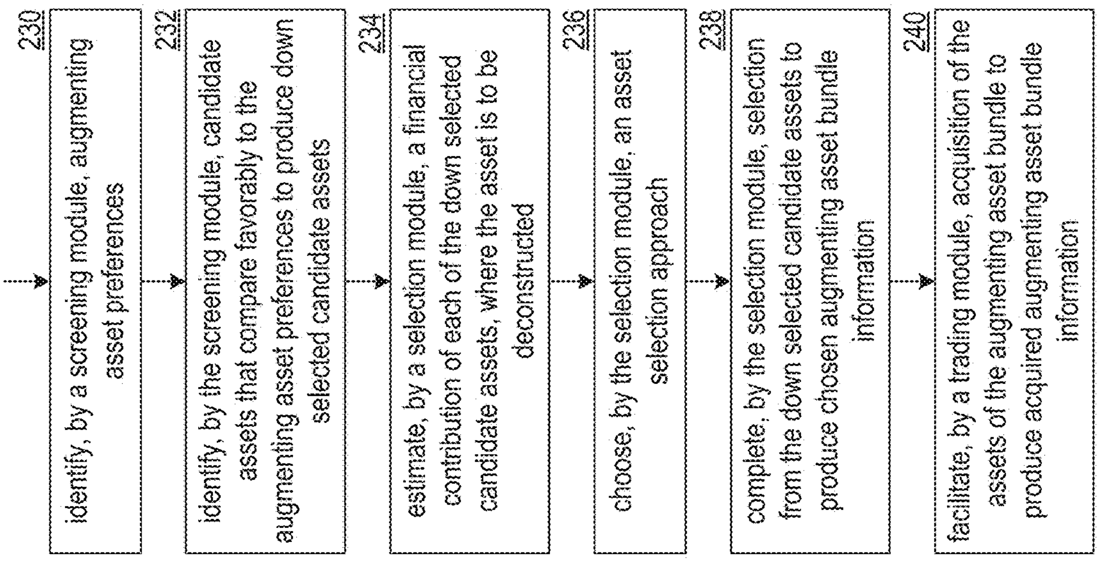
FIG. 6C is a logic diagram of an example of a method of acquiring augmenting assets in accordance with the present invention.

FIG. 6C is a logic diagram of an example of a method acquiring augmenting assets that includes step 230 where a screening module identifies augmenting asset preferences. For example, the screening module interprets augmenting asset information and desired financial attributes to produce the augmenting asset preferences. The method continues at step 232 where the screening module identifies candidate assets that compare favorably to the augmenting asset preferences to produce down selected candidate assets. For example, the screen module interprets the augmenting asset information to identify characteristics of the candidate assets, compares the candidate assets to the asset preferences, and indicates down selection when the candidate asset compares favorably to the asset preferences.

The method continues at step 234 where a selection module estimates a financial contribution of each of the down selected candidate assets, where the asset is to be deconstructed. For example, the selection module analyzes deconstruction of the candidate asset into an inter-related asset and a liability, further based on one or more of price, fair market value, and matching to the desired financial attributes were a varying range of timing of benefits of the asset when the asset produces benefits (e.g., a death benefit payment of a life insurance policy). The method continues at step 236 where the selection module chooses an asset selection process. The choosing may be based on one or more of a predetermination, interpreting a request, and interpreting historical selection data and associated financial results.

The method continues at step 238 where the selection module completes selection from the down selected candidate assets to produce chosen augmenting asset bundle information, where the selection is made in accordance with the chosen asset selection approach, and where estimated financial contributions of the augmenting asset bundle compares favorably to a desired cash flow and a desired valuation lift of the desired financial attributes. The method continues at step 240 where a trading module facilitates acquisition of the assets of the augmenting asset bundle to produce acquired augmenting asset bundle information. For example, the trading module exchanges trading information with an augmentation server to confirm purchase pricing, passes through a funding transaction in accordance with the purchase pricing to purchase the assets, and confirms receipt and title of the purchase of the assets of the acquired augmenting asset bundle.

Figure 7A:
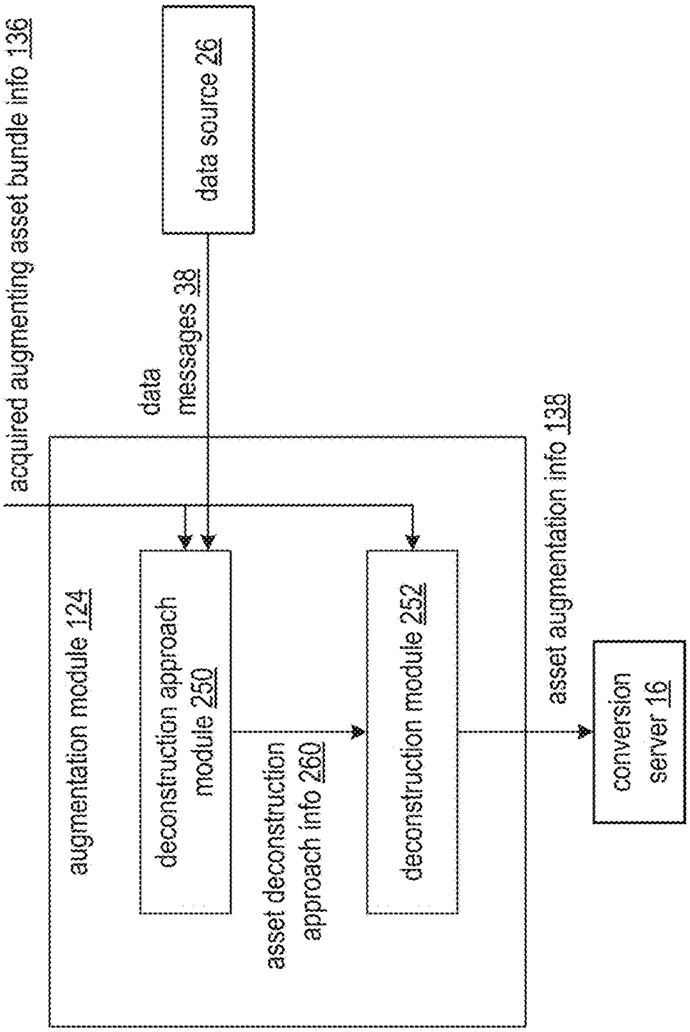
FIG. 7A is a schematic block diagram of an embodiment of an augmentation module in accordance with the present invention.

FIG. 7A is a schematic block diagram of an embodiment of an augmentation module 124 that includes a deconstruction approach module 250 and a deconstruction module 252, where the augmentation module 124 communicates with the data source 26 of FIG. 1 and the conversion server 16 of FIG. 1. Each of the deconstruction approach module 250 and the deconstruction module 252 may be implemented utilizing a processing module.

In an example of operation of the augmentation module 124, the deconstruction approach module 250 identifies a transactional server associated with a custodial entity to facilitate ongoing transactions of a financial system when augmented by an acquired augmenting asset bundle. The identifying includes one or more of interpreting a request, interpreting a query response, declaring a competition winner (e.g., a bid), analyzing historical transaction information, identifying a desired risk level for an entity associated with a transactional server, and interpreting risk information associated with entities of transactional servers.

Having identified the transactional server, the deconstruction approach module 250 selects a deconstruction approach for the acquired augmenting asset bundle based on acquired augmenting asset bundle information 136 to produce asset deconstruction approach information 260, where an estimated value of deconstructed asset elements compares favorably to one or more of a desired cash flow and a desired valuation lift and other funding requirements (e.g., value to be generated associated with the transactional server). The deconstruction approaches include a first approach where each asset is converted into a first deconstructed asset element that is an asset and a second peak constructed asset element that is a liability, a number of first elements are titled with an entity associated with a legacy server and a remaining number of first elements with another entity associated with the identified transactional server, substantially all of the second elements are titled to the entity associated with the identified transactional server, where the quantities of tight of the elements is in accordance with one or more of a net present value, exchange or market value historical pricing, instructed pricing, risk levels of each of the entities, and arbitrage information of a data message 38 received from the data source 26.

The deconstruction approaches includes a second approach where in combination with the first approach, a portion of the elements are titled to an entity associated with the conversion server. The selecting may be based on one or more of a predetermination, interpreting a request, interpreting historical results associated with particular deconstruction approaches, interpreting data messages 38 from the data source 26 associated with current market conditions, and optimizing a level of fit for cash flow and for value for at least a portion of the assets for two or more of the deconstruction approaches to identify a presently superior deconstruction approach, where asset element valuation depends on risk associated with entities affiliated with one or more of the legacy server, the transactional server and augmentation server, the conversion server 16. The selecting further includes outputting the asset deconstruction approach information to include one or more of the approach for each asset, a number of assets, identifiers of the assets, and preliminary asset titling information (e.g., which deconstructed asset is assigned to which entity).

Having selected the deconstruction approach for each asset, the deconstruction module 252 facilitates deconstruction of substantially each asset of the acquired augmenting asset bundle utilizing the selected deconstruction approach to produce asset augmentation information 138 (e.g., selected asset title transfer information, selected asset deconstruction approaches). The facilitating includes performing the deconstruction or requesting that the conversion server 16 execute the deconstruction (e.g., in accordance with an agreement).

Figure 7B:
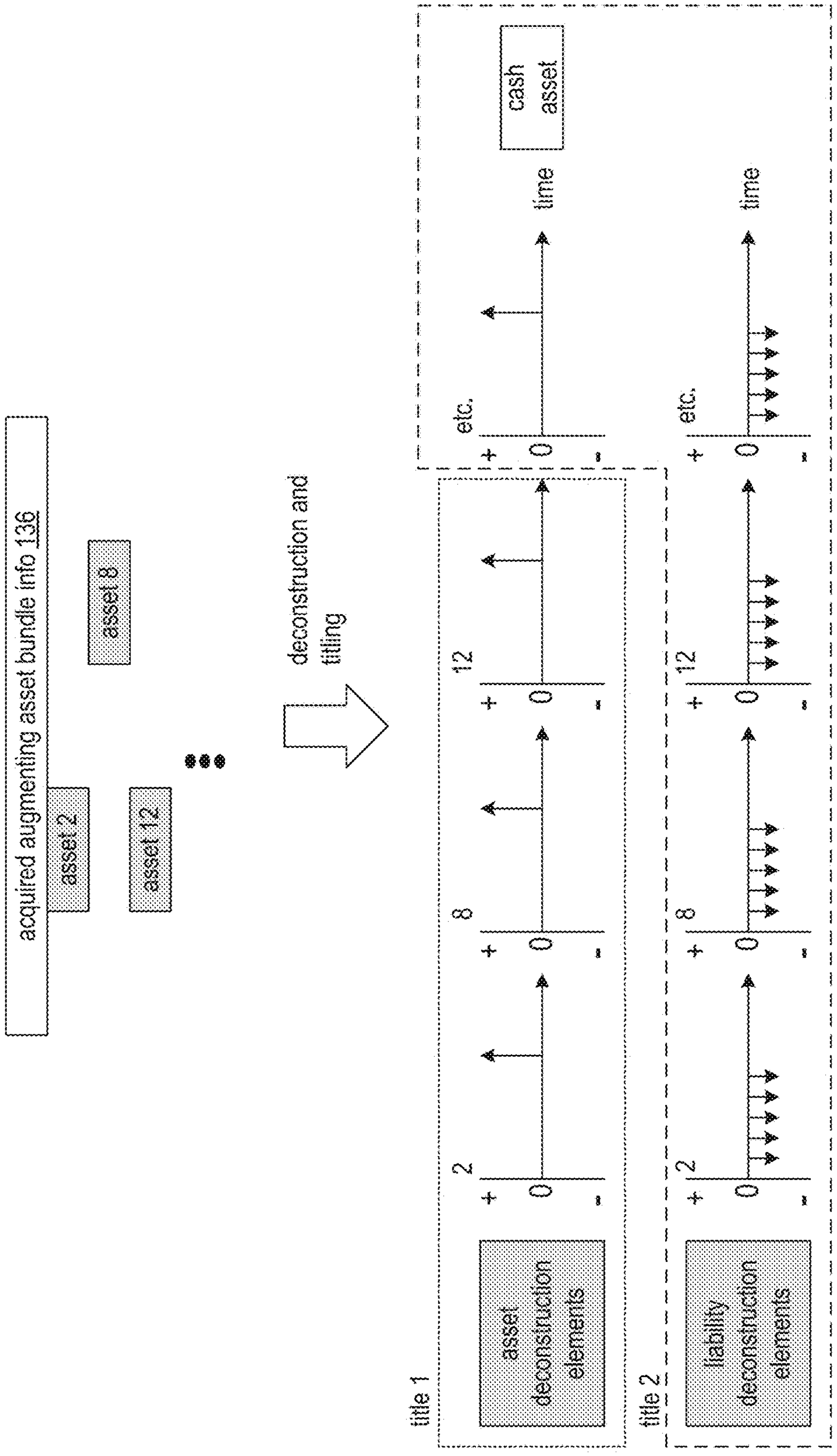
FIG. 7B is a diagram of an example of utilizing augmenting assets in accordance with the present invention.

FIG. 7B is a diagram of an example of utilizing augmenting assets where assets described by acquired augmenting asset bundle information 136 are deconstructed and titled to produce two or more groupings of deconstructed elements from the assets of an acquired augmenting asset bundle. For example, assets 2, 8, and 12 are deconstructed in accordance with a deconstruction approach to produce asset deconstruction elements and liability deconstruction elements, when the assets 2, 8, and 12 are part of the acquired augmenting asset bundle.

Having deconstructed each element, individual elements are partitioned into two or more groupings, where each grouping is titled to a different entity of two or more entities, and where a valuation of each grouping meets valuation requirements for the groupings and as a whole for the financial system of a legacy asset base for augmentation. For example, the value of a title 1 grouping may be driven by the asset deconstruction elements of the assets 2, 8, and 12 while the value of a title 2 grouping may be driven by the liability deconstruction elements of assets 2, 8, 12, and others, along with a cash asset and one or more asset deconstruction elements from other assets of the acquired augmenting asset bundle. Alternatively, the title 1 grouping may include another cash asset, or any other asset including bonds etc., and/or one or more liability deconstructed elements. Further alternatively, the title 2 grouping may include shortened liability deconstructed elements, where the shortened liability deconstructed element includes a subset of a plurality of liability (e.g., payment) cash flows (e.g., 2 of n life insurance policy premium payments, a maximum of 10 years of life insurance premium payments, 75% of each remaining life insurance policy premium payment, etc.).

To predict valuations, the value of the title 1 grouping is a function of the aggregated value of each asset deconstruction element, where each asset deconstruction element has a value that's a function of a corresponding liability deconstruction element value (e.g., level of premium payments of the life insurance policy as the original asset), a credit rating associated with a custodial entity (e.g., an entity associated with a transactional server) responsible for making the series of payments of the liability deconstruction element, a credit rating of an entity issuing the original asset (e.g., the life insurance company responsible for the life insurance policy), and timing associated with future cash flow of the asset deconstruction element (e.g., timing of a death benefit payment from the life insurance policy upon death of an insured person).

The value of the title 2 grouping is a function of the expected liability payments associated with the liability deconstruction elements (e.g., life insurance policy premiums based on those insured and mortality table information), one or more asset deconstruction elements (e.g., death benefits), and a cash level or similar (e.g., any other financial instrument to add value such that a net value of the title 2 grouping is positive with respect to the life of the title 2 grouping). As an example, the cash asset may be produced by selling at least some of the asset deconstruction elements to produce cash to bundle into the title 2 grouping.

Figure 7C:
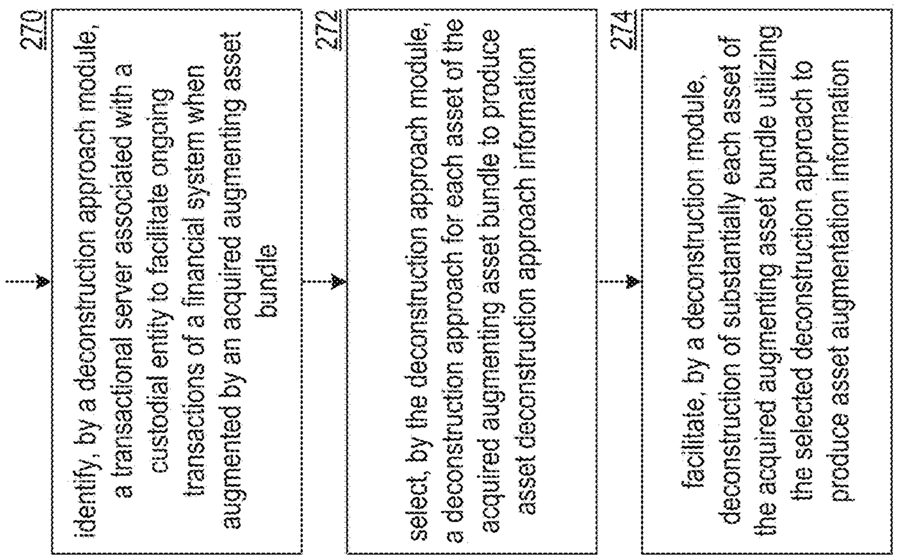
FIG. 7C is a logic diagram of an example of a method utilizing augmenting assets in accordance with the present invention.

FIG. 7C is a logic diagram of an example of a method utilizing augmenting assets that includes step 270 where a deconstruction approach module identifies a transactional server associated with a custodial entity to facilitate ongoing transactions of the financial system when augmented by an acquired augmenting asset bundle. The identifying includes one or more of interpreting a request, interpreting a query response, declaring a competition winner, analyzing historical transaction information, identifying a desired risk level for an entity associated with a transactional server, and interpreting risk information associated with entities of a plurality of transactional servers.

The method continues at step 272 where the deconstruction approach module selects a deconstruction approach for each asset of the acquired augmenting asset bundle to produce asset deconstruction approach information, where an estimated value of deconstructed asset elements compares favorably to one or more of a desired cash flow and a desired valuation lift and other funding requirements of a financial system for augmentation. The selecting includes one or more of utilizing a predetermination, interpreting a request, interpreting historical results for various deconstruction approaches, analyzing data messages from a data source where the data messages include current market conditions, optimizing a level of fit for cash flow and for value for at least a portion of the assets for two or more of the deconstruction approaches to identify a presently superior deconstruction approach, where asset element valuation depends on risks associated with entities associated with one or more of a plurality of servers of a communication system, and outputting the asset deconstruction approach information to include one or more of an approach for each asset, a number of assets, identifiers of assets, and preliminary asset title transfer information.

The method continues at step 274 where a deconstruction module facilitates deconstruction of substantially each element of the acquired augmenting asset bundle utilizing the selected deconstruction approach to produce asset augmentation information. The facilitating includes performing the deconstruction or requesting that a remote server performs the deconstruction utilizing the asset deconstruction approach information.

Figure 8A:
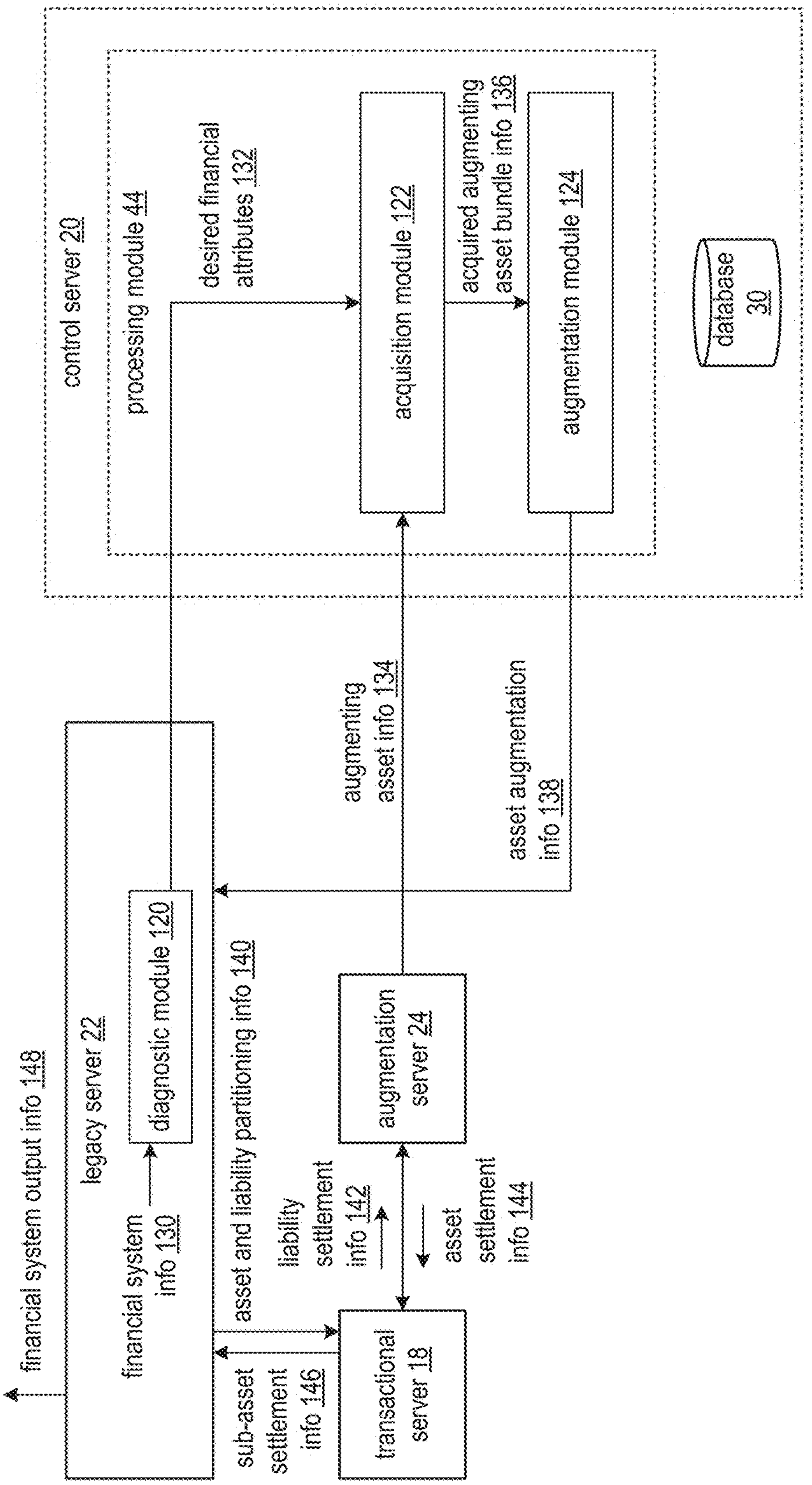
FIG. 8A is a schematic block diagram of another embodiment of a communication system in accordance with the present invention.

FIG. 8A is a schematic block diagram of another embodiment of a communication system that includes the legacy server 22 of FIG. 1, the transactional server 18 of FIG. 1, the augmentation server 24 of FIG. 1, and the control server 20 of FIG. 1. The legacy server 22 includes the diagnostic module 120 of FIG. 4A. The control server 20 includes the processing module 44 of FIG. 1 and the database 30 of FIG.

1. The processing module 44 includes the acquisition module 122 of FIG. 4A and the augmentation module 124 of FIG. 4A. The communication system functions to facilitate asset reconfiguration and reassignment.

In an example of operation of the facilitating asset reconfiguration and reassignment, the diagnostic module 120 determines to evaluate a financial system associated with the legacy server 22. When evaluating the financial system, the diagnostic module 120 characterizes the financial system based on financial system information 130 to produce desired financial attributes 132 that includes a desired cash flow and a desired valuation lift.

The acquisition module 122 identifies augmenting asset preferences, accesses augmenting asset information 134 to extract candidate asset characteristics, down selects candidate assets that have characteristics that compare favorably to the augmenting asset preferences and to the desired financial attributes 132, determines financial contributions of each of the down selected candidate assets, and selects an asset selection approach. The acquisition module 122 further completes selection of assets from the down selected candidate assets to produce an augmenting asset bundle utilizing the selected asset selection approach, where an estimated financial contribution of the augmenting asset bundle compares favorably to the desired cash flow and valuation lift, and summarizes the augmenting asset bundle to reveal selected asset characteristics to produce acquired augmenting asset bundle information 136.

The augmentation module 124 facilitates identification of a custodial entity and an associated transactional server 18, selects a deconstruction approach for the acquired augmenting asset bundle where an estimated value of deconstructed asset elements compares favorably to one or more of the desired cash flow, the desired valuation lift, and other funding requirements (e.g., the transactional server 18 generates an estimated value, the augmentation module 124 generates the estimated value), generates title transfer information for the deconstructed asset elements, facilitates producing of the acquired augmenting asset bundle utilizing the deconstruction approach to produce the deconstructed asset elements (e.g., perform the deconstruction or request that another entity such as the legacy server 22 perform the deconstruction by issuing a request that includes selected asset titling information and the selected asset deconstruction approach. For instance, the augmentation module 124 issues asset augmentation information 138 to the legacy server 22, where the asset augmentation information 138 includes the selected asset titling information and the selected asset deconstruction approach along with a request that the legacy server 22 perform the deconstruction.

Having received the asset augmentation information 138, the legacy server 22 performs the deconstruction of the augmenting asset bundle to produce the deconstructed asset elements in accordance with the selected asset deconstruction approach, re-bundles deconstructed asset elements to produce two or more groupings, assigns title to each of the two or more groupings in accordance with the received titling information, and issues asset and liability partitioning information 140 to the transactional server 18, where the asset and liability partitioning information 140 includes asset deconstruction results and deconstructed asset element title information. For instance, a first title group of deconstructed elements is titled to the financial system of the legacy server 22 (e.g., a pension system) and a second title group of deconstructed elements is titled to the entity associated with the custodial entity transactional server 18.

Having received the asset and liability protection information 140 the transactional server 18 issues liability settlement information 142 to the augmentation server 24 in accordance with timing associated with a particular group of deconstructed elements titled to either the transactional server 18 or the legacy server 22 (e.g., life insurance policy premium payments, life insurance death benefit claims) and receives corresponding asset settlement information 144 (e.g., life insurance death benefit payments). The transactional server 18 issues sub-asset settlement information 146 to the legacy server 22 when receiving asset settlement information 144 to satisfy compensation for asset maturation in accordance with the titling information (e.g., a portion of the life insurance death benefit payments are forwarded to the legacy server 22 for utilization in the financial system). Having received a plurality of asset maturation payments (e.g., numerous sub-asset settlement information 146), the legacy server 22 facilitates issuing of financial system output information 148 (e.g., financial transactions to satisfy pension payments in accordance with a pension schedule for each pension participant).

Figure 8B:
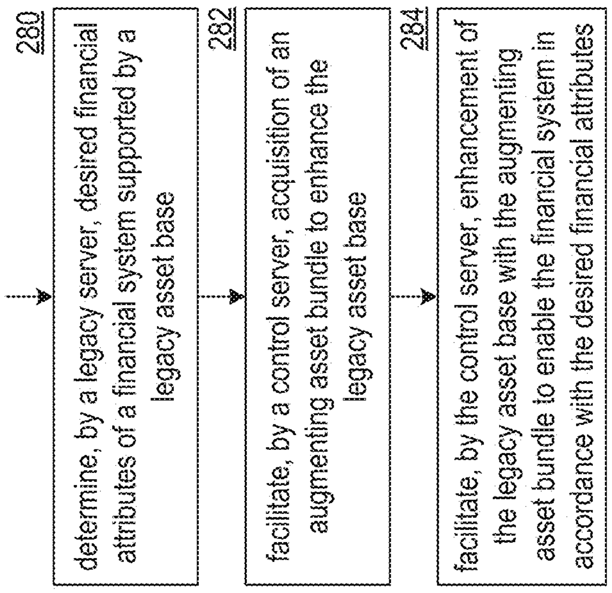
FIG. 8B is a logic diagram of another example of a method of enhancing a legacy asset base in accordance with the present invention.

FIG. 8B is a logic diagram of another example of a method of enhancing a legacy asset base that includes step 280 where a legacy server determines desired financial attributes of the financial system supported by a legacy asset base. For example, the legacy server determines to evaluate the financial system and characterizes the financial system to estimate a desired cash flow and a desired valuation lift when the financial system is underperforming.

The method continues at step 282 where a control server facilitates acquisition of an augmenting asset bundle to enhance the legacy asset base. For example, the control server identifies augmenting asset preferences, accesses augmenting asset information to extract candidate asset characteristics, down selects candidate assets that have characteristics that compare favorably to the augmenting asset preferences, determines financial contributions of each of the down selected candidate assets, selects an asset selection approach, completes the selection from the down selected candidate assets to produce the augmenting asset bundle utilizing the selected asset selection approach where an estimated financial contribution of the augmenting asset bundle compares favorably to the desired cash flow and desired valuation lift, and summarizes the augmenting asset bundle to reveal selected asset characteristics.

The method continues at step 284 where the control server facilitates enhancement of the legacy asset base with the augmenting asset bundle to enable the financial system in accordance with the desired financial attributes. For example, the control server facilitates identification of a custodial entity associated with a transactional server, selects a deconstruction approach for the acquired augmenting asset bundle where an estimated value of two or more groupings of deconstructed asset elements compares favorably to one or more of the desired cash flow, the desired valuation lift, and other funding requirements, generates titling information for the two or more groupings of the deconstructed asset elements, and facilitates producing of the two or more groupings of deconstructed asset elements utilizing the deconstruction approach.

Figure 9A:
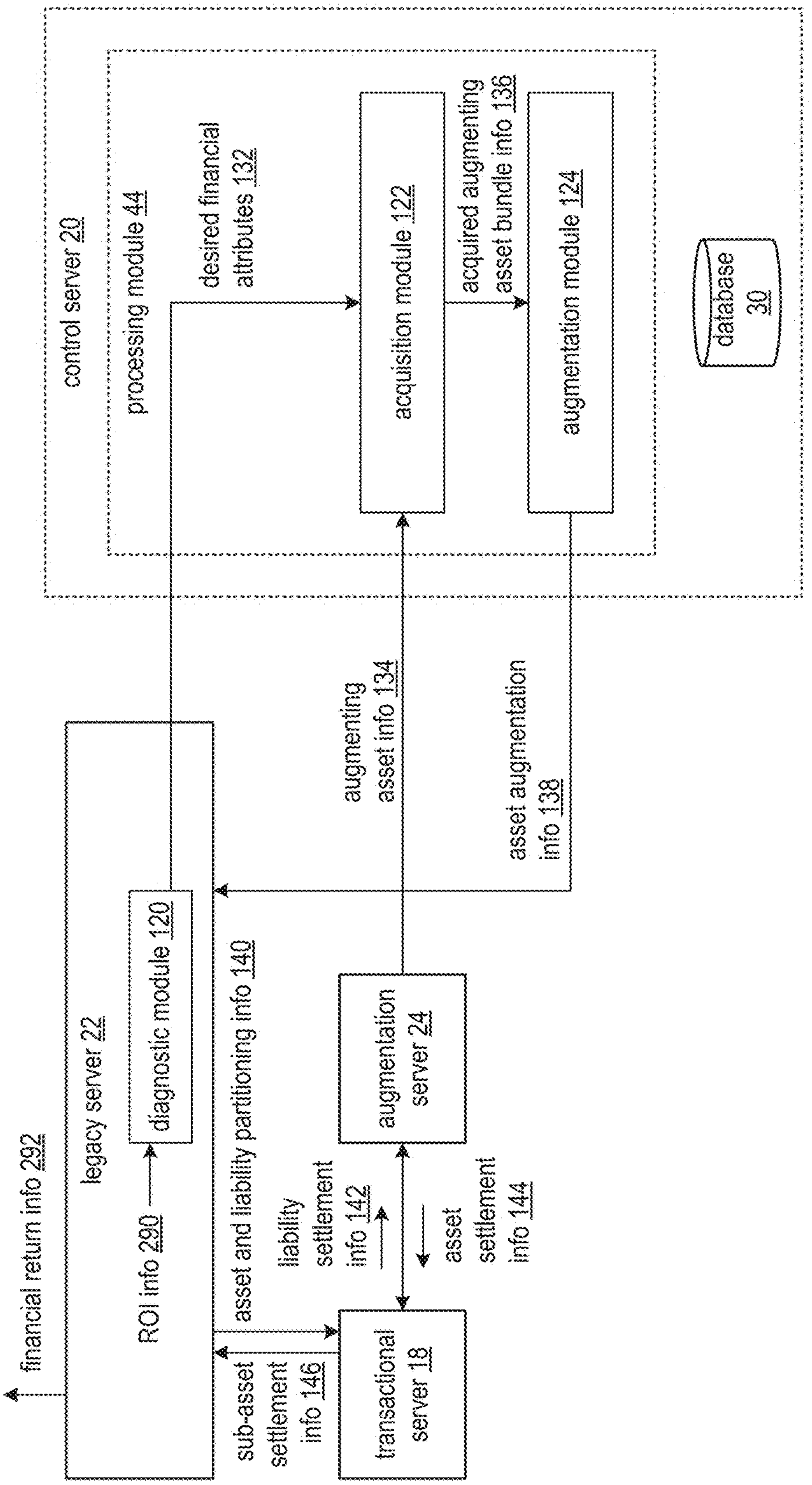
FIG. 9A is a schematic block diagram of another embodiment of a communication system in accordance with the present invention.

FIG. 9A is a schematic block diagram of another embodiment of a communication system that includes the legacy server 22 of FIG. 1, the transactional server 18 of FIG. 1, the augmentation server 24 of FIG. 1, and the control server 20 of FIG. 1. The legacy server 22 includes the diagnostic module 120 of FIG. 4A. The control server 20 includes the processing module 44 of FIG. 1 and the database 30 of FIG.

1. The processing module 44 includes the acquisition module 122 of FIG. 4A and the augmentation module 124 of FIG. 4A. The communication system functions to facilitate asset reconfiguration and reassignment.

In an example of operation of the facilitating asset reconfiguration and reassignment, the diagnostic module 120 determines to evaluate return on investment (ROI) information associated with the legacy server 22. Such ROI information to be associated with one or more present or future asset bases, where an investment is expected to produce a return with various minimums for financial metrics such as a minimum ROI level, a time frame to achieve various absolute returns, minimum level of magnitudes of returns, etc. The legacy asset base will eventually produce returns that are summarized by the legacy server 22 as financial return information 292 (e.g., cash flow information, balance sheet information. When evaluating the ROI, the diagnostic module 120 characterizes the one or more asset bases from ROI information 290 to produce desired financial attributes 132 that includes a desired cash flow and a desired valuation lift.

The acquisition module 122 identifies augmenting asset preferences, accesses augmenting asset information 134 to extract candidate asset characteristics, down selects candidate assets that have characteristics that compare favorably to the augmenting asset preferences and to the desired financial attributes 132, determines financial contributions of each of the down selected candidate assets, and selects an asset selection approach. The acquisition module 122 further completes selection of assets from the down selected candidate assets to produce an augmenting asset bundle utilizing the selected asset selection approach, where an estimated financial contribution of the augmenting asset bundle compares favorably to the desired cash flow and valuation lift, and summarizes the augmenting asset bundle to reveal selected asset characteristics to produce acquired augmenting asset bundle information 136.

The augmentation module 124 facilitates identification of a custodial entity and an associated transactional server 18, selects a deconstruction approach for the acquired augmenting asset bundle where an estimated value of deconstructed asset elements compares favorably to one or more of the desired cash flow, the desired valuation lift, and other funding requirements (e.g., the transactional server 18 generates an estimated value, the augmentation module 124 generates the estimated value), generates title transfer information for the deconstructed asset elements, facilitates producing of the acquired augmenting asset bundle utilizing the deconstruction approach to produce the deconstructed asset elements (e.g., perform the deconstruction or request that another entity such as the legacy server 22 perform the deconstruction by issuing a request that includes selected asset titling information and the selected asset deconstruction approach. For instance, the augmentation module 124 issues asset augmentation information 138 to the legacy server 22, where the asset augmentation information 138 includes the selected asset titling information and the selected asset deconstruction approach along with a request that the legacy server 22 perform the deconstruction.

Having received the asset augmentation information 138, the legacy server 22 performs the deconstruction of the augmenting asset bundle to produce the deconstructed asset elements in accordance with the selected asset deconstruction approach, re-bundles deconstructed asset elements to produce two or more groupings, assigns title to each of the two or more groupings in accordance with the received titling information, and issues asset and liability partitioning information 140 to the transactional server 18, where the asset and liability partitioning information 140 includes asset deconstruction results and deconstructed asset element title information. For instance, a first title group of deconstructed elements is titled to the asset base of the legacy server 22 (e.g., a general investment fund) and a second title group of deconstructed elements is titled to the entity associated with the custodial entity transactional server 18.

Having received the asset and liability protection information 140 the transactional server 18 issues liability settlement information 142 to the augmentation server 24 in accordance with timing associated with a particular group of deconstructed elements titled to either the transactional server 18 or the legacy server 22 (e.g., life insurance policy premium payments, life insurance death benefit claims) and receives corresponding asset settlement information 144 (e.g., life insurance death benefit payments). The transactional server 18 issues sub-asset settlement information 146 to the legacy server 22 when receiving asset settlement information 144 to satisfy dividend payments or similar for asset maturation in accordance with the titling information (e.g., a portion of the life insurance death benefit payments are forwarded to the legacy server 22 for utilization in the asset base). Having received a plurality of asset maturation payments (e.g., numerous sub-asset settlement information 146), the legacy server 22 facilitates issuing of the financial return information 292 (e.g., financial transactions to satisfy general investment fund payments in accordance with a dividend payment schedule for each investment fund participant).

Figure 9B:
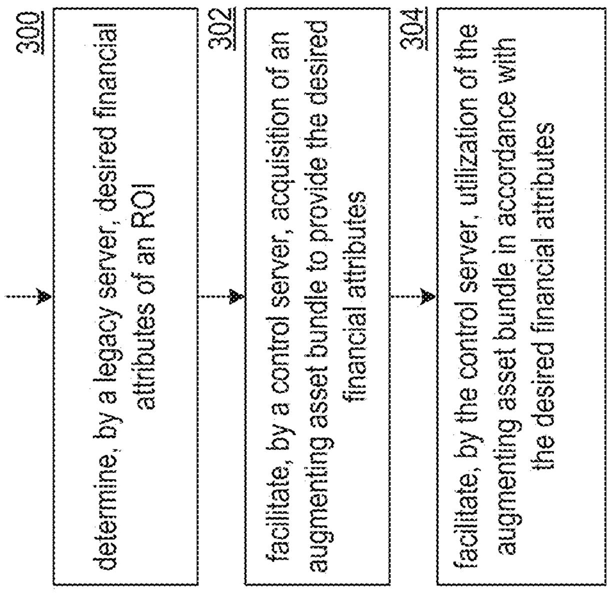
FIG. 9B is a logic diagram of an example of a method of acquisition of an augmenting asset bundle in accordance with the present invention.

FIG. 9B is a logic diagram of another example of a method of enhancing a legacy asset base that includes step 300 where a legacy server determines desired financial attributes of an ROI (e.g., of a general investment fund or similar). For example, the legacy server determines to evaluate the ROI of the legacy asset base and characterizes the acid-base to estimate a desired cash flow and a desired valuation lift.

The method continues at step 302 where a control server facilitates acquisition of an augmenting asset bundle to enhance the legacy asset base. For example, the control server identifies augmenting asset preferences, accesses augmenting asset information to extract candidate asset characteristics, down selects candidate assets that have characteristics that compare favorably to the augmenting asset preferences, determines financial contributions of each of the down selected candidate assets, selects an asset selection approach, completes the selection from the down selected candidate assets to produce the augmenting asset bundle utilizing the selected asset selection approach where an estimated financial contribution of the augmenting asset bundle compares favorably to the desired cash flow and desired valuation lift, and summarizes the augmenting asset bundle to reveal selected asset characteristics.

The method continues at step 304 where the control server facilitates enhancement of the legacy asset base with the augmenting asset bundle to enable the legacy asset in accordance with the desired financial attributes. For example, the control server facilitates identification of a custodial entity associated with a transactional server, selects a deconstruction approach for the acquired augmenting asset bundle where an estimated value of two or more groupings of deconstructed asset elements compares favorably to one or more of the desired cash flow, the desired valuation lift, and other funding requirements, generates titling information for the two or more groupings of the deconstructed asset elements, and facilitates producing of the two or more groupings of deconstructed asset elements utilizing the deconstruction approach to enable future results of the legacy asset base to compare favorably to the desired financial attributes.

Figure 10A:
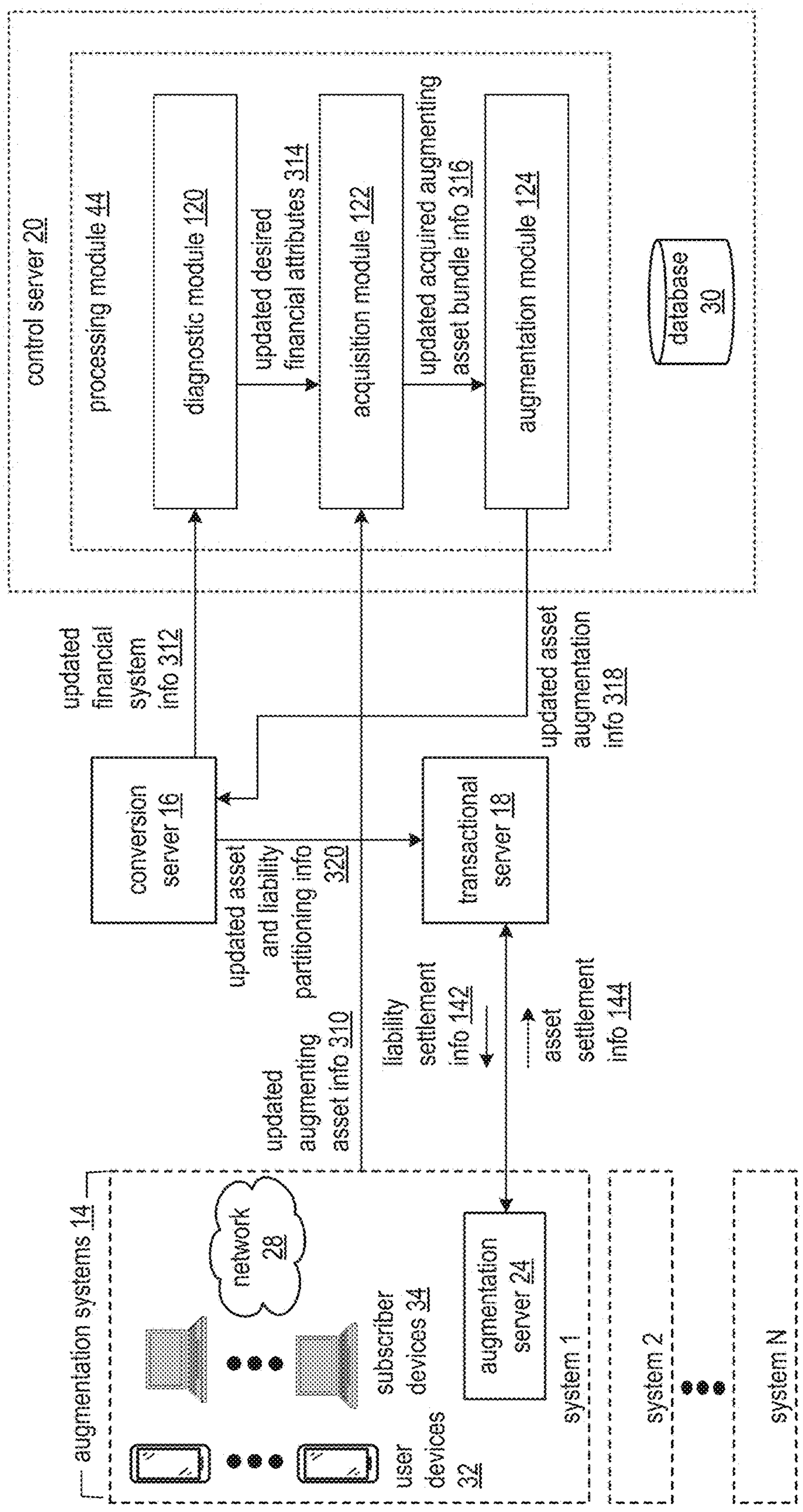
FIG. 10A is a schematic block diagram of another embodiment of a communication system in accordance with the present invention.

FIG. 10A is a schematic block diagram of another embodiment of a communication system that includes the plurality of N augmentation systems 14 of FIG. 1, the conversion server 16 of FIG. 1, the transactional server 18 of FIG. 1, and the control server 20 of FIG. 1. Each augmentation system 14 includes a portion of the network 28 of FIG. 1, the plurality of user devices 32 of FIG. 1, the plurality of subscriber devices 34 of FIG. 1, and the augmentation server 24 of FIG. 1. The control server 20 includes the processing module 44 FIG. 1 and the database 30 of FIG. 1. The processing module 44 includes the diagnostic module 120 of FIG. 4A, the acquisition module 122 of FIG. 4A, and the augmentation module 124 of FIG. 4. The communication system functions to facilitate asset reconfiguration and reassignment.

In an example of operation of the facilitating of the asset reconfiguration and reassignment, the acquisition module 122 determines whether to update an acquired augmenting asset bundle. As a particular example, the acquisition module 122 receives updated desired financial attributes 314 from the diagnostic module 120 based on updated financial system information 312 from the conversion server 16 and detects that a change has occurred that will drive updated desired financial attributes 314 (e.g., a new desired cash flow is detected, a new desired valuation lift is detected).

As another particular example, the acquisition module 122 receives updated augmenting asset information 310 from one or more of a user device 32, a subscriber device 34, and the augmentation server 24, and detects that an attribute of an augmenting asset of the acquired augmented asset bundle compares favorably to an attribute threshold level (e.g., interpret updated augmenting asset information 310 from a user device 32 to extract the attribute, compare the attribute to a corresponding attribute threshold level, and indicate the favorable comparison when the attribute compares favorably to the attribute threshold level). Examples of attributes include user demographics, user lifestyle, user location user interests, user illness, user domicile location, user work location user career field, user family connections, user social connections user leisure time activities, user nutrition information, user DNA information, weather conditions associated with a proximal location to a user, and/or any other attribute associated with one or more users that may impact valuation of associated assets of an augmentation system. For instance, the acquisition module 122 detects a lifestyle change of a person associated with the user device 32, where the person is associated with a life insurance policy asset of the augmenting assets.

When updating the acquired augmenting asset bundle, the acquisition module 122 facilitates further augmenting asset acquisition to produce updated acquired augmenting asset bundle information 316. For example, the acquisition module 122 identifies augmenting asset preferences, accesses the updated augmenting asset information 310 to extract candidate asset characteristics, down selects candidate assets that have attributes that compare favorably to the augmenting asset preferences, determines financial contributions of each of the down selected candidate assets, and selects an asset selection approach (e.g., keep some prior assets, swaps and prior assets, add more assets, remove some assets). The selecting may be based on one or more of a predetermination, a request, a query response, and a previously utilized asset selection approach that is associated with favorable financial results.

When acquiring more assets, the acquisition module 122 completes the selection from the down selected candidate assets to produce the updated augmenting asset bundle utilizing the selected asset selection approach where an estimated financial contribution of the augmenting asset bundle compares favorably to a desired cash flow and a desired valuation lift. The acquisition module 122 summarizes the updated acquired asset bundle to reveal further selected asset characteristics included in updated acquired augmenting asset bundle information 316.

The augmentation module 124 facilitates updating of the acquired augmenting asset bundle to produce updated asset augmentation information 318. For example, the augmentation module 124 identifies a custodial entity associated with the transactional server 18, selects a deconstruction approach for the updated acquired augmenting asset bundle, where an estimated value of remaining deconstructed asset elements combined with further acquired deconstructed asset elements, when re-bundled in two or more groups, compares favorably to one or more of the desired cash flow, the desired valuation lift, and other funding requirements.

The augmentation module 124 generates updated titling information for the totality of deconstructed asset elements as a result of a new re-bundling plan and facilitates the construction of an updated acquired augmenting asset bundle utilizing the deconstruction approach to produce the further deconstructed asset elements (e.g., perform the deconstruction or request that another entity such as the conversion server 16 perform the deconstruction by issuing the updated asset augmentation information 318 to the conversion server 16). The updated asset augmentation information 318 includes one or more of the asset titling information, the selected asset deconstruction approach, and a request to perform the deconstruction.

The conversion server 16 issues updated asset and liability partitioning information 320 to the transactional server 18 based on the updated asset augmentation information 318. The transactional server 18 issues liability settlement information 142 to the augmentation server 24 from time to time and receives asset settlement information 144 from the augmentation server 24.

Figure 10B:
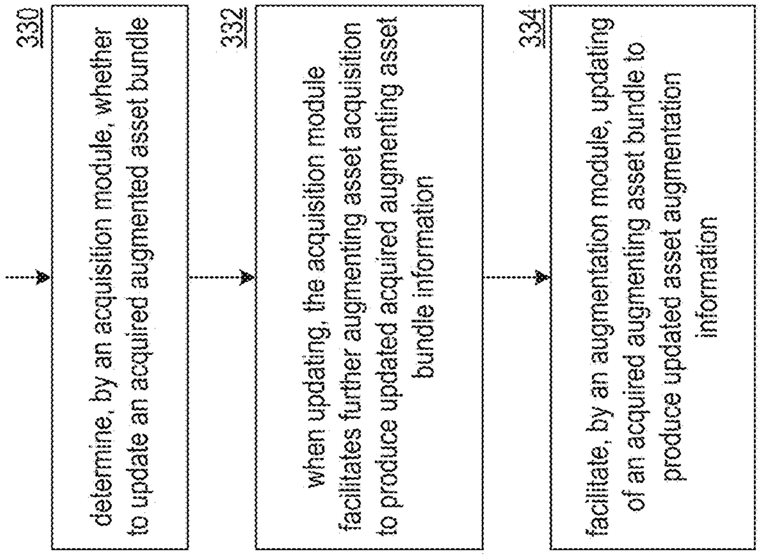
FIG. 10B is a logic diagram of an example of a method of updating an acquired augmenting asset bundle in accordance with the present invention.

FIG. 10B is a logic diagram of an example of a method of updating an acquired augmenting asset bundle that includes step 330 where an acquisition module determines whether to update an acquired augmented asset bundle. The determining may be based on one or more of interpreting updated desired financial attributes based on updated financial system information and detecting that an attribute of an augmenting asset of the acquired augmenting asset bundle compares favorably to an attribute threshold level (e.g., interpret updated augmenting asset information to extract the attribute, compare the attribute to a corresponding attribute threshold level, and indicate a favorable comparison when the attribute compares favorably to the attribute threshold level).

When updating, the method continues at step 332 where the acquisition module facilitates further augmenting asset acquisition to produce updated acquired augmented asset bundle information. For example, the acquisition module identifies augmenting asset preferences, accesses updated augmenting asset information to extract candidate asset characteristics, down selects candidate assets that have attributes that compare favorably to the augmenting asset preferences, determines financial contributions of each of the down selected candidate assets, selects an asset selection approach, completes the selection from the down selected candidate assets to produce the updated augmenting asset bundle utilizing the selected asset selection approach where an estimated financial contribution of the augmenting asset bundle compares favorably to a desired cash flow and a desired valuation lift, and summarize the updated augmenting asset bundle to reveal further selected asset characteristics.

The method continues at step 334 where an augmentation module facilitates updating of an acquired augmenting asset bundle to produce updated asset augmentation information. For example, the augmentation module identifies a custodial entity of an associated transactional server, selects a deconstruction approach for the updated acquired augmented asset bundle where an estimated value of remaining deconstructed asset elements combined with further acquired deconstructed asset elements compares favorably to one or more of the desired cash flow, the desired valuation lift, and other funding requirements, generates updated titling information for the totality of deconstructed asset elements, facilitates the construction of an updated acquired augmenting asset bundle utilizing the deconstruction approach to produce further deconstructed asset elements, where the transactional server utilizes the further elements.

Figure 11A:
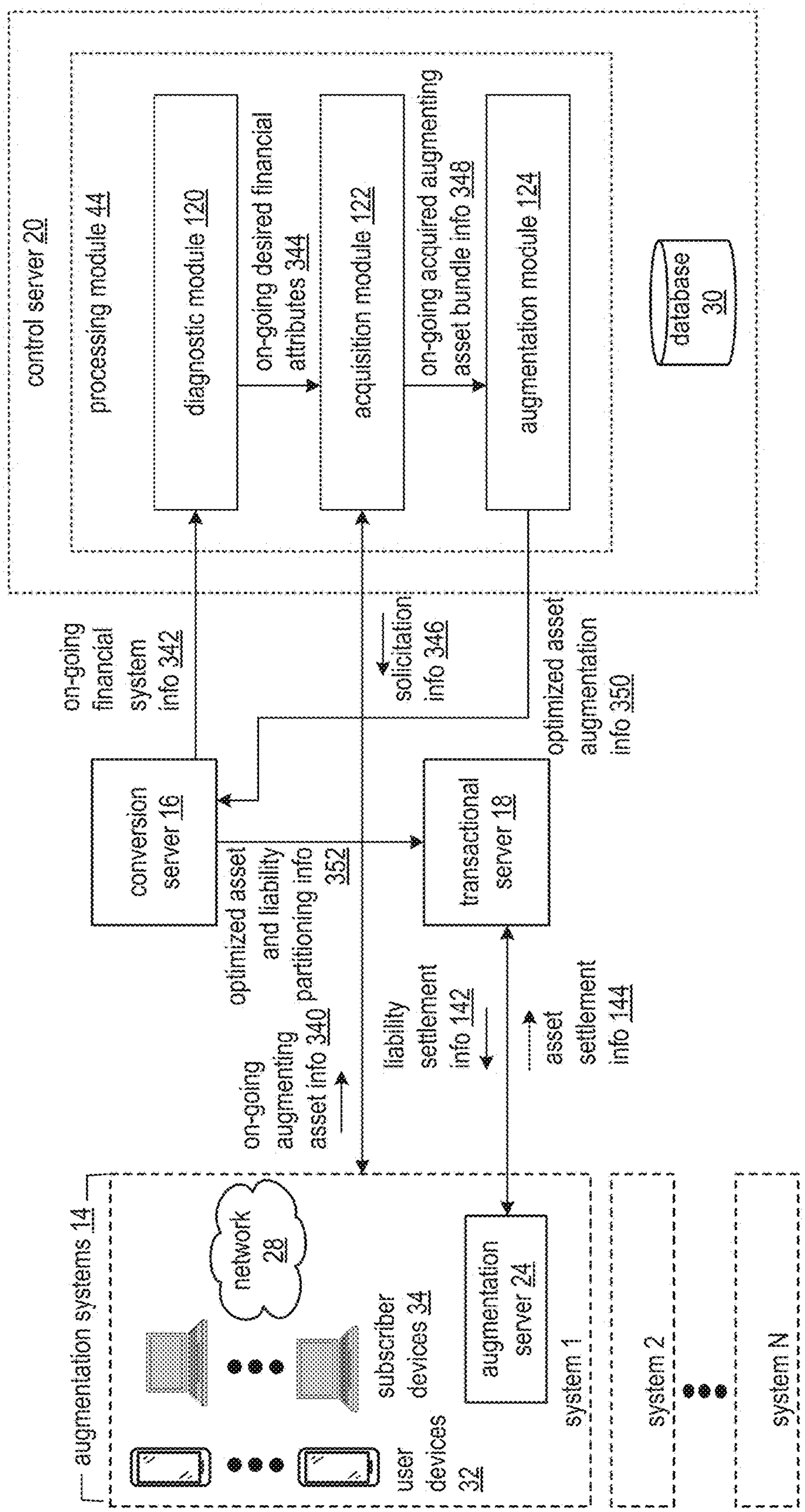
FIG. 11A is a schematic block diagram of another embodiment of a communication system in accordance with the present invention.

FIG. 11A is a schematic block diagram of another embodiment of a communication system that includes the plurality of N augmentation systems 14 of FIG. 1, the conversion server 16 of FIG. 1, the transactional server 18 of FIG. 1, and the control server 20 of FIG. 1. Each augmentation system 14 includes a portion of the network 28 of FIG. 1, the plurality of user devices 32 of FIG. 1, the plurality of subscriber devices 34 of FIG. 1, and the augmentation server 24 of FIG. 1. The control server 20 includes the processing module 44 FIG. 1 and the database 30 of FIG. 1. The processing module 44 includes the diagnostic module 120 of FIG. 4A, the acquisition module 122 of FIG. 4A, and the augmentation module 124 of FIG. 4. The communication system functions to facilitate asset reconfiguration and reassignment.

In an example of operation of the facilitating of the asset reconfiguration and reassignment, the acquisition module 122 determines whether to update an asset base associated with the conversion server 16 (e.g., where a pension system sponsor is associated with the conversion server 16). As a particular example, the acquisition module 122 receives ongoing desired financial attributes 344 from the diagnostic module 120 based on ongoing financial system information 342 from the conversion server 16 and detects that a change has occurred that will drive ongoing desired financial attributes 344 (e.g., a new desired cash flow is detected, a new desired valuation lift is detected).

As another particular example, the acquisition module 122 receives an indication from one or more of the transactional server 18, the conversion server 16, the augmentation server 24, one or more user devices 32, and one or more subscriber devices 34, that a trigger condition has occurred associated with one or more of the asset base and or with one or more available assets associated with one or more of the augmentation systems 14. For example, the acquisition module 122 interprets ongoing augmenting asset information 340 from a first user device 32, where the interpretation indicates that an asset associated with the user of the first user device 32 has favorable attributes as compared to augmenting asset preferences and may be available for purchase.

When augmenting the asset base, the acquisition module 122 facilitates augmenting asset acquisition utilizing solicitation of a plurality of assets associated with one or more augmentation systems 14 to produce ongoing acquired augmenting asset bundle information 348. For example, the acquisition module 122 identifies the augmenting asset preferences, accesses the ongoing augmenting asset information 342 extract candidate asset characteristics, down selects candidate assets that compare favorably to the augmenting asset preferences, determines financial contributions of each of the down selected candidate assets, selects an asset selection approach, complete selection from the down selected candidate assets to produce an updated augmenting asset bundle utilizing the selected asset selection approach where an estimated financial contribution of the augmenting asset bundle compares favorably to desired cash flow and desired valuation lift, and summarizes the updated augmenting asset bundle to reveal further selected asset characteristics in ongoing acquired augmenting asset bundle information 348, where the acquisition module 122 issues solicitation information 346 to the corresponding one or more augmentation systems 14 to invoke a new agreement to sell an asset (e.g., sends a solicitation message to the first user device 32), and completes the acquiring of the selected assets.

The augmentation module 124 facilitates updating of the acquired augmenting asset bundle to produce optimized asset augmentation information 350. For example, the augmentation module 124 identifies a custodial entity associated with the transactional server 18, selects a deconstruction approach for the updated acquired augmenting asset bundle, where an estimated value of remaining deconstructed asset elements combined with further acquired deconstructed asset elements, when re-bundled in two or more groups, compares favorably to one or more of the desired cash flow, the desired valuation lift, and other funding requirements.

The augmentation module 124 generates updated titling information for the totality of deconstructed asset elements as a result of a new re-bundling plan and facilitates the construction of an updated acquired augmenting asset bundle utilizing the deconstruction approach to produce the further deconstructed asset elements (e.g., perform the deconstruction or request that another entity such as the conversion server 16 perform the deconstruction by issuing the updated asset augmentation information 318 to the conversion server 16). The optimized asset augmentation information 350 includes one or more of the asset titling information, the selected asset deconstruction approach, and a request to perform the deconstruction.

The conversion server 16 issues optimized asset and liability partitioning information 352 to the transactional server 18 based on the optimized asset augmentation information 350. The transactional server 18 issues liability settlement information 142 to the augmentation server 24 from time to time and receives asset settlement information 144 from the augmentation server 24.

Figure 11B:
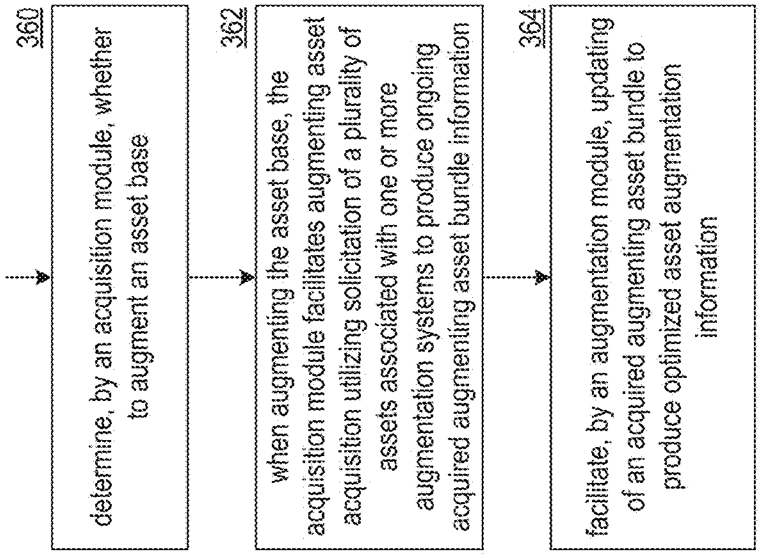
FIG. 11B is a logic diagram of another example of a method of updating an acquired augmenting asset bundle in accordance with the present invention.

FIG. 11B is a logic diagram of another example of a method of updating an acquired augmenting asset bundle that includes step 360 where an acquisition module determines whether to augment an asset base. When updating the asset base, the method continues at step 362 where the acquisition module facilitates further augmenting asset acquisition utilizing solicitation of a plurality of assets associated with one or more augmentation systems to produce on-going acquired augmented asset bundle information. The method continues at step 364 where an augmentation module facilitates updating of an acquired augmenting asset bundle to produce optimized asset augmentation information.

FIGS. 12A-12E are schematic block diagrams of another embodiment of a communication system illustrating an embodiment of a method for servicing a plurality of rived longevity-contingent instruments within a computing system. The computing system includes data sources 26-1 through 26-N, the augmentation server 24 of FIG. 1, the transactional server 18 of FIG. 1, and legacy servers 22-1 through 22-2. In an embodiment, the data sources 26-1 through 26-N are implemented utilizing the data source 26 of FIG. 1. In an embodiment, the legacy servers 22-1 through 22-2 are implemented utilizing the legacy server 22 of FIG. 1, where legacy server 22-1 is associated with a pension system and legacy server 22-2 is associated with one or more sponsors associated with the pension system. The transactional server 18 includes the processing module 44 of FIG. 1 and the database 30 of FIG. 1.

The plurality of rived longevity-contingent instruments includes a pool of life insurance policies (e.g., the instruments), where the policies have been rived (e.g., split of benefit ownership from premium liability responsibility). Each longevity-contingent instrument is associated with a premium payment stream (e.g., series of premium payments). For example, an insurance company of a first life insurance policy requires a monthly premium payment to maintain the first life insurance policy in force. Together, the pool of life insurance policies is associated with a plurality of premium payment streams.

A financial offering that includes the pool of life insurance policies requires an aggregated payment of the plurality of premium payment streams associated with the pool of life insurance policies. In an embodiment, the one or more sponsors associated with the legacy servers 22-1 through 22-2 are liable for the aggregated payment of the plurality of periodic premium payments in accordance with a rive approach 682. The rive approach 682 is discussed in greater detail with regards to FIG. 12C.

Each longevity-contingent instrument is further associated with a payout (e.g., death benefit) when a longevity status changes, e.g., a death of an insured person associated with the life insurance policy of the longevity-contingent instrument. For example, when the insured person passes, the life insurance company of the first life insurance policy provides payment of the payout to an entity associated with ownership of the first life insurance policy.

Riving of the policies splits the policy to associate liability of periodic premium payments with one or more debtors (e.g., sponsors) and to associate the policy payout with one or more benefactors (e.g., a pension and a sponsor). For example, the riving results in associating multiple sponsors of a common union pension with the liability of periodic premium payments. As another example, the riving results in associating the multiple sponsors of the common union pension and the common union pension with the policy payout.

The servicing of the plurality of longevity-contingent instrument includes steps associated with both the payouts upon longevity status change and the payment of the premium payment streams. The method of the servicing is discussed in greater detail with reference to FIGS. 15A-15E.

Figure 12A:
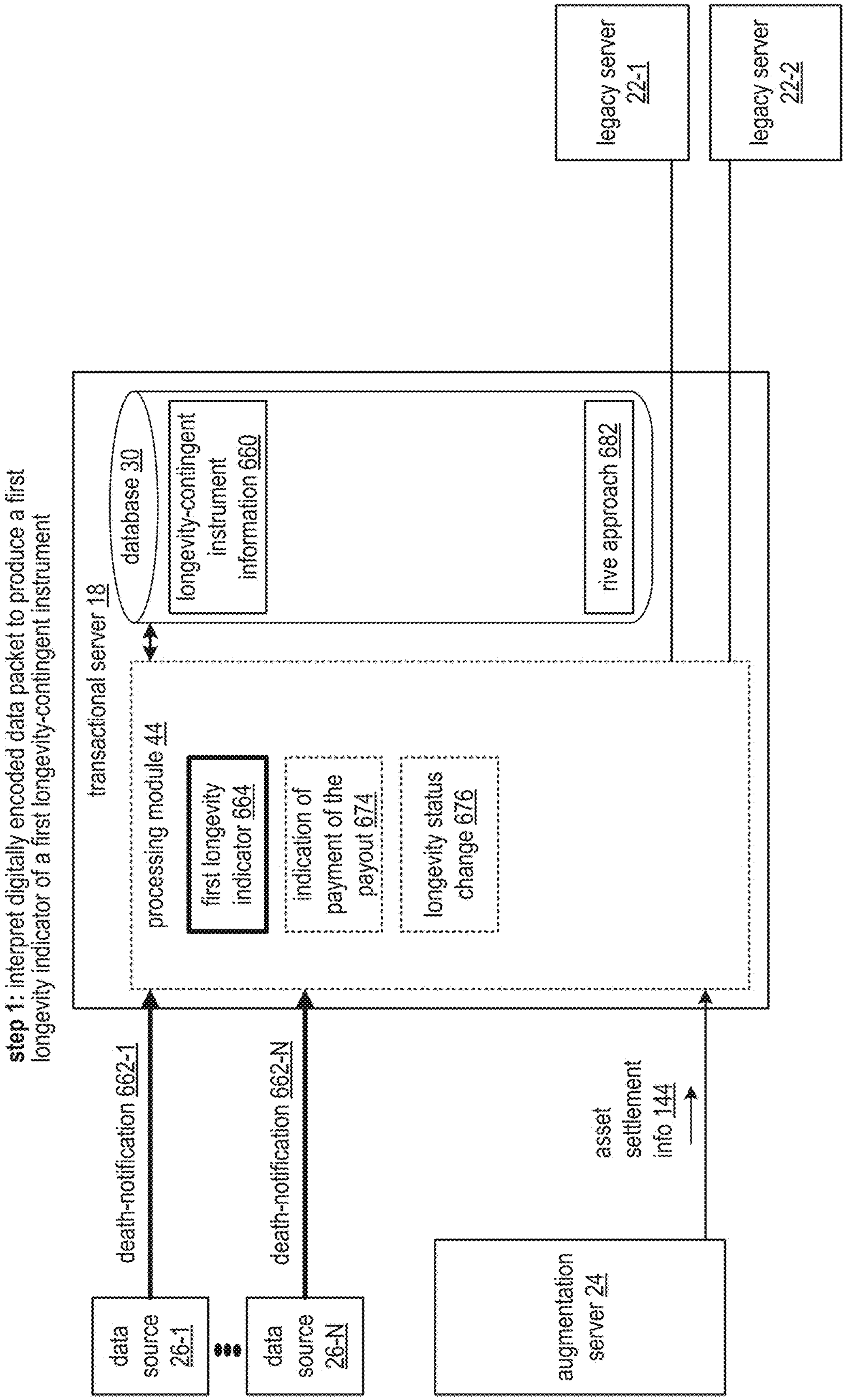
FIGS. 12A-12E are schematic block diagrams of another embodiment of a communication system illustrating an embodiment of a method for servicing a plurality of rived longevity-contingent instruments within a computing system in accordance with the present invention.

FIG. 12A illustrates an example of operation of steps of a method for the servicing of the plurality of longevity-contingent instruments where, in a first step, the processing module 44 interprets a digitally encoded data packet from another computing device to produce a first longevity indicator of a first longevity-contingent instrument of a plurality of longevity-contingent instruments. The first longevity-contingent instrument is rived in accordance with the rive approach 682 to produce a first sub-asset of a plurality of sub-assets and a first sub-liability of a plurality of sub-liabilities. The first sub-liability is associated with a first premium payment stream of a plurality of premium payment streams of the plurality of sub-liabilities.

A first death-notification of a multitude of death-notifications is encoded to produce the digitally encoded data packet. For example, the processing module 44 receives a multitude of death-notifications 662-1 through 662-N from data sources 26-1 through 26-N. The processing module 44 decodes the multitude of death-notifications to produce death-notification information. The processing module 44 accesses the database 30 to extract a plurality of insured person identifiers of the plurality of longevity-contingent instruments from longevity-contingent instrument information 660. A first insured person identifier of the plurality of insured person identifiers is associated with the first longevity-contingent instrument. The processing module 44 generates the first longevity indicator 664 to indicate a deceased status when the death-notification information includes a deceased person identifier that substantially matches the first insured person identifier of the first longevity-contingent instrument.

In another example, the processing module 44 interprets asset settlement information 144 to produce an indication of payment of the payout 674. The processing module 44 generates the first longevity indicator 664 when the payment of the payout 674 includes the deceased person identifier that substantially matches the first insured person identifier of the first longevity-contingent instrument.

In yet another example, the processing module 44 interprets either of the asset settlement information 144 and a corresponding death-notification 662-1 to produce a longevity status change 676. The processing module 44 generates the first longevity indicator 664 when the longevity status change 676 includes the deceased person identifier that substantially matches the first insured person identifier of the first longevity-contingent instrument.

Figure 12B:
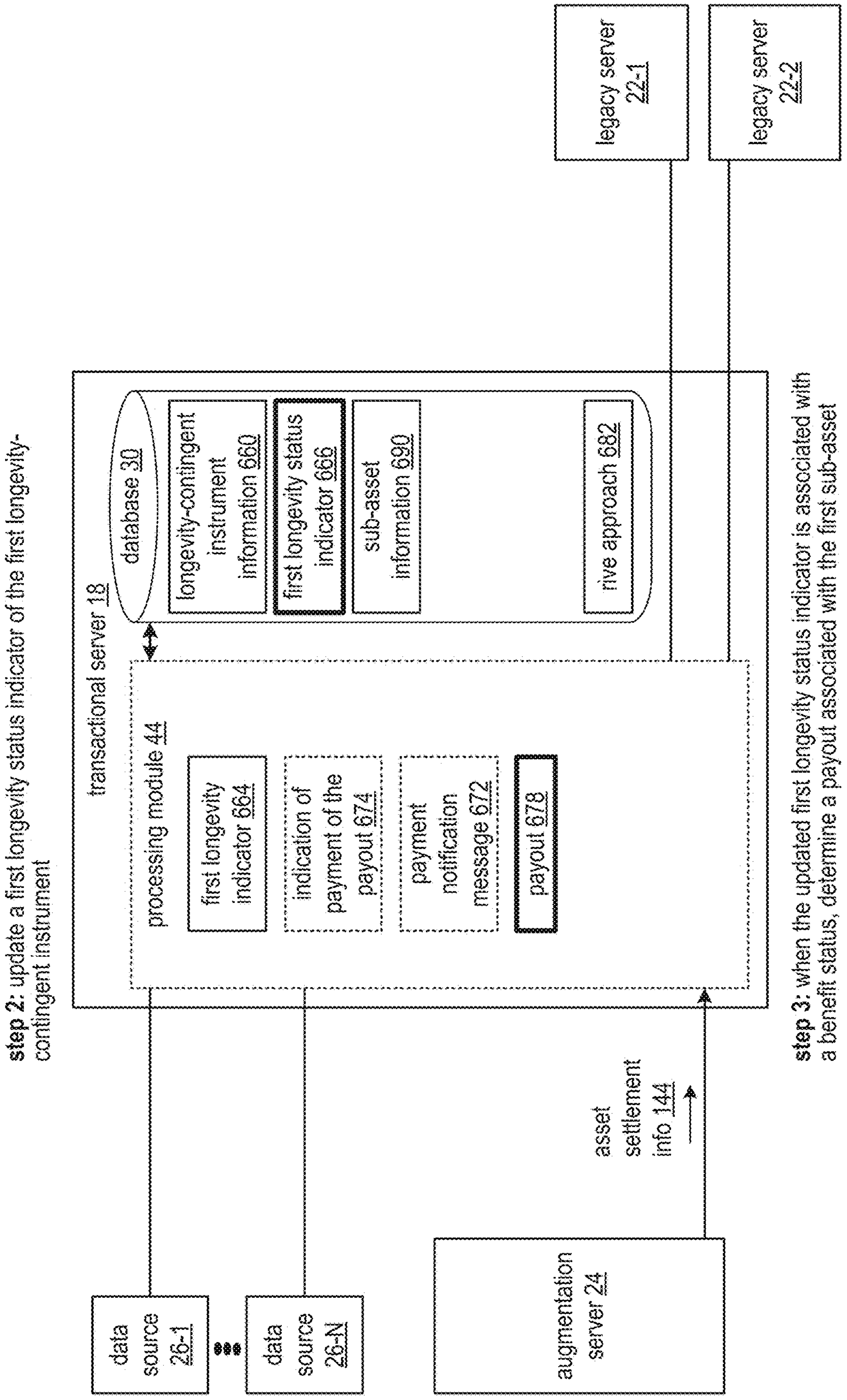

FIG. 12B further illustrates the example of the servicing of the plurality of longevity-contingent instruments where, having produced the first longevity indicator 664, in a second step, the processing module 44 updates a first longevity status indicator 666 for the first longevity-contingent instrument within the database 30 utilizing the first longevity indicator to produce an updated first longevity status indicator. For example, the processing module 44 produces the updated first longevity status indicator to indicate a benefit status when the first longevity indicator 664 indicates that the insured person has deceased.

Having updated the first longevity status indicator 666, when the updated first longevity status indicator is associated with the benefit status, in a third step, the processing module 44 determines a payout 678 associated with the first sub-asset. The determining the payout 678 includes a variety of approaches. A first approach includes interpreting a payment notification message 672. For example, the processing module 44 interprets the asset settlement information 144 to produce the payment notification message 672, where the payment notification message 672 includes the payout 678. In another example, the processing module 44 interprets the asset settlement information 144 to produce the indication of payment of the payout 674, where the indication of payment of the payout 674 includes the payout 678.

A second approach to determine the payout 678 includes accessing the database 30 to extract a face value of the first longevity-contingent instrument. For example, the processing module 44 accesses the longevity-contingent instrument information 660 to extract the face value (e.g., a stated value of an associated life insurance policy).

A third approach to determine the payout 678 includes accessing the database 30 to extract a benefit value (e.g., an agreed to value) of the first sub-asset. For example, the processing module 44 accesses sub-asset information 690 to extract the benefit value.

Alternatively, or in addition to, the processing module 44 indicates that the first sub-asset has matured. For example, the processing module updates the sub-asset information 690 to indicate that the sub-asset has matured (e.g., to benefit payout).

Figure 12C:
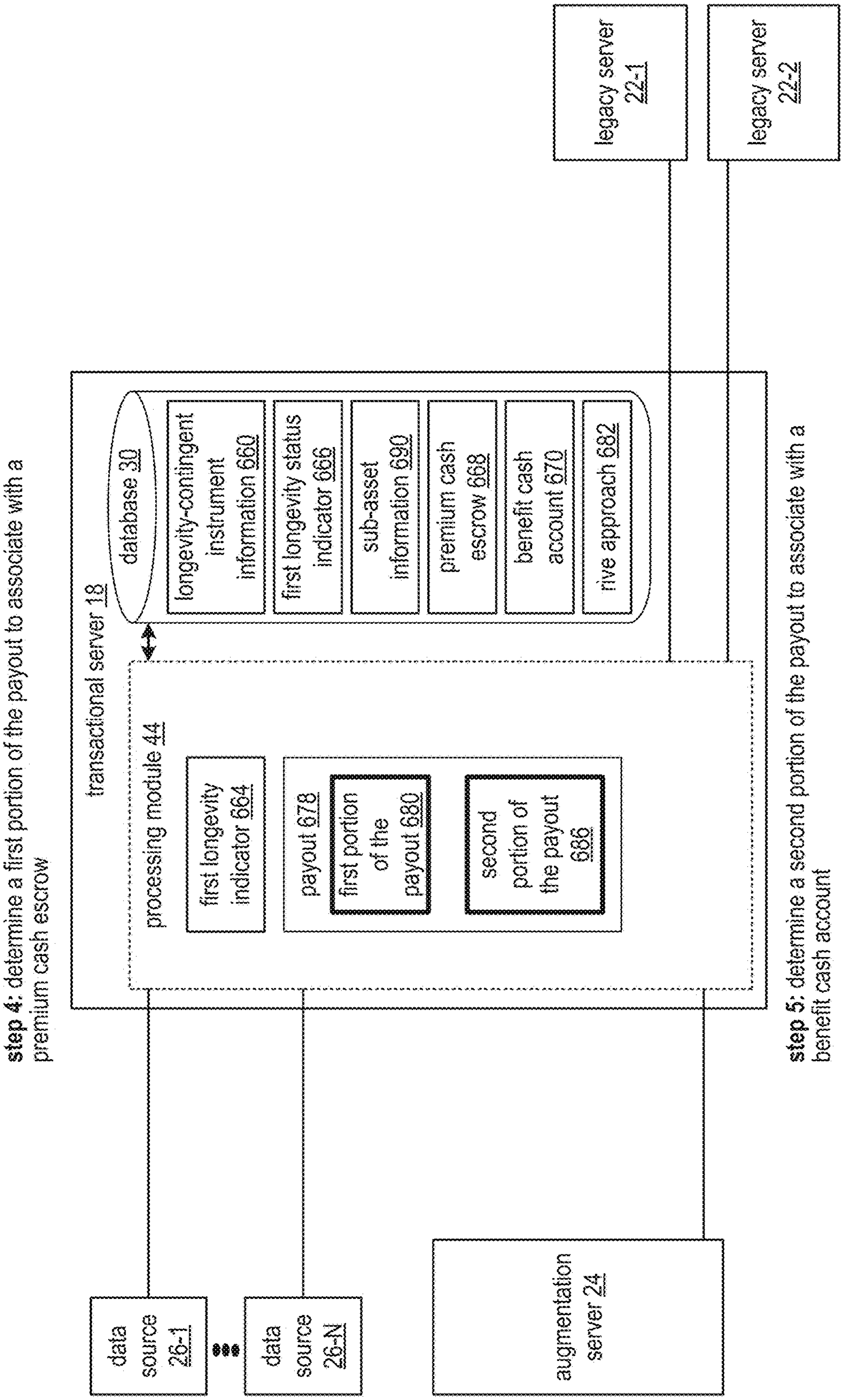

FIG. 12C further illustrates the example of the servicing of the plurality of longevity-contingent instruments where the processing module 44, having identified the payout 678, in a fourth step determines a first portion of the payout 680 to associate with a premium cash escrow 668 in accordance with the rive approach 682. The association enables subsequent utilization of the premium cash escrow 668 to fund the aggregated payment of the plurality of premium payment streams on behalf of the one or more debtors.

The rive approach includes a variety of approaches. The approaches include a surplus approach where a balance associated with the premium cash escrow 668 is maintained at a level that is more than enough to make the aggregated premium payment streams. The approaches further include a deficit approach where the balance associated with the premium cash escrow 668 is maintained at a level that is less than enough to make the aggregated premium payment streams (e.g., another party such as a pension sponsor is liable to make up differences).

The approaches further include a breakeven approach where the balance associated with the premium cash escrow 668 is maintained at a level that is just enough to make the aggregated premium payment streams. The approaches further include a pro rata approach where the first portion is in accordance with a negotiated percentage of the payout (e.g., always 50% or even 40%). The approaches further include a consistency approach where the balance associated with the premium cash escrow 668 receives a stream of constant inflows to support the aggregated premium payment streams.

When the rive approach 682 includes the surplus approach, the determining of the first portion of the payout 680 includes calculating the first portion of the payout such that a sum of a plurality of first portion payouts within a first time frame is greater than a sum of a subset of the plurality of premium payment streams for the first time frame. When the rive approach 682 includes the deficit approach, the determining of the first portion of the payout 680 includes calculating the first portion of the payout such that the sum of the plurality of first portion payouts within the first time frame is less than the sum of the subset of the plurality of premium payment streams for the first time frame.

When the rive approach 682 includes the break-even approach, the determining of the first portion of the payout 680 includes calculating the first portion of the payout such that the sum of the plurality of first portion payouts within the first time frame is substantially the same as the sum of the subset of the plurality of premium payment streams for the first time frame. When the rive approach 682 includes the pro rata approach, the determining of the first portion of the payout 680 includes establishing the first portion of the payout in accordance with a pre-determined percentage of the payout. When the rive approach 682 includes the consistency approach, the determining of the first portion of the payout 680 includes establishing the first portion of the payout in accordance with a pre-determined first portion level (e.g., a default constant amount).

Having determined the first portion of the payout 680, the processing module 44, in a fifth step determines a second portion of the payout 686 to associate with a benefit cash account 670 based on the first portion of the payout 680 and in accordance with the rive approach 682. The benefit cash account 670 is associated with the one or more benefactors. The determining of the second portion of the payout 686 includes a variety of approaches. The approaches include the pro rata approach, the consistency approach, and a difference approach.

When the rive approach includes the pro rata approach, the determining of the second portion of the payout 686 includes establishing the second portion of the payout 686 in accordance with a pre-determined percentage of the payout. For example, the processing module 44 multiplies the predetermined percentage by the payout 678 to produce the second portion of the payout 686 (e.g., 60% of the payout).

When the rive approach includes the consistency approach, the determining of the second portion of the payout 686 includes establishing the second portion of the payout 686 in accordance with a pre-determined second portion level (e.g., a constant amount). For example, the processing module 44 sets the second portion of the payout 686 to be a fixed number based on the predetermined second portion level (e.g., a flat $100,000).

When the rive approach includes the difference approach, the determining of the second portion of the payout 686 includes establishing the second portion of the payout in accordance with a difference between the payout and the first portion of the payout (e.g., what's leftover). For example, the processing module 44 subtracts the first portion of the payout 680 from the payout 678 to produce the second portion of the payout 686 (e.g., $1 million payout minus $480,000 first portion equals $520,000).

Alternatively, or in addition to, the processing module 44 determines a third portion of the payout. For instance, the payout 678 equals the sum of the first through third portions, where the third portion is a service fee. In yet another alternative, the processing module determines further portions of the payout when more than one benefactor directly receives a portion of the payout 678 (e.g., multiple pensions associated with the plurality of longevity-contingent assets).

Figure 12D:
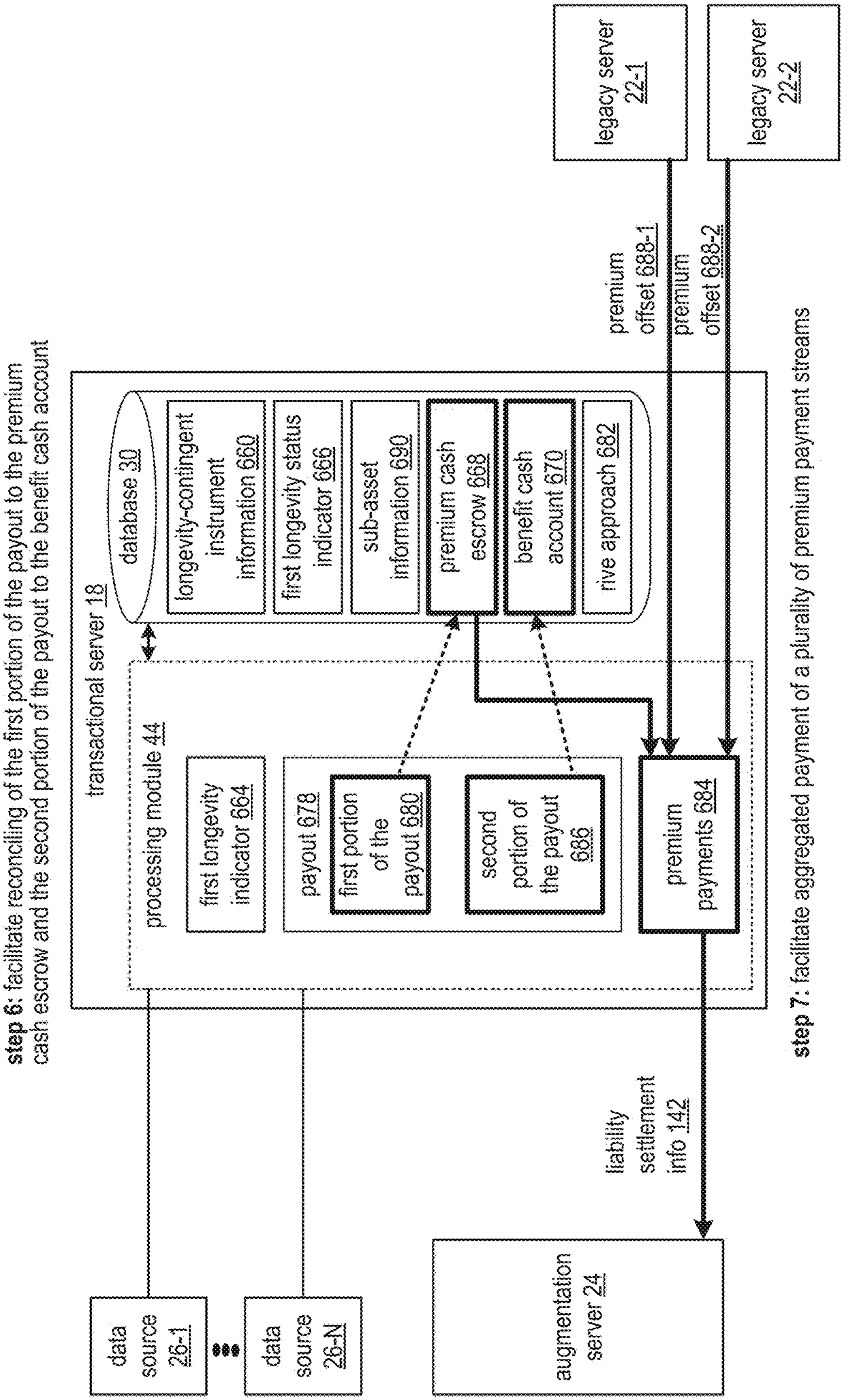

FIG. 12D further illustrates the example of the servicing of the plurality of longevity-contingent instruments where the processing module 44, in sixth step, facilitates reconciling of the first portion of the payout 680 to the premium cash escrow 668 and the second portion of the payout 686 to the benefit cash account 670. For example, the processing module 44 increments the premium cash escrow 668 of the database 30 by an amount of the first portion of the payout 680. Alternatively, or in addition to, the processing module 44 issues a payment message to another server associated with the premium cash escrow 668 (e.g., a debtor). As another example, the processing module 44 increments the benefit cash account 670 of the database 30 by an amount of the second portion of the payout 686. Alternatively, or in addition to, the processing module 44 issues a payment message to another server associated with the benefit cash account 670 (e.g., a benefactor).

Having facilitated the reconciling of the first portion of the payout 680 and the second portion of the payout 686, in a seventh step the processing module 44 facilitates the aggregated payment of the plurality of premium payment streams utilizing the premium cash escrow 668 and one or more premium offsets 688-1 and 688-2 from the one or more debtors (e.g., via their legacy servers 22-1 and 22-2). For example, the processing module 44 accrues premium payments 684 utilizing a portion of the premium cash escrow 668, determines a level of a required payment of the premium payment streams, calculates a difference between the accrued premium payment 684 and the level of required payment to produce a supplementing level, and obtains the supplementing level of funds from the legacy servers 22-1 and 22-2 via premium offsets 688-1 and 688-2.

Having obtained the portion of the premium cash escrow 668, the premium offsets 688-1, and the premium offsets 688-2, the processing module 44 sums the portion of the premium cash escrow 668, the premium offset 688-1, and the premium offset 688-2 to produce the premium payments 684. Having produced the premium payments 684, the processing module 44 issues liability settlement information 142 to the augmentation server 24, where the liability settlement information 142 pertains to the premium payments 684.

Figure 12E:
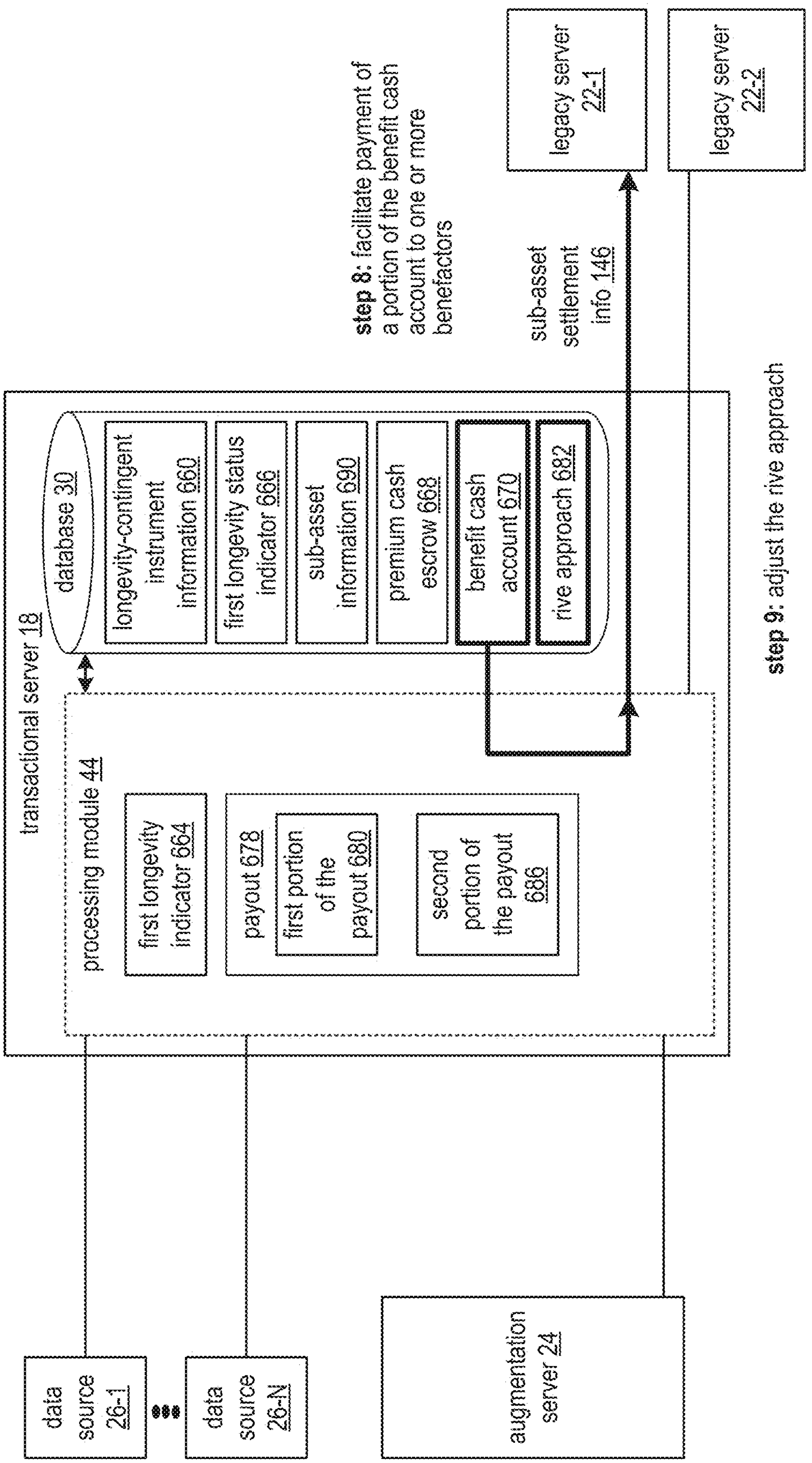

FIG. 12E further illustrates the example of the servicing of the plurality of longevity-contingent instruments where, in an eight step the processing module 44 facilitates payment from the benefit cash account 670 to the one or more benefactors. For example, the processing module 44 issues sub-asset settlement information 146 to the legacy server 22-1 that is associated with the pension system, where the sub-asset settlement information 146 includes a portion of the benefit cash account 670 (e.g., the second portion of the payout 686). Alternatively, or in addition to, the processing module 44 issues the second portion of the payout 686 to another server associated with one or more other benefactors.

Having facilitated the payment of the benefit cash account 670, the processing module 44, from time to time in a nineth step, adjusts the rive approach 682 to favor increasing the second portion of the payout when a first sum of a first plurality of second portion payouts within a first time frame is less than a first sum of a first subset of the plurality of premium payment streams for the first time frame. For example, the processing module 44 increases the percentage of the second portion of the payout to bolster the premium payments.

Alternatively, the processing module 44, from time to time in the nineth step, adjusts the rive approach to favor decreasing the second portion of the payout when a second sum of a second plurality of second portion payouts within a second time frame is greater than a second sum of a second subset of the plurality of premium payment streams for the second time frame. For example, the processing module 44 decreases the percentage of the payout 686 to not overfund the premium payments.

The method described above module can alternatively be performed by various modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the communication system 10, cause the one or more computing devices to perform any or all of the steps described above.

FIGS. 13A-13E are schematic block diagrams of another embodiment of a communication system illustrating an embodiment of a method for riving longevity-contingent instruments within a computing system. The computing system includes a benefactor server 700, a debtor server 702, user devices 32-1 through 32-N, longevity-contingent instrument provider servers 704-1 through 704-M, and the control server 20 of FIG. 1. In an embodiment, the benefactor server 700 and the debtor server 702 are implemented utilizing the legacy server 22 of FIG. 1, where the benefactor server 700 is associated with at least one pension system and the debtor server 702 is associated with at least one sponsor associated with the at least one pension system. In an embodiment, the user devices 32-1 through 32-N are implemented utilizing the user devices 32 of FIG. 1. In an embodiment, the longevity-contingent instrument provider servers 704-1 through 704-M are implemented utilizing the augmentation server 24 of FIG. 1. The control server 20 includes the processing module 44 of FIG. 1 and the database 30 of FIG. 1.

Figure 13A:
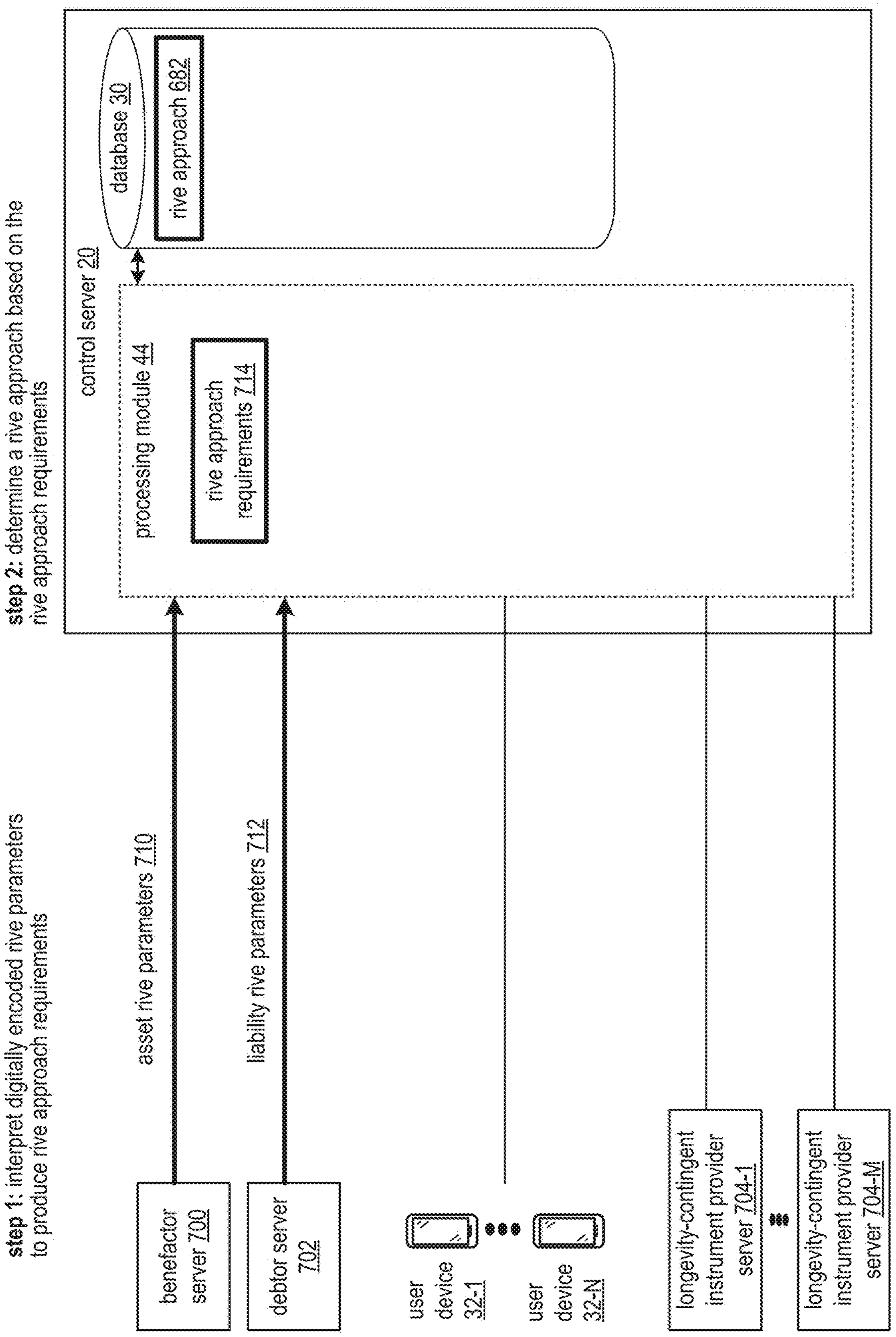
FIGS. 13A-13E are schematic block diagrams of another embodiment of a communication system illustrating an embodiment of a method for riving longevity-contingent instruments within a computing system in accordance with the present invention.

FIG. 13A illustrates an example of operation of steps of a method for the riving of the longevity-contingent instruments where, in a first step, the processing module 44 interprets digitally encoded rive parameters from one or more of a benefactor computing device (e.g., the benefactor server 700) and a debtor computing device (e.g., the debtor server 702) to produce rive approach requirements 714. The interpreting includes a series of operations. A first operation includes decoding a first subset of the digitally encoded rive parameters received from the benefactor computing device to produce asset rive parameters. For example, the processing module 44 decodes digitally encoded rive parameters from the benefactor server 700 to produce asset rive parameters 710. The asset rive parameter 710 includes one or more of a required net cash flow pattern, a target investment yield rate, and a maximum initial benefactor contribution level.

A second operation includes decoding a second subset of the digitally encoded rive parameters received from the debtor computing device to produce liability rive parameters. For example, the processing module 44 decodes digitally encoded rive parameters from the debtor server 702 to produce liability rive parameter 712. The liability rive parameters 712 includes one or more of a maximum contribution cash flow pattern and a maximum initial debtor contribution level. A third operation includes aggregating the asset rive parameters 710 and the liability rive parameters 712 to produce the rive approach requirements 714.

Having produced the rive approach requirements 714, in a second step, the processing module 44 determines a rive approach 682 for riving a set of longevity-contingent instruments of a multitude of available longevity-contingent instruments based on the rive approach requirements 714. A first longevity-contingent instrument of the set of longevity-contingent instruments includes a first face value benefit (e.g., death benefit) and a first premium payment stream. A second longevity-contingent instrument of the set of longevity-contingent instruments includes a second face value benefit and a second premium payment stream. When available (e.g., when an insured person passes and the death benefit is provided), a first portion of the first face value benefit is utilized to fund at least some of the second premium payment stream in accordance with the rive approach 682. The premium payment stream includes series of time-certain obligated payments to maintain the corresponding longevity-contingent instrument (e.g., with a corresponding provider, i.e., insurance company).

The determining of the rive approach 682 includes one of a variety of ways. A first way, when the rive approach requirements indicate that a first allocated portion of the plurality of sub-assets is to be greater than the plurality of sub-liabilities, includes establishing the rive approach as a surplus approach. A second way, when the rive approach requirements indicate that the first allocated portion of the plurality of sub-assets is to be less than the plurality of sub-liabilities includes establishing the rive approach as a deficit approach. A third way, when the rive approach requirements indicate that the first allocated portion of the plurality of sub-assets is to be substantially the same as the plurality of sub-liabilities includes establishing the rive approach as a break-even approach.

A fourth way of determining the rive approach 682, when the rive approach requirements indicate that the first allocated portion of the plurality of sub-assets is to be a pre-determined percentage of the plurality of sub-assets includes establishing the rive approach as a pro rata approach. A fifth way, when the rive approach requirements indicate that the first allocated portion of the plurality of sub-assets is to be a pre-determined first portion level includes establishing the rive approach as a consistency approach.

Figure 13B:
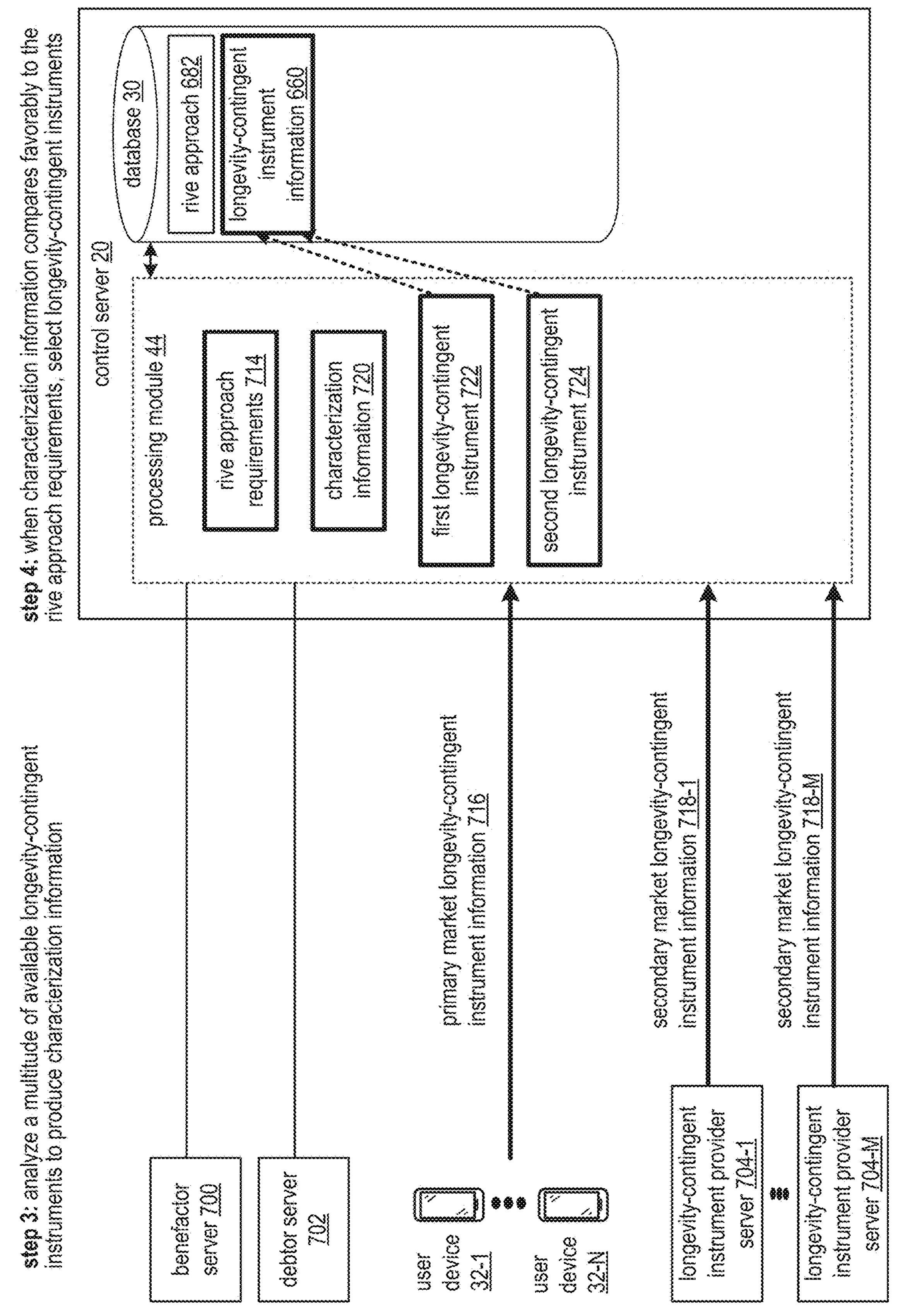

FIG. 13B further illustrates the example of the riving of the longevity-contingent instruments where, having determined the rive approach 682, in a third step, the processing module 44 analyzes a subset of the multitude of available longevity-contingent instruments to produce characterization information 720. The subset of the multitude of available longevity-contingent instruments includes the first longevity-contingent instrument 722 and the second longevity-contingent instrument 724. The characterization information 720 includes first characterization information for the first longevity-contingent instrument 722 and second characterization information for the second longevity-contingent instrument 724.

The multitude of available longevity-contingent instruments are generally available from one or both of a primary market and a secondary market. Accessing the primary market includes obtaining the longevity-contingent instruments directly from initial policyholders (e.g., the originally insured). Accessing the secondary market includes obtaining the longevity-contingent instruments from brokers and providers, where the longevity-contingent instruments have changed hands from the initial policyholders to one or more intermediaries (e.g., the brokers, etc.).

The analyzing of the subset of the multitude of available longevity-contingent instruments to produce the characterization information includes several sub-steps. A first sub-step includes accessing the multitude of available longevity-contingent instruments. For example, the processing module 44 receives primary market longevity-contingent instrument information 716 from one or more of the user devices 32-1 through 32-N. A first instance includes the user device 32-1 issuing the primary market longevity-contingent instrument information 716 to the control server 20 in an unsolicited fashion when desiring to offer a life insurance policy for sale. A second instance includes the control server 20 receiving the primary market longevity-contingent instrument information 716 from the user device 32-2 in response to a solicitation message from the control server 20.

As another example of accessing a multitude of available longevity-contingent instruments, the processing module 44 receives one or more of secondary market longevity-contingent instrument information 718-1 through 718-M from one or more of the longevity-contingent instrument provider servers 704-1 through 704-M. The receiving includes receiving the information in an unsolicited fashion and receiving the information in response to the control server 20 issuing a solicitation.

Having accessed the multitude of available longevity-contingent instruments, a second sub-step to analyze the subsets of the multitude of available longevity-contingent instruments includes determining the first characterization information to include one or more elements. A first element includes a first estimated timeframe for payout of the first face value benefit (e.g., generate a life expectancy based on one or more of insured age, gender, smoker, health impairments, historical life expectancy data, etc.). A second element includes a present value of the first face value benefit utilizing the first estimated timeframe (e.g., generate a present value range for a range of discounted cash flow analysis interest rates and for a range around the first estimate timeframe, i.e., dither the life expectancy). A third element includes a present value of the first premium payment stream.

A third sub-step to analyze the subsets of the multitude of available longevity-contingent instruments includes determining the second characterization information to include one or more further elements. A first further element includes a second estimated timeframe for payout of the second face value benefit. A second further element includes a present value of the second face value benefit utilizing the second estimated timeframe. A third further element includes a present value of the second premium payment stream.

A fourth sub-step to analyze the subsets of the multitude of available longevity-contingent instruments includes aggregating the first characterization information and the second characterization information to produce the characterization information 720. The characterization information 720 further includes insured age, gender, smoker, insured health record, historical life expectancy data, a requested purchase price, an offered purchase price, etc.).

Having analyzed the multitude of available longevity-contingent instruments to produce the characterization information 720, in a fourth step, when the first characterization information and the second characterization information compare favorably to the rive approach requirements 714, the processing module 44 selects the first longevity-contingent instrument 722 and the second longevity-contingent instrument 724 to include in the set of longevity-contingent instruments. For example, the processing module 44 identifies the first and second longevity-contingent instruments, causes title transfer (e.g., purchase via a transaction with the user device 32-1 and/or longevity-contingent instrument provider servers 704-1), and lists the first and second longevity-contingent instruments in the longevity-contingent instrument information 660 of the database 30.

Figure 13C:
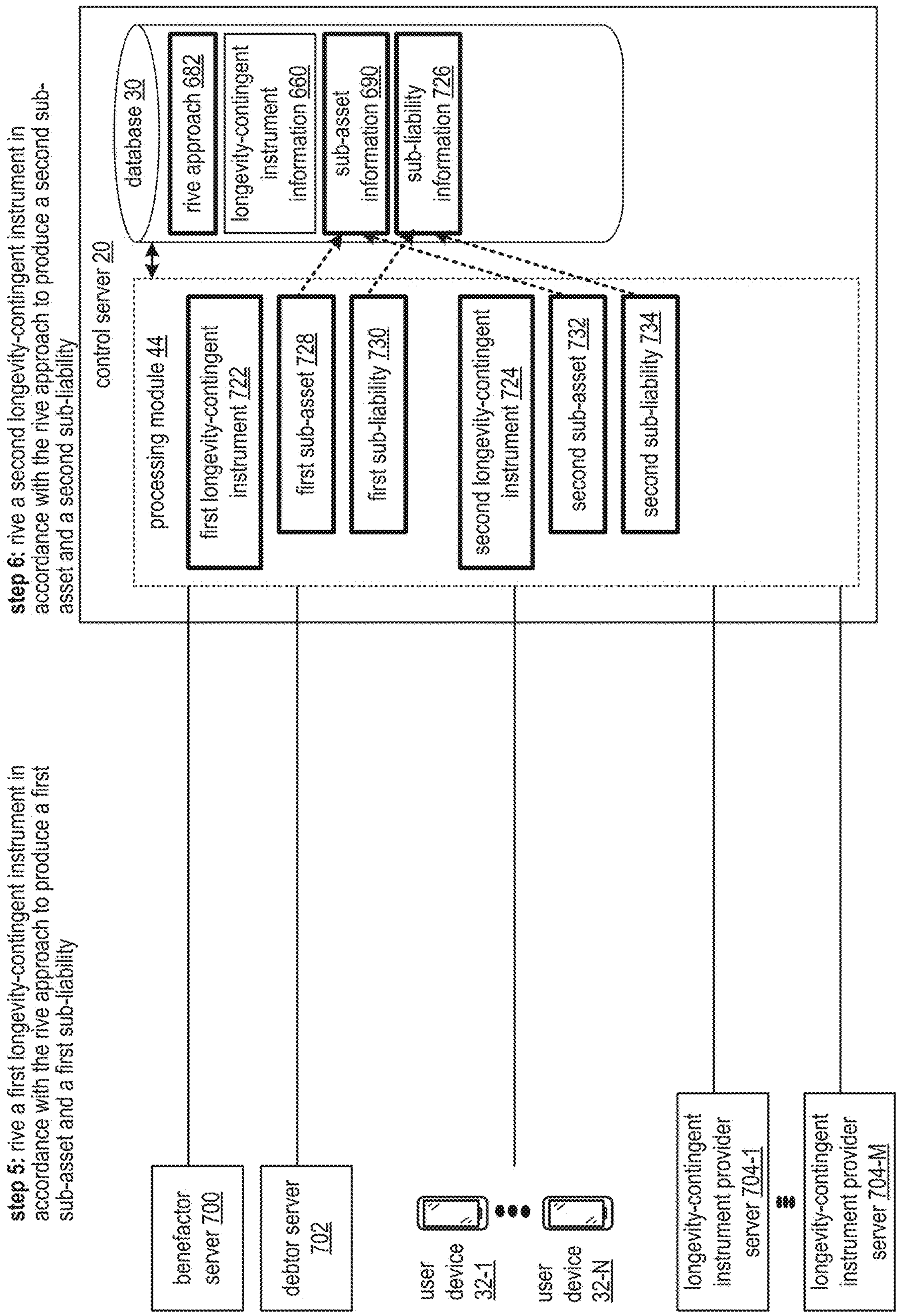

FIG. 13C further illustrates the example of the riving of the longevity-contingent instruments where, having selected the longevity-contingent instruments, in a fifth step, the processing module 44 rives the first longevity-contingent instrument 722 based on the first face value benefit, the first premium payment stream and in accordance with the rive approach 682 to produce a first sub-asset 728 of a plurality of sub-assets of the set of longevity-contingent instruments and a first sub-liability 730 of a plurality of sub-liabilities of the set of longevity-contingent instruments. The first sub-liability 730 is associated with the first premium payment stream.

The riving of the first longevity-contingent instrument 722 includes generating beneficiary ownership of the first face value benefit to be associated with the first sub-asset 728. For example, the processing module 44 facilitates listing a legal entity of the first sub-asset as a partial beneficiary of the first longevity-contingent instrument and updates the sub-asset information 690 with the first sub-asset 728. As another example, the processing module 44 facilitates listing another legal entity of the first sub-liability as one of another partial beneficiary of the first longevity-contingent instrument and updates the sub-liability information 726 with the first sub-liability 730.

The riving of the first longevity-contingent instrument 722 further includes generating fiduciary responsibility of the first premium payment stream to be associated with the first sub-liability. For example, the processing module 44 facilitates listing the other legal entity of the first sub-liability as having fiduciary responsibility of the first premium payment stream of the first longevity-contingent instrument 722.

Having rived the first longevity-contingent instrument 722, in a sixth step, the processing module 44 rives the second longevity-contingent instrument 724 based on the second face value benefit, the second premium payment stream and in accordance with the rive approach 682 to produce a second sub-asset 732 of the plurality of sub-assets and a second sub-liability 734 of the plurality of sub-liabilities. The second sub-liability 734 is associated with the second premium payment stream. The processing module 44 further updates the sub-asset information 690 with the second sub-asset 732 and updates the sub-liability information 726 with the second sub-liability 734.

Figure 13D:
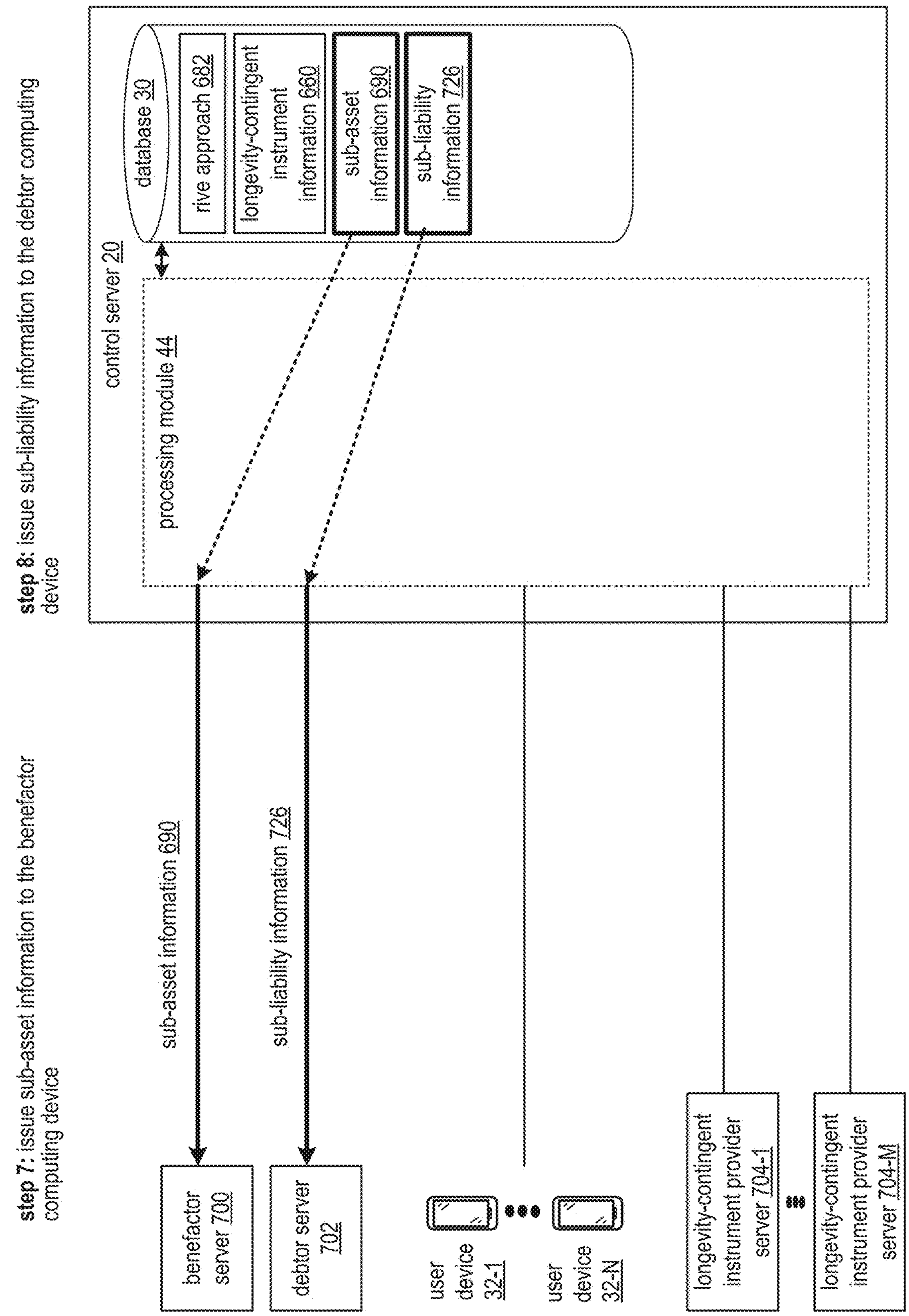

FIG. 13D further illustrates the example of the riving of the longevity-contingent instruments where, having rived the longevity-contingent instruments, in a seventh step, the processing module 44 issues sub-asset information 690 to the benefactor computing device (e.g., to the benefactor server 700). The sub-asset information 690 is based on the plurality of sub-assets and the rive approach 682. The issuing includes generating the sub-asset information 690 from all of the sub-assets and sending, via the network 28 of FIG. 1, the sub-asset information 690 to the benefactor server 700.

Having issued the sub-asset information, in an eight step, the processing module 44 issues sub-liability information 726 to the debtor computing device (e.g., to the debtor server 702). The sub-liability information 726 is based on the plurality of sub-liabilities and the rive approach 682. The issuing includes generating the sub-liability information 726 from all of the sub-liabilities and sending, via the network 28 of FIG. 1, the sub-liability information 726 to the debtor server 702.

Figure 13E:
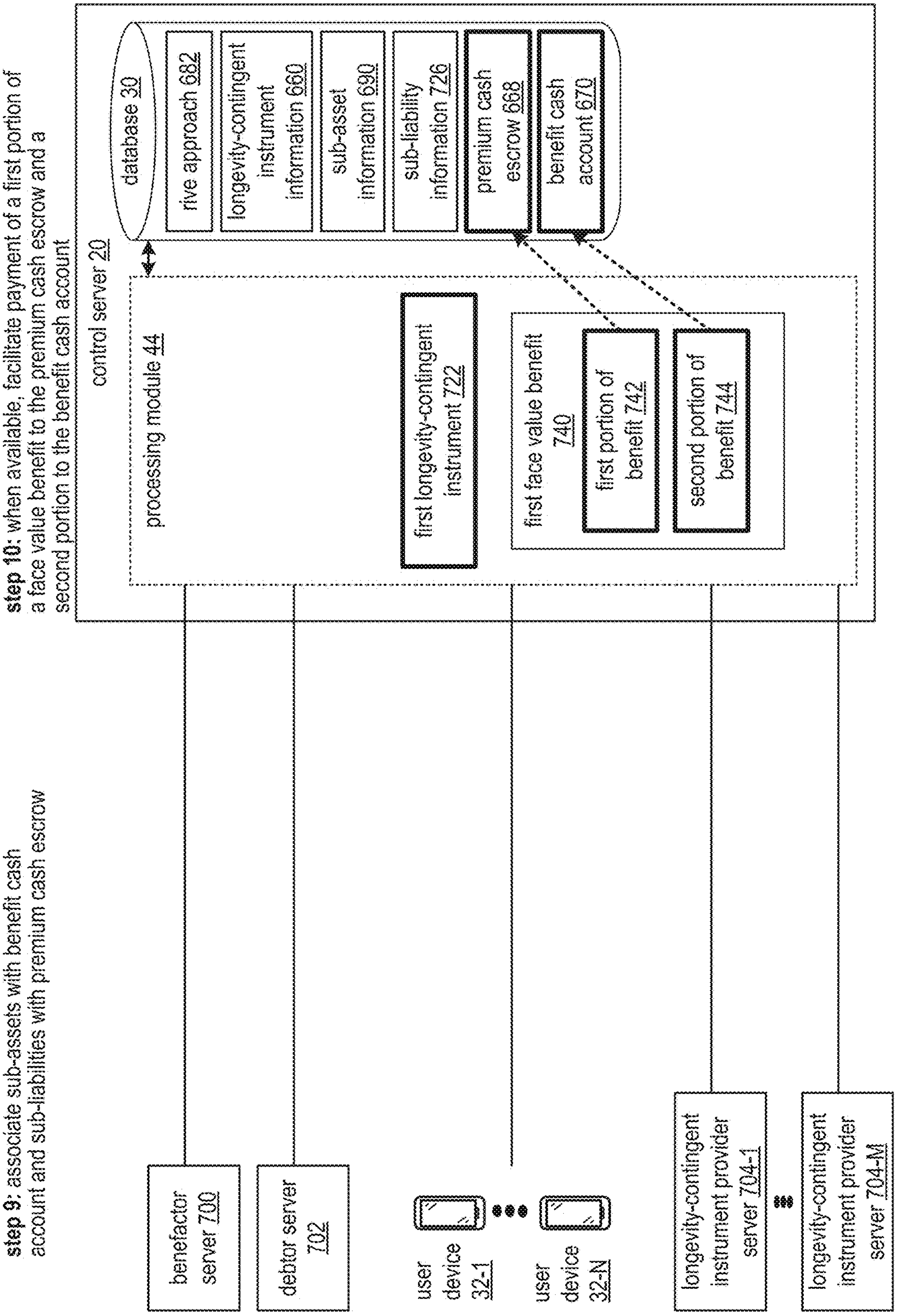

FIG. 13E further illustrates the example of the riving of the longevity-contingent instruments where, having issued the sub-liability information to the debtor computing device, in a ninth step, the processing module 44 associates the plurality of sub-assets with a benefit cash account 670 and associates the plurality of sub-liabilities with a premium cash escrow 668. The benefit cash account 670 is associated with the benefactor computing device and the premium cash escrow 668 is associated with the debtor computing device.

Having associated the sub-assets and the sub-liabilities, in a tenth step, the processing module 44, when available (e.g., upon payment of a death benefit), facilitates payment of a first portion of the first face value benefit 742 to the premium cash escrow 668 in accordance with the first sub-liability. The first portion of the first face value benefit is determined in accordance with the rive approach 682. The tenth step further includes the processing module 44, when available, facilitating payment of a second portion of the first face value benefit 744 to the benefit cash account 670 in accordance with the first sub-asset. The second portion of the first face value benefit is determined in accordance with the rive approach 682 and the first portion of the first face value benefit. Alternatively, or in addition to, the processing module 44 facilitates payment of a portion of the second premium payment stream utilizing one or more of the premium cash escrow 668 and a premium offset from the debtor computing device.

The method described above module can alternatively be performed by various modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the communication system 10, cause the one or more computing devices to perform any or all of the steps described above.

FIGS. 14A-14E are schematic block diagrams of another embodiment of a communication system illustrating an embodiment of a method for generating a portfolio of blockchain-encoded rived longevity-contingent instruments within a computing system. The computing system includes a benefactor server 700, a debtor server 702, user devices 32-1 through 32-N, longevity-contingent instrument provider servers 704-1 through 704-M, and the control server 20 of FIG. 1.

In an embodiment, the benefactor server 700 and the debtor server 702 are implemented utilizing the legacy server 22 of FIG. 1, where the benefactor server 700 is associated with at least one benefit entity (e.g., pension system) and the debtor server 702 is associated with at least one sponsor entity associated with the at least one benefit entity. In an embodiment, the user devices 32-1 through 32-N are implemented utilizing the user devices 32 of FIG. 1. In an embodiment, the longevity-contingent instrument provider servers 704-1 through 704-M are implemented utilizing the augmentation server 24 of FIG. 1. The control server 20 includes the processing module 44 of FIG. 1 and the database 30 of FIG. 1.

Figure 14A:
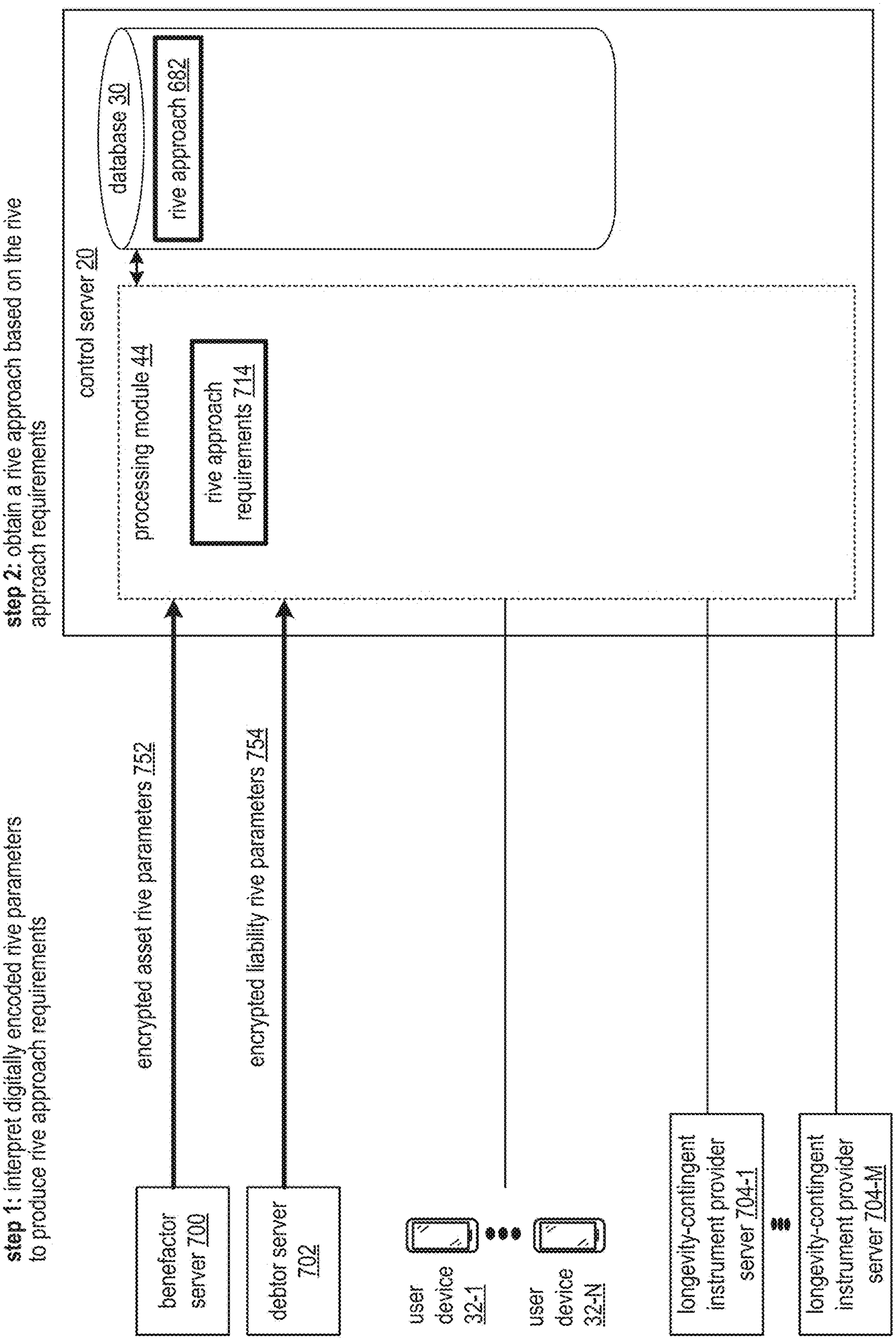
FIGS. 14A-14E are schematic block diagrams of another embodiment of a communication system illustrating an embodiment of a method for generating a portfolio of blockchain-encoded rived longevity-contingent instruments within a computing system in accordance with the present invention.

FIG. 14A illustrates an example of operation of steps of a method for the generating of the portfolio of blockchain-encoded rived longevity-contingent instruments where, in a first step, the processing module 44 interprets digitally encoded rive parameters from one or more of a benefactor computing device (e.g., the benefactor server 700) and a debtor computing device (e.g., the debtor server 702) to produce rive approach requirements 714. The interpreting includes a series of one or more operations. A first operation includes decrypting encrypted asset rive parameters 752 received from the benefactor server 700 to produce a first subset of the digitally encoded rive parameters. A second operation includes decoding the first subset of the digitally encoded rive parameters to produce asset rive parameters.

A third operation includes decrypting encrypted liability rive parameters 754 received from the debtor server 702 to produce a second subset of the digitally encoded rive parameters. A fourth operation includes decoding the second subset of the digitally encoded rive parameters to produce liability rive parameters. A fifth operation includes aggregating the asset rive parameters and the liability rive parameters to produce the rive approach requirements 714.

Having produced the rive approach requirements 714, in a second step of the method for the generating of the portfolio of blockchain-encoded rived longevity-contingent instruments, the processing module 44 obtains a rive approach 682 for riving a set of longevity-contingent instruments of a multitude of available longevity-contingent instruments based on the rive approach requirements 714. A first longevity-contingent instrument of the set of longevity-contingent instruments includes a first face value benefit and a first premium payment stream. The first longevity-contingent instrument assigns the first face value benefit and the first premium payment stream to a first ownership entity (e.g., originally insured or a broker/holding entity).

A second longevity-contingent instrument of the set of longevity-contingent instruments includes a second face value benefit and a second premium payment stream. The second longevity-contingent instrument assigns the second face value benefit and the second premium payment stream to a second ownership entity (e.g., another originally insured or the broker/holding entity). In an embodiment, when an insured person passes and a death benefit is provided, availability of a first portion of the first face value benefit is utilized to fund at least some of the second premium payment stream in accordance with the rive approach 682.

The obtaining of the rive approach 682 includes determining, retrieving, and receiving. For example, the processing module 44 determines the rive approach 682 based on the rive approach requirements 714 as previously discussed. As another example, the processing module 44 retrieves the rive approach requirements 714 from the database 30. As yet another example, the processing module 44 receives the rive approach requirements 714 from another computing device.

Figure 14B:
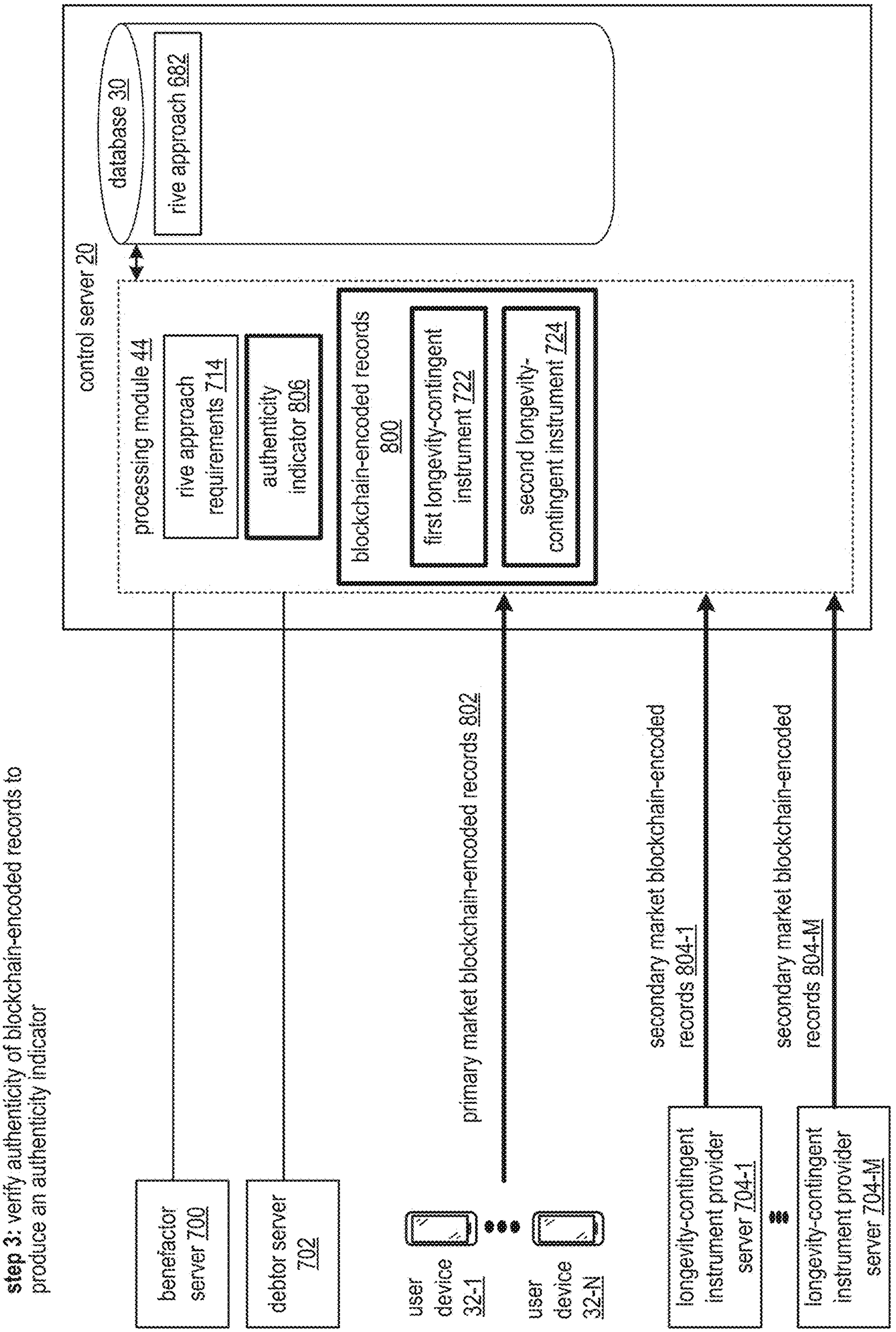

FIG. 14B further illustrates the example of operation of steps of the method for the generating of the portfolio of blockchain-encoded rived longevity-contingent instruments where, having obtained the rive approach 682, in a third step, the processing module 44 verifies authenticity of a group of blockchain-encoded records 800 representing a subset of the multitude of available longevity-contingent instruments to produce an authenticity indicator 806. The subset of the multitude of available longevity-contingent instruments includes the first longevity-contingent instrument 722 and the second longevity-contingent instrument 724.

The verifying of the authenticity includes obtaining the group of blockchain-encoded records 800 and analyzing the group of blockchain-encoded records 800 for authenticity. The obtaining of the group of blockchain-encoded records 800 includes accessing one or both of a primary market and a secondary market. Accessing the primary market includes obtaining blockchain-encoded records for longevity-contingent instruments directly from initial policyholders (e.g., originally insured individuals). Accessing the secondary market includes obtaining further blockchain-encoded records for further longevity-contingent instruments from brokers and providers, where the blockchain-encoded records of longevity-contingent instruments have changed hands from the initial policyholders to one or more intermediaries (e.g., the brokers, etc.).

The accessing of the blockchain-encoded records 800 includes a series of sub-steps. A first sub-step includes identifying the multitude of available longevity-contingent instruments by one or more of issuing a solicitation message for longevity-contingent instrument information and receiving the longevity-contingent instrument information. For example, the processing module 44 issues a solicitation message to one or more of the user devices 32-1 through 32-N, and in response, receives primary market blockchain-encoded records 802. As another example, the processing module 44 issues the solicitation message to one or more of the longevity-contingent instrument provider servers 704-1 through 704-M, and in response, receives at least one of secondary market blockchain-encoded records 804-1 through 804-M. Alternatively, the processing module 44 receives the blockchain-encoded records 800 in an unsolicited fashion.

The analyzing of the group of blockchain-encoded records 800 for authenticity includes utilizing a symmetric key signature approach or another approach including a straightforward signature verification. When utilizing the symmetric key signature approach, the processing module 44 decrypts a first signature of a first blockchain-encoded record of the blockchain-encoded records 800 utilizing a first public key of a first public-private key pair to produce a first decrypted transaction hash value. The first public-private key pair is associated with a last transaction computing device (e.g., a computing device associated with a last transfer of ownership of the associated longevity-contingent instrument).

Having produced the first decrypted transaction hash value, the processing module 44 hashes a portion of the first blockchain-encoded record utilizing a second public key of a second public-private key pair to produce a candidate transaction hash value. The second public-private key pair is associated with the computing device (e.g., generated by the computing device). Having produced the candidate transaction hash value, the processing module 44 establishes the authenticity indicator 806 to indicate favorable authenticity when the first decrypted transaction hash value compares favorably to the candidate transaction hash value.

When not utilizing the symmetric key signature approach, the processing module 44 applies signature verification to the first signature of the first blockchain-encoded record utilizing the first public key and the second public key to produce the authenticity indicator. The authentication is discussed in greater detail with reference to FIG. 14C.

Figure 14C:
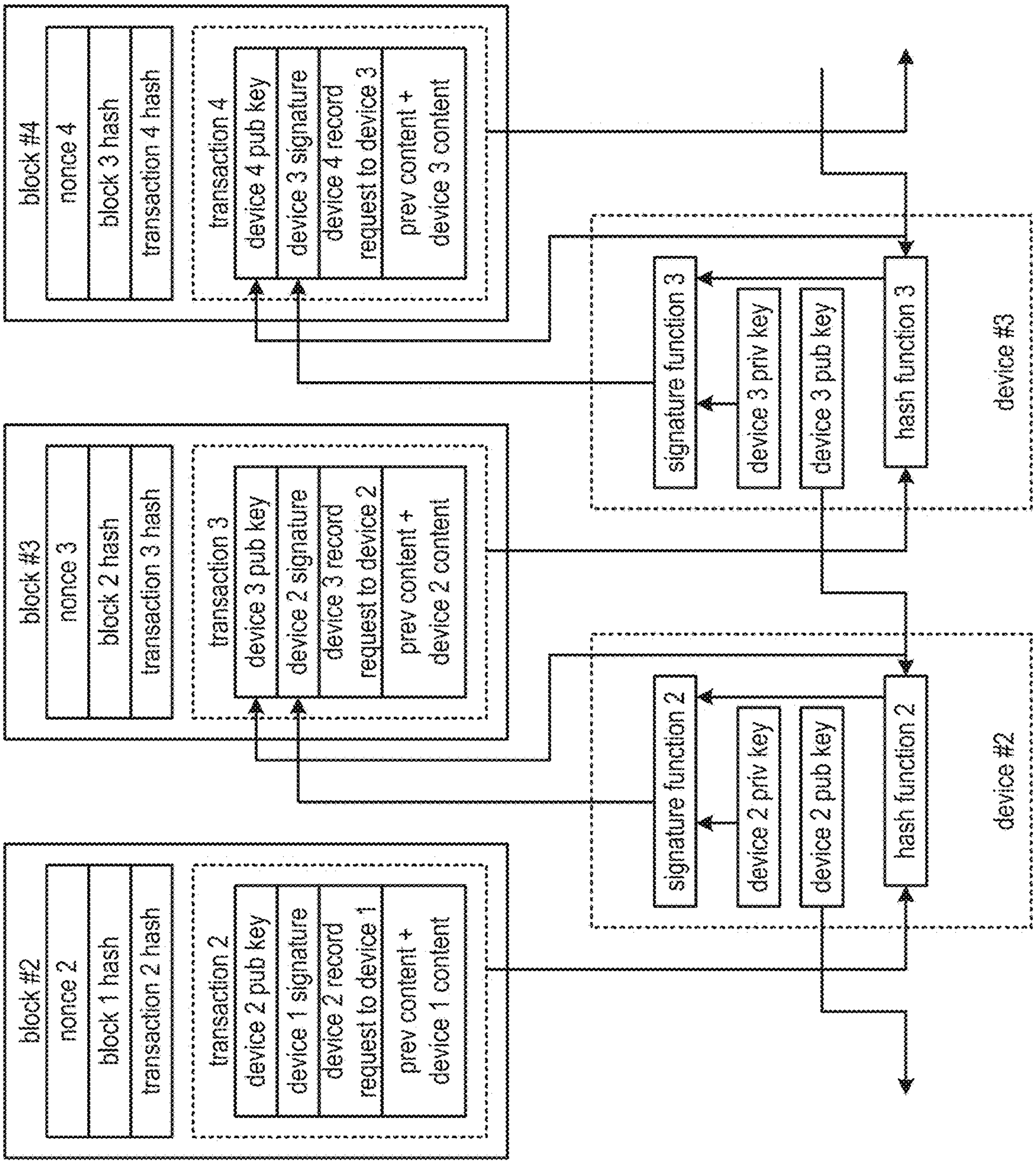

FIG. 14C further illustrates the example of operation of steps of the method for the generating of the portfolio of blockchain-encoded rived longevity-contingent instruments where, blockchain-encoded records are utilized to securely represent longevity-contingent instruments. In particular, a blockchain of blockchain-encoded records is utilized to record transactions and updates associated with a particular longevity-contingent instrument. For instance, a new blockchain is created when a life insurance policy is initially created by an associated insurance provider and sold to the originally insured. As another instance, the blockchain is updated when the life insurance policy is sold by the originally insured in the primary market to a second owner. As yet another instance, the blockchain is updated when life insurance policy is sold by the second owner to a third owner.

Each block of the blockchain includes various fields associated with the blockchain and a transaction field that includes content associated with the corresponding life insurance policy. The content includes one or more of insured name, a longevity status (e.g., living, deceased), policy terms (e.g., initial purchase price, death benefit, premium payment information), insured health records, an estimated life expectancy, a net present value, a current owner, a current holder (e.g., a fiduciary associated with the current owner), and insurance company information. Further information is included as is discussed with reference to FIG. 14D.

The example blockchain includes blocks 2-4. Each block includes a header section and a transaction section. The header section includes one or more of a nonce, a hash of a preceding block of the blockchain, where the preceding block was under control of a preceding computing device (e.g., a computing device of a seller) in a chain of control of the blockchain, and a hash of a current block (e.g., a current transaction section). The current block is under control of a current computing device in the chain of control of the blockchain.

The transaction section includes one or more of a public key of the current computing device, a signature of the preceding computing device, request information regarding a record request and change of control from the preceding computing device to the current computing device, and content information from the previous block as received by the previous computing device plus content added by the previous computing device when transferring the current block to the current computing device.

The example further includes computing devices 2-3 (e.g., devices #2 and #3) to facilitate illustration of generation of the blockchain. Each computing device includes a hash function, a signature function, and storage for a public/private key pair generated by the device.

An example of operation of the generating of the blockchain, when the device 2 has control of the blockchain and is passing control of the blockchain to the device 3 (e.g., the device 3 is transacting a transfer of content from device 2), the device 2 obtains the device 3 public key from device 3, performs a hash function 2 over the device 3 public key and the transaction 2 to produce a hashing resultant (e.g., preceding transaction to device 2) and performs a signature function 2 over the hashing resultant utilizing a device 2 private key to produce a device 2 signature.

Having produced the device 2 signature, the device 2 generates the transaction 3 to include the device 3 public key, the device 2 signature, device 3 record request to device 2 information, and the previous content plus content from device 2. The device 3 record request to device 2 information includes one or more of the actual record request, a query request, background content, and routing instructions from device 3 to device 2 for access to the content. The previous content plus content from device 2 includes one or more of content from an original source, content from any subsequent source after the original source, an identifier of a source of content, a serial number of the content, an expiration date of the content, content utilization rules, and results of previous blockchain validations.

Having produced the transaction 3 section of the block 3 a processing module (e.g., of the device 2, of the device 3, of a transaction mining computing entity, of a computing device), generates the header section by performing a hashing function over the transaction section 3 to produce a transaction 3 hash, performing the hashing function over the preceding block (e.g., block 2) to produce a block 2 hash. The performing of the hashing function may include generating a nonce such that when performing the hashing function to include the nonce of the header section, a desired characteristic of the resulting hash is achieved (e.g., a desired number of zero's).

Having produced the block 3, the device 2 sends the block 3 to the device 3, where the device 3 initiates control of the blockchain. Having received the block 3, the device 3 validates the received block 3. The validating includes one or more of verifying the device 2 signature over the preceding transaction section (e.g., transaction 2) and the device 3 public key utilizing the device 2 public key (e.g., a re-created signature function result compares favorably to device 2 signature) and verifying that an extracted device 3 public key of the transaction 3 compares favorably to the device 3 public key held by the device 3. The device 3 considers the received block 3 validated when the verifications are favorable (e.g., the authenticity of the associated content is trusted). For instance, the device considers the records intact, valid, and usable to facilitate determination of selection for the set of longevity-contingent instruments.

Figure 14D:
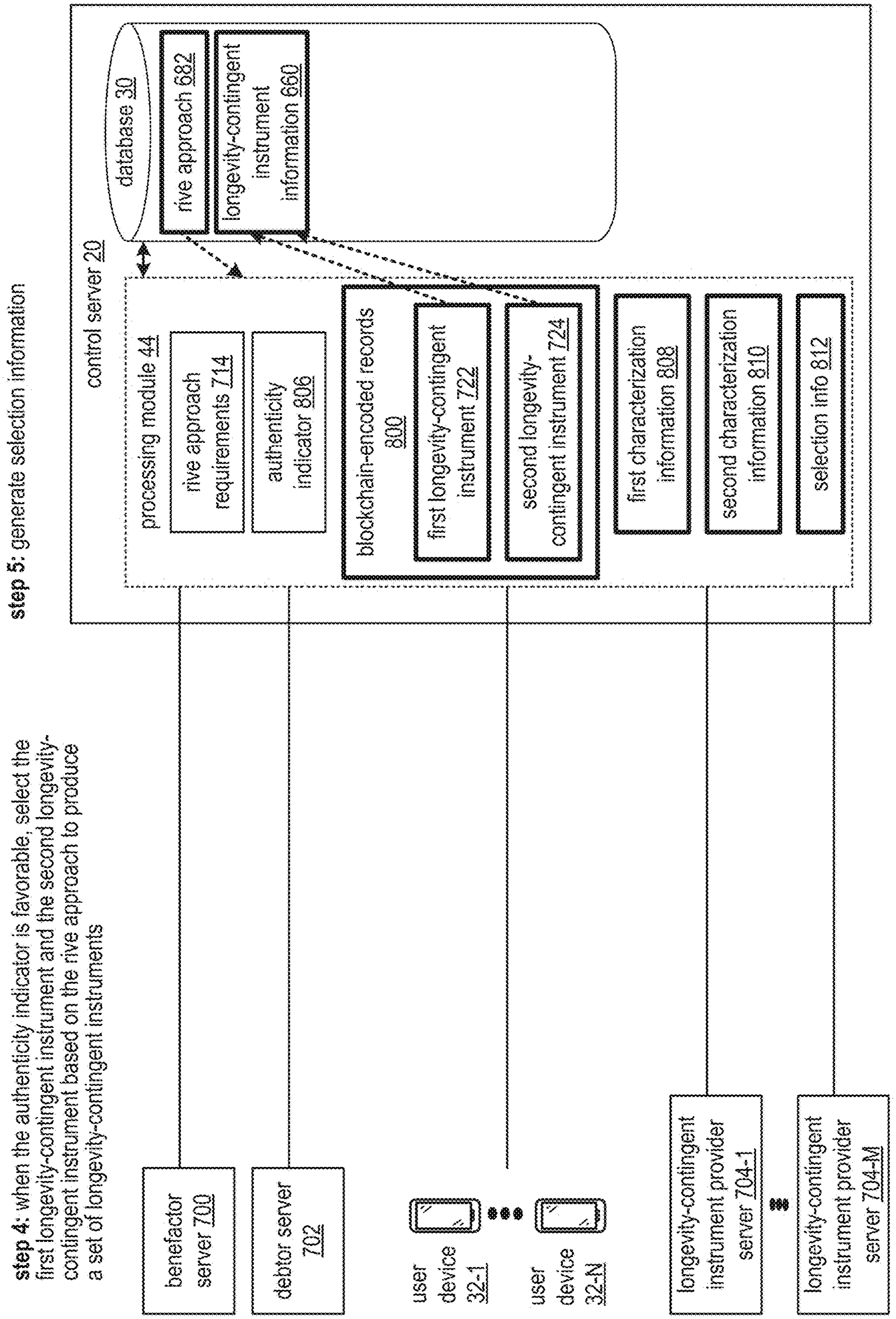

FIG. 14D further illustrates the example of operation of steps of the method for the generating of the portfolio of blockchain-encoded rived longevity-contingent instruments where, having produce the authenticity indicator 806, in a fourth step, when the authenticity indicator for the group of blockchain-encoded records is favorable (e.g., authentic), the processing module 44 selects the first longevity-contingent instrument 722 and the second longevity-contingent instrument 724 based on the rive approach 682 to include in a set of longevity-contingent instruments (e.g., the portfolio). The set of longevity-contingent instruments is associated with a fair market acquisition value (e.g., purchase price based on current status where a common ownership entity owns both the face value benefit and the premium payment stream). The selecting includes a series of sub-steps. The processing module maintains records of the plurality of longevity-contingent instruments as longevity-contingent instrument information 660 within the database 30.

A first sub-step of the series of sub-steps includes extracting first characterization information 808 from the first blockchain-encoded record for the first longevity-contingent instrument to include one or more of a first estimated timeframe for payout of the first face value benefit, a present value of the first face value benefit utilizing the first estimated timeframe, and a present value of the first premium payment stream. A second sub-step includes extracting second characterization information 810 from the second blockchain-encoded record for the second longevity-contingent instrument to include one or more of a second estimated timeframe for payout of the second face value benefit, a present value of the second face value benefit utilizing the second estimated timeframe, and a present value of the second premium payment stream.

A third sub-step includes selecting the first longevity-contingent instrument 722 and the second longevity-contingent instrument 724 to include in the set of longevity-contingent instruments when the first characterization information 808 and the second characterization information 810 compare favorably to the rive approach requirements 714 associated with the rive approach 682. For example, the first and second longevity-contingent instruments provide an estimated favorable outcome aligned with the rive approach requirements 714.

Having selected the first and second longevity-contingent instruments, in a fifth step of the method for the generating of the portfolio of blockchain-encoded rived longevity-contingent instruments, the processing module 44 generates selection information 812 for subsequent updating of the blockchain-encoded records 800 (e.g., to document transfer of ownership and a payment amount). The selection information is generated to include one or more of an identifier of a benefactor computing device associated with the benefit entity, an identifier of a debtor computing device associated with the sponsor entity, an identifier of an associated blockchain-encoded record, an identifier of an associated longevity-contingent instrument, a current purchase transaction value, an ownership entity identifier, a holder identifier, an updated life expectancy value, an updated longevity status indicator, and an identifier of another longevity-contingent instrument of the set of longevity-contingent instruments.

Figure 14E:
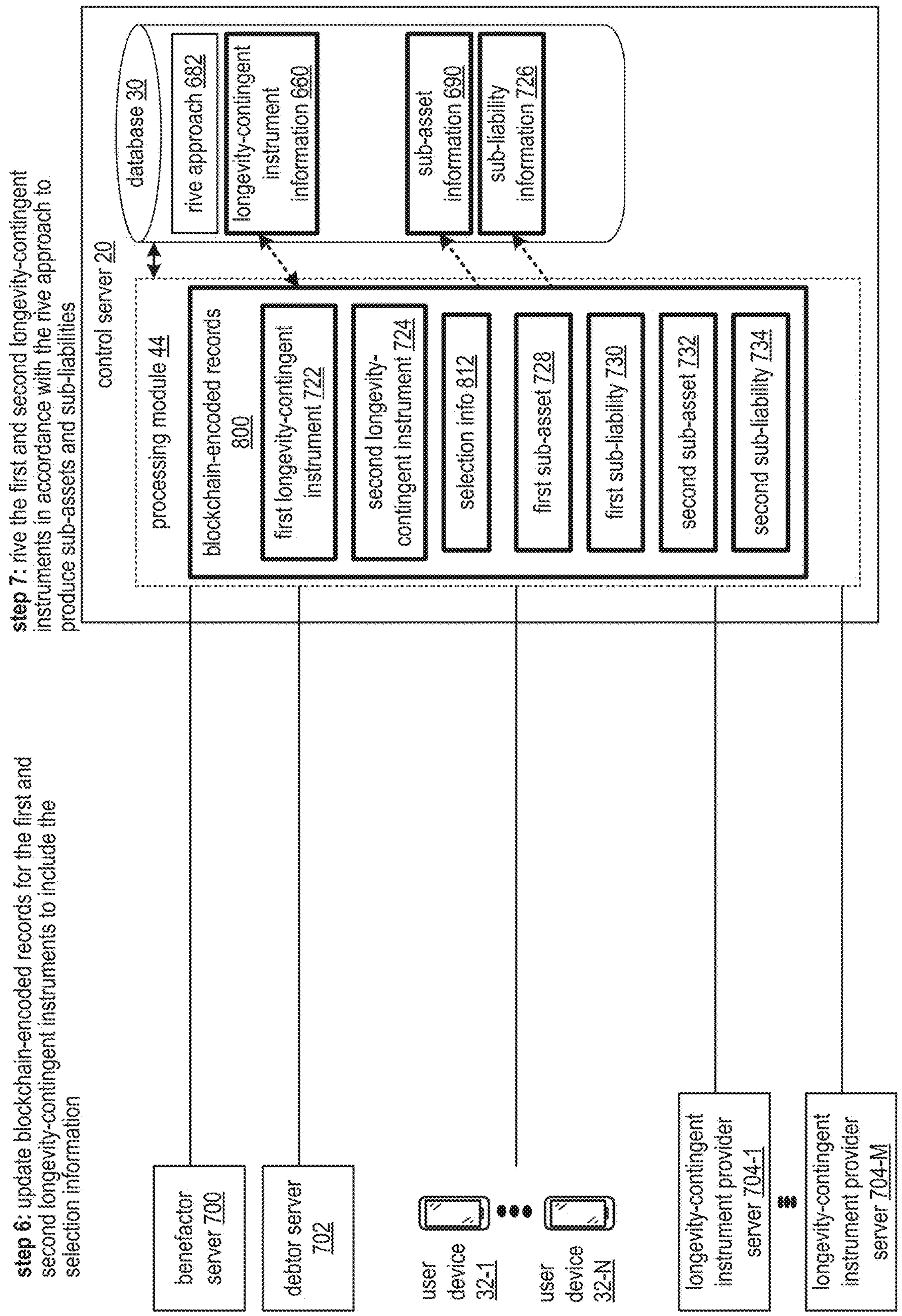

FIG. 14E further illustrates the example of operation of steps of the method for the generating of the portfolio of blockchain-encoded rived longevity-contingent instruments where, having generated the selection information 812, in a sixth step, the processing module 44 updates the first blockchain-encoded record for the first longevity-contingent instrument 722 and a second blockchain-encoded record for the second longevity-contingent instrument 724 to include the selection information 812. The group of blockchain-encoded records 800 includes the first and second blockchain-encoded records. The processing module maintains records of the plurality of longevity-contingent instruments as longevity-contingent instrument information 660 within the database 30.

The updating of a blockchain-encoded record includes a series of sub-steps. In a first sub-step the processing module 44 hashes the selection information 812 utilizing a recipient public key of a recipient computing device to produce a next transaction hash value. In a second sub-step the processing module 44 encrypts the next transaction hash value utilizing a private key of the computing device to produce a next transaction signature. In a third sub-step the processing module 44 generates a next blockchain-encoded record to include the selection information 812 and the next transaction signature.

Having updated the blockchain-encoded records, in a seventh step of the method for the generating of the portfolio of blockchain-encoded rived longevity-contingent instruments, the processing module 44 rives the first and second longevity-contingent instruments in accordance with the rive approach 682 to produce sub-assets and sub-liabilities. For example, the processing module 44 rives the first longevity-contingent instrument 722 in accordance with the rive approach 682 to reassign the first face value benefit from the first ownership entity to the benefit entity to produce a first sub-asset 728 of a plurality of sub-assets of the set of longevity-contingent instruments. As another example, the processing module 44 further rives the first longevity-contingent instrument 722 in accordance with the rive approach 682 to reassign the first premium payment stream from the first ownership entity to the sponsor entity to produce a first sub-liability 730 of a plurality of sub-liabilities of the set of longevity-contingent instruments.

The plurality of sub-assets is associated with a benefit net present value and the plurality of sub-liabilities is associated with a liability net present value. A beneficial valuation elevation is created such that a sum of the benefit net present value and the liability net present value is greater than the fair market acquisition value so that the benefit entity and sponsor entity realize the beneficial valuation elevation over direct utilization of selected longevity-contingent instruments of the set of longevity-contingent instruments prior to the riving.

As yet another example of the riving, the processing module 44 rives the second longevity-contingent instrument 724 in accordance with the rive approach 682 to reassign the second face value benefit from the second ownership entity to the benefit entity to produce a second sub-asset 732 of the plurality of sub-assets of the set of longevity-contingent instruments. The processing module 44 further rives the second longevity-contingent instrument 724 in accordance with the rive approach 682 to reassign the second premium payment stream from the second ownership entity to the sponsor entity to produce a second sub-liability 734 of the plurality of sub-liabilities of the set of longevity-contingent instruments. Having produced the plurality of sub-assets and the plurality of sub-liabilities, the processing module 44 stores the sub-assets and the plurality of sub-liabilities as sub-asset information 690 and sub-liability information 726 in the database 30.

The method described above module can alternatively be performed by various modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the communication system 10, cause the one or more computing devices to perform any or all of the steps described above.

Figure 15A:
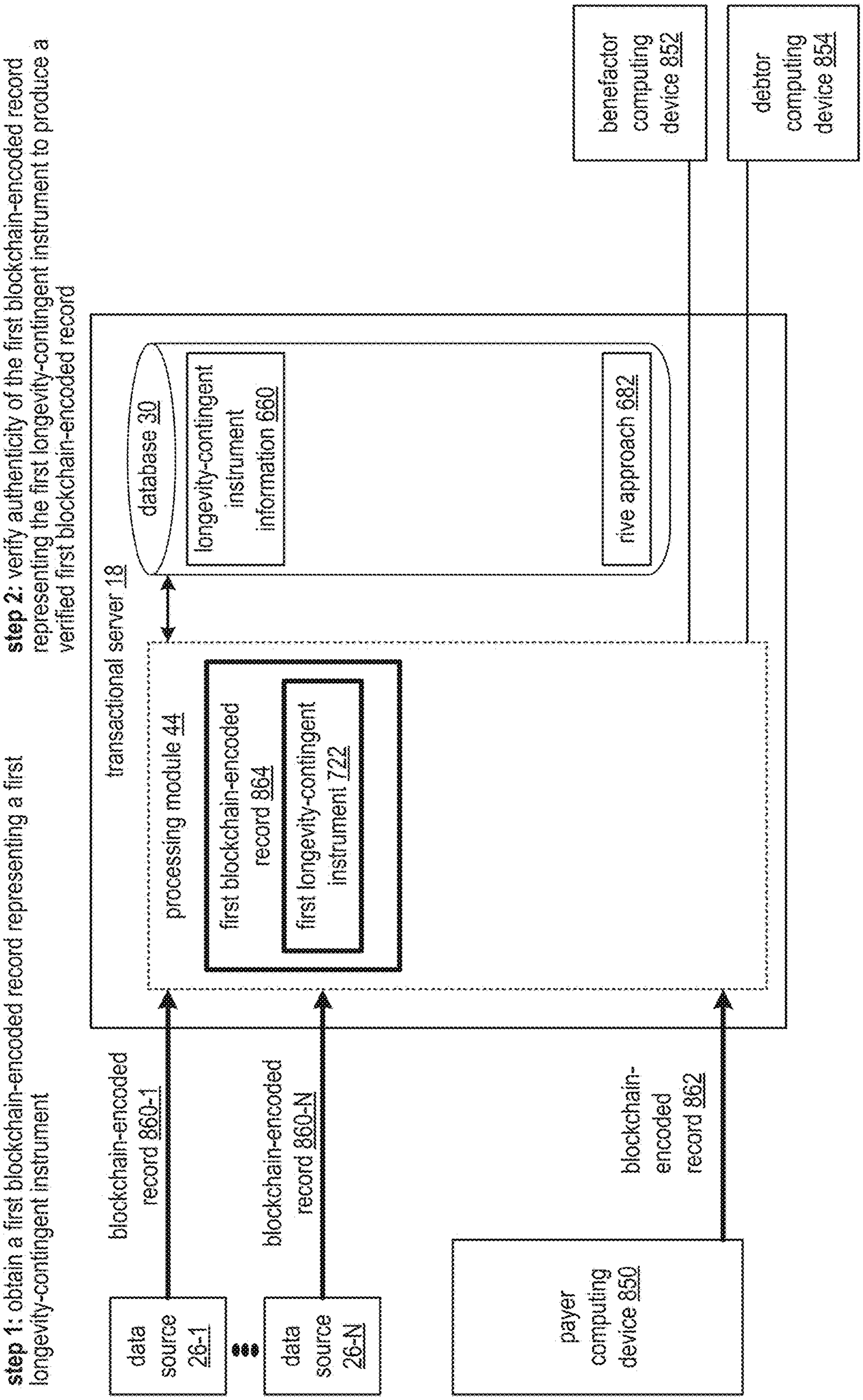
FIGS. 15A-15C are schematic block diagrams of another embodiment of a communication system illustrating an embodiment of a method for utilizing a portfolio of blockchain-encoded rived longevity-contingent instruments within a computing system in accordance with the present invention.
Figure 15B:
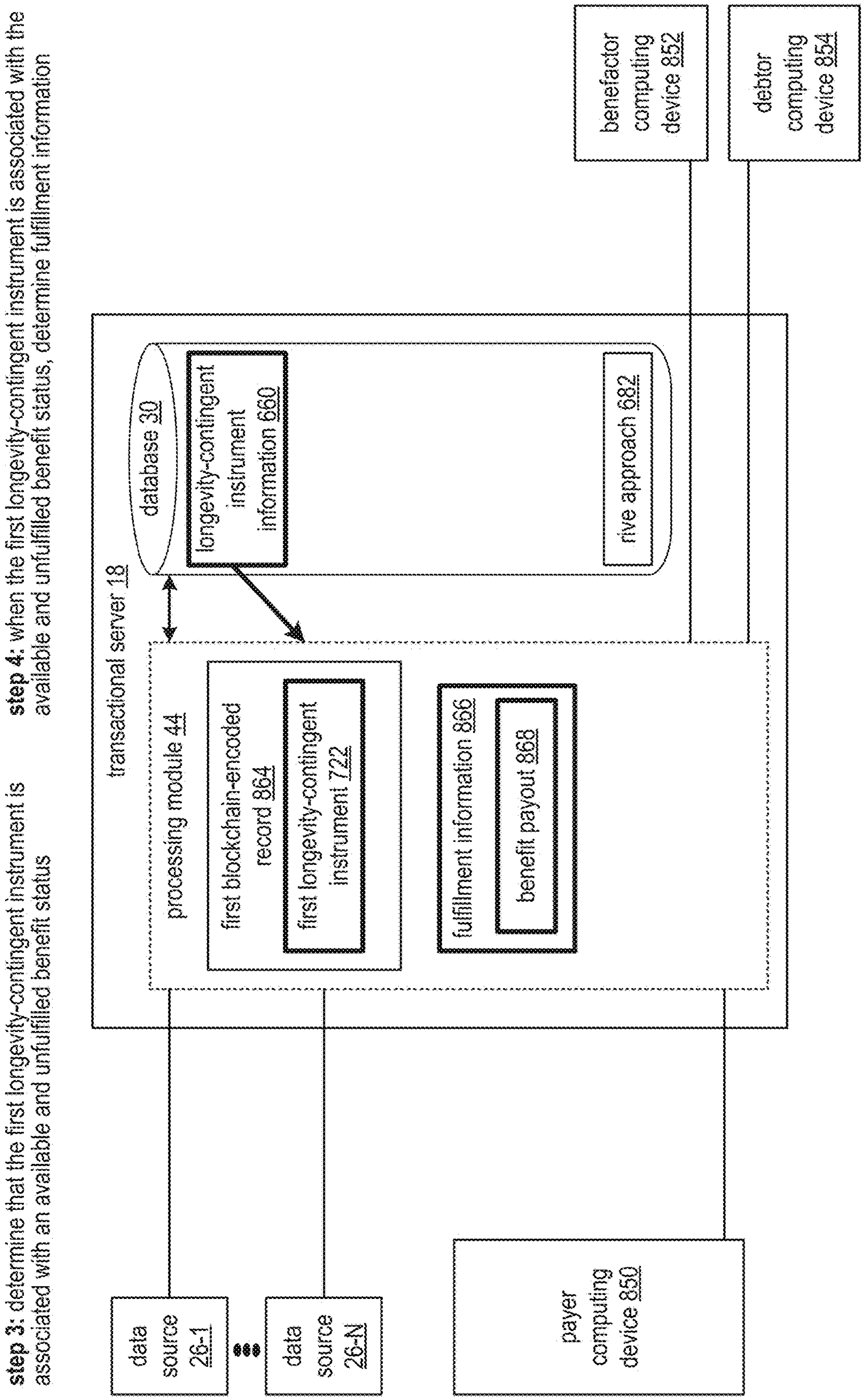
Figure 15C:
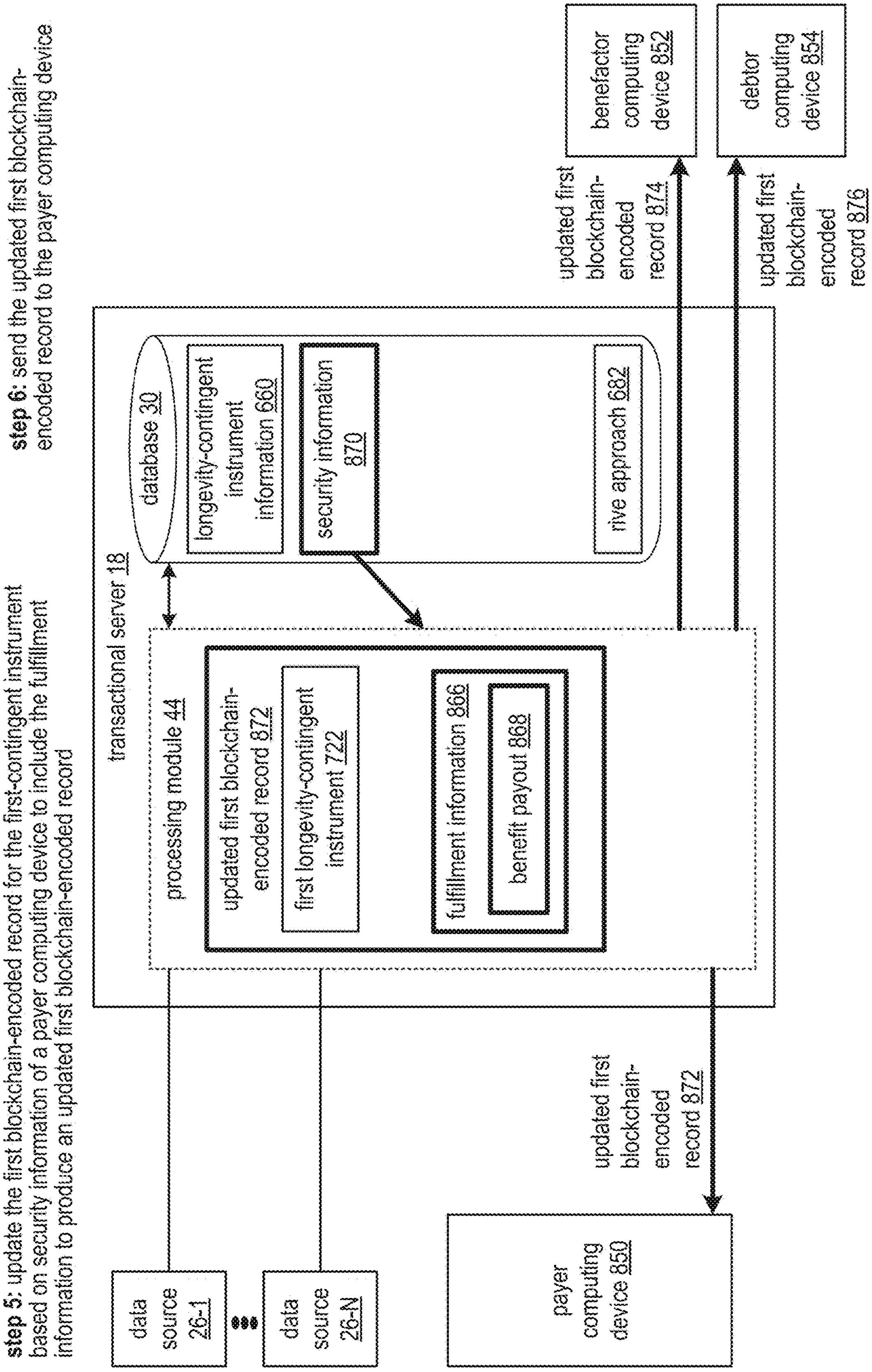

FIGS. 15A-15C are schematic block diagrams of another embodiment of a communication system illustrating an embodiment of a method for utilizing a portfolio of blockchain-encoded rived longevity-contingent instruments within a computing system. The computing system includes data sources 26-1 through 26-N, a payer computing device 850, the transactional server 18 of FIG. 1, a benefactor computing device 852, and a debtor computing device 854.

In an embodiment, the payer computing device 850 is implemented utilizing the augmentation server 24 FIG. 1. In an embodiment, the benefactor computing device 852 and the debtor computing device 854 are implemented utilizing legacy server 22 of FIG. 1. In an embodiment, the data sources 26-1 through 26-N are implemented utilizing the data source 26 of FIG. 1. The transactional server 18 includes the processing module 44 of FIG. 1 and the database 30 of FIG. 1.

FIG. 15A illustrates an example of operation of steps of a method for the utilizing of the portfolio of blockchain-encoded rived longevity-contingent instruments where, in a first step, the processing module 44 obtains a first blockchain-encoded record 864 representing a first longevity-contingent instrument 722. When an insured person passes and a death benefit is provided, availability of a benefit payout is utilized to fund a combination of a cash flow to the benefactor computing device 852, for a benefit entity, and for at least some of a plurality of premium payment streams on behalf of the debtor computing device 854, of a sponsor entity, from the payer computing device 850 in accordance with a rive approach 682. The first blockchain-encoded record 864 includes a notification of the death benefit.

The obtaining includes receiving one or more blockchain-encoded records 860-1 through 860-N from one or more of the data sources 26-1 through 26-N. The obtaining further includes receiving a blockchain-encoded record 862 from the payer computing device 850 when the payer computing device 850 issues the notification of the death benefit (e.g., the life insurance company issues the notice).

Having obtained the first blockchain-encoded record representing the first longevity-contingent instrument 722, a second step of the method for the utilizing of the portfolio of blockchain-encoded rived longevity-contingent instruments includes the processing module 44 verifying authenticity of the first blockchain-encoded record 864 representing the first longevity-contingent instrument 722 of a portfolio of longevity-contingent instruments to produce a verified first blockchain-encoded record. The processing module maintains records of the portfolio of longevity-contingent instruments as longevity-contingent instrument information 660 within the database 30. The portfolio of longevity-contingent instruments is associated with a fair market acquisition value.

The first longevity-contingent instrument 722 is selected and rived in accordance with a rive approach 682 to reassign a first face value benefit from a first ownership entity to the benefit entity to produce a first sub-asset (e.g., death benefit) of a plurality of sub-assets of the portfolio of longevity-contingent instruments. The first longevity-contingent instrument 722 is further selected and rived in accordance with the rive approach 682 to reassign a first premium payment stream from the first ownership entity to the sponsor entity to produce a first sub-liability of a plurality of sub-liabilities of the portfolio of longevity-contingent instruments.

The plurality of sub-assets is associated with a benefit net present value and the plurality of sub-liabilities is associated with a liability net present value. The selecting and riving creates a beneficial valuation elevation such that a sum of the benefit net present value and the liability net present value is greater than the fair market acquisition value.

The verifying of the authenticity includes utilizing a symmetric key signature approach or another approach (e.g., straightforward signature verification). When utilizing the symmetric key signature approach, the processing module 44 decrypts a first signature of the first blockchain-encoded record 864 utilizing a first public key of a first public-private key pair to produce a first decrypted transaction hash value. The first public-private key pair is associated with a last transaction computing device (e.g., a computing device associated with generating the death notification).

Having produced the first decrypted transaction hash value, the processing module 44 hashes a portion of the first blockchain-encoded record utilizing a second public key of a second public-private key pair to produce a candidate transaction hash value. The second public-private key pair is associated with the computing device (e.g., generated by the computing device). Having produced the candidate transaction hash value, the processing module 44 indicates favorable authenticity when the first decrypted transaction hash value compares favorably to the candidate transaction hash value.

When not utilizing the symmetric key signature approach, the processing module 44 applies signature verification to the first signature of the first blockchain-encoded record utilizing the first public key and the second public key to produce the authenticity indicator. The verifying of the authenticity was previously discussed in greater detail with reference to FIG. 14C.

FIG. 15B further illustrates the example of operation of steps of the method for the utilizing of the portfolio of blockchain-encoded rived longevity-contingent instruments where, having verify the authenticity of the first blockchain-encoded record 864, in a third step, the processing module 44 determines that the first longevity-contingent instrument 722 is associated with an available and unfulfilled benefit status by at least one of several approaches.

A first approach includes interpreting the first longevity-contingent instrument 722 to identify a first death-notification of a first insured person identifier. The first insured person identifier is associated with the first longevity-contingent instrument 722. A second approach includes interpreting the first longevity-contingent instrument 722 to identify the unfulfilled benefit status of the first longevity-contingent instrument 722. A third approach includes accessing the longevity-contingent instrument information 660 from the database 30 to extract a plurality of insured person identifiers of the plurality of longevity-contingent instruments and identifying the first insured person identifier within the plurality of insured person identifiers.

Having determined that the first longevity-contingent instrument 722 is associated with the available and unfulfilled benefit status, a fourth step of the method for utilizing of the portfolio of blockchain-encoded rived longevity-contingent instruments includes the processing module 44 determining fulfillment information 866 for the first longevity-contingent instrument 722. The fulfillment information 866 includes a benefit payout 868 of the first sub-asset facilitated by the payer computing device 850 for the benefit entity.

The fulfillment information 866 includes a variety of one or more elements. The elements include an identifier of the computing device, an identifier of the benefactor computing device 852 associated with the benefit entity, an identifier of the debtor computing device 854 associated with the sponsor entity, and an identifier of the payer computing device 850. The elements of the fulfillment information 866 further includes a request for the payment of the benefit payout 868, a current purchase transaction value, the benefit payout 868, and a fulfillment status of the benefit payout 868.

The elements of the fulfillment information 866 further includes an ownership entity identifier, a holder identifier, an insured person identifier, an identifier of an associated blockchain-encoded record, an identifier of an associated longevity-contingent instrument, a health record, and an updated life expectancy value. The elements of the fulfillment information 866 further includes a death-notification of the insured person identifier, an updated longevity status indicator, and an identifier of another longevity-contingent instrument associated with the first longevity-contingent instrument 722.

The determining of the fulfillment information 866 includes at least one of a variety of approaches. A first approach includes determining the benefit payout associated with the first sub-asset. A second approach includes generating a request for the payment of the benefit payout. A third approach includes determining a first portion of the benefit payout to associate with a premium cash escrow in accordance with the rive approach 682. The premium cash escrow is utilized to fund payment of a plurality of premium payment streams associated with the plurality of sub-liabilities of the portfolio of longevity-contingent instruments on behalf of the sponsor entity.

A third approach includes determining a second portion of the benefit payout to associate with a benefit cash account based on the first portion of the payout and in accordance with the rive approach 682. The benefit cash account is associated with the benefit entity (e.g., one or more benefactors) associated with the benefactor computing device 852.

FIG. 15C further illustrates the example of operation of steps of the method for the utilizing of the portfolio of blockchain-encoded rived longevity-contingent instruments where, having produce the fulfillment information 866, in a fifth step, the processing module 44 updates the first blockchain-encoded record 864 for the first longevity-contingent instrument 722 based on security information (e.g., key pair information) of the payer computing device 850 to include the fulfillment information 866 to produce an updated first blockchain-encoded record 872.

The updating of the first blockchain-encoded record 864 includes a series of sub-steps. In a first sub-step the processing module 44 hashes the fulfillment information 866 utilizing a recipient public key of a recipient computing device (e.g., of the payer computing device 850) to produce a next transaction hash value. In a second sub-step the processing module 44 encrypts the next transaction hash value utilizing a private key of the computing device to produce a next transaction signature. In a third sub-step the processing module 44 generates a next blockchain-encoded record to include the fulfillment information 866 and the next transaction signature.

Having produced the updated first blockchain-encoded record 872, in a sixth step of the method of the utilizing of the portfolio of blockchain-encoded rived longevity-contingent instruments, the processing module 44 sends the updated first blockchain-encoded record 872 to the payer computing device 850 to facilitate payment of the benefit payout 868 of the first sub-asset to the benefit entity. The benefit entity and sponsor entity realize the beneficial valuation elevation over direct utilization of selected longevity-contingent instruments of the portfolio of longevity-contingent instruments prior to the riving. The facilitating of the payment includes generating a still further updated representation of the first blockchain-encoded record to include confirmation of payment.

Alternatively, or in addition to, the processing module 44 sends a representation of the updated first blockchain-encoded record 872 to one or more of the benefactor computing device 852 and the debtor computing device 854. For instance, the processing module 44 further updates the updated first blockchain-encoded record 872 based on security information of at least one of the benefactor computing device 852 and the debtor computing device 854 to include the fulfillment information 866 to produce a further updated first blockchain-encoded record as the representation of the updated first blockchain-encoded record. Having produced the representation, the processing module 44 sends the representation as one or more of an updated first blockchain-encoded record 874 to the benefactor computing device 852 and as an updated first blockchain-encoded record 876 to the debtor computing device 854.

The method described above module can alternatively be performed by various modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the communication system 10, cause the one or more computing devices to perform any or all of the steps described above.

FIGS. 16A-16D are schematic block diagrams of another embodiment of a communication system illustrating an embodiment of a method for updating a portfolio of blockchain-encoded rived longevity-contingent instruments within a computing system. The computing system includes a benefactor server 700, a debtor server 702, user devices 32-1 through 32-N, longevity-contingent instrument provider servers 704-1 through 704-M, and the control server 20 of FIG. 1.

In an embodiment, the benefactor server 700 and the debtor server 702 are implemented utilizing the legacy server 22 of FIG. 1, where the benefactor server 700 is associated with at least one benefit entity (e.g., pension system) and the debtor server 702 is associated with at least one sponsor entity associated with the at least one benefit entity. In an embodiment, the user devices 32-1 through 32-N are implemented utilizing the user devices 32 of FIG. 1. In an embodiment, the longevity-contingent instrument provider servers 704-1 through 704-M are implemented utilizing the augmentation server 24 of FIG. 1. The control server 20 includes the processing module 44 of FIG. 1 and the database 30 of FIG. 1.

Figure 16A:
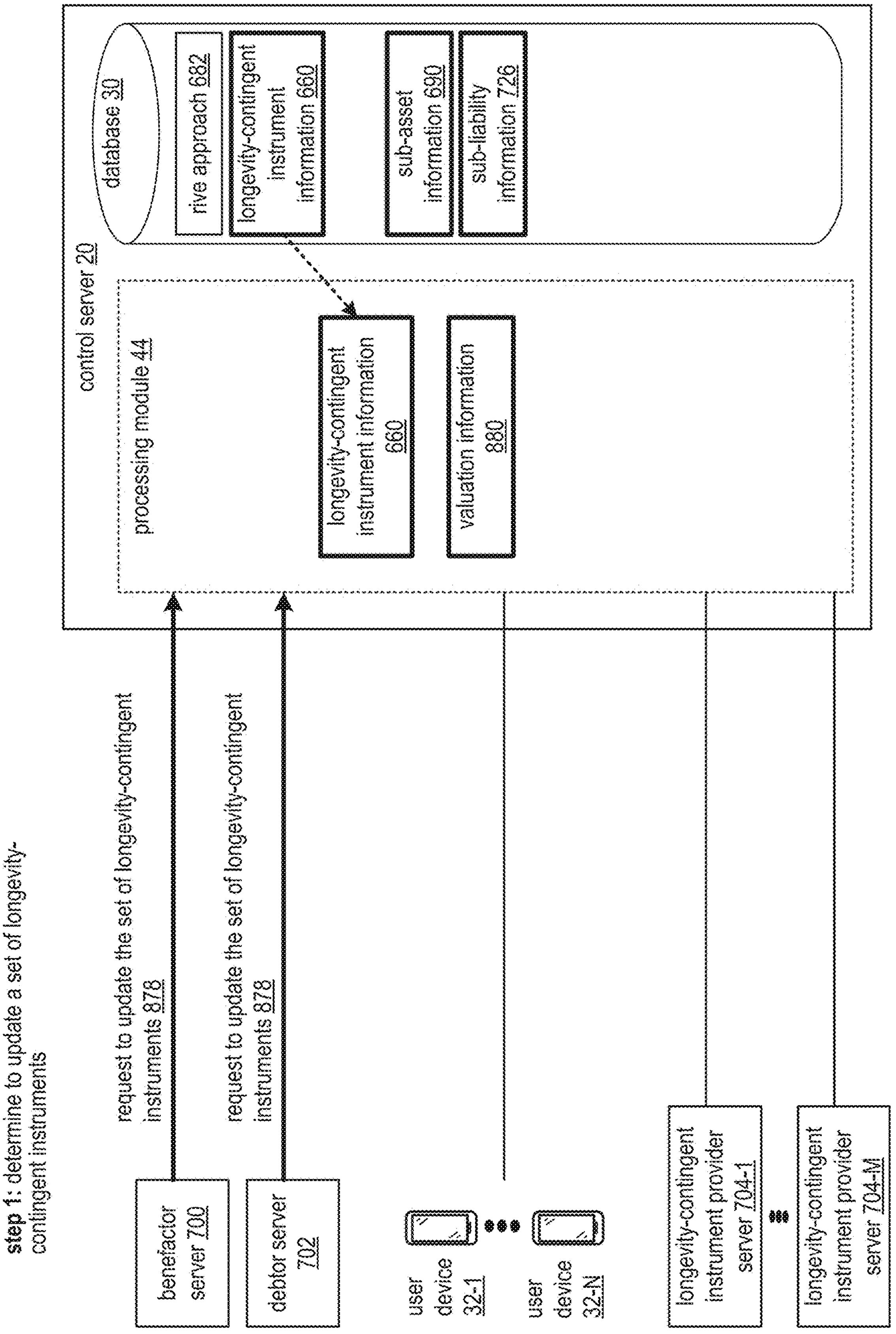
FIGS. 16A-16D are schematic block diagrams of another embodiment of a communication system illustrating an embodiment of a method for updating a portfolio of blockchain-encoded rived longevity-contingent instruments within a computing system in accordance with the present invention.

FIG. 16A illustrates an example of operation of steps of a method for the updating of the portfolio of blockchain-encoded rived longevity-contingent instruments where, in a first step, the processing module 44 determines to update a set of longevity-contingent instruments (e.g., an existing portfolio of blockchain-encoded rived longevity-contingent instruments). A first longevity-contingent instrument of the set of longevity-contingent instruments is rived in accordance with a rive approach 682 to reassign a first face value benefit of the first longevity-contingent instrument from a first ownership entity (e.g., originally insured or a broker/holding entity) to a benefit entity to produce a first sub-asset of a plurality of sub-assets of the set of longevity-contingent instruments.

The first longevity-contingent instrument is further rived in accordance with the rive approach 682 to reassign a first premium payment stream of the first longevity-contingent instrument from the first ownership entity to a sponsor entity to produce a first sub-liability of a plurality of sub-liabilities of the set of longevity-contingent instruments. The plurality of sub-assets is associated with a benefit net present value and the plurality of sub-liabilities is associated with a liability net present value. The control server 20 maintains information with regards to the set of longevity-contingent instruments, including the first longevity-contingent instrument, in the database 30. The control server 20 further maintains information with regards to the plurality of sub-assets as sub-asset information 690 and information with regards to the plurality of sub-liabilities as sub-liability information 726 in the database 30.

The processing module 44 determines to update the set of longevity-contingent instruments utilizing one or more of a variety of approaches. A first approach includes interpreting a request. For example, the processing module 44 interprets a request to update the set of longevity-contingent instruments 878 received from one or more of the benefactor server 700 and the debtor server 702.

A second approach includes determining to add another longevity-contingent instrument to the set of longevity-contingent instruments. For example, the processing module 44 determines to expand the portfolio of blockchain-encoded rived longevity-contingent instruments by adding (e.g., buying) the other longevity-contingent instrument to the set of longevity-contingent instruments.

A third approach includes determining to remove an existing longevity-contingent instrument from the set of longevity-contingent instruments. For example, the processing module determines to contract the portfolio of blockchain-encoded rived longevity-contingent instruments by removing (e.g., selling) the existing longevity-contingent instrument from the set of longevity-contingent instruments.

A fourth approach to update the set of longevity-contingent instruments includes determining that a sum of the benefit net present value and the liability net present value associated with the set of longevity-contingent instruments is less than a low threshold. For example, the processing module 44 determines each of the benefit net present value and the liability net present value of valuation information 880 and compares the sum of the two to the low threshold. When the sum is less than the low threshold, the processing module 44 indicates to update the set of longevity-contingent instruments (e.g., buying).

Figure 16B:
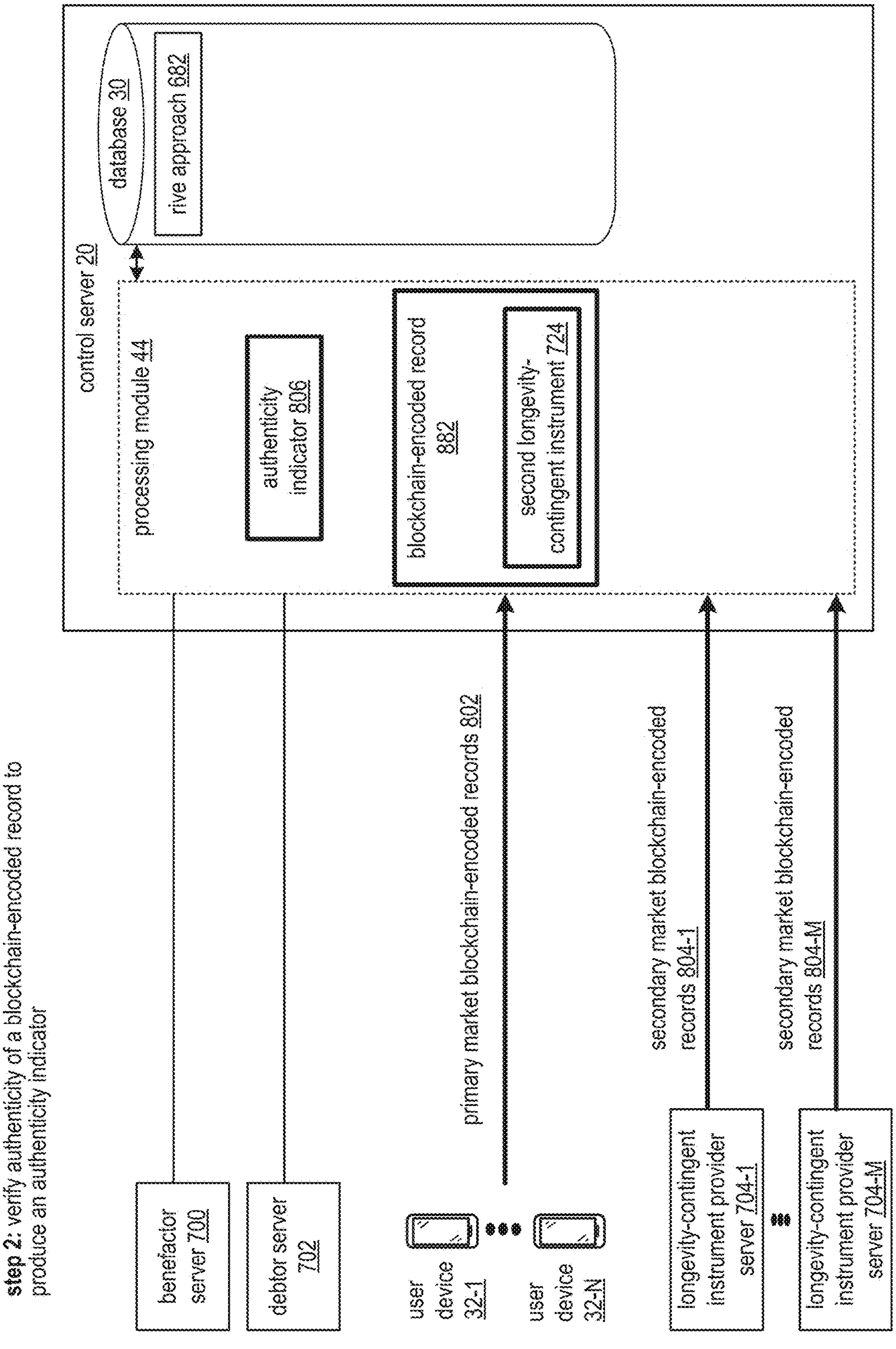

FIG. 16B further illustrates the example of operation of steps of the method for the updating of the portfolio of blockchain-encoded rived longevity-contingent instruments where, having determined to update the set of longevity-contingent instruments, in a second step, the processing module 44 verifies authenticity of a blockchain-encoded record 882 representing a second longevity-contingent instrument 724 to produce an authenticity indicator 806. The second longevity-contingent instrument assigns a second face value benefit of the second longevity-contingent instrument and a second premium payment stream of the second longevity-contingent instrument to a second ownership entity (e.g., another originally insured or the broker/holding entity).

The verifying of the authenticity includes obtaining the blockchain-encoded record 882 and analyzing the record for authenticity. The obtaining of the blockchain-encoded record 882 includes accessing one or both of a primary market and a secondary market. Accessing the primary market includes obtaining one or more blockchain-encoded records for longevity-contingent instruments directly from initial policyholders (e.g., originally insured individuals). Accessing the secondary market includes obtaining one or more further blockchain-encoded records for further longevity-contingent instruments from brokers and providers, where the blockchain-encoded records of longevity-contingent instruments have changed hands from the initial policyholders to one or more intermediaries (e.g., the brokers, etc.).

The accessing of the blockchain-encoded record 882 includes a series of sub-steps. A first sub-step includes identifying one or more available longevity-contingent instruments by one or more of issuing a solicitation message for longevity-contingent instrument information and receiving the longevity-contingent instrument information. For example, the processing module 44 issues a solicitation message to one or more of the user devices 32-1 through 32-N, and in response, receives primary market blockchain-encoded records 802. As another example, the processing module 44 issues the solicitation message to one or more of the longevity-contingent instrument provider servers 704-1 through 704-M, and in response, receives at least one of secondary market blockchain-encoded records 804-1 through 804-M. Alternatively, the processing module 44 receives the blockchain-encoded record 882 in an unsolicited fashion.

The analyzing of the blockchain-encoded record 882 for authenticity includes utilizing a symmetric key signature approach or another approach including a straightforward signature verification. When utilizing the symmetric key signature approach, the processing module 44 decrypts a signature of a first blockchain-encoded record of the blockchain-encoded record 882 utilizing a first public key of a first public-private key pair to produce a first decrypted transaction hash value. The first public-private key pair is associated with a last transaction computing device (e.g., a computing device associated with a last transfer of ownership of an associated longevity-contingent instrument).

Having produced the first decrypted transaction hash value, the processing module 44 hashes a portion of the blockchain-encoded record utilizing a second public key of a second public-private key pair to produce a candidate transaction hash value. The second public-private key pair is associated with the computing device (e.g., generated by the computing device). Having produced the candidate transaction hash value, the processing module 44 establishes the authenticity indicator 806 to indicate favorable authenticity when the first decrypted transaction hash value compares favorably to the candidate transaction hash value (e.g., substantially the same).

When not utilizing the symmetric key signature approach, the processing module 44 applies signature verification to the signature of the blockchain-encoded record utilizing the first public key and the second public key to produce the authenticity indicator 806. The authentication was discussed in greater detail with reference to FIG. 14C.

Figure 16C:
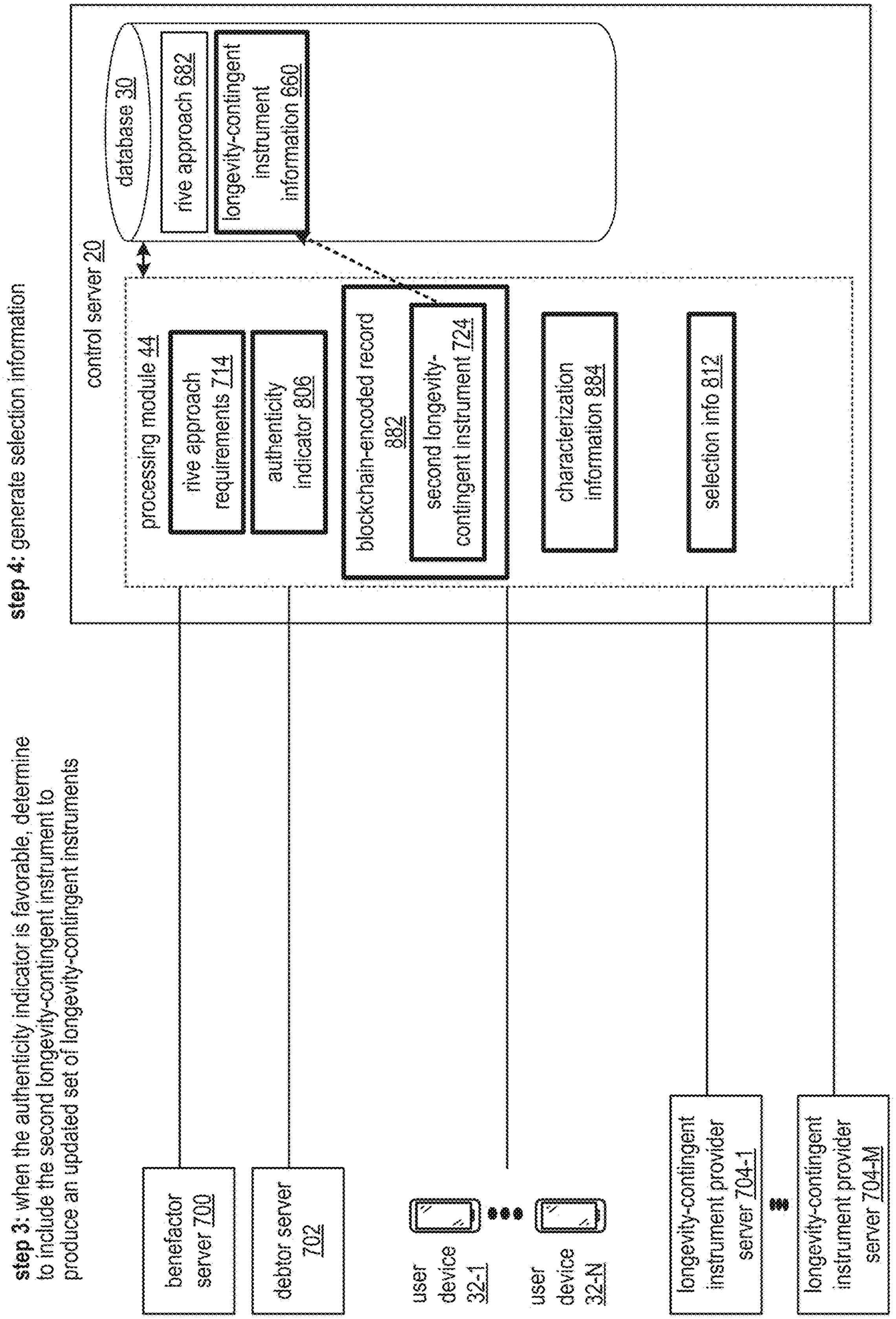

FIG. 16C further illustrates the example of operation of steps of the method for the updating of the portfolio of blockchain-encoded rived longevity-contingent instruments where, having verified the authenticity of the blockchain-encoded record 882 to produce the authenticity indicator 806, in a third step, when the authenticity indicator for the blockchain-encoded record is favorable (e.g., authentic), the processing module 44 determines to include the second longevity-contingent instrument 724 in the set of longevity-contingent instruments to produce an updated set of longevity-contingent instruments. The updated set of longevity-contingent instruments is associated with a fair market acquisition value (e.g., purchase price based on current status where a common ownership entity owns both the face value benefit and the premium payment stream).

The determining to include the second longevity-contingent instrument 724 in the set of longevity-contingent instruments to produce the updated set of longevity-contingent instruments includes a series of sub-steps. A first sub-step includes extracting characterization information 884 from the blockchain-encoded record 882 for the second longevity-contingent instrument 724 to include one or more of an estimated timeframe for payout of the second face value benefit, a present value of the second face value benefit utilizing the estimated timeframe, and a present value of the second premium payment stream.

A second sub-step includes indicating to include the second longevity-contingent instrument 724 in the set of longevity-contingent instruments to produce the updated set of longevity-contingent instruments when the characterization information 884 compares favorably to rive approach requirements 714 associated with the rive approach 682. For example, the second longevity-contingent instrument 724 provides an estimated favorable outcome aligned with the rive approach requirements 714.

Having determined to produce the updated set of longevity-contingent instruments, in a fourth step of the method for the updating of the portfolio of blockchain-encoded rived longevity-contingent instruments, the processing module 44 generates selection information 812 for subsequent updating of the blockchain-encoded records 800 (e.g., to document transfer of ownership and a payment amount). The selection information is generated to include one or more of an identifier of a benefactor computing device associated with the benefit entity, an identifier of a debtor computing device associated with the sponsor entity, an identifier of an associated blockchain-encoded record, an identifier of an associated longevity-contingent instrument, a current purchase transaction value, an ownership entity identifier, a holder identifier, an updated life expectancy value, an updated longevity status indicator, and an identifier of another longevity-contingent instrument of the set of longevity-contingent instruments.

Figure 16D:
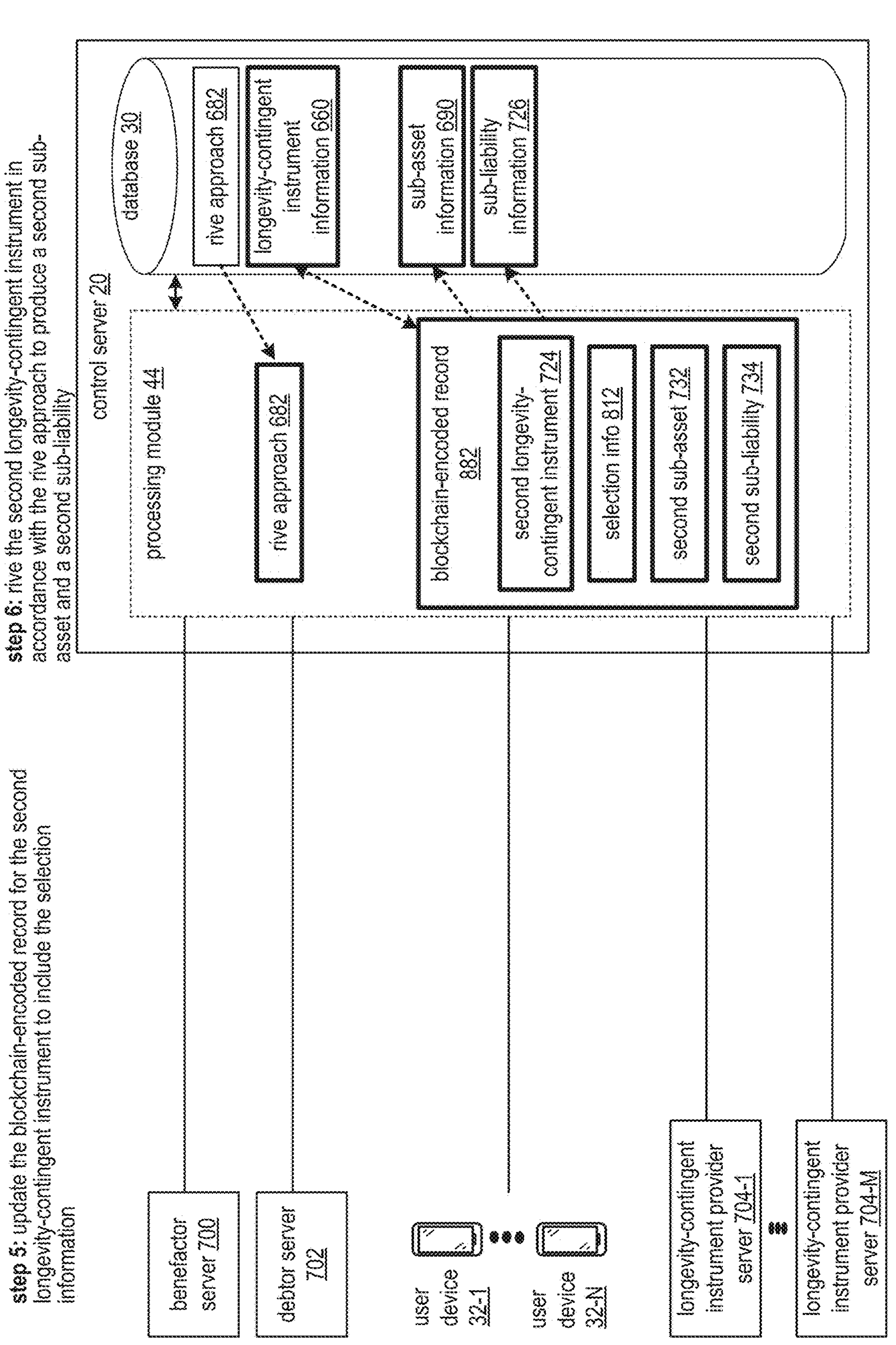

FIG. 16D further illustrates the example of operation of steps of the method for the updating of the portfolio of blockchain-encoded rived longevity-contingent instruments where, having produced the selection information 812, in a fifth step, the processing module 44 updates the blockchain-encoded record 882 for the second longevity-contingent instrument to include the selection information 812. The updating of the blockchain-encoded record 882 includes a series of sub-steps. In a first sub-step, the processing module 44 hashes the selection information 812 utilizing a recipient public key of a recipient computing device to produce a next transaction hash value. In a second sub-step, the processing module 44 encrypts the next transaction hash value utilizing a private key of the computing device to produce a next transaction signature. In a third sub-step, the processing module 44 generates a next blockchain-encoded record to include the selection information 812 and the next transaction signature.

Having updated the blockchain-encoded record 882, in a sixth step of the method for the updating of the portfolio of blockchain-encoded rived longevity-contingent instruments, the processing module 44 rives the second longevity-contingent instrument 724 in accordance with the rive approach 682 to reassign the second face value benefit from the second ownership entity to the benefit entity to produce a second sub-asset 732 of the plurality of sub-assets of the updated set of longevity-contingent instruments, and to reassign the second premium payment stream from the second ownership entity to the sponsor entity to produce a second sub-liability 734 of the plurality of sub-liabilities of the updated set of longevity-contingent instruments.

Having produced the plurality of sub-assets and the plurality of sub-liabilities, the processing module 44 stores the sub-assets and the plurality of sub-liabilities as sub-asset information 690 and sub-liability information 726 in the database 30. A beneficial valuation elevation is created such that a sum of the benefit net present value and the liability net present value is greater than the fair market acquisition value so that the benefit entity and sponsor entity realize the beneficial valuation elevation over direct utilization of selected longevity-contingent instruments of the updated set of longevity-contingent instruments prior to the riving.

The method described above module can alternatively be performed by various modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the communication system 10, cause the one or more computing devices to perform any or all of the steps described above.

Figure 17A:
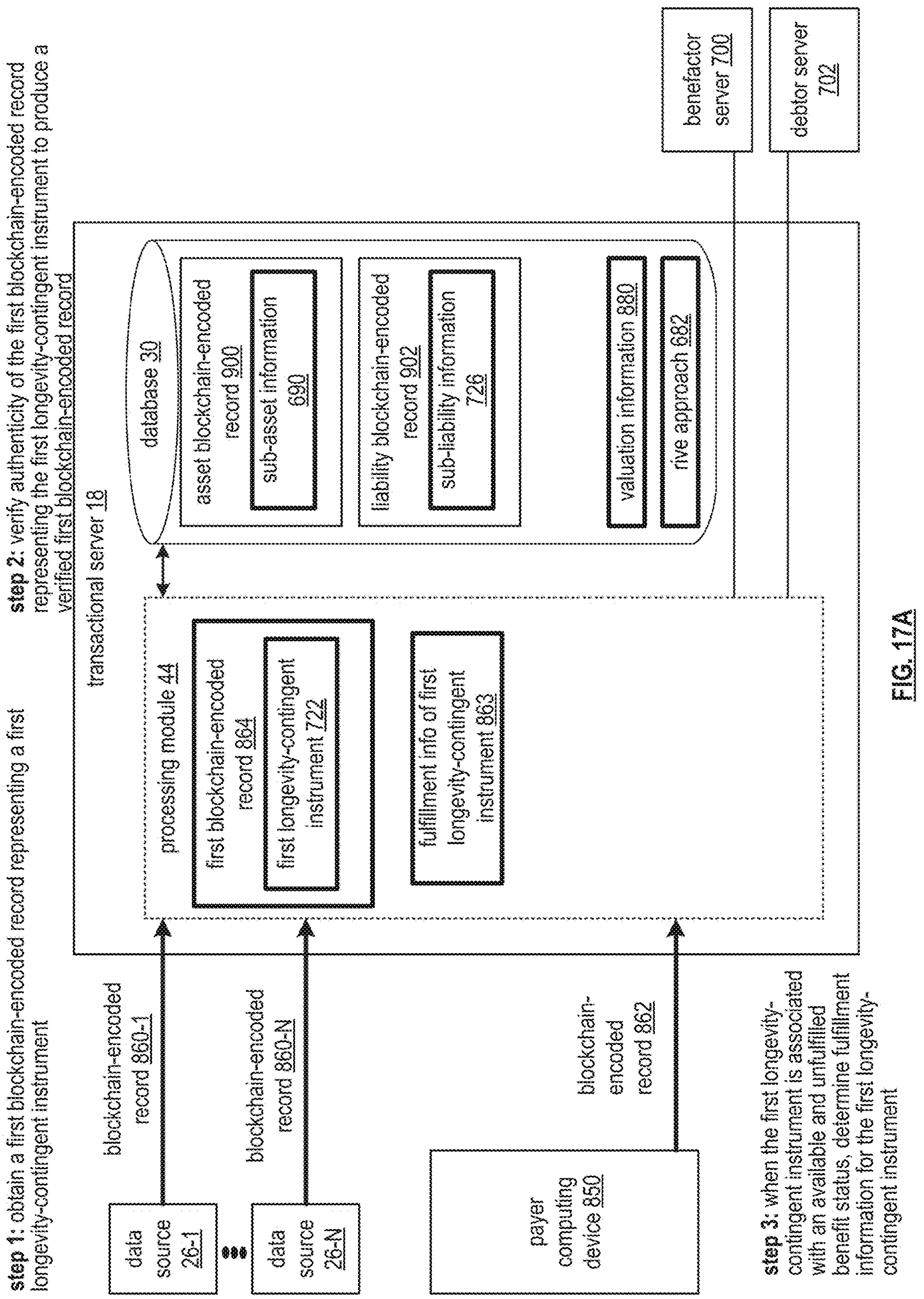
FIGS. 17A-17C are schematic block diagrams of another embodiment of a communication system illustrating an embodiment of a method for utilizing blockchain-encoded records for rived longevity-contingent instruments within a computing system in accordance with the present invention.
Figure 17B:
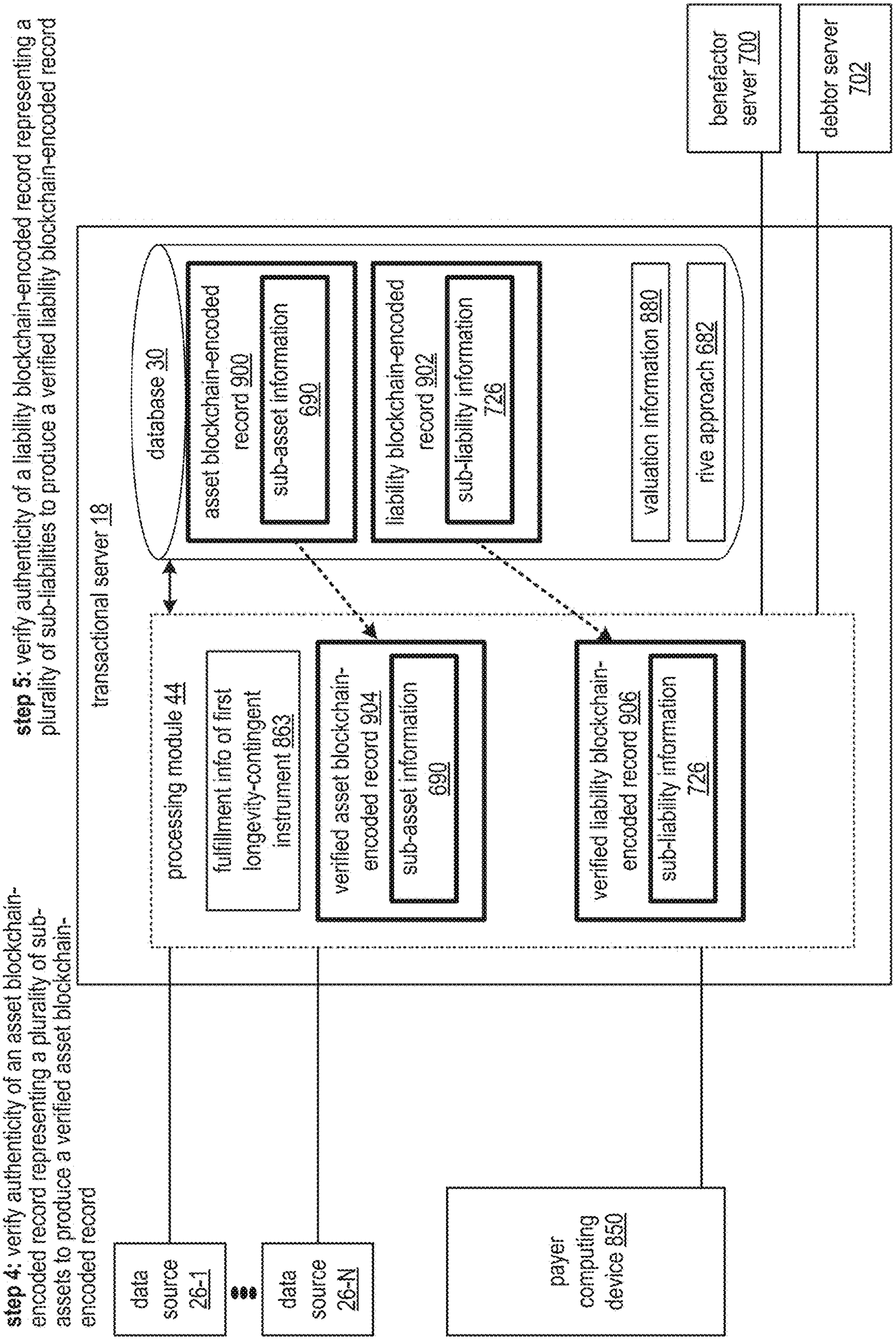
Figure 17C:
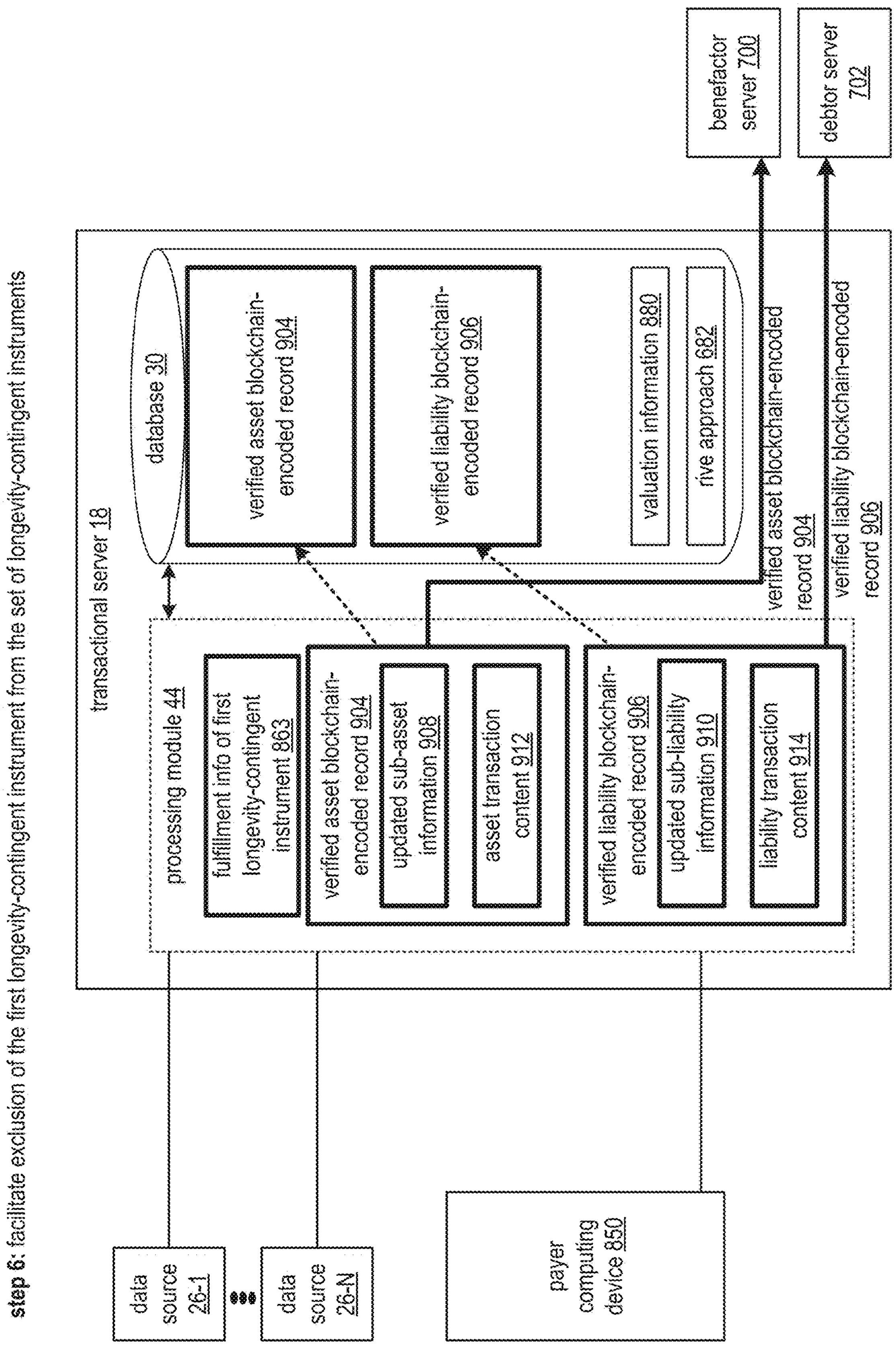

FIGS. 17A-17C are schematic block diagrams of another embodiment of a communication system illustrating an embodiment of a method for utilizing blockchain-encoded records for rived longevity-contingent instruments within a computing system. The computing system includes a benefactor server 700, a debtor server 702, data sources 26-1 through 26-N, a payer computing device 850, and the transactional server 18 of FIG. 1.

In an embodiment, the payer computing device 850 is implemented utilizing the augmentation server 24 FIG. 1. In an embodiment, the data sources 26-1 through 26-N are implemented utilizing the data source 26 of FIG. 1. The transactional server 18 includes the processing module 44 of FIG. 1 and the database 30 of FIG. 1.

In an embodiment, the benefactor server 700 and the debtor server 702 are implemented utilizing the legacy server 22 of FIG. 1, where the benefactor server 700 is associated with at least one benefit entity (e.g., pension system) and the debtor server 702 is associated with at least one sponsor entity associated with the at least one benefit entity.

FIG. 17A illustrates an example of operation of steps of a method for the utilizing blockchain-encoded records for rived longevity-contingent instruments where, in a first step, the processing module 44 obtains a first blockchain-encoded record 864 representing a first longevity-contingent instrument 722 of a set of longevity-contingent instruments. When an insured person passes and a death benefit is provided, availability of a benefit payout is utilized to fund a combination of a cash flow to a benefit entity and for at least some of a plurality of premium payment streams on behalf of a sponsor entity, from the payer computing device 850 in accordance with a rive approach 682. The first blockchain-encoded record 864 includes a notification of the death benefit.

The obtaining includes receiving one or more blockchain-encoded records 860-1 through 860-N from one or more of the data sources 26-1 through 26-N. The obtaining further includes receiving a blockchain-encoded record 862 from the payer computing device 850 when the payer computing device 850 issues the notification of the death benefit (e.g., the life insurance company issues the notice).

Having obtained the first blockchain-encoded record 864, a second step of the method for the utilizing blockchain-encoded records for rived longevity-contingent instruments includes the processing module 44 verifying authenticity of the first blockchain-encoded record 864 representing the first longevity-contingent instrument 722 of the set of longevity-contingent instruments to produce a verified first blockchain-encoded record. The set of longevity-contingent instruments is associated with a fair market acquisition value. The transactional server 18 maintains valuation information 880 within the database 30 to include the fair market acquisition value.

The first longevity-contingent instrument 722 is selected and rived in accordance with the rive approach 682 to reassign a first face value benefit of the first longevity-contingent instrument from a first ownership entity to the benefit entity to produce a first sub-asset of a plurality of sub-assets of the set of longevity-contingent instruments. The plurality of sub-assets is associated with a benefit net present value. The transactional server 18 further maintains the valuation information 880 to include the benefit net present value. The transactional server 18 maintains sub-asset information 690 within the database 30 to include information with regards to the plurality of sub-assets.

The first longevity-contingent instrument 722 is further rived in accordance with the rive approach 682 to reassign a first premium payment stream of the first longevity-contingent instrument from the first ownership entity to the sponsor entity to produce a first sub-liability of a plurality of sub-liabilities of the set of longevity-contingent instruments. The plurality of sub-liabilities is associated with a liability net present value. The transactional server 18 further maintains the valuation information 880 to include the liability net present value. The transactional server 18 maintains sub-liability information 726 within the database 30 to include information with regards to the plurality of sub-liabilities The riving creates a beneficial valuation elevation such that a sum of the benefit net present value and the liability net present value is greater than the fair market acquisition value so that the benefit entity and the sponsor entity realize the beneficial valuation elevation over direct utilization of the set of longevity-contingent instruments prior to the riving.

The verifying of the authenticity of the first blockchain-encoded record 864 includes utilizing a symmetric key signature approach or another approach (e.g., straightforward signature verification). When utilizing the symmetric key signature approach, the processing module 44 decrypts a first signature of the first blockchain-encoded record 864 utilizing a first public key of a first public-private key pair to produce a first decrypted transaction hash value. The first public-private key pair is associated with a last transaction computing device (e.g., a computing device associated with generating the death notification).

Having produced the first decrypted transaction hash value, the processing module 44 hashes a portion of the first blockchain-encoded record utilizing a second public key of a second public-private key pair to produce a candidate transaction hash value. The second public-private key pair is associated with the transactional server 18 (e.g., generated by the transactional server 18). Having produced the candidate transaction hash value, the processing module 44 indicates favorable authenticity when the first decrypted transaction hash value compares favorably to the candidate transaction hash value.

When not utilizing the symmetric key signature approach, the processing module 44 applies signature verification to the first signature of the first blockchain-encoded record utilizing the first public key and the second public key to produce the favorable authenticity indication of the verified first blockchain-encoded record 864. The verifying of the authenticity was previously discussed in greater detail with reference to FIG. 14C.

Having verified the authenticity of the first blockchain-encoded record 864, when the first longevity-contingent instrument 722 is associated with an available and unfulfilled benefit status, a third step of the method for the utilizing blockchain-encoded records for rived longevity-contingent instruments includes the processing module 44 determining fulfillment information 863 of the first longevity-contingent instrument. The determining of the fulfillment information 863 includes determining that the first longevity-contingent instrument 722 is associated with the available and unfulfilled benefit status. The processing module 44 determines that the first longevity-contingent instrument 722 is associated with an available and unfulfilled benefit status by at least one of several approaches.

A first approach includes interpreting the first longevity-contingent instrument 722 to identify a first death-notification of a first insured person identifier. The first insured person identifier is associated with the first longevity-contingent instrument 722. A second approach includes interpreting the first longevity-contingent instrument 722 to identify the unfulfilled benefit status of the first longevity-contingent instrument 722. A third approach includes accessing longevity-contingent instrument information from the database 30 to extract a set of insured person identifiers of the set of longevity-contingent instruments and identifying the first insured person identifier within the plurality of insured person identifiers.

Having determined that the first longevity-contingent instrument 722 is associated with the available and unfulfilled benefit status, the processing module 44 determines the fulfillment information 863 for the first longevity-contingent instrument 722. The fulfillment information 863 includes a benefit payout of the first sub-asset facilitated by the payer computing device 850 for the benefit entity.

The fulfillment information 863 includes a variety of one or more elements. The elements include an identifier of the computing device, an identifier of the benefactor server 700 associated with the benefit entity, an identifier of the debtor server 702 associated with the sponsor entity, and an identifier of the payer computing device 850. The elements of the fulfillment information 863 further includes a request for the payment of the benefit payout, a current purchase transaction value, the benefit payout, and a fulfillment status of the benefit payout.

The elements of the fulfillment information 863 further includes an ownership entity identifier, a holder identifier, an insured person identifier, an identifier of an associated blockchain-encoded record, an identifier of an associated longevity-contingent instrument, a health record, and an updated life expectancy value. The elements of the fulfillment information 863 further includes a death-notification of the insured person identifier, an updated longevity status indicator, and an identifier of another longevity-contingent instrument associated with the first longevity-contingent instrument 722.

The determining of the fulfillment information 863 further includes at least one of a variety of approaches. A first approach includes determining the benefit payout associated with the first sub-asset. A second approach includes generating a request for the payment of the benefit payout. A third approach includes determining a first portion of the benefit payout to associate with a premium cash escrow in accordance with the rive approach 682. The premium cash escrow is utilized to fund payment of a plurality of premium payment streams associated with the plurality of sub-liabilities of the portfolio of longevity-contingent instruments on behalf of the sponsor entity.

A third approach includes determining a second portion of the benefit payout to associate with a benefit cash account based on the first portion of the payout and in accordance with the rive approach 682. The benefit cash account is associated with the benefit entity (e.g., one or more benefactors) associated with the benefactor server 700.

FIG. 17B further illustrates the example of operation of steps of the method for the utilizing blockchain-encoded records for rived longevity-contingent instruments where, having determined the fulfillment information 863, in a fourth step the processing module 44 verifies authenticity of an asset blockchain-encoded record 900 representing the plurality of sub-assets to produce a verified asset blockchain-encoded record 904. The verifying of the authenticity of the asset blockchain-encoded record 900 includes obtaining the asset blockchain-encoded record 900 from at least one of the database 30 and the benefactor server 700.

The verifying of the authenticity of the asset blockchain-encoded record 900 further includes utilizing a symmetric key signature approach or another approach (e.g., straightforward signature verification). When utilizing the symmetric key signature approach, the processing module 44 decrypts a first signature of the asset blockchain-encoded record 900 utilizing a first public key of a first public-private key pair to produce a first decrypted transaction hash value. The first public-private key pair is associated with a last transaction computing device (e.g., of the benefactor server 700, or of the transactional server 18, or of another computing device).

Having produced the first decrypted transaction hash value, the processing module 44 hashes a portion of the asset blockchain-encoded record 900 utilizing a second public key of a second public-private key pair to produce a candidate transaction hash value. The second public-private key pair is associated with the transactional server 18 (e.g., generated by the transactional server 18). Having produced the candidate transaction hash value, the processing module 44 establishes the verified asset blockchain-encoded record 904 to indicate favorable authenticity when the first decrypted transaction hash value compares favorably to the candidate transaction hash value (e.g., substantially the same).

When not utilizing the symmetric key signature approach, the processing module 44 applies signature verification to the first signature of the asset blockchain-encoded record 900 utilizing the first public key and the second public key to establish the verified asset blockchain-encoded record 904 to indicate the favorable authenticity. The verifying of the authenticity of blocks of blockchains such as the asset blockchain-encoded record 900 was previously discussed in greater detail with reference to FIG. 14C.

Having produced the verified asset blockchain-encoded record 904, a fifth step of the example of operation of the method for the utilizing blockchain-encoded records for rived longevity-contingent instruments includes the processing module 44 verifying authenticity of a liability blockchain-encoded record 902 representing the plurality of sub-liabilities to produce a verified liability blockchain-encoded record 906. The verifying of the authenticity of the liability blockchain-encoded record 902 includes obtaining the liability blockchain-encoded record 902 from at least one of the database 30, the debtor server 702, and any other computing device.

The verifying of the authenticity of the liability blockchain-encoded record 902 further includes utilizing the symmetric key signature approach or the other approach (e.g., straightforward signature verification). When utilizing the symmetric key signature approach, the processing module 44 decrypts a first signature of the liability blockchain-encoded record 902 utilizing another first public key of another first public-private key pair to produce another first decrypted transaction hash value. The other first public-private key pair is associated with a last transaction computing device (e.g., of the debtor server 702, or the transactional server 18, or another computing device).

Having produced the other first decrypted transaction hash value, the processing module 44 hashes a portion of the liability blockchain-encoded record 902 utilizing the second public key of the second public-private key pair to produce another candidate transaction hash value. The second public-private key pair is associated with the transactional server 18 (e.g., generated by the transactional server 18). Having produced the other candidate transaction hash value, the processing module 44 establishes the verified liability blockchain-encoded record 906 to indicate favorable authenticity when the other first decrypted transaction hash value compares favorably to the other candidate transaction hash value (e.g., substantially the same).

When not utilizing the symmetric key signature approach, the processing module 44 applies signature verification to the first signature of the liability blockchain-encoded record utilizing the other first public key and the second public key to establish the verified liability blockchain-encoded record 906 to indicate the favorable authenticity. The verifying of the authenticity of blocks of blockchains such as the liability blockchain-encoded record 902 was previously discussed in greater detail with reference to FIG. 14C.

FIG. 17C further illustrates the example of operation of steps of the method for the utilizing blockchain-encoded records for rived longevity-contingent instruments where, having produced the verified asset blockchain-encoded record 904 and the verified liability blockchain-encoded record 906, in a sixth step the processing module 44 facilitates exclusion of the first longevity-contingent instrument from the set of longevity-contingent instruments in accordance with the fulfillment information 863. The facilitating of the exclusion includes the processing module 44 excluding the first sub-asset from the plurality of sub-assets to produce an updated plurality of sub-assets. The transactional server 18 maintains information with regards to the updated plurality of sub-assets as updated sub-asset information 908.

The facilitating of the exclusion further includes the processing module 44 excluding the first sub-liability from the plurality of sub-liabilities to produce an updated plurality of sub-liabilities. The transactional server 18 maintains information with regards to the updated plurality of sub-liabilities as updated sub-liability information 910.

The facilitating of the exclusion further includes the processing module 44 updating the verified asset blockchain-encoded record 904 to represent the updated plurality of sub-assets and updating the verified liability blockchain-encoded record 906 to represent the updated plurality of sub-liabilities. The updating of the verified asset blockchain-encoded record 904 includes a series of sub-steps. A first sub-step includes generating asset transaction content 912 to include one or more of a variety of elements. The elements include information regarding the fulfillment information 863, information regarding a second sub-asset, information regarding the first sub-asset, information regarding the updated plurality of sub-assets, an identifier of an owner computing device associated with an ownership entity, and an identifier of a benefactor computing device associated with the benefit entity. The elements further include an identifier of a debtor computing device associated with the sponsor entity, an identifier of an associated blockchain-encoded record, an identifier of an associated longevity-contingent instrument, a current purchase transaction value, and an ownership entity identifier. The elements further include a holder identifier, an updated life expectancy value, an updated longevity status indicator, and an identifier of another longevity-contingent instrument of the set of longevity-contingent instruments.

A second sub-step of the series of sub-steps includes hashing the asset transaction content 912 utilizing a recipient public key of a recipient computing device (e.g., of the benefactor server 700 or of the transactional server 18) to produce a next transaction hash value. A third sub-step includes encrypting the next transaction hash value utilizing a private key of the transactional server 18 to produce a next transaction signature. A fourth sub-step includes generating a next blockchain-encoded record to include the asset transaction content 912 and the next transaction signature.

The updating of the verified liability blockchain-encoded record 906 includes another series of sub-steps. A first sub-step includes generating liability transaction content 914 to include one or more of a variety of elements. The elements include information regarding the fulfillment information 863, information regarding a second sub-liability, information regarding the first sub-liability, information regarding the updated plurality of sub-liabilities, the identifier of the owner computing device associated with the ownership entity, and the identifier of the benefactor computing device associated with the benefit entity. The elements further include the identifier of the debtor computing device associated with the sponsor entity, the identifier of the associated blockchain-encoded record, the identifier of the associated longevity-contingent instrument, the current purchase transaction value, and the ownership entity identifier. The elements further include the holder identifier, the updated life expectancy value, the updated longevity status indicator, and the identifier of another longevity-contingent instrument of the set of longevity-contingent instruments.

A second sub-step of the other series of sub-steps includes hashing the liability transaction content 914 utilizing a recipient public key of a recipient computing device (e.g., of the debtor server 702 or of the transactional server 18) to produce another next transaction hash value. A third sub-step includes encrypting the other next transaction hash value utilizing the private key of the transactional server 18 to produce another next transaction signature. A fourth sub-step includes generating another next blockchain-encoded record to include the liability transaction content 914 and the other next transaction signature.

Having updated the verified asset blockchain-encoded record 904 and the verified liability blockchain-encoded record 906, the processing module 44 facilitates sharing of the updates. For example, the processing module 44 sends, via the network 28 of FIG. 1, the verified asset blockchain-encoded record 904 to the benefactor server 700. As another example, the processing module 44 sends, via the network 28 of FIG. 1, the verified liability blockchain-encoded record 906 to the debtor server 702.

The method described above module can alternatively be performed by various modules of the communication system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the communication system 10, cause the one or more computing devices to perform any or all of the steps described above.

FIGS. 18A-18E are schematic block diagrams of an embodiment of a computing system illustrating an embodiment of a method for utilizing a contingent action token within the computing system. The computing system includes the benefactor server 700 of FIG. 13A, the debtor server 702 of FIG. 13A, the user devices 32-1 through 32-N of FIG. 13A, the longevity-contingent instrument provider servers 704-1 through 704-M of FIG. 13A, the control server 20 of FIG. 1, and the transactional server 18 of FIG. 1.

The control server 20 includes the processing module 44 of FIG. 1 and the database 30 of FIG. 1. The benefactor server 700 may be further associated with an outcome recipient identifier 1128 as further discussed below. The debtor server 702 may be further associated with an obligation provider identifier 1146 as further discussed below. The longevity-contingent instrument provider servers 704-1 through 704-M may further be associated with one or more of an outcome provider identifier 1124 and an obligation recipient identifier 1150 as further discussed below. The transactional server 18 includes the processing module 44 FIG. 1 and the database 30 of FIG. 1 and functions as a blockchain node of a blockchain associated with an object distributed ledger.

Figure 18A:
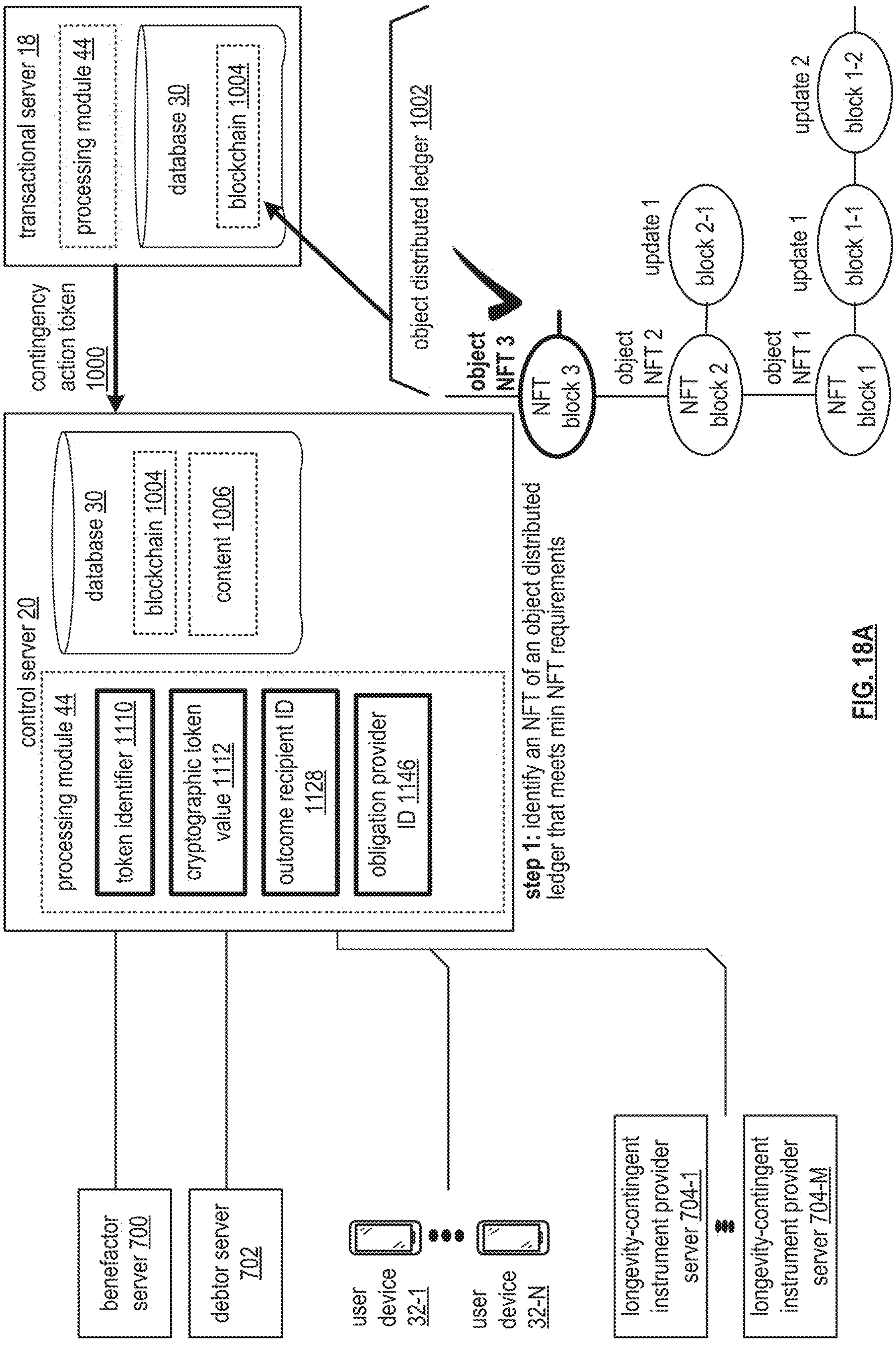
FIGS. 18A-18E are schematic block diagrams of an embodiment of a computing system illustrating an embodiment of a method for utilizing a contingent action token within the computing system in accordance with the present invention.

FIG. 18A illustrates an example of the method for utilizing the contingent action token, where a first step of the example method includes the control server 20 identifying a non-fungible token (NFT) of an object distributed ledger that meets minimum NFT requirements. Example content of the contingent action token 1000 is discussed in greater detail with reference to FIG. 18B.

The minimum NFT requirements include a variety of requirements. A first requirement includes a recovered cryptographic token value 1112 of the NFT matches a calculated cryptographic token value of the NFT. A second requirement includes an obligation provider identifier 1146 of the NFT is the same as an original obligation provider identifier of the NFT when the NFT was initially generated. The obligation provider identifier 1146 is associated with providing of an obligation 1148 tied to an obligation recipient identifier 1150 in accordance with obligation requirements 1142. A positive obligation status 1144 indicates that the obligation 1148 has historically been provided in accordance with the obligation requirements 1142.

A second requirement includes an outcome recipient identifier 1128 of the NFT is the same as an original outcome recipient identifier of the NFT when the NFT was initially generated. The outcome recipient identifier 1128 is associated with a result of a triggered outcome 1126 tied to an outcome provider identifier 1124 in accordance with contingent outcome rules 1118 and the positive obligation status 1144. A contingency status 1120 indicates whether the triggered outcome 1126 has been triggered for a contingency entity identifier 1122 in accordance with the contingent outcome rules 1118.

The identifying the NFT of the object distributed ledger that meets the minimum NFT requirements includes a series of sub-steps. A first sub-step includes the processing module 44 of the control server 20 determining whether to indirectly or directly access the object distributed ledger. For example, the processing module 44 determines to indirectly access the object distributed ledger when the blockchain 1004 is not available in the database 30 of the control server 20 and is available in the database 30 of the transactional server 18. As another example, the processing module 44 of the control server 20 determines to directly access the object distributed ledger when the blockchain 1004 is available within the database 30 of the control server 20.

When indirectly accessing the object distributed ledger, a second sub-step of the identifying of the NFT includes the processing module 44 of the control server 20 issuing a non-fungible token access request to the transactional server 18 (e.g., an object ledger computing device of the computing system serving as a blockchain node of the object distributed ledger). The non-fungible token access request includes a representation of the minimum NFT requirements. The second sub-step further includes the processing module 44 of the control server 20 extracting an NFT identifier of the NFT from a non-fungible token access response that includes the contingency action token 1000 from the transactional server 18, where the transactional server 18 accesses the object distributed ledger 1002 to identify and NFT block 3 of the blockchain as illustrated in FIG. 18A.

When directly accessing the object distributed ledger, the second sub-step of the identifying of the NFT includes the processing module 44 of the control server 20 obtaining a copy of the object distributed ledger (e.g., recover the blockchain 1004 from the database 30 of the control server 20). The second sub-step further includes the processing module 44 of the control server 20 indicating the NFT identifier of the NFT when detecting a block of the copy of the object distributed ledger that matches the representation of the minimum NFT requirements (e.g., original obligation provider identifier and original outcome recipient identifier).

Having obtained the NFT, a third sub-step of the identifying of the NFT that meets the minimum NFT requirements includes the processing module 44 of the control server 20 verifying that the recovered cryptographic token value 1112 of the NFT matches the calculated cryptographic token value of the NFT. For example, the processing module 44 produces the calculated cryptographic token value of the NFT over a corresponding content portion of the obtained NFT and compares that calculated value to the recovered cryptographic token value 1112. When the cryptographic token values are the same, the processing module 44 indicates that the NFT that meets the minimum NFT requirements has been identified (e.g., by the token identifier 1110).

Figure 18B:
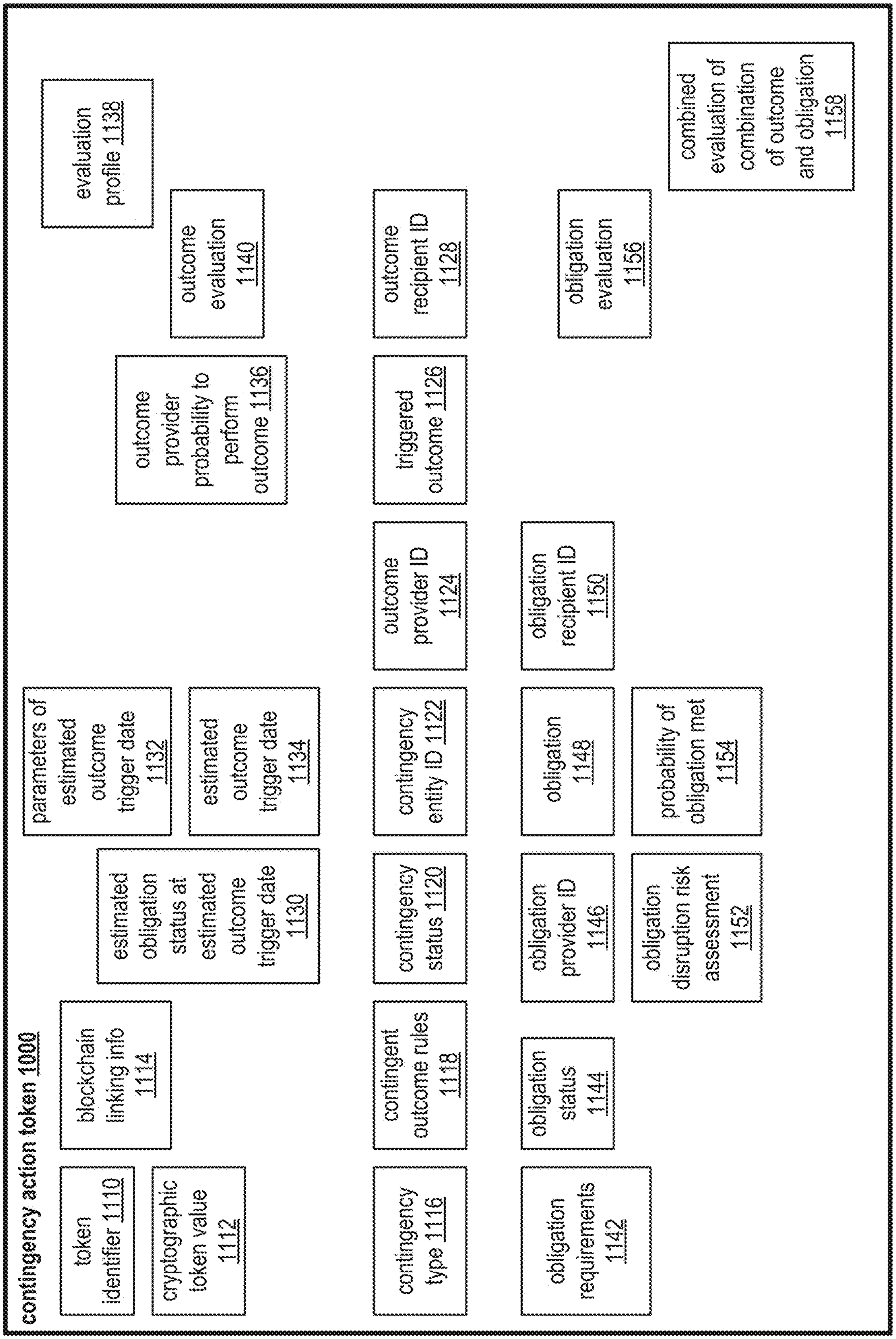

FIG. 18B illustrates an example of elements of the contingency action token 1000 of the example of the method for utilizing the contingent asset token. A token identifier 1110 uniquely identifies the contingency action token 1000. A cryptographic token value 1112 includes one or more of public keys, a cryptographic signature over a portion of the token, a nonce for utilization in a blockchain, and one or more hash values over portions of this token or another of a shared blockchain.

The token further includes blockchain linking information 1114 such as token identifiers and/or links for other tokens of the shared blockchain. A contingency type 1116 indicates a contingency category for the token (e.g., where the contingency, when met, activates the triggered outcome 1126). Contingent outcome rules 1118 set forth how the activation of the triggered outcome is properly enabled. For example, activation only when the obligation status 1144 is positive and a trigger occurs associated with the contingency type.

A contingency status 1120 indicates whether the contingency has been triggered (e.g., yes or no). A contingency entity identifier (ID) 1122 specifies a unique identifier of an entity associated with the contingency, where the contingent outcome rules dictate what happens when the contingency trigger occurs associated with the contingency entity identifier.

An outcome provider ID 1124 indicates an identifier associated with providing of the triggered outcome when activated. The triggered outcome 1126 occurs when activated and in accordance with the contingent outcome rules. An outcome recipient ID 1128 is associated with receiving of the triggered outcome 1126.

Obligation requirements 1142 indicate an obligation and timing by an obligation provider identifier to an obligation recipient identifier. The obligation status 1144 indicates historically whether the obligation has been maintained as associated with the obligation provider ID 1146. The obligation 1148 indicates metrics and/or descriptors associated with an obligation provided in association with the obligation provider ID to an association of the obligation recipient ID 1150.

The contingent action token 1000 further includes elements associated with evaluating portions of the token in accordance with an evaluation profile 1138 (e.g., risk assumptions, historical probabilities and risks of obligations and outcomes). Major portions of the token include the obligation and the triggered outcome. An obligation evaluation 1156 evaluates the obligation by utilizing an obligation disruption risk assessment 1152 that portrays likelihood of disruption of an obligation stream when the obligation includes a series of sub component obligations. The obligation evaluation is further based on a probability of obligation met 1154 wrapping up a risk assessment of an association of the obligation provider ID faithfully providing the obligation to the association of the obligation recipient ID.

An outcome evaluation 1140 provides an evaluation of the triggered outcome based on an estimated obligation status at estimated outcome triggered date 1130 that portrays risk of a negative obligation status at an expected time of the trigger of the triggered outcome. The outcome evaluation is further based on estimating that outcome triggered date 1134 in accordance with parameters of estimated outcome triggered date 1132 (e.g., historical values of trigger date timing and variables correlated to the contingency entity identifier). The outcome evaluation is further based on an outcome provider probability to perform outcome 1136 that assesses whether an association of the outcome provider ID is able to provide the triggered outcome at the estimated outcome trigger date.

The evaluation of the token further includes a rollup of the obligation evaluation and the outcome evaluation in a combined evaluation of combination of outcome and obligation 1158. The combined evaluation provides an all-in preponderance of a present evaluation based on an estimated future that concludes with the trigger outcome. Risks associated with both the obligation and the triggered outcome drive the combined evaluation such that changing of the obligation provider ID can result in an unexpected improvement in the combined evaluation. For example, the outcome evaluation 1140 can rise to an improved evaluation when the obligation provider ID is changed to another obligation provider ID that is associated with a higher probability of obligation met 1154. With that, the estimated obligation status at estimated outcome triggered date 1130 improves driving up the outcome evaluation 1140.

A series of related invention embodiments pertain to finding change outs of one or more of the obligation provider ID and the outcome recipient ID to provide an improved combined evaluation. As a result, a beneficial evaluation increase is provided. As a specific example, the token is originally set up with an original obligation provider ID that is the same as the contingency entity ID, an original outcome recipient ID, and an outcome provider ID that matches the obligation recipient ID. Later, the token is updated to replace the obligation provider ID with another obligation provider ID associated with a higher probability of providing the obligation (e.g., that may or may not include the contingency entity ID). As a result, the outcome evaluation 1140 rises to an improved and unexpected level of the invention embodiment.

Figure 18C:
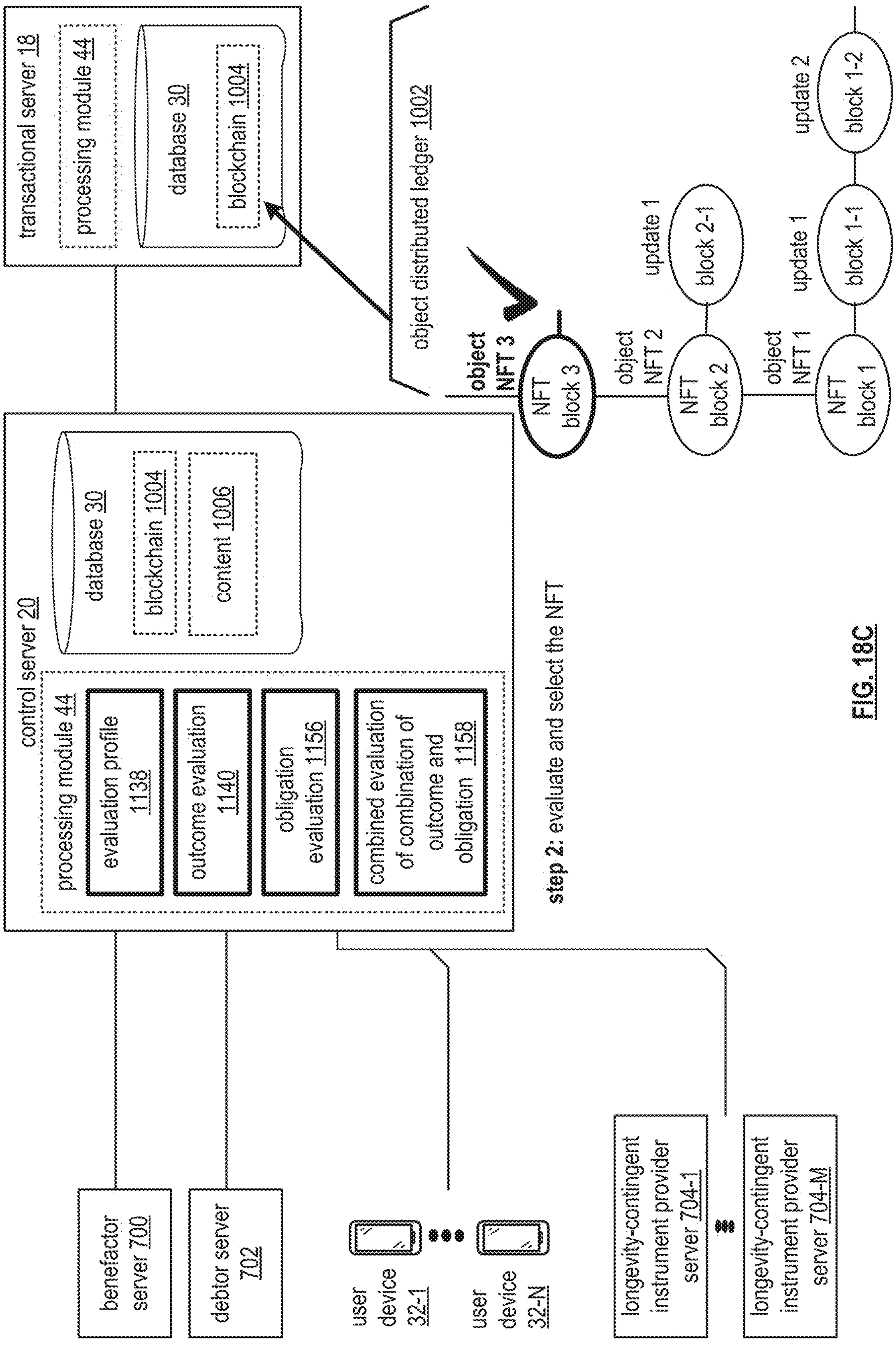

FIG. 18C further illustrates the example of the method for utilizing the contingent asset token, where having identify the NFT that meets the minimum NFT requirements, a second step of the example method includes the control server 20 determining whether to select the NFT based on an evaluation of the NFT with regards to an evaluation profile 1138. A beneficial improvement to the triggered outcome results from a hypothetical change to the obligation provider identifier of the selected NFT. The evaluation of the NFT includes producing the obligation evaluation 1156 based on the evaluation profile 1138. The obligation evaluation 1156 compares the providing of the obligation in accordance with the obligation requirements (e.g., historical and estimated future). The evaluation of the NFT further includes the outcome evaluation 1140. The outcome evaluation 1140 estimates the triggered outcome based on the evaluation profile 1138 (e.g., using risks and historical correlations of the evaluation profile).

The determining whether to select the NFT based on the evaluation of the NFT with regards to the evaluation profile includes a series of sub-steps. A first sub-step includes the processing module 44 of the control server 20 determining the evaluation profile to include a required evaluation performance improvement level. For example, the processing module 44 extracts the evaluation profile 1138 from the recovered NFT. As another example, the processing module 44 generates the evaluation profile based on an external input through a user interface (e.g., a request that includes a specific evaluation performance improvement level.

A second sub-step includes the processing module 44 of the control server 20 comparing the providing of the obligation associated with the original obligation provider identifier to providing of the obligation associated with a hypothetical obligation provider identifier in accordance with the evaluation profile to produce the obligation evaluation. For example, the processing module 44 receives identity and risk levels with regards to a new obligation provider identifier and utilizes that to produce the obligation evaluation (e.g., an improved outcome when a risk level of noncompliance to the obligation is lower for the new obligation provider identifier).

A third sub-step includes the processing module 44 of the control server 20 comparing an estimated trigger outcome when the providing of the obligation is associated with the original obligation provider identifier to a hypothetical estimated trigger outcome when the providing of the obligation is associated with the hypothetical obligation provider identifier in accordance with the evaluation profile to produce the outcome evaluation. For example, the processing module 44 produces the outcome evaluation for the new obligation provider (e.g., with the lower risks of not meeting the obligation) and for an estimated trigger date of the triggered outcome.

A fourth sub-step includes the processing module 44 of the control server 20 indicating to select the NFT when the obligation evaluation and the outcome evaluation satisfies the required evaluation performance improvement level. For example, the processing module 44 indicates to select the NFT when the new obligation provider identifier is a catalyst to meet the required evaluation performance improvement level.

Figure 18D:
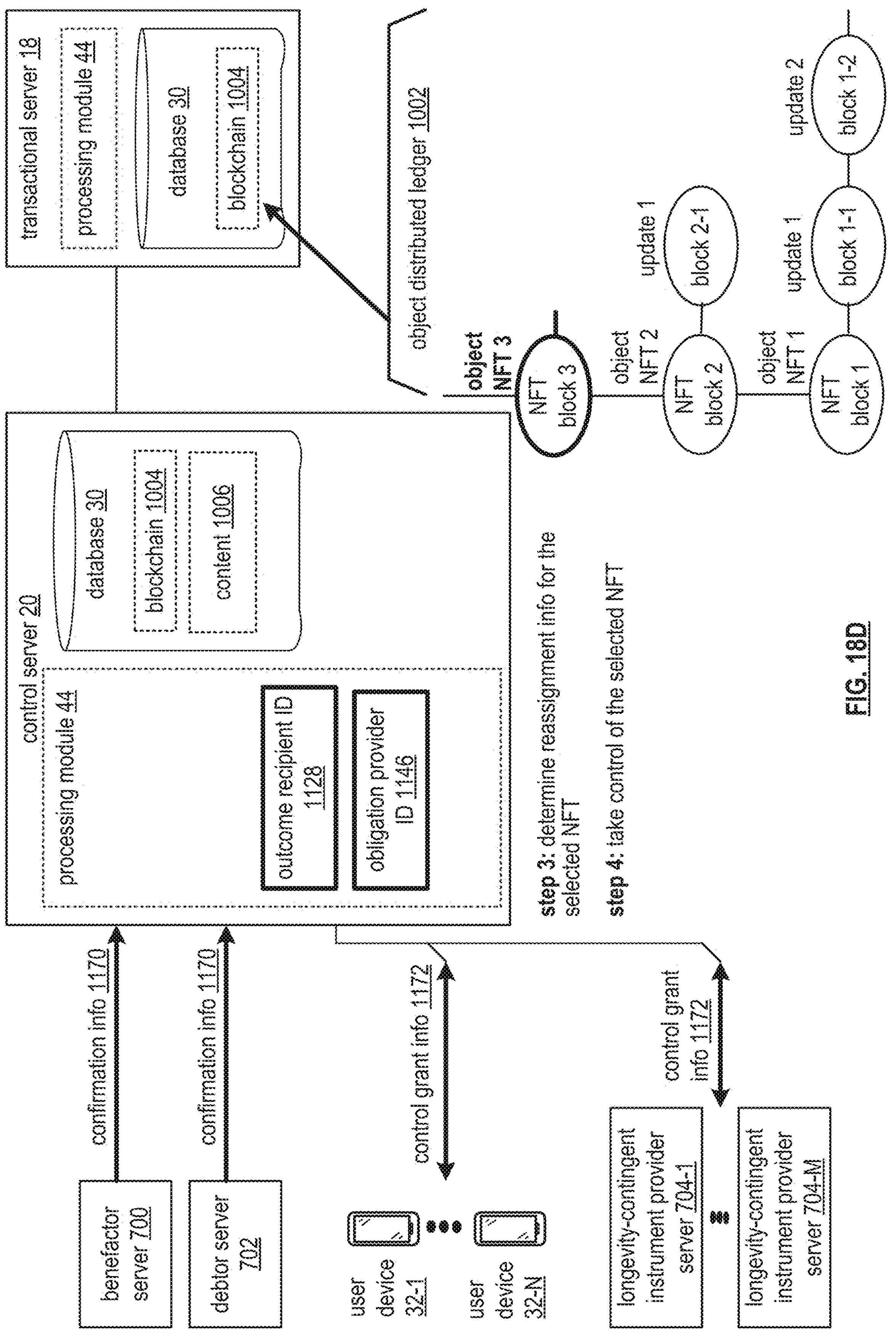

FIG. 18D further illustrates the example of the method for utilizing the contingent asset token, where having selected the NFT to produce a selected NFT, a third step of the example method includes determining reassignment information for the selected NFT. The reassignment information includes a confirmed change of at least one of the obligation provider identifier 1146 and the outcome recipient identifier 1128.

The determining the reassignment information for the selected NFT includes a variety of approaches. A first approach includes identifying a hypothetical obligation provider identifier based on the evaluation of the selected NFT with regards to the evaluation profile to establish a new obligation provider identifier of the reassignment information. For example, the processing module 44 of the control server 20 replaces or adds a hypothetical obligation provider identifier to the obligation provider identifier 1146 based on a previous analysis of the evaluation of the selected NFT. Acquisition of the hypothetical obligation provider identifier includes extracting the identifier from confirmation information 1170 received from another computing device and extraction from content 1006 of the selected NFT.

A second approach to determine the reassignment information includes, when requested, the processing module 44 of the control server 20 modifying the outcome recipient identifier to establish a new outcome recipient identifier of the reassignment information. For example, the processing module 44 extracts the new outcome recipient identifier from the confirmation information 1170.

Having determined the reassignment information, a fourth step of the example method of operation includes the processing module 44 of the control server 20 facilitating taking control of the selected NFT of a blockchain of the object distributed ledger as discussed with reference to FIG. 14C. For example, the processing module 44 exchanges control grant information 1172 with a current controlling entity of the selected NFT to gain the control. For instance, the current controlling entity generates a new block that includes a public key of the processing module 44, the control request from the processing module 44, and a cryptographic signature over a portion of the block utilizing a private key of the current controlling entity.

Figure 18E:
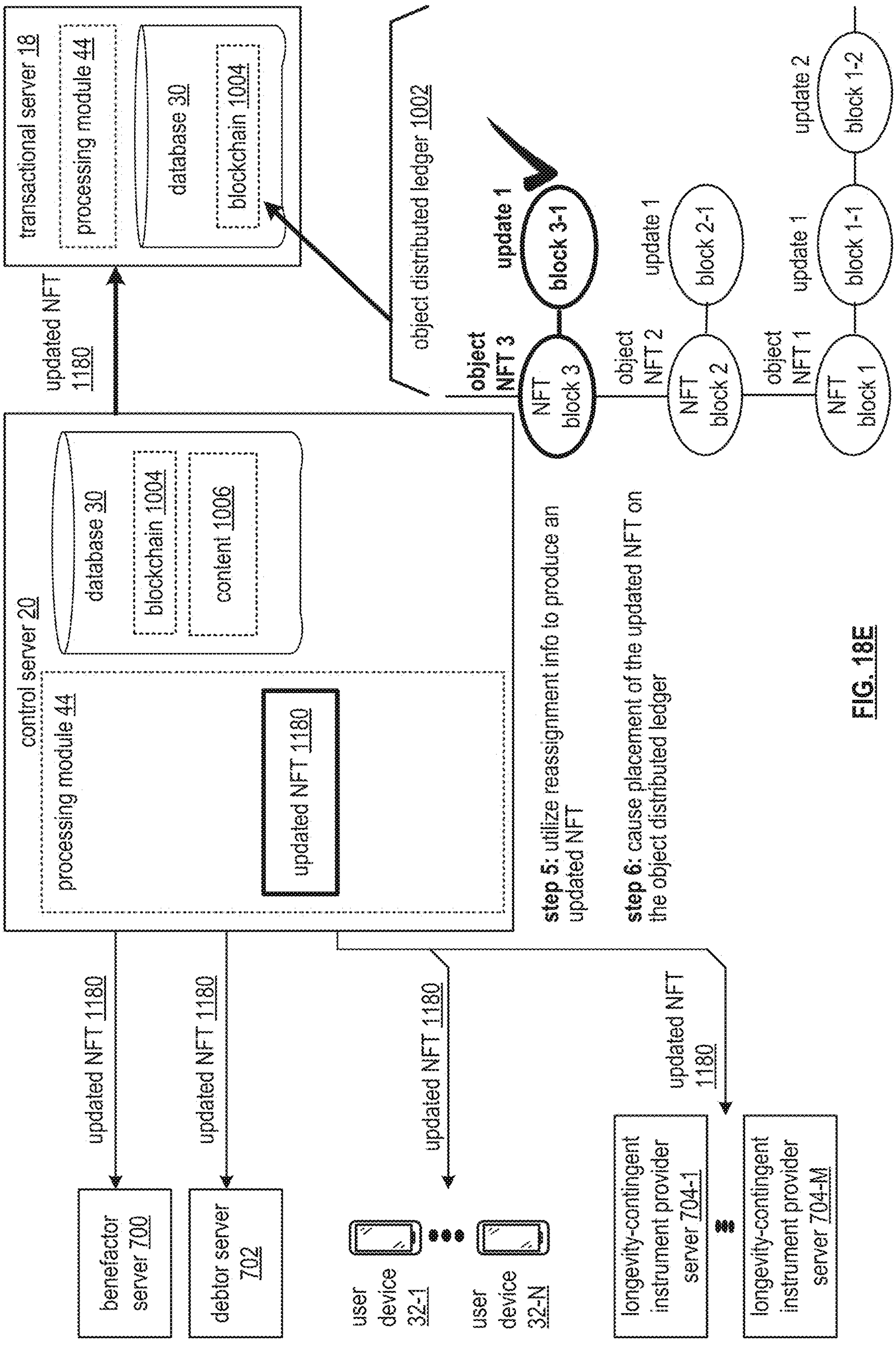

FIG. 18E further illustrates the example of the method for utilizing the contingent asset token, where having taking control of the selected NFT, a fifth step of the example method includes the processing module 44 of the control server 20 updating the selected NFT utilizing the reassignment information for the NFT to produce an updated NFT 1180. The updating the selected NFT utilizing the reassignment information for the selected NFT to produce the updated NFT 1180 includes a series of sub-steps. A first sub-step includes the processing module 44 obtaining the selected NFT. For example, the processing module 44 recovers the selected NFT from the blockchain 1004 of the database 30 of the control server 20 when a local copy of the blockchain is up-to-date. As another example, the processing module 44 requests the selected NFT from the transactional server 18.

A second sub-step includes the processing module 44 replacing corresponding elements of the selected NFT with at least a portion of the reassignment information to produce the updated NFT 1180. For example, the processing module 44 replaces the obligation provider identifier 1146 with a new obligation provider identifier such that the beneficial valuation level increase is realized subsequently for the triggered outcome upon triggering and when conditions of the contingent outcome rules have been satisfied.

Having produced the updated NFT 1180, a sixth step of the example method of operation includes the processing module 44 of the control server 20 causing generation of a new block affiliated with the updated NFT via the blockchain of the object distributed ledger. The new block includes the updated NFT.

The causing generation of the new block affiliated with the updated NFT via the blockchain of the object distributed ledger includes a series of sub-steps. A first sub-step includes the processing module 44 of the control server 20 determining whether to indirectly or directly update the object distributed ledger as previously discussed (e.g., using a local copy of the blockchain when available).

When indirectly updating the object distributed ledger, a second sub-step includes the processing module 44 issuing a blockchain update request to an object ledger computing device of the computing system serving as a blockchain node of the object distributed ledger. The blockchain update request includes the updated NFT 1180. For example, the processing module 44 of the control server 20 sends the updated NFT 1180 to the transactional server 18 such that the transactional server 18 places an update 1 block 3-1 on the blockchain connected to the NFT as illustrated in FIG. 18E.

When directly updating the object distributed ledger, the second sub-step includes the processing module 44 obtaining a copy of the object distributed ledger. For example, the processing module 44 recovers the object distributed ledger from the blockchain 1004 of the database 30 of the control server 20. Having obtained the copy of the object distributed ledger, the second sub-step further includes hashing content of the updated NFT utilizing a receiving public key of the object distributed ledger to produce a next transaction hash value. For example, the control module 44 generates a hash value utilizing a cryptographic algorithm over the content of the updated NFT using a public key in possession of receiving entities for subsequent access of the blockchain to produce the next transaction hash value.

Having produced the next transaction hash value, the second sub-step further includes encrypting the next transaction hash value utilizing a private key of the computing device to produce a next transaction signature. For example, the processing module 44 utilizes a cryptographic encryption algorithm to encrypt the next transaction hash value utilizing the private key of the processing module 44 to produce the next transaction signature.

Having produced the next transaction signature, the second sub-step further includes generating a next block of the blockchain of the object distributed ledger to include the content of the updated NFT and the next transaction signature. For example, the processing module 44 populates the cryptographic token value 1112 of the next block with the next transaction signature and populates all the other content fields with the content of the updated NFT to produce the next block.

Having produced the next block, the second sub-step further includes causing inclusion of the next block as the new block in the object distributed ledger. For example, the processing module 44 of the control server 20 adds the block 3-1 as the update 1 associated with the selected NFT on the object distributed ledger 1002 as illustrated in FIG. 18E by updating the blockchain 1004 and the database 30 of the control server 20 and/or the transactional server 18 and other transactional servers serving as blockchain nodes supporting the object distributed ledger.

Alternatively, or in addition to, the processing module 44 of the control server 20 sends the updated NFT 1182 one or more of the benefactor server 700, the debtor server 702, one or more of the user devices 32-1 through 32-N, and one or more of the longevity-contingent instrument provider servers 704-1 through 704-M.

The method described above module can alternatively be performed by various modules of the computing system or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the computing system, cause the one or more computing devices to perform any or all of the steps described above.

Figure 19A:
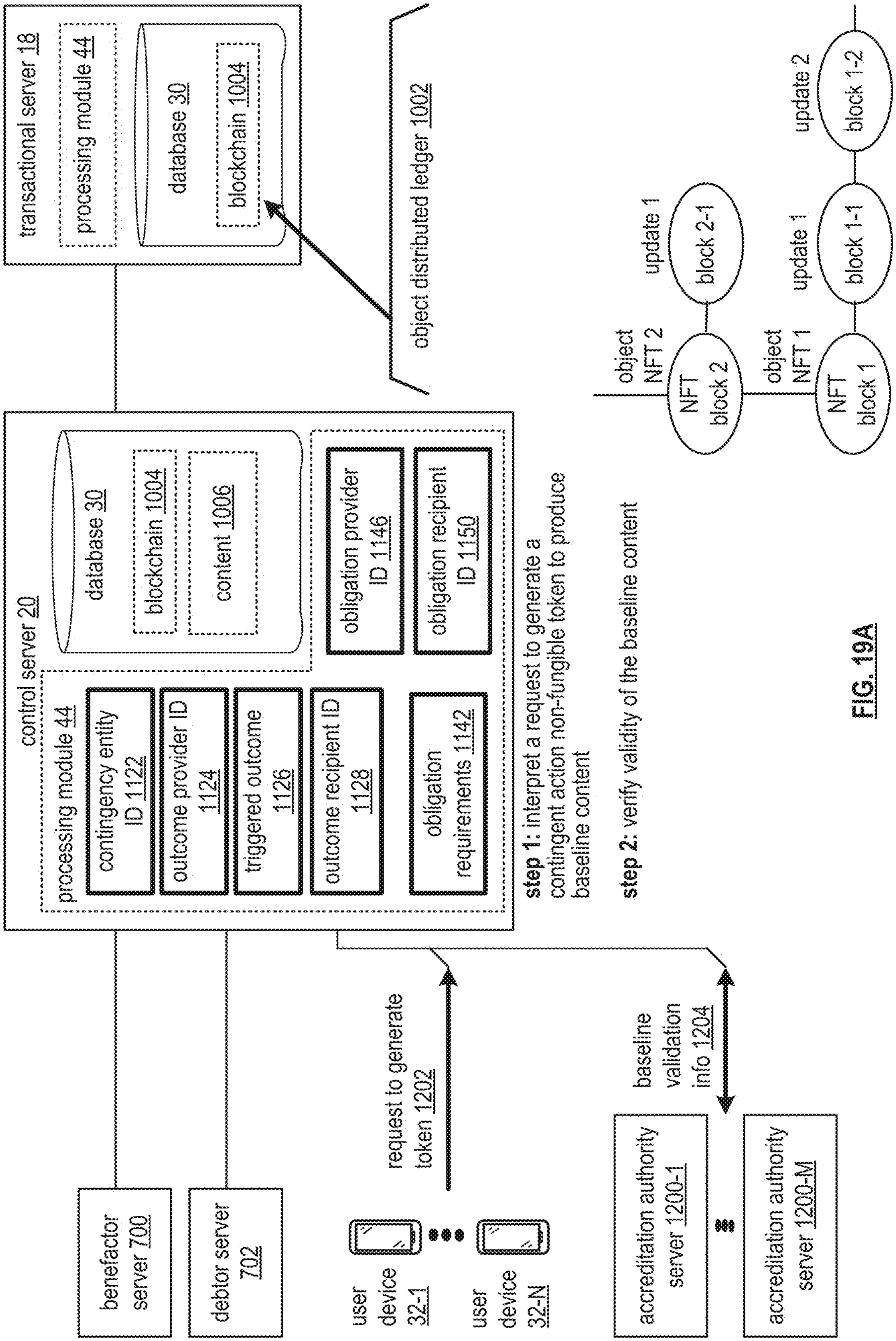
FIGS. 19A-19B are schematic block diagrams of another embodiment of a computing system illustrating another embodiment of a method for generating a contingent action token within the computing system in accordance with the present invention.
Figure 19B:
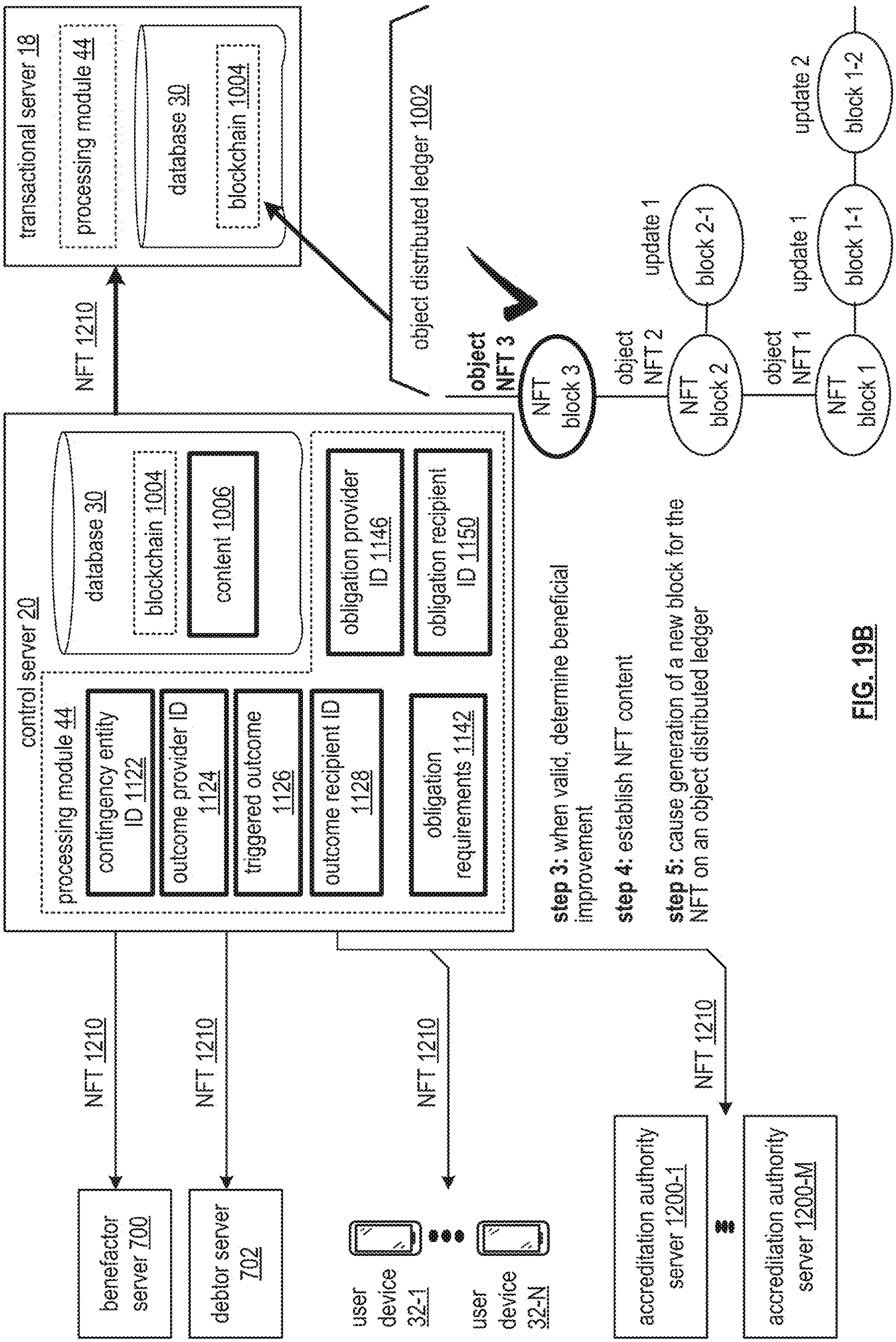

FIGS. 19A-19B are schematic block diagrams of another embodiment of a computing system illustrating another embodiment of a method for generating a contingent action token within the computing system. The computing system includes the benefactor server 700 of FIG. 13A, the debtor server 702 of FIG. 13A, the user devices 32-1 through 32-N of FIG. 13A, accreditation authority servers 1200-1 through 1200-M, the control server 20 of FIG. 1, and the transactional server 18 of FIG. 1. In an embodiment, the accreditation authority server is affiliated with a corresponding longevity-contingent instrument provider server 704 of FIG. 13A. The control server 20 includes the processing module 44 of FIG. 1 and the database 30 of FIG. 1. The transactional server 18 includes the processing module 44 FIG. 1 and the database 30 of FIG. 1 and functions as a blockchain node of a blockchain 1004 associated with an object distributed ledger 1002.

FIG. 19A illustrates an example method of operation for generating the contingent action token, where a first step of the example method includes the control server 20 interpreting a request to generate a non-fungible token (NFT) 1202 as a contingency action token for the object distributed ledger 1002 to produce baseline content of content 1006 that includes an obligation provider identifier (ID) 1146 and an outcome recipient ID 1128. The obligation provider ID is associated with providing of an obligation tied to an obligation recipient ID 1150 in accordance with obligation requirements 1142. The outcome recipient ID 1128 is associated with a result of a triggered outcome 1126 tied to an outcome provider ID 1124 in accordance with contingent outcome rules and an obligation status. A positive obligation status indicates that the obligation has historically been provided in accordance with the obligation requirements 1142. The format of the contingent action token 1000 is discussed in greater detail with reference to FIG. 18B.

The baseline content for the contingency action token further includes a contingency entity identifier (ID) 1122, an outcome provider ID 1124, a value of a triggered outcome 1126, the outcome recipient ID 1128, the obligation requirements 1142, the obligation provider ID 1146, and the obligation recipient ID 1150. The interpreting the request to generate the NFT to produce the baseline content includes a series of sub-steps. A first sub-step includes the processing module 44 of the control server 20 extracting, from the request to generate the NFT 1202, one or more of the contingency entity ID 1122, the outcome provider ID 1124, the value of the result of the triggered outcome 1126, the obligation requirements 1142, and the obligation recipient ID 1150.

A second sub-step includes the processing module 44 determining the outcome recipient ID 1128 based on the request to generate the NFT 1202 and benefactor information (e.g., which entity or entities is to receive the result of the triggered outcome 1126). For example, the processing module 44 interprets the benefactor information to identify an entity that is to receive the result of the triggered outcome and to establish an identifier of the entity as the outcome recipient ID 1128.

A third sub-step includes the processing module 44 determining the obligation provider ID 1146 based on the request to generate the NFT and debtor information (e.g., which entity or entities are to provide, at least in part, the obligation in accordance with the obligation requirements 1142). For example, the processing module 44 interprets the debtor information to identify an entity that is to provide the obligation and to establish an identifier of the entity as the obligation provider ID 1146.

Having produced the baseline content, a second step of the example method of operation includes the processing module 44 verifying with an accreditation authority computing device of the computing system, validity of the baseline content. In an embodiment, one or more of the accreditation authority servers 1200-1 through 1200-M provide the accreditation authority computing device.

The verifying the validity of the baseline content includes a series of sub-steps. A first sub-step includes the processing module 44 of the control server 20 identifying the accreditation authority computing device based on a first identified corresponding accreditation authority associated with the obligation recipient ID 1150. For example, the control server 20 accesses the database 30 to retrieve identity of the accreditation authority server 1200-1 that is affiliated with the obligation provider ID.

A second sub-step includes the processing module 44 obtaining baseline validation information 1204 from the accreditation authority computing device for the baseline content. For example, the processing module 44 issues at least some of the baseline content to the accreditation authority server 1200-1 and receives the baseline validation information 1204 in response.

A third sub-step includes the processing module 44 indicating that the baseline content is valid when the baseline validation information is substantially the same as the baseline content. For example, the processing module 44 compares the received baseline validation information 1204 to the baseline content and indicates that the baseline content is valid when the comparison indicates a match of at least a minimum set of items for matching (e.g., outcome provider ID 1124, and obligation recipient ID 1150).

FIG. 19B further illustrates the example method of operation of the generating of the contingent action token, where having verified the baseline content as valid, a third step includes the processing module 44 of the control server 20 determining whether a beneficial improvement is provided to the result of the triggered outcome 1126 when a hypothetical change to the obligation provider ID 1146 is made. The hypothetical change includes utilizing a different obligation provider ID with a different risk profile as compared to a baseline risk profile associated with a present obligation provider ID.

The determining whether the beneficial improvement is provided includes producing an obligation evaluation based on an evaluation profile. The obligation evaluation compares the providing of the obligation in accordance with the obligation requirements with the hypothetical change to the obligation provider ID. The determining further includes producing an outcome evaluation. The outcome evaluation estimates the result of the triggered outcome based on the evaluation profile when the hypothetical change to the obligation provider ID is made. For example, an improvement to the result of the triggered outcome may occur when a lower risk profile of the hypothetical change to the obligation provider ID is implemented.

The determining whether the beneficial improvement is provided to the result of the triggered outcome when the hypothetical change to the obligation provider ID is made includes a series of sub-steps. A first sub-step includes the processing module 44 of the control server 20 generating an obligation disruption risk assessment 1152 for the (present) obligation provider ID 1146 based on the evaluation profile to produce a baseline obligation evaluation. For example, the processing module 44 analyzes risks associated with obligation fulfillment associated with the present obligation provider ID.

A second sub-step includes the processing module 44 generating another obligation disruption risk assessment for the hypothetical change to the obligation provider ID based on the evaluation profile to produce a hypothetical baseline obligation evaluation. For example, the processing module 44 analyzes risks associated with the obligation fulfillment associated with the hypothetical change to the obligation provider ID.

A third sub-step includes the processing module 44 generating a baseline outcome evaluation to include an estimate of the result of the triggered outcome utilizing the baseline obligation evaluation. For example, the processing module 44 computes the result of the triggered outcome when obligation risks associated with the present obligation provider ID are considered.

A fourth sub-step includes the processing module 44 generating the outcome evaluation to include another estimate of the result of the triggered outcome utilizing the hypothetical baseline obligation evaluation. For example, the processing module 44 computes another result of the triggered outcome when obligation risks associated with the hypothetical change to the obligation provider ID are considered.

A fifth sub-step includes the processing module 44 indicating that the beneficial improvement is provided to the result of the triggered outcome when the hypothetical change to the obligation provider ID is made when the outcome evaluation is greater than the baseline outcome evaluation. For example, the processing module 44 compares the results of the triggered outcome and indicates the beneficial improvement is provided when the triggered outcome is greater utilizing the hypothetical change to the obligation provider ID (e.g., due to lowered risks).

Having determined the beneficial improvement when the baseline content as valid, a fourth step of the example method of operation includes the processing module 44 of the control server 20 establishing NFT content based on the outcome evaluation to include the baseline content. The establishing the NFT content based on the outcome evaluation to include the baseline content includes a series of sub-steps. A first sub-step includes the processing module 44 generating the NFT content to include the baseline content. For example, the processing module 44 includes the contingency entity ID 1122, the outcome provider ID 1124, the triggered outcome 1126, the outcome recipient ID 1128, the obligation requirements 1142, the obligation provider ID 1146, and the obligation recipient ID 1150 in the NFT content.

A second sub-step includes the processing module 44 updating the NFT content to replace the obligation provider ID 1146 with an updated obligation provider ID associated with the hypothetical change to the obligation provider ID when the beneficial improvement is provided to the result of the triggered outcome from the hypothetical change to the obligation provider ID.

Having established the NFT content, a fifth step of the example method of operation includes the processing module 44 of the control server 20 causing generation of a new block affiliated with the NFT via the blockchain 1004 of the object distributed ledger 1002 as discussed with reference to FIG. 14C. The new block includes the NFT content. The causing generation of the new block includes a series of sub-steps. A first sub-step includes the processing module 44 determining whether to indirectly or directly update the object distributed ledger as previously discussed (e.g., using a local copy of the blockchain when available).

When indirectly updating the object distributed ledger, a second sub-step includes the processing module 44 of the control server 20 issuing a blockchain update request to an object ledger computing device of the computing system serving as a blockchain node of the object distributed ledger. The blockchain update request includes the NFT 1210. For example, the processing module 44 sends the updated NFT 1210 to the transactional server 18 such that the transactional server 18 places a NFT3 block 3 on the blockchain connected to the NFT 2 as illustrated in FIG. 19B.

When directly updating the object distributed ledger, the second sub-step includes the processing module 44 obtaining a copy of the object distributed ledger. For example, the processing module 44 recovers the object distributed ledger from the blockchain 1004 of the database 30 of the control server 20. Having obtained the copy of the object distributed ledger, the second sub-step further includes hashing NFT content of the NFT utilizing a receiving public key of the object distributed ledger to produce a next transaction hash value. For example, the control module 44 generates a hash value utilizing a cryptographic algorithm over the NFT content of the NFT using a public key in possession of receiving entities for subsequent access of the blockchain to produce the next transaction hash value.

Having produced the next transaction hash value, the second sub-step further includes encrypting the next transaction hash value utilizing a private key of the computing device to produce a next transaction signature. For example, the processing module 44 utilizes a cryptographic encryption algorithm to encrypt the next transaction hash value utilizing the private key of the processing module 44 to produce the next transaction signature.

Having produced the next transaction signature, the second sub-step further includes generating a next block of the blockchain of the object distributed ledger to include the NFT content of the NFT and the next transaction signature. For example, the processing module 44 populates the cryptographic token value of the next block with the next transaction signature and populates all the other content fields with the content of the NFT to produce the next block.

Having produced the next block, the second sub-step further includes causing inclusion of the next block as the new block in the object distributed ledger. For example, the processing module 44 of the control server 20 adds the block 3 on the object distributed ledger 1002 as illustrated in FIG. 19B by updating the blockchain 1004 and the database 30 of the control server 20 and/or the transactional server 18 and other transactional servers serving as blockchain nodes supporting the object distributed ledger.

Alternatively, or in addition to, the processing module 44 of the control server 20 sends the NFT 1210 to one or more of the benefactor server 700, the debtor server 702, one or more of the user devices 32-1 through 32-N, and one or more of the accreditation authority servers 1200-1 through 1200-M.

The method described above module can alternatively be performed by various modules of the computing system or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the computing system, cause the one or more computing devices to perform any or all of the steps described above.

FIGS. 20A-20B are schematic block diagrams of another embodiment of a computing system illustrating another embodiment of a method for utilizing a contingent action token within the computing system. The computing system includes the benefactor server 700 of FIG. 13A, the debtor server 702 of FIG. 13A, the user devices 32-1 through 32-N of FIG. 13A, accreditation authority servers 1200-1 through 1200-M, the control server 20 of FIG. 1, and the transactional server 18 of FIG. 1. In an embodiment, the accreditation authority server is affiliated with a corresponding longevity-contingent instrument provider server 704 of FIG. 13A. The control server 20 includes the processing module 44 of FIG. 1 and the database 30 of FIG. 1. The transactional server 18 includes the processing module 44 FIG. 1 and the database 30 of FIG. 1 and functions as a blockchain node of a blockchain 1004 associated with an object distributed ledger 1002.

FIG. 20A illustrates an example of the method for utilizing the contingent action token, where a first step of the example method includes the control server 20 interpreting a contingency status message from another computing device that indicates the change of contingency status for a contingency entity identifier (ID) 1122 common to the contingency status message and a first contingency action token. For example, the processing module 44 of the control server 20 receives contingency status 1120 from the benefactor server 700, the debtor server 702, the user devices 32-1 through 32-N and the accreditation authority servers 1200-1 through 1200-M.

Having interpreted the contingency status message that indicates the change of contingency status, a second step of the example method of operation includes obtaining a first block 1209 of the blockchain from the object distributed ledger based on the contingency entity ID. For example, the processing module 44 of the control server 20 recovers the first block 1209 (e.g., NFT block 3 as illustrated in FIG. 20A) that includes a matching contingency entity ID from the blockchain 1004 of the object distributed ledger 1002.

Having produced the change of contingency status and obtained the first block, the second step of the further example method of operation includes obtaining, in accordance with a securely passing process, control over the first block of the blockchain of the object distributed ledger in response to the change of contingency status of the first block. The first block is associated with a first contingency action token of a multitude of contingency action tokens.

The first contingency action token includes an obligation provider identifier (ID) and an outcome recipient ID 1128. The obligation provider ID is associated with providing of an obligation tied to an obligation recipient ID in accordance with obligation requirements. The outcome recipient ID is associated with a result of a triggered outcome tied to an outcome provider ID in accordance with contingent outcome rules and an obligation status 1144. A positive obligation status indicates that the obligation has historically been provided in accordance with the obligation requirements. Only a device possessing control over the first block of the blockchain may modify the first block of the blockchain.

The securely passing process includes obtaining control as either an originator of the first block and being authorized as to possess control from a current entity that possesses the control. The current owner includes a public key of the next owner in a transaction section of the block and generates the signature over the transaction section utilizing both the private key of the current owner device and the public key of the next owner device as discussed in greater detail with reference to FIG. 14C.

The obtaining, in accordance with the securely passing process, the control over the first block includes a series of sub-steps. A first sub-step includes the processing module 44 of the control server 20 receiving an indication of the control over the first block from a requesting computing entity. For example, the processing module 44 receives contingency status 1120, where the request includes the first block that includes a private key associated with the benefactor server 700.

A second sub-step includes establishing the identity of the computing device (e.g., the control server 20) to have the control over the first block of the blockchain. For example, the processing module 44 modifies the first block to include the identity of the control server 20 as having the control over the first block.

Having obtained control over the first block, a third step of the example method of operation includes determining whether the triggered outcome 1126 is valid for the first contingency action token based on the change of contingency status 1120 of the first block. The determining whether the triggered outcome 1126 is valid for the first contingency action token based on the change of contingency status 1120 of the first block includes a series of sub-steps. A first sub-step includes verifying that the outcome recipient ID 1128 is associated with the result of the triggered outcome 1126 tied to the outcome provider ID 1124 in accordance with contingent outcome rules 1118. For example, the processing module 44 of the control server 20 matches the outcome recipient ID of the contingency status 1120 to the outcome recipient ID of the first block and matches the triggered outcome to the outcome provider ID.

A second sub-step includes verifying that the positive obligation status indicates that the obligation has historically been provided in accordance with the obligation requirements. For example, the processing module 44 accesses the obligation status of the first block for the contingency action token to verify that the obligation has been historically made in a positive fashion in accordance with the obligation requirements (e.g., completed timely transfer of monthly payment obligations).

FIG. 20B further illustrates the example method of operation of the utilization of the contingency action token, where, having determined that the triggered outcome is valid, a fourth step includes the control server 20, when the triggered outcome is valid for the first contingency action token, updating the first contingency action token to indicate that the triggered outcome is valid for the first contingency action token to produce an updated first contingency action token. For example, the processing module 44 of the control server 20 sets a flag in the first block to indicate that the triggered outcome is valid.

Having produced the updated first contingency action token, a fifth step of the example method of operation includes the control server 20 generating, by the computing device, a new block for the blockchain of the object distributed ledger in accordance with the securely passing process to represent the updated first contingency action token. The generating the new block includes a series of sub-steps.

A first sub-step includes the processing module 44 determining whether to indirectly or directly update the object distributed ledger as previously discussed (e.g., using a local copy of the blockchain when available).

When indirectly updating the object distributed ledger, a second sub-step includes the processing module 44 of the control server 20 issuing a blockchain update request to an object ledger computing device of the computing system serving as a blockchain node of the object distributed ledger. The blockchain update request includes the new block 1211. For example, the processing module 44 sends the updated new block 1211 to the transactional server 18 such that the transactional server 18 places a block 3-1 on the blockchain connected to the NFT 3 as illustrated in FIG. 20B.

When directly updating the object distributed ledger, the second sub-step includes the processing module 44 obtaining a copy of the object distributed ledger. For example, the processing module 44 recovers the object distributed ledger from the blockchain 1004 of the database 30 of the control server 20. Having obtained the copy of the object distributed ledger, the second sub-step further includes hashing content of the updated first contingency action token utilizing a receiving public key of the object distributed ledger to produce a next transaction hash value. For example, the control module 44 generates a hash value utilizing a cryptographic algorithm over the content of the updated first contingency action token using a public key in possession of receiving entities for subsequent access of the blockchain to produce the next transaction hash value.

Having produced the next transaction hash value, the second sub-step further includes encrypting the next transaction hash value utilizing a private key of the computing device to produce a next transaction signature. For example, the processing module 44 utilizes a cryptographic encryption algorithm to encrypt the next transaction hash value utilizing the private key of the processing module 44 to produce the next transaction signature.

Having produced the next transaction signature, the second sub-step further includes generating a next block of the blockchain of the object distributed ledger to include the content of the updated first contingency action token and the next transaction signature. For example, the processing module 44 populates the cryptographic token value of the next block with the next transaction signature and populates all the other content fields with the content of the updated first contingency action token to produce the next block.

Having produced the next block, the second sub-step further includes causing inclusion of the next block as the new block in the object distributed ledger. For example, the processing module 44 of the control server 20 adds the block 3-1 on the object distributed ledger 1002 as illustrated in FIG. 20B by updating the blockchain 1004 and the database 30 of the control server 20 and/or the transactional server 18 and other transactional servers serving as blockchain nodes supporting the object distributed ledger.

Alternatively, or in addition to, the processing module 44 of the control server 20 sends the new block 1211 to one or more of the benefactor server 700, the debtor server 702, one or more of the user devices 32-1 through 32-N, and one or more of the accreditation authority servers 1200-1 through 1200-M. Alternatively or in addition to, having generated the new block, in a sixth step of the example method of operation the control server 20 securely passes control over the new block via the object distributed ledger to another computing device when the new block is further processed to complete the triggered outcome. For example, the processing module 44 of the control server 20 utilizes the process discussed with reference to FIG. 14C to pass control of the new block to the other computing device when the other computing device is responsible to complete payment to the outcome recipient ID 1128 for the triggered outcome 1126.

The method described above module can alternatively be performed by various modules of the computing system or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the computing system, cause the one or more computing devices to perform any or all of the steps described above.

FIGS. 21A-21D are schematic block diagrams of an embodiment of a computing system illustrating an embodiment of a method for selecting a contingent action token within the computing system. The computing system includes the benefactor server 700 of FIG. 13A, the debtor server 702 of FIG. 13A, the user devices 32-1 through 32-N of FIG. 13A, the longevity-contingent instrument provider servers 704-1 through 704-M of FIG. 13A, the control server 20 of FIG. 1, and the transactional server 18 of FIG. 1.

The control server 20 includes the processing module 44 of FIG. 1 and the database 30 of FIG. 1. The benefactor server 700 may be further associated with an outcome recipient identifier 1128 as further discussed below. The debtor server 702 may be further associated with an obligation provider identifier 1146 as further discussed below. The longevity-contingent instrument provider servers 704-1 through 704-M may further be associated with one or more of an outcome provider identifier 1124 and an obligation recipient identifier 1150 as further discussed below. The transactional server 18 includes the processing module 44 FIG. 1 and the database 30 of FIG. 1 and functions as a blockchain node of a blockchain 1004 associated with an object distributed ledger 1002.

Figure 21A:
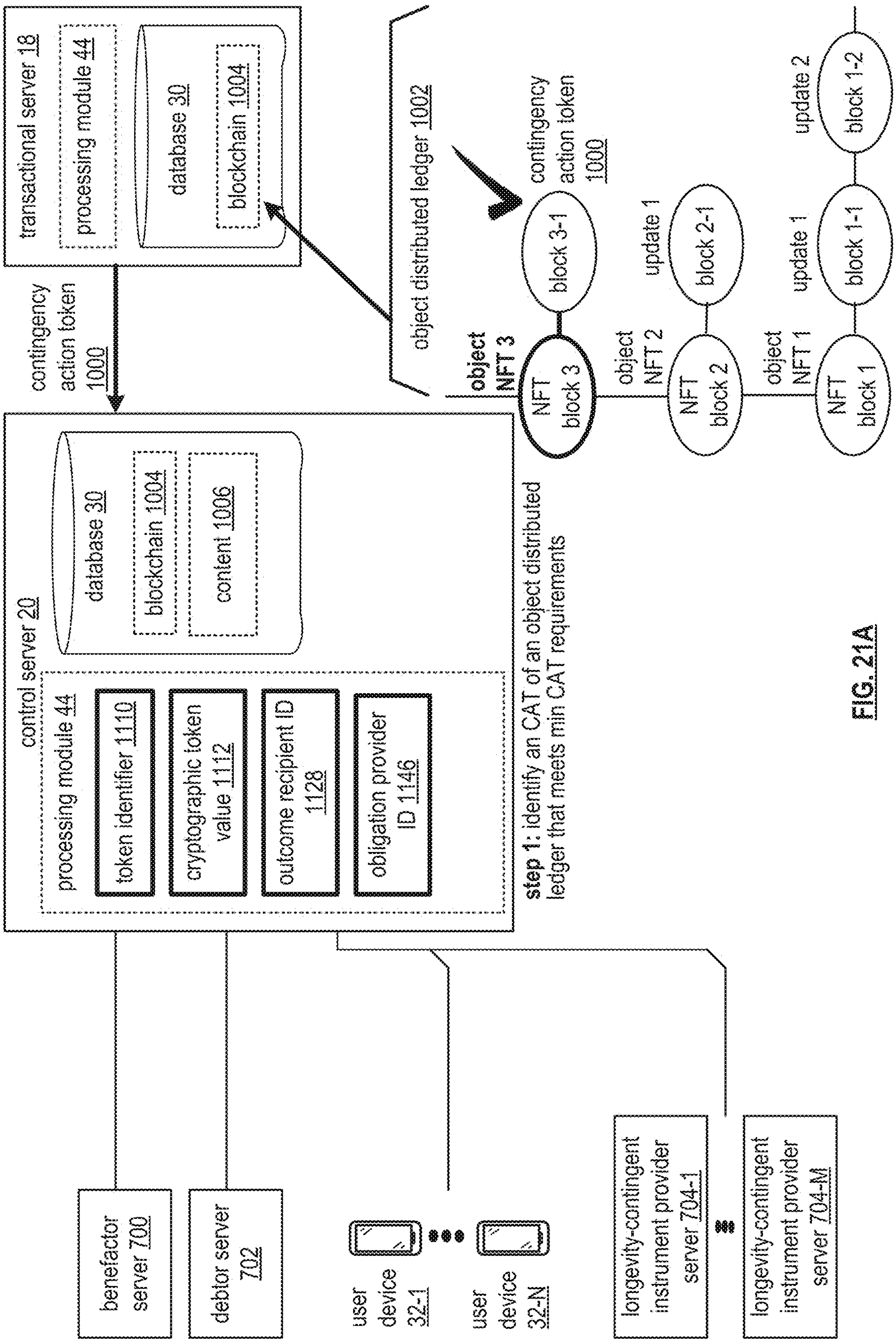

FIG. 21A illustrates an example of the method for selecting the contingent action token, 1000 where a first step of the example method includes the control server 20 identifying the contingency-action token (CAT) of the object distributed ledger 1002 that meets minimum CAT requirements. The CAT includes one of a non-fungible token (NFT) and another token linked to the NFT by the object distributed ledger when the CAT is not the NFT s illustrated in FIG. 18A. Example content of the contingent action token 1000 is discussed in greater detail with reference to FIG. 18B.

The minimum CAT requirements include a variety of requirements. A first requirement includes a recovered cryptographic token value 1112 of the CAT matches a calculated cryptographic token value of the CAT. A second requirement includes an obligation provider identifier record of the CAT that includes an original obligation provider identifier 1146 of the CAT when the NFT was initially generated. The obligation provider identifier 1146 is associated with providing of an obligation 1148 tied to an obligation recipient identifier 1150 in accordance with obligation requirements 1142. A positive obligation status 1144 indicates that the obligation 1148 has historically been provided in accordance with the obligation requirements 1142.

A third requirement includes an outcome recipient identifier record of the CAT that includes an original outcome recipient identifier of the NFT when the NFT was initially generated. The outcome recipient identifier 1128 is associated with a result of a triggered outcome 1126 tied to an outcome provider identifier 1124 in accordance with contingent outcome rules 1118 and the positive obligation status 1144. A contingency status 1120 indicates whether the triggered outcome 1126 has been triggered for a contingency entity identifier 1122 in accordance with the contingent outcome rules 1118.

The identifying the CAT of the object distributed ledger that meets the minimum CAT requirements includes a series of sub-steps. A first sub-step includes the processing module 44 of the control server 20 determining whether to indirectly or directly access the object distributed ledger. For example, the processing module 44 determines to indirectly access the object distributed ledger when the blockchain 1004 is not available in the database 30 of the control server 20 and is available in the database 30 of the transactional server 18. As another example, the processing module 44 of the control server 20 determines to directly access the object distributed ledger when the blockchain 1004 is available within the database 30 of the control server 20.

When indirectly accessing the object distributed ledger, a second sub-step of the identifying of the CAT includes the processing module 44 of the control server 20 issuing a CAT access request to the transactional server 18 (e.g., an object ledger computing device of the computing system serving as a blockchain node of the object distributed ledger). The CAT access request includes a representation of the minimum CAT requirements. The second sub-step further includes the processing module 44 of the control server 20 extracting a CAT identifier of the CAT from a CAT access response from the transactional server 18, where the transactional server 18 accesses the object distributed ledger 1002 to identify an NFT block 3 and/or a linked block 3-1 of the blockchain as the CAT as illustrated in FIG. 21A.

When directly accessing the object distributed ledger, the second sub-step of the identifying of the CAT includes the processing module 44 of the control server 20 obtaining a copy of the object distributed ledger (e.g., recover the blockchain 1004 from the database 30 of the control server 20). The second sub-step further includes the processing module 44 of the control server 20 indicating the CAT identifier of the CAT when detecting a block of the copy of the object distributed ledger that matches the representation of the minimum CAT requirements (e.g., original obligation provider identifier and original outcome recipient identifier or a linked identifiers subsequent to the originals).

Having obtained the CAT, a third sub-step of the identifying of the CAT that meets the minimum CAT requirements includes the processing module 44 of the control server 20 verifying that the recovered cryptographic token value 1112 of the CAT matches the calculated cryptographic token value of the CAT. For example, the processing module 44 produces the calculated cryptographic token value of the CAT over a corresponding content portion of the obtained CAT and compares that calculated value to the recovered cryptographic token value 1112. When the cryptographic token values are the same, the processing module 44 indicates that the CAT that meets the minimum CAT requirements has been identified (e.g., by the token identifier 1110).

Figure 21B:
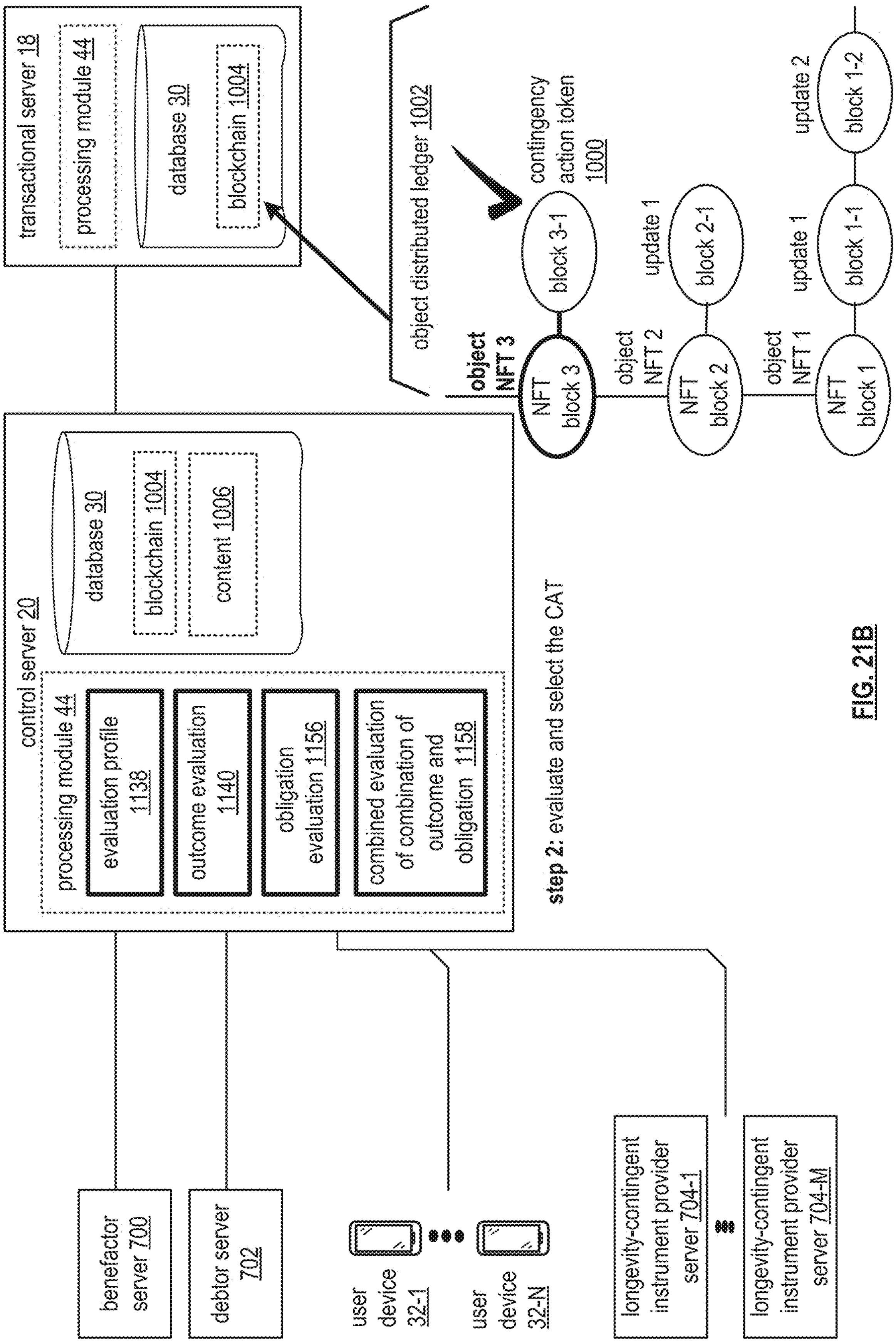

FIG. 21B further illustrates the example of the method for selecting the contingent asset token, where having identified the CAT that meets the minimum CAT requirements, a second step of the example method includes the control server 20 determining whether to select the CAT based on an evaluation of the CAT with regards to an evaluation profile 1138. A beneficial improvement to a present estimate of the triggered outcome results from a hypothetical change to the obligation provider identifier of the selected CAT. The evaluation of the CAT includes producing the obligation evaluation 1156 based on the evaluation profile 1138 (e.g., using risks and historical correlations of the evaluation profile). The obligation evaluation 1156 compares the providing of the obligation in accordance with the obligation requirements (e.g., historical and estimated future). The evaluation of the CAT further includes the outcome evaluation 1140. The outcome evaluation 1140 produces the present estimate of the triggered outcome based on the evaluation profile.

The determining whether to select the CAT based on the evaluation of the CAT with regards to the evaluation profile includes a series of sub-steps. A first sub-step includes the processing module 44 of the control server 20 determining the evaluation profile to include a required evaluation performance improvement level. For example, the processing module 44 extracts the evaluation profile 1138 from the recovered CAT. As another example, the processing module 44 generates the evaluation profile based on an external input through a user interface (e.g., a request that includes a specific evaluation performance improvement level).

A second sub-step includes the processing module 44 of the control server 20 comparing the providing of the obligation associated with the obligation provider identifier (e.g., original or subsequent) to providing of the obligation associated with a hypothetical obligation provider identifier in accordance with the evaluation profile to produce the obligation evaluation. For example, the processing module 44 receives identity and risk levels with regards to a new obligation provider identifier and utilizes that to produce the obligation evaluation (e.g., an improved outcome when a risk level of noncompliance to the obligation is lower for the new obligation provider identifier).

A third sub-step includes the processing module 44 of the control server 20 comparing an estimated trigger outcome when the providing of the obligation is associated with the obligation provider identifier to a hypothetical estimated trigger outcome when the providing of the obligation is associated with the hypothetical obligation provider identifier in accordance with the evaluation profile to produce the outcome evaluation. For example, the processing module 44 produces the outcome evaluation for the new obligation provider (e.g., with the lower risks of not meeting the obligation) and for an estimated trigger date of the triggered outcome.

A fourth sub-step includes the processing module 44 of the control server 20 indicating to select the CAT when the obligation evaluation and the outcome evaluation satisfies the required evaluation performance improvement level. For example, the processing module 44 indicates to select the CAT when the new obligation provider identifier is a catalyst to meet the required evaluation performance improvement level.

Figure 21C:
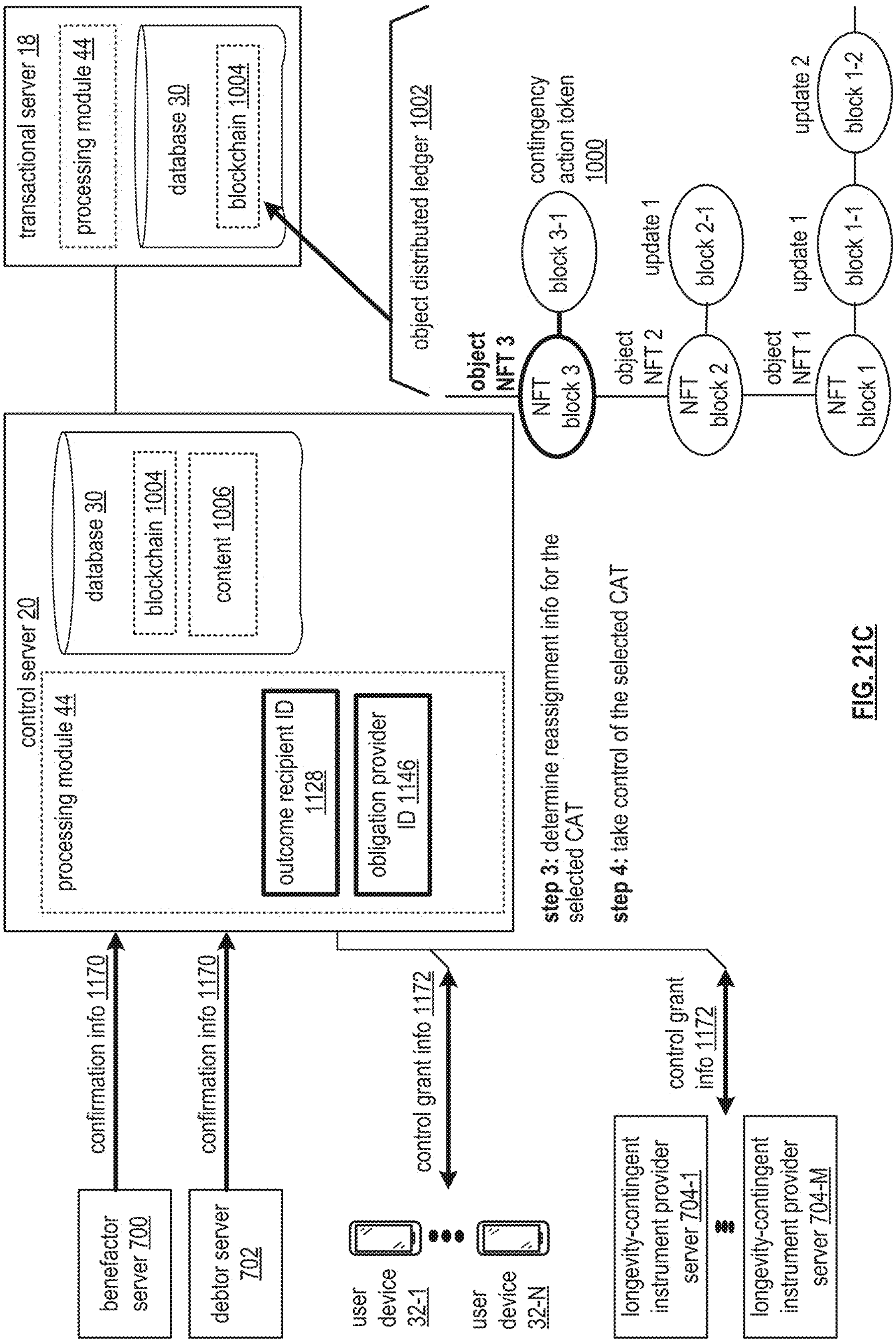

FIG. 21C further illustrates the example of the method for selecting the contingent asset token, where having selected the CAT to produce a selected CAT, a third step of the example method includes determining reassignment information for the selected CAT. The reassignment information includes a confirmed change of at least one of the obligation provider identifier 1146 and the outcome recipient identifier 1128.

The determining the reassignment information for the selected CAT includes a variety of approaches. A first approach includes identifying a hypothetical obligation provider identifier based on the evaluation of the selected CAT with regards to the evaluation profile to establish a new obligation provider identifier of the reassignment information. For example, the processing module 44 of the control server 20 replaces or adds a hypothetical obligation provider identifier to the obligation provider identifier 1146 based on a previous analysis of the evaluation of the selected CAT. Acquisition of the hypothetical obligation provider identifier includes extracting the identifier from confirmation information 1170 received from another computing device and extraction from content 1006 of the selected CAT.

A second approach to determine the reassignment information includes, when requested, the processing module 44 of the control server 20 modifying the outcome recipient identifier to establish a new outcome recipient identifier of the reassignment information. For example, the processing module 44 extracts the new outcome recipient identifier from the confirmation information 1170.

Having determined the reassignment information, a fourth step of the example method of operation includes the processing module 44 of the control server 20 facilitating taking control of the selected CAT of a blockchain of the object distributed ledger as discussed with reference to FIG. 14C. For example, the processing module 44 exchanges control grant information 1172 with a current controlling entity of the selected CAT to gain the control. For instance, the current controlling entity generates a new block that includes a public key of the processing module 44, the control request from the processing module 44, and a cryptographic signature over a portion of the block utilizing a private key of the current controlling entity.

Figure 21D:
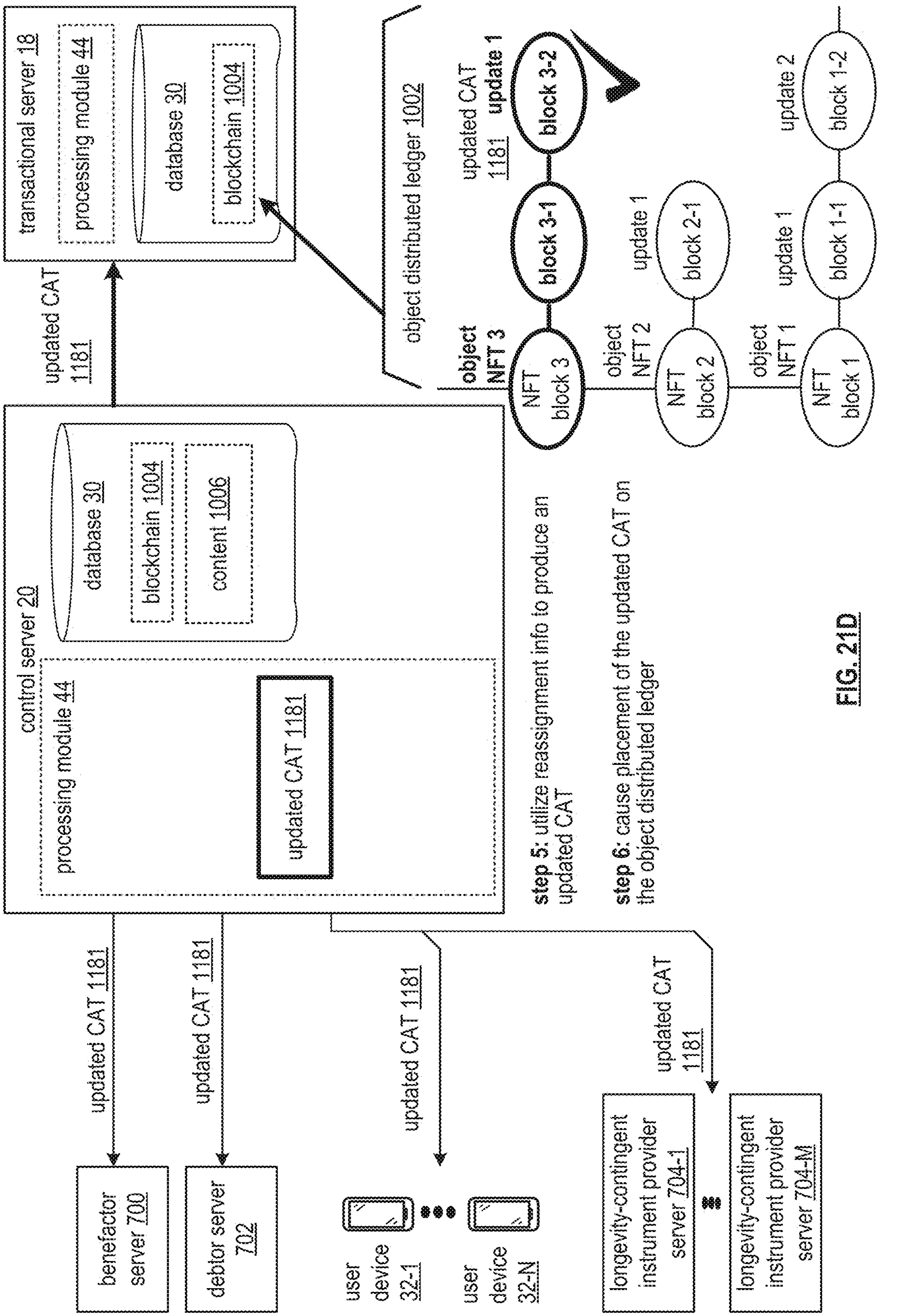

FIG. 21D further illustrates the example of the method for selecting the contingent asset token, where having taking control of the selected CAT, a fifth step of the example method includes the processing module 44 of the control server 20 updating the selected CAT utilizing the reassignment information for the CAT to produce an updated CAT 1181. The updating the selected CAT utilizing the reassignment information for the selected CAT to produce the updated CAT 1181 includes a series of sub-steps. A first sub-step includes the processing module 44 obtaining the selected CAT. For example, the processing module 44 recovers the selected CAT from the blockchain 1004 of the database 30 of the control server 20 when a local copy of the blockchain is up-to-date. As another example, the processing module 44 requests the selected CAT from the transactional server 18.

A second sub-step includes the processing module 44 replacing corresponding elements of the selected CAT with at least a portion of the reassignment information to produce the updated CAT 1181. For example, the processing module 44 replaces the obligation provider identifier 1146 with a new obligation provider identifier such that a beneficial valuation level increase is realized subsequently for the triggered outcome upon triggering and when conditions of the contingent outcome rules have been satisfied.

Having produced the updated CAT 1181, a sixth step of the example method of operation includes the processing module 44 of the control server 20 causing generation of a new block affiliated with the updated CAT via the blockchain of the object distributed ledger. The new block includes the updated CAT.

The causing generation of the new block affiliated with the updated CAT via the blockchain of the object distributed ledger includes a series of sub-steps. A first sub-step includes the processing module 44 of the control server 20 determining whether to indirectly or directly update the object distributed ledger as previously discussed (e.g., using a local copy of the blockchain when available).

When indirectly updating the object distributed ledger, a second sub-step includes the processing module 44 issuing a blockchain update request to an object ledger computing device of the computing system serving as a blockchain node of the object distributed ledger. The blockchain update request includes the updated CAT 1181. For example, the processing module 44 of the control server 20 sends the updated CAT 1181 to the transactional server 18 such that the transactional server 18 places an update to block 3-2 on the blockchain connected to the CAT as illustrated in FIG. 21D.

When directly updating the object distributed ledger, the second sub-step includes the processing module 44 obtaining a copy of the object distributed ledger. For example, the processing module 44 recovers the object distributed ledger from the blockchain 1004 of the database 30 of the control server 20. Having obtained the copy of the object distributed ledger, the second sub-step further includes hashing content of the updated CAT utilizing a receiving public key of the object distributed ledger to produce a next transaction hash value. For example, the control module 44 generates a hash value utilizing a cryptographic algorithm over the content of the updated CAT using a public key in possession of receiving entities for subsequent access of the blockchain to produce the next transaction hash value.

Having produced the next transaction hash value, the second sub-step further includes encrypting the next transaction hash value utilizing a private key of the computing device to produce a next transaction signature. For example, the processing module 44 utilizes a cryptographic encryption algorithm to encrypt the next transaction hash value utilizing the private key of the processing module 44 to produce the next transaction signature.

Having produced the next transaction signature, the second sub-step further includes generating a next block of the blockchain of the object distributed ledger to include the content of the updated CAT and the next transaction signature. For example, the processing module 44 populates the cryptographic token value 1112 of the next block with the next transaction signature and populates all the other content fields with the content of the updated CAT to produce the next block.

Having produced the next block, the second sub-step further includes causing inclusion of the next block as the new block in the object distributed ledger. For example, the processing module 44 of the control server 20 adds the block 3-2 as an update 1 associated with the selected CAT on the object distributed ledger 1002 as illustrated in FIG. 21D by updating the blockchain 1004 and the database 30 of the control server 20 and/or the transactional server 18 and other transactional servers serving as blockchain nodes supporting the object distributed ledger.

Alternatively, or in addition to, the processing module 44 of the control server 20 sends the updated CAT 1181 to one or more of the benefactor server 700, the debtor server 702, one or more of the user devices 32-1 through 32-N, and one or more of the longevity-contingent instrument provider servers 704-1 through 704-M.

The method described above module can alternatively be performed by various modules of the computing system or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers) of the computing system, cause the one or more computing devices to perform any or all of the steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computer-implemented method of using a computing system, the method comprises:

obtaining, by a computing device of the computing system, a copy of an object distributed ledger that includes a contingency-action token (CAT), wherein the CAT includes a CAT identifier of the CAT and a link to a non-fungible token (NFT) by the object distributed ledger, wherein the obtaining the copy of the object distributed ledger comprises:

determining whether to indirectly or directly access the object distributed ledger;

when indirectly accessing the object distributed ledger:

issuing a CAT access request to an object ledger computing device of the computing system serving as a blockchain node of the object distributed ledger, wherein the CAT access request includes a representation of minimum CAT requirements, and extracting the CAT identifier of the CAT from a CAT access response from the object ledger computing device; and when directly accessing the object distributed ledger:

recovering the copy of the object distributed ledger, and indicating the CAT identifier of the CAT when detecting a block of the copy of the object distributed ledger that matches at least a portion of the representation of the minimum CAT requirements;

verifying, by the computing device, that the CAT matches the representation of the minimum CAT requirements that includes:

an obligation provider identifier record of the CAT that includes an original obligation provider identifier of the NFT when the NFT was initially generated, wherein the obligation provider identifier is associated with providing of an obligation tied to an obligation recipient identifier in accordance with obligation requirements, wherein a positive obligation status indicates that the obligation has historically been provided in accordance with the obligation requirements, and an outcome recipient identifier record of the CAT that includes an original outcome recipient identifier of the NFT when the NFT was initially generated, wherein the outcome recipient identifier is associated with a result of a triggered outcome tied to an outcome provider identifier in accordance with contingent outcome rules and the positive obligation status, wherein a contingency status indicates whether the triggered outcome has been triggered for a contingency entity identifier in accordance with the contingent outcome rules;

verifying, by the computing device, that a recovered cryptographic token value of the CAT matches a calculated cryptographic token value of the CAT;

determining, by the computing device, an evaluation profile for an evaluation of the CAT to include a required evaluation performance improvement level of the obligation requirements;

comparing, by the computing device, the providing of the obligation associated with the obligation provider identifier to providing of the obligation associated with a hypothetical obligation provider identifier in accordance with the evaluation profile to produce an obligation evaluation;

comparing, by the computing device, an estimated triggered outcome when the providing of the obligation is associated with the obligation provider identifier to a hypothetical estimated triggered outcome when the providing of the obligation is associated with the hypothetical obligation provider identifier in accordance with the evaluation profile to produce an outcome evaluation;

indicating, by the computing device, to select the CAT to produce a selected CAT when the obligation evaluation and the outcome evaluation satisfies the required evaluation performance improvement level of the obligation requirements;

determining, by the computing device, reassignment information for the selected CAT, wherein the reassignment information includes a confirmed change of at least one of the obligation provider identifier and the outcome recipient identifier;

facilitating, by the computing device, taking control of the selected CAT of a blockchain of the object distributed ledger;

updating, by the computing device, the selected CAT utilizing the reassignment information for the CAT to produce an updated CAT; and causing, by the computing device, generation of a new block affiliated with the updated CAT via the blockchain of the object distributed ledger, wherein the new block includes the updated CAT, wherein the causing generation of the new block affiliated with the updated CAT via the blockchain of the object distributed ledger comprises:

determining whether to indirectly or directly update the object distributed ledger;

when indirectly updating the object distributed ledger:

issuing a blockchain update request to the object ledger computing device, wherein the blockchain update request includes the updated CAT; and when directly updating the object distributed ledger:

obtaining the copy of the object distributed ledger, hashing content of the updated CAT utilizing a receiving public key of the object distributed ledger to produce a next transaction hash value, encrypting the next transaction hash value utilizing a private key of the computing device to produce a next transaction signature, generating a next block of the blockchain of the object distributed ledger to include the content of the updated CAT and the next transaction signature, and causing inclusion of the next block as the new block in the object distributed ledger.

2. The method of claim 1, wherein the determining the evaluation profile for the evaluation of the CAT to include the required evaluation performance improvement level of the obligation requirements comprises:

recovering the NFT utilizing the link to the NFT to produce a recovered NFT; and extracting the evaluation profile from the recovered NFT.

3. The method of claim 1, wherein the determining the reassignment information for the selected CAT comprises at least one of:

identifying the hypothetical obligation provider identifier based on the evaluation of the selected CAT with regards to the evaluation profile to establish a new obligation provider identifier of the reassignment information; and when requested, modifying the outcome recipient identifier to establish a new outcome recipient identifier of the reassignment information.

4. The method of claim 1, wherein the updating the selected CAT utilizing the reassignment information for the selected CAT to produce the updated CAT comprises:

obtaining the selected CAT; and replacing corresponding elements of the selected CAT with at least a portion of the reassignment information to produce the updated CAT.

5. A computing device of a computing system, the computing device comprises:

an interface;

a local memory; and a processing module operably coupled to the interface and the local memory, wherein the processing module functions to:

obtain a copy of an object distributed ledger that includes a contingency-action token (CAT), wherein the CAT includes a CAT identifier of the CAT and a link to a non-fungible token (NFT) by the object distributed ledger, wherein the processing module obtains the copy of the object distributed ledger by:

determining whether to indirectly or directly access the object distributed ledger;

when indirectly accessing the object distributed ledger:

issuing, via the interface, a CAT access request to an object ledger computing device of the computing system serving as a blockchain node of the object distributed ledger, wherein the CAT access request includes a representation of minimum CAT requirements, and extracting the CAT identifier of the CAT from a CAT access response from the object ledger computing device; and when directly accessing the object distributed ledger:

recovering the copy of the object distributed ledger, and indicating the CAT identifier of the CAT when detecting a block of the copy of the object distributed ledger that matches at least a portion of the representation of the minimum CAT requirements;

verify that the CAT matches the representation of the minimum CAT requirements that includes:

an obligation provider identifier record of the CAT that includes an original obligation provider identifier of the NFT when the NFT was initially generated, wherein the obligation provider identifier is associated with providing of an obligation tied to an obligation recipient identifier in accordance with obligation requirements, wherein a positive obligation status indicates that the obligation has historically been provided in accordance with the obligation requirements, and an outcome recipient identifier record of the CAT that includes an original outcome recipient identifier of the NFT when the NFT was initially generated, wherein the outcome recipient identifier is associated with a result of a triggered outcome tied to an outcome provider identifier in accordance with contingent outcome rules and the positive obligation status, wherein a contingency status indicates whether the triggered outcome has been triggered for a contingency entity identifier in accordance with the contingent outcome rules;

verify that a recovered cryptographic token value of the CAT matches a calculated cryptographic token value of the CAT;

determine an evaluation profile for an evaluation of the CAT to include a required evaluation performance improvement level of the obligation requirements;

compare the providing of the obligation associated with the obligation provider identifier to providing of the obligation associated with a hypothetical obligation provider identifier in accordance with the evaluation profile to produce an obligation evaluation;

compare an estimated triggered outcome when the providing of the obligation is associated with the obligation provider identifier to a hypothetical estimated triggered outcome when the providing of the obligation is associated with the hypothetical obligation provider identifier in accordance with the evaluation profile to produce an outcome evaluation;

indicate to select the CAT to produce a selected CAT when the obligation evaluation and the outcome evaluation satisfies the required evaluation performance improvement level of the obligation requirements;

determine reassignment information for the selected CAT, wherein the reassignment information includes a confirmed change of at least one of the obligation provider identifier and the outcome recipient identifier;

facilitate taking control of the selected CAT of a blockchain of the object distributed ledger;

update the selected CAT utilizing the reassignment information for the CAT to produce an updated CAT; and cause generation of a new block affiliated with the updated CAT via the blockchain of the object distributed ledger, wherein the new block includes the updated CAT, wherein the processing module causes generation of the new block affiliated with the updated CAT via the blockchain of the object distributed ledger by:

determining whether to indirectly or directly update the object distributed ledger;

when indirectly updating the object distributed ledger:

issuing, via the interface, a blockchain update request to the object ledger computing device, wherein the blockchain update request includes the updated CAT; and when directly updating the object distributed ledger:

obtaining the copy of the object distributed ledger, hashing content of the updated CAT utilizing a receiving public key of the object distributed ledger to produce a next transaction hash value, encrypting the next transaction hash value utilizing a private key of the computing device to produce a next transaction signature, generating a next block of the blockchain of the object distributed ledger to include the content of the updated CAT and the next transaction signature, and causing inclusion of the next block as the new block in the object distributed ledger.

6. The computing device of claim 5, wherein the processing module functions to determine the evaluation profile for the evaluation of the CAT to include the required evaluation performance improvement level of the obligation requirements by:

recovering, via the interface, the NFT utilizing the link to the NFT to produce a recovered NFT; and extracting the evaluation profile from the recovered NFT.

7. The computing device of claim 5, wherein the processing module functions to determine the reassignment information for the selected CAT by at least one of:

identifying the hypothetical obligation provider identifier based on the evaluation of the selected CAT with regards to the evaluation profile to establish a new obligation provider identifier of the reassignment information; and when requested, modifying the outcome recipient identifier to establish a new outcome recipient identifier of the reassignment information.

8. The computing device of claim 5, wherein the processing module functions to update the selected CAT utilizing the reassignment information for the selected CAT to produce the updated CAT by:

obtaining, via the interface, the selected CAT; and replacing corresponding elements of the selected CAT with at least a portion of the reassignment information to produce the updated CAT.

9. A non-transitory computer-readable memory comprises:

a first memory element that stores operational instructions that, when executed by a processing module of a computing device of a computing system, causes the processing module to:

obtain a copy of an object distributed ledger that includes a contingency-action token (CAT), wherein the CAT includes a CAT identifier of the CAT and a link to a non-fungible token (NFT) by the object distributed ledger, wherein the processing module obtains the copy of the object distributed ledger by:

determining whether to indirectly or directly access the object distributed ledger;

when indirectly accessing the object distributed ledger:

issuing a CAT access request to an object ledger computing device of the computing system serving as a blockchain node of the object distributed ledger, wherein the CAT access request includes a representation of minimum CAT requirements, and extracting the CAT identifier of the CAT from a CAT access response from the object ledger computing device; and when directly accessing the object distributed ledger:

recovering the copy of the object distributed ledger, and indicating the CAT identifier of the CAT when detecting a block of the copy of the object distributed ledger that matches at least a portion of the representation of the minimum CAT requirements;

verify that the CAT matches the representation of the minimum CAT requirements that includes:

an obligation provider identifier record of the CAT that includes an original obligation provider identifier of the NFT when the NFT was initially generated, wherein the obligation provider identifier is associated with providing of an obligation tied to an obligation recipient identifier in accordance with obligation requirements, wherein a positive obligation status indicates that the obligation has historically been provided in accordance with the obligation requirements, and an outcome recipient identifier record of the CAT that includes an original outcome recipient identifier of the NFT when the NFT was initially generated, wherein the outcome recipient identifier is associated with a result of a triggered outcome tied to an outcome provider identifier in accordance with contingent outcome rules and the positive obligation status, wherein a contingency status indicates whether the triggered outcome has been triggered for a contingency entity identifier in accordance with the contingent outcome rules; and verify that a recovered cryptographic token value of the CAT matches a calculated cryptographic token value of the CAT;

a second memory element that stores operational instructions that, when executed by the processing module, causes the processing module to:

determine an evaluation profile for an evaluation of the CAT to include a required evaluation performance improvement level of the obligation requirements;

compare the providing of the obligation associated with the obligation provider identifier to providing of the obligation associated with a hypothetical obligation provider identifier in accordance with the evaluation profile to produce an obligation evaluation;

compare an estimated triggered outcome when the providing of the obligation is associated with the obligation provider identifier to a hypothetical estimated triggered outcome when the providing of the obligation is associated with the hypothetical obligation provider identifier in accordance with the evaluation profile to produce an outcome evaluation; and indicate to select the CAT to produce a selected CAT when the obligation evaluation and the outcome evaluation satisfies the required evaluation performance improvement level of the obligation requirements; and a third memory element that stores operational instructions that, when executed by the processing module, causes the processing module to:

determine reassignment information for the selected CAT, wherein the reassignment information includes a confirmed change of at least one of the obligation provider identifier and the outcome recipient identifier;

facilitate taking control of the selected CAT of a blockchain of the object distributed ledger;

update the selected CAT utilizing the reassignment information for the CAT to produce an updated CAT; and cause generation of a new block affiliated with the updated CAT via the blockchain of the object distributed ledger, wherein the new block includes the updated CAT, wherein the processing module causes generation of the new block affiliated with the updated CAT via the blockchain of the object distributed ledger by:

determining whether to indirectly or directly update the object distributed ledger;

when indirectly updating the object distributed ledger:

issuing a blockchain update request to the object ledger computing device, wherein the blockchain update request includes the updated CAT; and when directly updating the object distributed ledger:

obtaining the copy of the object distributed ledger, hashing content of the updated CAT utilizing a receiving public key of the object distributed ledger to produce a next transaction hash value, encrypting the next transaction hash value utilizing a private key of the computing device to produce a next transaction signature, generating a next block of the blockchain of the object distributed ledger to include the content of the updated CAT and the next transaction signature, and causing inclusion of the next block as the new block in the object distributed ledger.

10. The non-transitory computer-readable memory of claim 9, wherein the processing module functions to execute the operational instructions stored by the second memory element to cause the processing module to the evaluation profile for the evaluation of the CAT to include the required evaluation performance improvement level of the obligation requirements by:

Recovering the NFT utilizing the link to the NFT to produce a recovered NFT; and extracting the evaluation profile from the recovered NFT.

11. The non-transitory computer-readable memory of claim 9, wherein the processing module functions to execute the operational instructions stored by the third memory element to cause the processing module to determine the reassignment information for the selected CAT by at least one of:

identifying the hypothetical obligation provider identifier based on the evaluation of the selected CAT with regards to the evaluation profile to establish a new obligation provider identifier of the reassignment information; and when requested, modifying the outcome recipient identifier to establish a new outcome recipient identifier of the reassignment information.

12. The non-transitory computer-readable memory of claim 9, wherein the processing module functions to execute the operational instructions stored by the third memory element to cause the processing module to update the selected CAT utilizing the reassignment information for the selected CAT to produce the updated CAT by:

obtaining the selected CAT; and replacing corresponding elements of the selected CAT with at least a portion of the reassignment information to produce the updated CAT.

* * * * *